United States Patent
Shear et al.

(10) Patent No.: US 10,509,907 B2
(45) Date of Patent: *Dec. 17, 2019

(54) METHODS AND SYSTEMS FOR SECURE AND RELIABLE IDENTITY-BASED COMPUTING

(71) Applicant: Advanced Elemental Technologies, Inc., Atherton, CA (US)

(72) Inventors: Victor Henry Shear, Atherton, CA (US); Peter Robert Williams, Belmont, CA (US); Jaisook Rho, Palo Alto, CA (US); Timothy St. John Redmond, San Francisco, CA (US)

(73) Assignee: Advanced Elemental Technologies, Inc., Atherton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,067

(22) Filed: Apr. 5, 2018

(65) Prior Publication Data

US 2018/0232522 A1    Aug. 16, 2018

Related U.S. Application Data

(60) Continuation of application No. 15/628,228, filed on Jun. 20, 2017, now Pat. No. 9,971,894, which is a
(Continued)

(51) Int. Cl.
*G06F 21/57* (2013.01)
*G06F 21/31* (2013.01)
(Continued)

(52) U.S. Cl.
CPC .............. *G06F 21/57* (2013.01); *G06F 21/31* (2013.01); *G06F 21/316* (2013.01); *G06F 21/32* (2013.01);
(Continued)

(58) Field of Classification Search
CPC ........ G06F 21/57; G06F 21/31; G06F 21/316; G06F 21/32; G06F 21/445; G06F 21/45;
(Continued)

(56) References Cited

U.S. PATENT DOCUMENTS

| 5,765,154 A | 6/1998 | Horikiri et al. |
| 5,794,050 A | 8/1998 | Dahlgren et al. |

(Continued)

FOREIGN PATENT DOCUMENTS

| CN | 1526232 A | 9/2004 |
| CN | 1535433 A | 10/2004 |

(Continued)

OTHER PUBLICATIONS

Wang et al., "A New Trust Model based on Social Characteristic and Reputation Mechanism for the Semantic Web," *Proceedings of the st International Workshop on Knowledge Discovery and Data Mining*, Jul. 2008, pp. 414-417.

(Continued)

*Primary Examiner* — Harunur Rashid
*Assistant Examiner* — Sakinah White Taylor
(74) *Attorney, Agent, or Firm* — Finnegan Henderson Farabow Garrett & Dunner LLP

(57) ABSTRACT

The embodiments herein provide a secure computing resource set identification, evaluation, and management arrangement, employing in various embodiments some or all of the following highly reliable identity related means to establish, register, publish and securely employ user computing arrangement resources in satisfaction of user set target contextual purposes. Systems and methods may include, as applicable, software and hardware implementations for Identity Firewalls; Awareness Managers; Contextual Purpose Firewall Frameworks for situationally germane resource usage related security, provisioning, isolation, con- (Continued)

straining, and operational management; liveness biometric, and assiduous environmental, evaluation and authentication techniques; Repute systems and methods assertion and fact ecosphere; standardized and interoperable contextual purpose related expression systems and methods; purpose related computing arrangement resource and related information management systems and methods, including situational contextual identity management systems and methods; and/or the like.

22 Claims, 54 Drawing Sheets

Related U.S. Application Data division of application No. 14/485,707, filed on Sep. 13, 2014, now Pat. No. 9,721,086, which is a continuation-in-part of application No. PCT/US2014/026912, filed on Mar. 14, 2014, which is a continuation-in-part of application No. 13/928,301, filed on Jun. 26, 2013, now Pat. No. 9,378,065, which is a continuation-in-part of application No. 13/815,934, filed on Mar. 15, 2013, now Pat. No. 10,075,384.

(51) Int. Cl.

| | | |
|---|---|---|
| *G06F 21/45* | (2013.01) | |
| *G06F 21/53* | (2013.01) | |
| *G06F 21/32* | (2013.01) | |
| *H04L 29/06* | (2006.01) | |
| *G06F 21/44* | (2013.01) | |
| *G06F 21/62* | (2013.01) | |
| *G06F 21/64* | (2013.01) | |

(52) U.S. Cl.
CPC ............ *G06F 21/445* (2013.01); *G06F 21/45* (2013.01); *G06F 21/53* (2013.01); *G06F 21/575* (2013.01); *G06F 21/6218* (2013.01); *G06F 21/6245* (2013.01); *G06F 21/64* (2013.01); *H04L 63/0861* (2013.01); *H04L 63/20* (2013.01); *G06F 2221/2129* (2013.01); *G06F 2221/2149* (2013.01)

(58) Field of Classification Search
CPC .... G06F 21/53; G06F 21/575; G06F 21/6218; G06F 21/6245; G06F 21/64; G06F 2221/2129; G06F 2221/2149; H04L 63/0861; H04L 63/20
USPC .......................................................... 726/6
See application file for complete search history.

(56) References Cited

U.S. PATENT DOCUMENTS

| | | |
|---|---|---|
| 5,892,900 A | 4/1999 | Ginter et al. |
| 5,893,057 A | 4/1999 | Fujimoto et al. |
| 5,933,502 A | 8/1999 | Aucsmith et al. |
| 6,185,683 B1 | 2/2001 | Ginter et al. |
| 6,353,824 B1 | 3/2002 | Boguraev et al. |
| 6,523,022 B1 | 12/2003 | Hobbs |
| 6,675,159 B1 | 1/2004 | Lin et al. |
| 7,082,463 B1 | 7/2006 | Bradley et al. |
| 7,281,043 B1 | 10/2007 | Davie |
| 7,313,533 B2 | 12/2007 | Chang et al. |
| 7,433,838 B2 | 10/2008 | Welsh et al. |
| 7,467,206 B2 | 12/2008 | Moore et al. |
| 7,603,350 B1 | 10/2009 | Guha |
| 7,673,040 B2 | 3/2010 | Gilbert et al. |
| 7,702,687 B2 | 4/2010 | Govindarajan et al. |
| 7,734,609 B2 | 6/2010 | Manfredi et al. |
| 7,761,399 B2 | 7/2010 | Evans |
| 8,010,459 B2 | 8/2011 | Buyukkokten et al. |
| 8,010,460 B2 | 8/2011 | Work et al. |
| 8,150,842 B2 | 4/2012 | Brougher et al. |
| 8,370,319 B1 | 2/2013 | Krynski et al. |
| 8,374,973 B2 | 2/2013 | Herbrich et al. |
| 8,380,902 B2 | 2/2013 | Howard |
| 8,508,338 B1 | 8/2013 | Owen |
| 8,548,207 B2 | 10/2013 | Langley et al. |
| 9,202,105 B1 | 12/2015 | Wang et al. |
| 9,576,270 B1 | 2/2017 | Afshar |
| 9,721,086 B2 | 8/2017 | Shear et al. |
| 9,904,579 B2 | 2/2018 | Shear et al. |
| 2002/0046041 A1 | 4/2002 | Lang |
| 2002/0056043 A1 | 5/2002 | Glass |
| 2002/0087496 A1 | 7/2002 | Stirpe et al. |
| 2002/0093529 A1 | 7/2002 | Daoud et al. |
| 2002/0129268 A1 | 9/2002 | Ito et al. |
| 2003/0014692 A1 | 1/2003 | James et al. |
| 2003/0037033 A1 | 2/2003 | Nyman et al. |
| 2003/0069640 A1 | 4/2003 | Ferreira et al. |
| 2003/0149666 A1* | 8/2003 | Davies .................... G06F 21/34 705/50 |
| 2003/0169640 A1 | 9/2003 | Koenig |
| 2003/0191719 A1* | 10/2003 | Ginter .................... G06F 21/10 705/54 |
| 2004/0022444 A1* | 2/2004 | Rhoads ............. G06K 9/00577 382/232 |
| 2004/0029564 A1 | 2/2004 | Hodge |
| 2005/0108001 A1 | 5/2005 | Aarskog |
| 2005/0206501 A1* | 9/2005 | Farhat .................... G06F 21/32 340/5.82 |
| 2005/0267871 A1 | 12/2005 | Marchisio et al. |
| 2006/0057550 A1 | 3/2006 | Sahashi |
| 2007/0185718 A1 | 8/2007 | Di Mambro et al. |
| 2007/0220273 A1* | 9/2007 | Campisi ............ G06K 9/00006 713/186 |
| 2008/0040428 A1 | 2/2008 | Wei et al. |
| 2008/0072298 A1 | 3/2008 | Dal Canto |
| 2008/0086458 A1 | 4/2008 | Robinson et al. |
| 2008/0109244 A1 | 5/2008 | Gupta |
| 2008/0109245 A1 | 5/2008 | Gupta |
| 2008/0126929 A1* | 5/2008 | Bykov .................... G06F 9/451 715/700 |
| 2008/0300011 A1* | 12/2008 | Rhoads .................... H04K 1/02 455/556.1 |
| 2009/0192968 A1 | 7/2009 | Tunstall-Pedoe |
| 2009/0287837 A1* | 11/2009 | Felsher ................. G06F 19/328 709/229 |
| 2009/0307581 A1 | 12/2009 | Jaepel et al. |
| 2010/0070448 A1 | 3/2010 | Omoigui |
| 2010/0180031 A1* | 7/2010 | Cacheria, III ...... G06Q 10/1057 709/225 |
| 2010/0185864 A1* | 7/2010 | Gerdes, Jr. ............ H04L 9/3213 713/175 |
| 2010/0242044 A1 | 9/2010 | Osborne et al. |
| 2010/0250497 A1* | 9/2010 | Redlich .................... F41H 13/00 707/661 |
| 2010/0317420 A1* | 12/2010 | Hoffberg ............ G06Q 30/0207 463/1 |
| 2011/0043652 A1 | 2/2011 | King |
| 2011/0082801 A1 | 4/2011 | Baghdasaryan et al. |
| 2011/0093703 A1 | 4/2011 | Etchegoyen |
| 2011/0125894 A1 | 5/2011 | Anderson et al. |
| 2011/0161309 A1 | 6/2011 | Lung |
| 2011/0283343 A1 | 11/2011 | Jaeger |
| 2011/0307435 A1 | 12/2011 | Overell et al. |
| 2012/0005480 A1 | 1/2012 | Batke et al. |
| 2012/0022382 A1 | 1/2012 | Daisuke et al. |
| 2012/0030228 A1 | 2/2012 | Naidu et al. |
| 2012/0158821 A1* | 6/2012 | Barros .................. G06F 16/254 709/203 |
| 2012/0216276 A1 | 8/2012 | Regnault et al. |
| 2012/0303358 A1 | 11/2012 | Ducatel et al. |
| 2013/0036459 A1 | 2/2013 | Liberman et al. |
| 2013/0073735 A1 | 3/2013 | Behrendt et al. |
| 2013/0086100 A1 | 4/2013 | de Cerqueira Gatti et al. |
| 2013/0110872 A1 | 5/2013 | Barga et al. |

(56) References Cited

U.S. PATENT DOCUMENTS

| | | | |
|---|---|---|---|
| 2013/0117668 A1 | 5/2013 | Joseph et al. | |
| 2013/0132866 A1 | 5/2013 | Shafique | |
| 2013/0166332 A1 | 6/2013 | Hammad | |
| 2013/0238425 A1 | 9/2013 | Saldanha et al. | |
| 2013/0238599 A1 | 9/2013 | Burris | |
| 2013/0305336 A1 | 11/2013 | Konertz et al. | |
| 2013/0306276 A1 | 11/2013 | Duchesneau | |
| 2014/0023246 A1 | 1/2014 | Bolding et al. | |
| 2014/0189804 A1 | 7/2014 | Lehmann et al. | |
| 2014/0214330 A1 | 7/2014 | Iyer et al. | |
| 2016/0071111 A1 | 3/2016 | Wang et al. | |
| 2016/0241405 A1* | 8/2016 | Jeong | H04L 63/0428 |

FOREIGN PATENT DOCUMENTS

| | | |
|---|---|---|
| CN | 103001945 A | 3/2013 |
| CN | 103019717 A | 4/2013 |
| EP | 2560123 A1 | 2/2013 |
| GB | 2492050 A | 12/2012 |
| JP | 06-203145 A | 7/1994 |
| WO | WO 2009/002686 A1 | 12/2008 |
| WO | WO 2011/073734 A1 | 6/2011 |

OTHER PUBLICATIONS

Office Action dated Oct. 16, 2018, for U.S. Appl. No. 16/004,350, filed Jun. 9, 2018.
Office Action dated Oct. 25, 2018, for U.S. Appl. No. 16/016,476, filed Jun. 22, 2018.
"About the Open Directory Project," *AOL Inc.*, 2012, retrieved on Jun. 14, 2013 from www.dmoz.org/docs/en/about.html, 2 pages.
"RDF Primer," *W3C Recommendation*F. Manola et al, eds., Feb. 10, 2004, www.w3.org/TR/2004/REC-rdf-primer-20040210/, 109 pages.
"WordNet 3.0 Reference Manual," from *WordNet: A lexical database for English*, Princeton University, retrieved on Jun. 14, 2013 from wordnet.princeton.edu/wordnet/documentation/, 114 pages.
Adler et al., "Reputation Systems for Open Collaboration," *Communications of the ACM* Aug. 2011, pp. 81-87.
Agrawal et al., "Activity Context Aware Digital Workspaces and Consumer Playspaces: Manifesto and Architecture," *Activity Context Representation: Techniques and Languages*, AAAI Technical Report WS-12-05, 2012, 16 pages.
Azzedin et al, "Towards Trust-Aware Resource Management in Grid Computing Systems," *Proceedings of the 2nd IEEE/ACM International Symposium on Cluster Computing and the Grid*, Jul. 2002, 6 pages.
Begoli et al., "Design Principles for Effective Knowledge Discovery from Big Data," *Joint Working Conference on Software Architecture & 6th European Conference on Software Architecture*, Feb. 2012, pp. 215-218.
Bock et al., "Owl 2 Web Ontology Language Structural Specification and Functional-Style Syntax (2nd Editon)," *W3C Recommendation*, B. Motik et al., eds., Dec. 11, 2012, www.w3.org/TR/2012/REC-ow12-syntax-20121211/, 63 pages.
Büttcher et al., *Information Retrieval: Implementing and Evaluating Search Engines*, 2010, The MIT Press, Cambridge, MA, ISBN: 978-0-262-02651-2.
Ceran et al., "A Semantic Triplet Based Story Classifier " *IEEE/ACM International Conference on Advances in Social Networks Analysis and Mining (ASONAM)*, 2012, pp. 573-580.
Coyle, "Identifiers: Unique, Persistent, Global," *The Journal of Academic Librarianship*, Jul. 2006, 32(4):428-431.
Downey et al., "Understanding the Relationship between Searchers' Queries and Information Goals," *Proceedings of the 17th Conference on Information and Knowledge Management (CIKM)*, Oct. 26-30, 2008, pp. 449-458.
Dyson, "The Future of Internet Search," Project Syndicate, Aug. 19, 2010, 3 pages.
Etzioni et al., "Open Information Extraction from the Web," *Communications of the ACM*, Dec. 2008, 51(12):68-74.
Fagin et al., *Reasoning about Knowledge*, 1995, The MIT Press, Cambridge, MA, ISBN: 978-0-262-56200-3.
FID IS WP3, "D3.18: Demonstration of a new approach for preserving identity and privacy in mobile transactions using Id-token with Trusted Computing," R. Husseiki et al, eds., Jun. 30, 2009, www.fidis.net/resources/deliverables/hightechid/, 18 pages.
FIDIS WP12, "D12.1: Integrated Workshop on Emerging Aml Technologies," M. Gasson, ed., May 21, 2007, www.fidis.net/resources/deliverables/hightechid/, 17 pages.
FIDIS WP12, "D12.10: Normality Mining: Results from a Tracking Study," M. Gasson et al., eds., Jun. 30, 2009, www.fidis.net/resources/deliverables/hightechid/, 41 pages.
FIDIS WP12, "D12.2: Study on Emerging Aml Technologies," M. Gasson et al., eds., Oct. 1, 2007, www.fidis.net/resources/deliverables/hightechid/, 85 pages.
FIDIS WP12, "D12.3: A Holistic Privacy Framework for RFID Applications," S. Fischer-Hilbner et al, eds., Apr. 30, 2008, www.fidis.net/resources/deliverables/hightechid/, 99 pages.
FIDIS WP12, "D12.4: Integrated Workshop on Emerging Aml Technologies," M. Gasson, ed., Apr. 30, 2008, www.fidis.net/resources/deliverables/hightechid/, 13 pages.
FIDIS WP12, "D12.5: Use cases and scenarios of emerging technologies," M. Gasson, ed., Sep. 25, 2008, www.fidis.net/resources/deliverables/hightechid/, 45 pages.
FIDIS WP12, "D12.6: A Study on ICT Implants," E. Kosta et al., eds., Sep. 30, 2008, www.fidis.net/resources/deliverables/hightechid/, 80 pages.
FIDIS WP12, "D12.7: Identity-related Crime in Europe-Big Problem or Big Hype?" N. van der Meulen et al., eds., Jun. 9, 2008, www.fidis.net/resources/deliverables/hightechid/, p. 86.
FIDIS WP2, "D2.1: Inventory of topics and clusters," T. Nabeth et al, eds., Sep. 21, 2005, www.fidis.net/resources/deliverables/identity-ofidentity/,.
FIDIS WP2, "D2.12: Time for Synthesis Identity [R]Evolution (Booklet)," D. Jaquet-Chiffelle et al., eds., May 4, 2009, www.fidis.net/resources/deliverables/identity-of-identity/, 11 pages.
FIDIS WP2, "D2.13: Virtual Persons and Identities," D. Jaquet-Chiffelle et al., eds., Mar. 24, 2008, www.fidis.net/resources/deliverables/identity-ofidentity/, 53 pages.
FIDIS WP2, "D2.2: Set of use cases and scenarios," T. Nabeth etal., eds., May 26, 2006, www.fidis.net/resources/deliverables/identity-of-identity/, 91 pages.
FIDIS WP2, "D2.3: Models," T. Nabeth et al., eds., Oct. 6, 2005, www.fidis.net/resources/deliverable/identity-of-identity/ , 74 pages.
FIDIS WP2, "D2.6: Identity in a Networked World Use Cases and Scenarios," D. Jaquet-Chiffelle et al., eds., Aug. 28, 2006 www.fidis.net/resources/deliverables/identity-of-identity/,• 24 pages.
FIDIS WP3 "D3.3: Study on Mobile Identity Management," G. MUiier et al., eds., May 9, 2005, www.fidis.net/resources/deliverables/hightechid/, 90 pages.
FIDIS WP3, "D3.1: Structured Overview on Prototypes and Concepts of Identity Management Systems," M. Bauer et al, eds., Sep. 15, 2005, www.fidis.net/resources/deliverables/hightechid/, 81 pages.
FIDIS WP3, "D3.10: Biometrics in identity management," E. Kindt et al, eds., Dec. 28, 2007, www.fidis.net/resources/deliverables/hightechid/, 130 pages.
FIDIS WP3, "D3.11: Report on the Maintenance of the IMS Database," M. Meints, ed., Apr. 24, 2007, www.fidis.net/resources/deliverables/hightechid/, 41 pages.
FIDIS WP3, "D3.13: Study on Usability of IMS," J. S. Pettersson et al, eds., Aug. 14, 2009, www.fidis.net/resources/deliverables/hightechid/, 144 pages.
FIDIS WP3, "D3.14: Model implementation for a user controlled biometric authentication," L. Millier et al., eds., Aug. 6, 2009, www.fidis.net/resources/deliverables/hightechid/, 58 pages.
FIDIS WP3, "D3.15: Report on the Maintenance of the IMS Database," M. Meints, ed., May 14, 2008, www.fidis.net/resources/deliverables/hightechid/, 12 pages.
FIDIS WP3, "D3.15a: Report on the Maintenance of the IMS Database," H. Zwingelberg, ed., May 8, 2009, www.fidis.net/resources/deliverables/hightechid/, 17 pages.

(56) References Cited

OTHER PUBLICATIONS

FIDIS WP3, "D3.16: Biometrics: Pet or Pit?" A. Sprokkereef et al., eds., Aug. 20, 2009, www.fidis.net/resources/deliverables/hightechid/, 68 pages.
FIDIS WP3, "D3.17: Identity Management Systems- recent developments," M. Meints et al., eds., Aug. 10, 2009, www.fidis.net/resources/deliverables/hightechid/, 65 pages.
FIDIS WP3, "D3.2: A study on PKI and biometrics," M. Gasson et al., eds., May 4, 2005, www.fidis.net/resources/deliverables/hightechid/, 138 pages.
FIDIS WP3, "D3.5: Workshop on ID-Documents," M. Meints, ed., Sep. 5, 2005, htto://www.fidis.net/resources/deliverables/hightechid/, 20 pages.
FIDIS WP3, "D3.6: Study on ID Documents," M. Meints et al., eds., Dec. 20, 2006, www.fidis.net/resources/deliverables/hightechid/, 160 pages.
FIDIS WP3, "D3.7: A Structured Collection on Information and Literature on Technological and Usability Aspects of Radio Frequency Identification (RFID)," M. Meints, ed., Jun. 4, 2007, www.fidis.net/resources/deliverables/hightechid/, 58 pages.
FIDIS WP3, "D3.8: Study on protocols with respect to identity and identification an insight on network protocols and privacy-aware communication," M. Hansen et al, eds., May 14, 2008, www.fidis.net/resources/deliverables/hightechid/, 121 pages.
FIDIS WP3, "D3.9: Study on the Impact of Trusted Computing on Identity and Identity Management," A. Alkassar et al, eds., May 13, 2008, www.fidis.net/resources/deliverables/hightechid/, 81 pages.
FIDIS WP3, Poetzsch et al.," D3.12: Federated Identity Management—what's in it for the citizen/customer?" R. Leenes, ed., Jun. 10, 2009, www.fidis.net/resources/deliverables/hightechid/, 76 pages.
FIDIS WP4, "D4.1: Structured account of approaches on interoperability," J. Backhouse, ed., Jul. 12, 2005, www.fidis.net/resources/deliverables/interoperability/, 77 pages.
FIDIS WP4, "D4.11: eHealth identity management in several types of welfare states in Europe," S. Els et al, eds., Mar. 31, 2008, www.fidis.net/resources/deliverables/interoperability/, 48 pages.
FIDIS WP4, "D4.12: A qualitative comparative analysis of citizens' perception of eIDs and interoperability," R. Halperin et al., eds., Jun. 28, 2009, www.fidis.net/resources/deliverables/interoperability/, 49 pages.
FIDIS WP4, "D4.2: Set of requirements for interoperability of Identity Management Systems," J. Backhouse et al., eds., Dec. 20, 2005, www.fidis.net/resources/deliverables/interoperability/, 157 pages.
FIDIS WP4, "D4.4: Survey on Citizen's trust in ID systems and authorities," J. Backhouse et al., eds., Feb. 8, 2007, www.fidis.net/resources/deliverables/interoperability/, 93 pages.
FIDIS WP4, "D4.5: A Survey on Citizen's trust in ID systems and Authorities," J. Backhouse et al., eds., Apr. 17, 2007, www.fidis.net/resources/deliverables/interoperability/, 27 pages.
FIDIS WP4, "D4.6: Draft best practice guidelines," J. Backhouse et al., eds., Oct. 2006, www.fidis.net/resources/deliverables/interoperability/, 34 pages.
FIDIS WP4, "D4.7: Review and classification for a FIDIS identity management model," J. Backhouse et al., eds., Apr. 26, 2007, www.fidis.net/resources/deliverables/interoperability/, 27 pages.
FIDIS WP4, "D4.8: Creating the method to incorporate FIDIS research for generic application," J. Backhouse et al., Apr. 2007, www.fidis.net/resources/deliverables/interoperability/, 29 pages.
FIDIS WP4, "D4.9: An application of the management method to interoperability within e-Health," J. Backhouse et al., eds., Nov. 26, 2007, www.fidis.net/resources/deliverables/interoperability/, 29 pages.
FIDIS WPI 7, "D17.1: Modelling New Forms of Identities: Applicability of the Model Based on Virtual Persons," D. Jaquet-Chiffelle et al., eds., Sep. 30, 2008, ttp://www.fidis.net/resources/fidis-deliverables/identity-of-identity, 67 pages.
FIDIS WPI 7, "D17.4: Trust and Identification in the Light of Virtual Persons," D. Jaquet-Chiffelle et al., eds., Jun. 25, 2009, www.fidis.net/resources/deliverables/identity-of-identity/, 103 pages.
FIDO Alliance, "Specifications Overview," [online]. Retrieved from: https://fidoalliance.org/specifications/overview/, Sep. 30, 2016.

Ge et al., "Concept Similarity Matching Based on Semantic Distance," *Proceedings of the 4th International Conference on Semantics, Knowledge and Grid*, May 2008, pp. 380-383.
Giannakopoulou, "Prototype Theory: an evaluation," *Ecloga*, Jan. 2003, 8 pages.
Gruber, "Toward principles for the design of ontologies used for knowledge sharing " *Int. J. Human-Computer Studies*, 1995(5-6):907-928.
Guarino, "Semantic Matching: Formal Ontological Distinctions for Information Organization, Extraction, and Integration," *Summer School on Information Extraction*, Jul. 14-19, 1997, Frascati, Italy, 32 pages.
Gulati et al., "Cloud-Scale Resource Management: Challenges and Techniques," *Proceedings of the* 3rd *USENIX conference on Hot topics in cloud computing*, 2011, 6 pages.
Halpern, *Reasoning about Uncertainty*, 2003, The MIT Press, Cambridge, MA, ISBN: 978-0-262-58259-9.
Houben et al., "A Situated Model and Architecture for Distributed Activity-Based Computing," *Proceedings of the 2nd International Workshop on Model-based Interactive Ubiquitous Systems*, 2012, 5 pages.
Ingwersen et al., *The Turn: Integration of Information Seeking and Retrieval in Context*20 10, Springer, Dordrecht, The Netherlands, ISBN: 978-90-481-6981-8.
International Search Report and Written Opinion from PCT/US2015/049222; dated Dec. 22, 2015; 9 pages.
International Search Report and Written Opinion in PCT Application PCT/US2014/026912 dated Sep. 19, 2014; 6 pages.
Jain et al, "Ontology Alignment for Linked Open Data," *Proceedings of the 9th International Conference on the Semantic Web*, 2010, 16 pages.
Kiorgaard, "RDA/ONIX Framework for Resource Categorization, Version 1.0 " *as submitted to the Joint Steering Committee for Revision of AACR*, Aug. 3, 2006, 23 pages.
Koutrouli et al., "Credibility Enhanced Reputation Mechanism for Distributed e-Communities " 19th*International Euromicro Conference on Parallel, Distributed and Network-Based Processing*, 2011, pp. 627-634.
Kraut et al., *Building Successful Online Communities: Evidence-Based Social Design 2011*, The MIT Press, Cambridge, MA, ISBN: 978-0-262-01657-5.
Liu et al., "A Constraint Language Approach to Grid Resource Selection," 2003, Department of Computer Science, University of Chicago, 14 pages.
Mayee et al., "Automatic Extraction and Incorporation of Purpose Data into PurposeNet," *Technical Report, International Institute of Information Technology*, Jul. 2010, 6:154-158.
Maheswaran et al., "Toward a Quality of Service Aware Public Computing Utility," 1st*IEEE NCA Workshop on Adaptive Grid Computing*, 2004, pp. 376-379.
Marshall et al., "Making Large-Scale Information Resources Serve Communities of Practice," *Journal of Management Information Systems*, Special Section: Navigation in information-intensive environments, 1995, 11(5):65-86.
Mayee, "PurposeNet," *PowerPoint presentation*, 2010, Hyerabad, India, 59 pages.
Morville et al., *Search Patterns*, 2010, O'Reilly Media, Inc., Sebastopol, CA, ISBN: 978-0-596-80227-1.
Muniswamy-Reddy, et al., "Provenance for the Cloud," *Proceedings of the 8th USENIX Conference on File and Storage Technologies*, 2010, pp. 1-14.
Najar et al., "Bringing Context to Intentional Services for Service Discovery," *International Journal on Advances in Intelligent Systems*, 2012, 5(1-2): 159-174.
Najar et al., "Context-Aware Intentional Service Framework for service adaptation," 4th International Conference on Research Challenges in Information Science (RCIS), Jan. 2010, 10 pages.
Najar et al., "The influence of context on intentional service," 35th *IEEE Annual Computer Software and Applications Conference Workshops (COMPSACW)*, May 2011, pp. 470-475.

(56) References Cited

OTHER PUBLICATIONS

Najar et al., "Towards Semantic Modeling of Intentional Pervasive Information Systems," *Proceedings of the 6th International Workshop on Enhanced Web Services Technologies*, Sep. 14, 2011, pp. 30-34.

Ngoc et al., "Context Knowledge Discovery in Ubiquitous Computing," *OTM Workshops*, R. Meersman et al., eds., 2005, LNCS 3762, pp. 33-34.

Parra et al., "Chapter 7: Recommender Systems: Sources of Knowledge and Evaluation Metrics," *Advanced Techniques in Web Intelligence-2* J.D. Velasquez et al, eds., 2013, Springer-Verlag, Berlin, Germany, SCI 452: 149-175.

Pearl, *Causality: Models, Reasoning, and Inference* ($2^{nd}$ Edition), 2000, Cambridge University Press, New York, NY, ISBN: 0-521-77362-8.

Ranganathan, "Philosophy of Library Classification," *Sarada Ranganathan Endowment for Library Science (SRELS)*, Digital Library of Information Science & Technology, University of Arizona, 1989, 12 pages.

Ranganathan, *Colon Classification* ($6^{th}$ Edition), 1960, Ess Ess Publications, New Delhi, India, ISBN: 81-7000-423-3.

Ricci et al. (eds.), *Recommender Systems Handbook*, 2011, Springer Science+Business Media, LLC, New York, NY, ISBN: 978-0-387-85819-7.

Sangal et al, "PurposeNet: A Knowledgebase Organized Around Purpose," *The $20^{th}$ International Conference on Conceptual Structures*, Jan. 2013, 20 pages.

Santini et al., "Similarity Matching," *Second Asian Conference on Computer Vision*, 1995, pp. 571-580.

Sowa, *Knowledge Representation*, 2000, Brooks/Cole, Pacific Grove, CA, ISBN: 0-534-94965-7.

Srivastava et al., "Knowledge Acquisition through Crowd Sourcing PurposeNet," *Language Technologies Research Center, International Institute of Information Technology*, Feb. 7, 2013, Hyderabad, India, 1 page.

Strohmaier et al., "Acquiring Explicit User Goals From Search Query Logs," *IEEE/ACM International Conference on Web Intelligence and Intelligent Agent Technology (WI-IAT)*, Jan. 2008, 3:602-605.

Strohmaier et al., "Intentional Query Suggestion: Making User Goals More Explicit During Search," *WSCD '09*, Feb. 9, 2009, 7 pages, Strohmaier et al., "Studying Databases of Intentions: Do Search Query Logs Capture Knowledge about Common Human Goals?" *Proceedings of the 5th International Conference on Knowledge Capture*, Sep. 1-4, 2009, pp. 89-96.

Strohmaier, "A Few Thoughts on Engineering Social Machines," *Proceedings of the $22^{nd}$ International Conference on World Wide Web Companion*, May 13-17, 2013, pp. 919-920.

Strohmaier, "Purpose Tagging: Capturing User Intent to Assist Goal-Oriented Social Search," *Proceedings of the 2008 ACM Workshop on Search in Social Media*, Oct. 30, 2008, pp. 35-42.

Swearingen et al., "Interaction Design for Recommender Systems," *Designing Interactive Systems*, 2002, 10 pages.

Tang, et al., "Expertise Matching via Constraint-based Optimization," *Proceedings of the 2010 IEEE/WIC/ACM International Conference on Web Intelligence and Intelligent Agent Technology*, vol. 1, 2010, pp. 34-41.

Taylor et al., *The Organization of Information* ($3^{rd}$Edition), 2009, Libraries Unlimited, Westport, CT, ISBN: 978-1-59158-700-2.

Touzi, "Toward a Discovering Knowledge Comprehensible and Exploitable by the End-user," $2^{nd}$ *International Conference on Advances in Databases, Knowledge, and Data Applications*, Feb. 2010, pp. 126-134.

Tran et al., "Ontology-based Interpretation of Keywords for Semantic Search," *The Semantic Web Lecture Notes, Computer Science*, 2007, 4825:523-536.

Van Dijck, *The Culture of Connectivity: A Critical History of Social Media*, 2013, Oxford University Press, New York, NY, ISBN: 978-0-19-997078-0.

Virtanen, "Git for Computer Scientists," [online]. Retrieved from: eagain.net/articles/git-for-computer-scientists/, Sep. 30, 2016, 10 pages.

Yan et al., "Efficient Event-based Resource Discovery," *Proceedings of the $3^{rd}$ACM International Conference on Distributed Event-Based Systems*, Jul. 6-9, 2009, 12 pages.

Zhu et al., "Intuitive Topic Discovery by Incorporating Word-Pairs Connection into LOA," *IEEE/WIC/ACM International Conferences on Web Intelligence and Intelligent Agent Technology (WI-IAT)*, Jul. 2012, pp. 303-310.

Zins, "Classification Schemes of Information Science: Twenty-Eight Scholars Map the Field," *Journal of the American Society for Information Science and Technology*, Mar. 2007, 58(5):645-672.

Zubiaga et al., "Tags vs Shelves: From Social Tagging to Social Classification," *Proceedings of the $22^{nd}$ ACM Conference on Hypertext and Hypermedia*, Jun. 6-9, 2011, pp. 93-102.

Office Action dated Feb. 26, 2016, for U.S. Appl. No. 14/485,707, filed Sep. 13, 2014.

Office Action dated Nov. 1, 2016, for U.S. Appl. No. 14/485,707, filed Sep. 13, 2014.

Notice of Allowance dated Mar. 23, 2017, for U.S. Appl. No. 14/485,707, filed Sep. 13, 2014.

Patent Examination Report No. 1 dated Oct. 11, 2017, for Australian Patent Application No. 2015315175.

Supplementary European Search Report dated Apr. 4, 2018, issued in European Patent Application No. 15839850.3 (7 pages).

Notice of Allowance dated Jan. 11, 2018, for U.S. Appl. No. 15/628,228, filed Jun. 20, 2017.

Office Action dated Feb. 24, 2016, for U.S. Appl. No. 13/815,934, filed Mar. 15, 2013.

Office Action dated Aug. 24, 2017, for U.S. Appl. No. 13/815,934, filed Mar. 15, 2013.

Office Action dated Jul. 7, 2015, for U.S. Appl. No. 13/928,301, filed Jun. 26, 2013.

Office Action dated Nov. 3, 2016, for U.S. Appl. No. 15/163,407, filed May 24, 2016.

Office Action dated Mar. 28, 2018, for U.S. Appl. No. 15/674,429, filed Aug. 10, 2017.

Final Office Action dated Oct. 26, 2018, for U.S. Appl. No. 15/674,429, filed Aug. 10, 2017.

Office Action dated Dec. 23, 2015, for U.S. Appl. No. 14/776,180, filed Sep. 14, 2015.

Office Action dated Jul. 19, 2016, for U.S. Appl. No. 14/776,180, filed Sep. 14, 2015.

Office Action dated Feb. 22, 2017, for U.S. Appl. No. 14/776,180, filed Sep. 14, 2015.

First Chinese Office Action (and English translation) dated Jul. 14, 2017, for Chinese Patent Application No. 201480027724.3.

Patent Examination Report No. 1 dated Jul. 1, 2016, for Australian Patent Application No. 2014236646.

Notice of Reasons for Rejection (and English translation) dated Oct. 11, 2016, for Japanese Patent Application No. 2016-502277.

Final Notice of Reasons for Rejection (and English translation) dated Jun. 6, 2017, for Japanese Patent Application No. 2016-502277.

European Official Communication dated Apr. 20, 2017, issued in European Patent Application No. 14768205.8 (5 pages).

Office Action dated Oct. 2, 2018, for U.S. Appl. No. 15/839,335, filed Dec. 12, 2017.

Office Action dated May 23, 2019, for U.S. Appl. No. 16/004,350, filed Jun. 6, 2018.

Office Action dated May 24, 2019, for U.S. Appl. No. 16/016,476, filed Jun. 22, 2018.

First Chinese Office Action and English Translation dated Jul. 15, 2019, for Chinese Patent Application No. 201580061903.3.

* cited by examiner

Non-limiting illustrative example of publication and re-publication

Non-limiting illustrative example of components of a secure arrangement for purposeful computing using a reliable identity-based resource system Non-limiting high level illustrative example of trustworthy configuration of operating session

METHODS AND SYSTEMS FOR SECURE AND RELIABLE IDENTITY-BASED COMPUTING

RELATED APPLICATIONS

This application is a continuation of U.S. application Ser. No. 15/628,228, filed Jun. 20, 2017, titled METHODS AND SYSTEMS FOR SECURE AND RELIABLE IDENTITY-BASED COMPUTING, which is a divisional of U.S. patent application Ser. No. 14/485,707, filed Sep. 13, 2014, titled METHODS AND SYSTEMS FOR SECURE AND RELIABLE IDENTITY-BASED COMPUTING, which claims priority to and is a continuation-in-part of PCT Application No. PCT/US2014/026912, filed Mar. 14, 2014, titled METHODS AND SYSTEMS FOR PURPOSEFUL COMPUTING, which is a continuation-in-part of U.S. patent application Ser. No. 13/928,301, filed Jun. 26, 2013, titled PURPOSEFUL COMPUTING, which is a continuation-in-part of U.S. patent application Ser. No. 13/815,934, filed Mar. 15, 2013, titled "PURPOSEFUL COMPUTING" and all of which are incorporated herein by reference in their entirety, and referred to collectively as the Parent Application Set.

BACKGROUND

Aspects of the disclosure relate in general to computer security and resource integrity systems. Aspects include apparatus, methods and systems configured to facilitate computer security and resource integrity in a computer architecture.

SUMMARY

Embodiments include systems, devices, methods and computer-readable media to facilitate reliability of identity, flexibility of identity information arrangements, and security related to resource identity and purposeful computing in computing architectures.

BRIEF DESCRIPTION OF THE DRAWINGS

FIG. 25 is a non-limiting illustrative example of relevant attribute sets for a given resource set, Participant, CPE, and/or the like.

DETAILED DESCRIPTION

Figure 1:
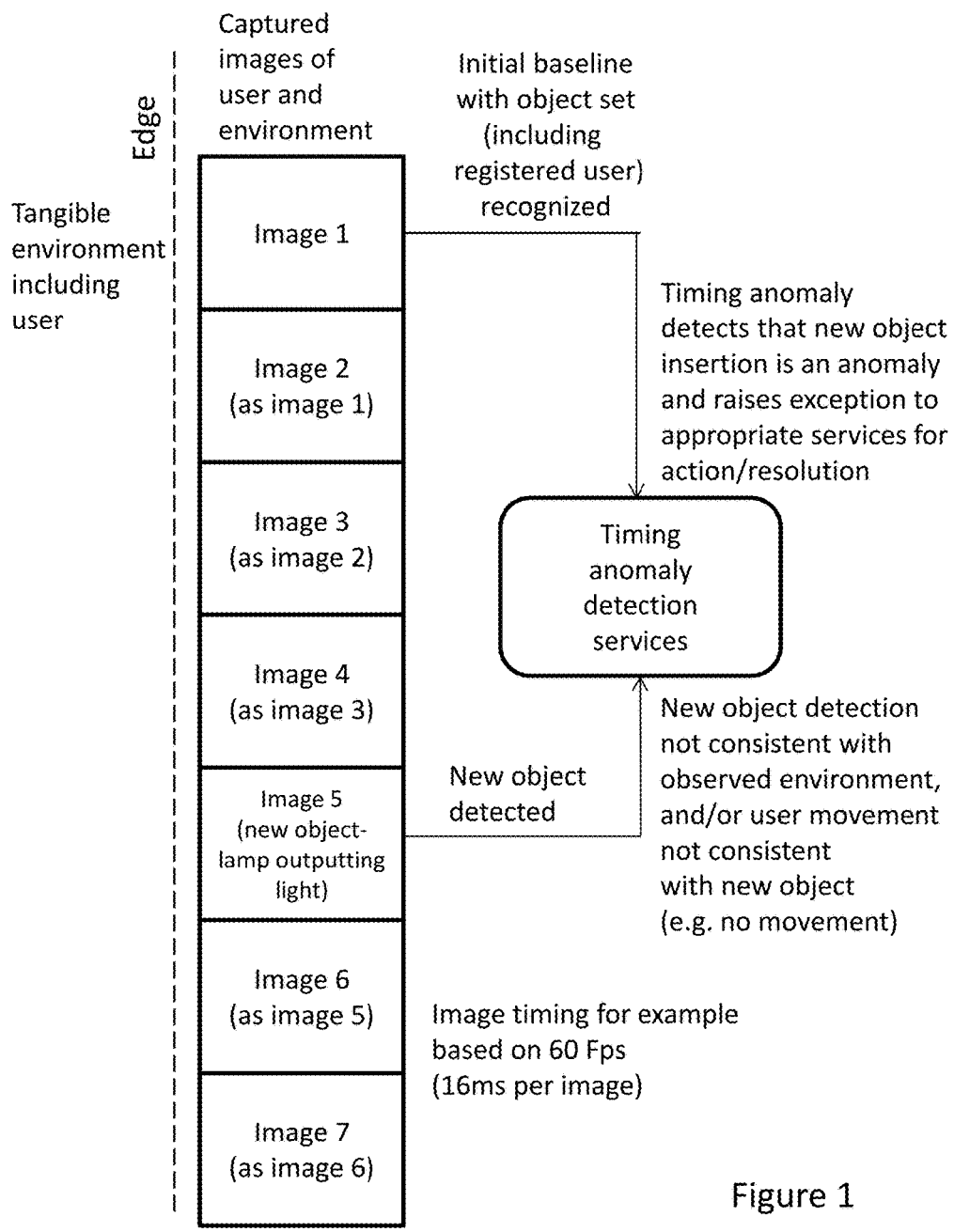
FIG. 1 is a non limiting illustrative example of timing anomaly service monitoring user and environment through assiduous images.

In many circumstances, the identification and use of computing arrangement resources have complex implications and repercussions. Computing session consequences involve not only immediate user satisfaction, but may well involve longer term ramifications involving effectiveness and impact, for example, the compromising of security of session operations and/or related information. A key consideration set is whether the use of resource sets produces comparatively competitive results, and what are the longer term security, information privacy, reliability, and rights management consequences. If the use of resources was not comparatively equivalent to what was reasonably possible, then a user set may have wasted time, capital, lost the forward going advantages of being best positioned, lost the greater enjoyment and/or satisfaction of superior results, and/or the like. Moreover, in addition to the direct results of poorer, purposeful computing outcomes, ill-informed use of resources may result in serious security, privacy, reliability, and/or like consequences that may have great impact on both resource user sets, and those who are otherwise impacted by user set usage of such resources.

Computing arrangement users are often effectively adrift when confronted with the challenge of identifying, reliably evaluating, and applying internet based (and other) resources in pursuit of understanding, defining, navigating, and/or fulfilling computing arrangement target purpose sets. This is at least substantially the result of the vastness of the resource population available through the internet, the complicated evaluative considerations of their associated differing attribute sets, the vulnerability of computing arrangement software, information, and processes to unforeseen characteristics of resource sets, and the motives of some parties to conceal at least a portion of resource attributes such that user sets are unaware of their various implications, such as the presence of malware, at the time of resource provisioning.

This application is a continuation-in-part of the earlier Parent Application Set for PERCos technologies, which is incorporated by reference herein, describing a collection of computing technology capability sets addressing resource identification, evaluation, and usage, as well as resource usage consequence optimization and management. Generally speaking, these applications address challenges that arise directly out of the historically unique, recent human environment produced by the intersecting nature and evolution of contemporary communications, networking, and computing technologies. There are no historical precedents for many of these human activity challenges dating prior to the emergence and ubiquity of the internet. This application addresses computing security, reliability, resource integrity, and situational attribute adaptiveness, particularly as related to user set purpose fulfillment.

The internet's resource population is a huge body of highly diverse and differently sourced items that are comprised of instances having subtle to vastly different individual and combinatorial qualities and implications when used by user sets in pursuit of user set purpose fulfillment. These resource instance sets can be bewildering in their scope, security considerations, sourcing, complexity, integrity, combinatorial implications, usage consequences, provenance, and/or Stakeholder interests and motives. This huge, inchoate world of resources is spread across a vast, multi-billion participant peer-to-peer and client server universe, where at each moment each computing user set may have its own unique contextual purpose considerations, but frequently no practical means to connect to optimal resource one or more sets and to ensure secure and reliable computing operations and results.

Individually, and enhanced by combination, various PERCos innovations help computing arrangement users ensure that their purposeful computing (as well as, in some embodiments, more traditional computing) is more efficiently and effectively directed towards not only assuring user selection of, relatively speaking, the most purposefully productive resource sets, but also in ensuring user computing arrangement related security, privacy, and efficiency considerations. Given the profoundly serious, and seemingly intractable trustworthy computing dilemma that currently plagues modern computing, certain PERCos capabilities provide new approaches to resolving such deeply entrenched problems.

There is no historical precedent for today's vast—often inchoate to purpose—distribution of many to overwhelming masses of potential resources. The internet's resource arrangement often appears to computing arrangement users as an immense, and at least in part or at times, indecipherable compendium of both known resources, which in many cases are poorly understood by some or all of their potential users, and unknown resources, those that extend beyond user set awareness. These variously known and unknown resources populate a vast, and to a large extent, randomly distributed, internet repository environment.

The availability of such a huge array of disparately sourced, varied, and frequently highly specific to purpose class resource sets, presents a new genre of human resource opportunities and identification, evaluation, and security challenges. These challenges include how users and/or their computing arrangements identify, objectively evaluate, select, and deploy the highest quality, best performing, and least risky resources for satisfying user contextual purpose conditions and intentions. These challenges further involve informing user sets and/or their computing arrangements concerning, as well as managing, the hidden and/or initially subtle, but subsequently often highly consequential, realities of resource usage consequences. Such consequences span a multi-dimensional spectrum of implications and effects, including, for example, the usage hazards resulting from such varied resources as computer emails and attachments to documents to reliance on other computing users to software plugins to software applications to web sites to live video conferencing to attached devices, and/or the like. Unsolved by current computing technologies, this new challenge set involving an, at times, overwhelming abundance of resource opportunities, from the very small, such as whether to open an email from a stranger, to the large, whether a given software application may compromise the integrity of a computing environment, raises the following issue set: how do user sets identify and apply apparently optimal to user purpose resource sets, while also contextually and appropriately balancing the risks (and where tolerance may be zero) of using such resources, when such user sets often lack target purpose related expertise and/or are unaware of relevant resources and/or related user purpose relevant resource qualities and usage consequences.

In the absence of new resource identification, deployment, provisioning, and operating management capabilities, today's computing arrangement users are, with current technologies, often unable to achieve best practical resource deployment results. Resources from the vast and rapidly growing internet universe are often poorly exploited from a user purpose fulfillment standpoint and poorly managed from a usage consequence protection perspective.

With modern computing and the internet, humanity has been endowed with the potential value inherent in the internet's vast storehouse of items and other opportunities. This storehouse is comprised of software applications, cloud services, documents and records, knowledge and knowledge organizations, expressions, perspectives, facts, discussions, messages and other communications, social network instances, experience producers, expert advisors, potential and current friends, interfaces to tangible things, and the like. These resources are accessible/useable if identified, selected, usage authorized and/or otherwise allowed, and provisioned and/or otherwise enabled. This vast array of resource instances is available substantially as a result of the synergistic qualities of recently developed computing, communications, and device technologies. These resources represent a disordered compendium of capabilities proffered not only by commercial enterprises and societal organizations, but by people, individually and in groups, who offer up facets of their knowledge, opinion, personality, social interactions, and/or the like.

While the internet and related computing capabilities comprise an environment that has spawned this massive, unprecedented expansion of user purpose related resource possibilities comprising, for example, knowledge, entertainment, social, commercial, and/or the like opportunities, modern computing has failed to provide effective, broadly applicable tools for user identification and understanding of, as well as, accessibility to, and provisioning and other management of, trustworthy, optimal user purpose fulfilling resource sets.

Today's computing tools for finding, evaluating, and employing resources offer the often useful, but limited, capabilities of, for example:

search and retrieval systems (which under some circumstances paradoxically require sufficient knowledge to find relevant instances when one is looking for, and needs, sufficient knowledge to be able to identify and retrieve).

semantic interpretation and organization/classification arrangements, that may, for example, aid search and retrieval systems, and may employ user set based, historical usage information derived, suggestion options.

keyword/phrase tagging, faceting interfaces and other expert system implementations.

cloud service information and recommender systems, computer and network firewalls, website trust evaluators, and diligent, security oriented operating system designs.

and the like.

In certain circumstances, particularly when well-informed users use such tools and when they have sufficient domain knowledge to direct these capability sets, such resources can provide user sets with efficient, effective results. But when circumstances call for broader discovery and analysis of resource opportunities, particularly when involving unknown and unseen to user significant knowledge variables, these tools often fail to provide flexible, effective, user purpose optimized (or even satisfactory) results. In sum, a great cloud of resources has emerged, but without practical means to organize and explore, identify, and safely use its content. Users are often unable to efficiently or effectively parse appropriate member resources into target purpose fulfilling, and in particular, target purpose optimized, trustworthy resource sets.

When users use computing arrangements and need to select and/or deploy computing resources from internet based sources, they often have constrained or otherwise insufficient knowledge and/or experience related to their current or intended activities. User sets often fail to fully understand their associated target purposes and related topic domain issues, and frequently are unaware of the extent and/or implications of their nescience. Such insufficiency means that user sets often don't have the ability to identify, evaluate, and/or safely provision resource sets in a manner that produces an optimal, practical, purpose fulfillment result set.

User sets are both routinely poorly informed or uninformed regarding the existence, location, nature, and/or usage consequences of internet based resource sets and are frequently ill-equipped for tasks related to identifying, understanding, evaluating, selecting, provisioning, and/or managing user target purpose applicable resource sets. As a result, user sets are often unable to effectuate best result sets for their purposeful computing activities, since, under many circumstances, they are unable to identify, evaluate, and bring to bear resource sets that will at least one of:

(a) from internet or other network available resources, provide, in combination with user set computing arrangements, the most satisfying (relative to other one or more resource sets) user purpose fulfillment, and/or (b) concomitantly avoid unintended consequences that, for example, produce operating inefficiencies, financial and/or data losses, and/or malware related results including the stealing of private information, the causing of inappropriate communications to other computing arrangements, and/or the like.

Most people are far from expert relative to a large variety of their computing activity domains and contextual purposes; this is a common problem in professional and commercial contexts, though this problem set is particularly evident in "personal" computing.

Absent sufficient relevant expertise, users are often either unaware of the existence of, and/or unable to evaluate, at least key aspects of resource usage qualities relative to any specific computing arrangement situational user purpose set. Such absence of expertise normally involves inadequate understanding of purpose related domain considerations, which may well include various considerations regarding what available resource sets may be situationally available for, and/or particularly applicable to, specific user set target contextual purpose fulfillment. Users are often either unable to locate resources and/or are unaware of the existence of superior quality and/or safer to use, user target purpose specific resource sets. Such user states of awareness may include, for example, not only a lack of knowledge regarding the existence or location of purpose germane resources, but when a user set has apparent domain relevant knowledge regarding a given resource, even if such knowledge appears well developed, it may not be current, for example, such knowledge set may not reflect recent updates to any such resource instances, such as recently published technical papers, relevant expert set recent comments (including regarding associated malware considerations), user one or more sets' opinions, software application version updates, and/or the like.

Present day computing arrangement capabilities and design don't include, support, and/or otherwise anticipate, PERCos like standardized, interoperable contextual purpose specifying tools that can, in combination with other novel PERCos capabilities, inform user sets of optimally useful, safest to use, resource sets for user target purpose fulfillment. For internet based resource set identification, evaluation, and management, such PERCos contextual purpose capabilities can, for example, in combination with identity related PERCos innovations, effectively and efficiently identify internet based resources that are likely to fulfill, in an optimal manner, a nearly boundlessly disparate range of situationally specific user contextual purpose objectives. Such PERCos purposeful computing capabilities, in various embodiments, also support significant innovations that, depending on their embodiments and circumstances of use, can greatly impact modern day computing security and privacy assurance performance. By combining with traditional computing security tools, such PERCos capabilities can transform user computing session resource identification integrity, as well as the quality and security of resource operational environments. Through the use of such PERCos capabilities, which include, for example, PERCos Awareness Managers, Identity Firewalls, Contextual Purpose Firewall Frameworks (CPFFs), and innovative existential biometric and assiduous environmental evaluative and authentication techniques, user sets can experience improved quality related to resource provisioning and operational management and more easily and effectively balance the availability of resource set capabilities with security and privacy considerations to ensure appropriate conditions regarding computer arrangement security for sensitive information and processes.

PERCos security, privacy, and identity assurance tools involve various capability sets in various embodiments. These sets include, for example and without limitation, the following:

Ensuring more reliable, persistent, and relevant resource identification means than are available using current technology capabilities. This emphasis includes new capabilities, for example, for ensuring that internet and/or other network resource sets continue to comprise their unmodified composition, except as may be otherwise securely and reliably specified.

Supporting assiduous identity techniques, including PERCos existential biometric identity establishment, and related registration, for example with a cloud service arrangement, in the form, for example, in some embodiments, of Participant instance resource publishing and associated resource authentication activities.

Reliably identifying, evaluating, and, as applicable, provisioning, situationally germane specific resource sets, based at least in part on identity attribute sets associated with user contextual purposes and/or related classes, and/or with computing arrangements, computing arrangement environments, user sets, resource sets, and/or the like (for example, with classes and/or instances of the foregoing).

Improved, including providing substantially more user friendly, secure, and situationally germane, means for supporting user computing sessions through the—for example, automatically and transparently to user sets—provisioning of constrained to target contextual purpose computing arrangement session resource sets, where such sets are comprised of one or more resource sets, such as CPFF sets, specifically applicable to session user set target purpose fulfillment related specifications (and where the foregoing may allow non-directly purpose related resource sets and/or set capabilities, if supported by such specification information and/or user selection).

Providing security and privacy capabilities that include the ability to automatically and transparently—based on input at least in part from user set target contextual purpose expressions and/or the like—situationally isolate computing session target contextual purpose fulfillment resource sets, such as applicable purpose class applications and/or other Frameworks and/or other resource sets, from underlying operating system and/or other resource sets, so as to ensure appropriate to circumstance, given target contextual purpose set(s) and associated conditions, reliable security and/or other trusted computing management. Such dynamic, contextual purpose related target purpose session resource set and/or session isolation and provisioning constraints can help ensure the integrity of target contextual purpose operations, as well as assure that target contextual purpose session consequences do not have extraneous, and in particular, undesirable, impact on, or otherwise misuse, user set and/or Stakeholder set sensitive information and/or related processes and resources, while maintaining, for typical computing arrangement users, a high level of ease of use and security operations transparency.

Providing PERCos security, privacy, and identity assurance security hardening capabilities to ensure that certain PERCos security, privacy, and identity reliability capability sets operate in protected contexts, secured against unauthorized observation and/or other inspection, decomposition, misdirection, and/or other subordination of user and/or Stakeholder interests and/or PERCos related processes, and where such hardening techniques, in some embodiments, are applied, for example, to PERCos Identity Firewall, Awareness Manager, and/or Contextual Purpose Firewall Framework arrangements.

Modern Computing's Unique and Unprecedented Resource Management Scenario

The history of human resource utilization—from Stone Age bands and tribal units to pastoral societies to recent agrarian communities to industrial age pre-computing modern society—comprised environments involving resources that almost all humans in a given community were familiar with. All, or almost all, available for use resources, including people, work implements, and/or the like, were well known to human community members who might be involved with such resource "instances." Historically, for almost all people until quite recently, the use of resources that weren't agrarian, pastoral, and/or hunter/gatherer in nature was quite rare and limited. In more recent, but pre-modern human history, the very limited population of specialized resource users, such as the community members in more developed societies who formed the small groups of frequently privileged individuals, such as priests, scribes, nobles, medicine men, clerks, traders, builders, warriors, advocates (e.g., lawyers, politicians), and the like, normally had special training as "novices" or apprentices or cadets or the like, and were trained specifically to be experts as regards the resources available to be applied in their domains.

In general, in pre-computerized societies, human familiarity with resources used by communities and their members was such that most all adults had expert level knowledge regarding most of their directly available resources, including a thorough familiarity with people who might assist them or otherwise cooperatively work with them. A farmer knew his implements and supplies, and with whom he traded his crops, and individuals and groups normally had intimate knowledge of all fellow residents of their community group, whether nomadic, pastoral, agricultural, and/or the like. As a result, people were normally completely familiar with any given individual they might use as a local societal or otherwise personally available resource.

For almost all of its history, humanity lived in this resource familiar world that can be characterized as "familiarity with almost everything." It was essentially all-inclusive, excepting as might relate to the unpredictable components of stress and crisis related to health, weather, warfare, and the like. Even with the emergence of cities and their metropolitan areas as a primary living environment for developed world population, people until mid-twentieth century largely kept to their own neighborhoods, except to work in factories or offices with task resources for which they had received training. As a result, the choices regarding almost all resources contemplated to be used in an average person's life were well understood by most adults—in fact, there was, by and large, until recent times, generally a rejection of the unfamiliar; when it arose, it frequently caused discomfort, avoidance, ostracism, other discrimination, and/or the like. Even in near contemporary times, resource options available to individuals were largely confined to options and devices that were physically presented to the potential user and familiar in nature, such as items available in a store or from a street vendor, or items cataloged and available to those who might use a library. These potential resources could normally be evaluated directly and/or by the assistance of one's compatriots or professional assisters, such as a family member, a friend, a store clerk, or a librarian.

There have been a few exceptions in recent, pre-internet modern life to the knowledge of, or direct evaluation of, physically present, diverse candidate resources where large varieties of resources were presented, for example, in mail order catalogs from purveyors of goods, such as pioneered by Montgomery Ward and later by Sears. But these resource offering compendiums were organized by simple item type and category, and while large in number and variety (Ward's catalog in 1895 had some 25,000 items), these numbers were negligible in their aggregate, variety, and sourcing, when compared to resources comprising the internet resource universe. Such catalog books used name and type organization systems, an item normally resided in only one place in a catalog, grouped with its like items and described as a thing, having a price and certain attributes.

With the very recent advent of certain internet and cloud service arrangements, such as eBay, Amazon, Craigslist, Match.com, YouTube, eHarmony, Facebook, Weibo, Tencent, Netflix, Zillow, Twitter, LinkedIn, Pandora, and the like, there has been a development of environments that have significant numbers of resource items, but the items represented within these "silo" service "islands" constitute but tiny portions of the available resources on the internet and normally are presented to users through, and operate using, different organizational formulations. Tools to access their resource instances are oriented to their respective task set types—access approaches tend to use, for example, one or more of Boolean search, assister drop down lists of options related to search contents, relatively simple recommender valuations of the resource instances (e.g., individual and aggregates one to five star ratings and crowd, user, and user like history based recommender input, for example, of "like" types—e.g., movies from Netflix, music from Pandora), and other user, crowd history, preference metrics, and/or the like capabilities that may influence or determine matching and/or other filtering processes, such as used by Match.com, OkCupid, and the like. While such systems have significant numbers of items listed, e.g., eBay recently had 112+million items (according to wiki.answers.com), and Amazon recently had over 200 million product items for sale in the USA (according to export-x.com), their relative consistency of form and type and the singular nature of their silo service emporium environments, and their relatively tiny population of instances versus the totality of internet available resource instances and types, present quite different, and less demanding, challenges relative to user access to an "internet of resources".

For example, there are estimated to be over 2 billion human "participant" internet users, over 14.3 trillion "live" internet webpages (as of 2013 by one estimate at factshunt. com) where Google is estimated by factshunt to have indexed only 48 billion of such pages. Further, there were 759 million websites and 328 million registered domains (2013, factshunt.com), and seemingly endless numbers of tweets, opinions, and other comments, indeterminate numbers of emails, billions of internet participants (including friends, potential friends, associates, and experts), huge numbers of software applications and plugins, hardware components and devices, and vast numbers of information items (including component information items within larger information resources, such component items supporting differing purpose related uses and comprising element(s) within documents), and substantial numbers of services, to say nothing of an incalculable number of combinatorial possibilities of these resources when being applied, as optimal target purpose fulfillment resource sets.

While, for example, Google's indexing of many billions of pages represent huge numbers of available for user use web page content resource items, and OCLC's WordCat Local provides access to more than 922 million items (primarily articles and books from library collections) and Ex Libris offers a meta-aggregation of hundreds of millions of scholarly resources (OCLC and Ex Libris info from infotoday.com, 2012), the use of novel PERCos purposeful computing capabilities described herein can support a much larger, and far more secure, global internet purpose aligning, evaluating, provisioning, and process management infrastructure encompassing all computing operable and interacting human resource instance sets. Opportunities resulting from a PERCos environment can encourage much larger numbers of individuals and groups (Stakeholders) to publish resources in the form of, for example, purpose fulfillment contributing resources. Such publishing should significantly increase the available quantity of many types of resources, and result in the incorporation of their associated resource information sets into information bases for user set resource purpose fulfillment identification, evaluation, provisioning, and management. Such information bases and their associated resource instances can at least in part take the form of, for example, PERCos Formal and/or Informal resources and/or the like stores, identity data base arrangements. Effective Fact, Faith Fact, and Quality to Purpose evaluative/recommender data base arrangements, and the like. Some PERCos cosmos embodiments can support expanding and self-organizing tangible and intangible resource item and framework ecospheres that could greatly enhance the identification, evaluation, provisioning, and secure and reliable usage of resource sets optimized to user (and/or Stakeholder) set current contextual purpose sets.

Such a PERCos embodiment resource ecosphere can comprise an immense population and diversity of internet information instances (representing intangible instances, tangible items and/or combinations thereof) whose resource types have been often untappable by users who lack significant expertise in a given domain. Candidate such resources can be organized to reflect a prioritized listing according to respective resource and/or resource portion set Quality to Purpose metrics, which can be expressed as a general Quality to Purpose value, for example, to a contextual purpose set, and/or more specifically to one or more certain Facet simplifications, such as Quality to Purpose trustworthiness, efficiency, cost, reliability, focus (e.g., concentration within resource on target purpose), complexity, length (e.g., time to play, pages/words/bytes, and/or the like), quality of interface, quality of Stakeholder publisher, quality of Stakeholder creator/author(s), quality of Stakeholder employer/institution, resource and/or resource Stakeholder provenance and/or other historical related information (including, for example. Stakeholder assessing past Quality to Purpose aggregate Creds), and/or similar metrics. A PERCos resource cosmos embodiment would be in sharp contrast to today's largely disordered and unmanageable (particularly where a user set is not significantly expert) internet resource environment (excepting to at least some extent certain targeted purpose set silo services) where the inability to efficiently and/or effectively identify, deploy, and manage optimal resource arrays in service specifically of user target contextual purpose objectives reflects the substantial limits of today's computing resource management capabilities.

The Purposeful Interfacing of Two Tangible Systems, Human Relational Thinking Users and Computing Arrangement Processing Various PERCos embodiments comprise, at least in part, capabilities supporting the operative union of at least two tangible processing environments, (a) human, and (b) computing arrangement, whereby PERCos' contextual purpose related communication and interfacing between such human/computing environments can lead to more informed, secure, efficient, satisfying, productive, and reliable computing arrangement usage and user purpose fulfillment results. For example, an important consideration in many of such PERCos embodiments are capabilities that interface human relational thinking and computing arrangement digital logic and operations. This interfacing, for example, involves, in various PERCos embodiments, standardized and interoperable contextual purpose and identity related specification, identity sensing, authentication, evaluation, storage, process management (e.g., event based and/or purpose based resource deployment and/or operating resource minimilization, transformation, isolation, function management, and/or the like), communication, and/or approximation and/or relational simplification. Such capabilities are, in various PERCos embodiments, designed at least in part to be efficiently processable by both user sets and applicable computing arrangements. In combination, for example in some embodiments, with PERCos novel resource organizing approximation, purpose related relationship, and user interface tools facilitating human resource comprehension and decision. PERCos standardized, interoperable purpose expression capabilities can be used during unfolding user/computing arrangement human/computer purposeful interactions in processes leading to resource identification, selection, provisioning, and/or purpose fulfillment.

Such PERCos capabilities can transform the interfacing of tangible human and computing arrangements, enabling both environments to operate as more effective purpose fulfillment cooperating sets. This can lead to, under many circumstances, improved computer arrangement resource utilization, improved computing security and reliability, and enhanced user target purpose satisfaction.

PERCos embodiments may depend, in part, on standardized, interoperable capabilities for humans to express—and computing arrangements to process and, as applicable, store—computing arrangement user and/or Stakeholder contextual purpose related information elements and combinations. These standardized capabilities may include, for example, PERCos specialized contextual purpose specification elements and forms, purpose related information (including, for example, resource related) stores, interoperable devices and services, and purpose related approximations and simplifications schema. The preceding may employ PERCos prescriptive/descriptive organizational and functional elements, such as, for example, prescriptive and descriptive CPEs (Contextual Purpose Expressions), Purpose Statements. CDSs (Concept Description Schemas) which may comprise other one or more applicable elements, Foundations. Purpose Class Applications and other Frameworks, Dimensions, Facets, Purpose Classes, Resonances, situational identity and other attribute related set forms and types and management, and/or the like.

PERCos provides capabilities that can enable computing arrangement users to efficiently relate to modern computing's nearly boundless resource possibilities and sift out those resource sets that will most effectively contribute to user contextual purpose fulfillment and/or otherwise have usage consequences consistent with user set interests, both optimizing purposeful results and minimizing risks (such as malware) and inefficiencies. This, for example, can be in part achieved through contextual purpose specification matching to potentially "most useful," situationally appropriate, resource (including, for example, information results) one or more sets having sufficiently corresponding contextual purpose related specification information. These PERCos capabilities can significantly contribute to improved resource accessibility, assessment, and/or provisionability. Such PERCos capabilities support users, Stakeholders. and/or their computing arrangements (including, as applicable, cloud service arrangements) declaring contextual purpose considerations and objectives, and where such contextual purpose related standardization capabilities enhance human and computing arrangement interfacing and operation. Such user set contextual purpose at least in part standardized and interoperable sets can be matched to resource sets (and/or results) at least in part through similarity matching of such human target contextual purpose sets with PERCos descriptive contextual purpose specification sets, and/or the like attribute information, associated with target purpose related resources such as services, devices, networks, software applications, operating environments, other sets of people, and/or the like.

One or more PERCos implementations embodying this purposeful cooperative arrangement between users and their computing arrangements and related services can support one or more global human/computing arrangement architectures. These architectures may be, for example, designed as integral expansions of the role of operating systems and environments so they may serve as functional arrangements, for example, for user and Stakeholder purpose related resource organization, identity awareness, evaluation, selection, support, provisioning, constraining, isolation, cooperative/complementary functionality matching, aggregating, interoperability, computing environment/user communicating, and/or the like.

In various embodiments. PERCos in part comprises broadly applied interoperable one or more systems for connecting the intents, capabilities, and other considerations of disparate, and frequently independently operating and/or located users, Stakeholders. and resource stores. To support such interconnections in a purpose optimized manner, various PERCos embodiments include new forms of computing arrangement capabilities that provide innovative contextual purpose expression and purpose related resource identity, applicability (qualities) to purpose, classification, publishing, provisioning, process reliability and efficiency management, and other purpose related information storage, organization, analysis, and management tools. These capabilities contrast with current computing's user and resource interconnecting capabilities which emphasize estimating/predicting what a user's interests may be, based on user and/or crowd historical actions and location; interpreting what a resource may mean by semantic analysis and/or traditional domain class organization; item tagging with key terms supporting tag and/or other metadata matching; and/or employing search and retrieval tools which respond, for example, to user free form Boolean expressions matched against indexes (with PERCos, such tools may be used in various embodiments to augment, for example, PERCos contextual purpose expression, resource and purpose organization, situational identity management, standardized assertion and fact framing, coherence resolution, and processing and/or other consequence communication and outcome management).

With various PERCos embodiments, user and/or computing arrangement resource assessments can, as germane, involve identifying and/or prioritizing (and/or otherwise evaluating and/or communicating to a user set) purpose relevant resource sets, along with, as germane, situationally informing resource attribute information (Repute, other contextual applicable information, and/or the like).

PERCos identification and/or evaluation can, in various embodiments, be based at least in part, for example, on matching for congruence between user set and resource associated Contextual Purpose Expressions and/or Purpose Statements and/or the like, which such information may be complemented by information regarding resource one or more Qualities to Purpose (for example, using Repute metrics), and/or by input, for example, from user set preference, profile, relevant resource usage history, search history (such as search string variables), crowd behavior history, other conventional contextual computing information (e.g., physical location), and/or the like.

Most users have only partial understanding of situationally relevant aspects of their respective purposes, and have difficulty expressing their situational requirements, particularly, when there is insufficient user knowledge regarding their purposeful intent, possible implications and outcomes. How does one characterize that which one does not understand (fully or partially)? No reasonable, interoperable and at least substantially in part standardized, application independent means currently exists for supporting the dynamics of user purpose fulfillment processes and the unfolding aspects of purpose fulfillment development. Further no broadly applicable, user friendly, interoperable standardized means exists for evaluating and performing trade-offs between different contextual purpose aspects, such as, for example, functionality, security, privacy, reliability, and/or the like. Current computing domain general purpose tools do not offer the average computing user apparatus or methods to assess resource attributes that are specific to a given target purpose situation, so they can achieve optimal interim results and outcomes.

PERCos embodiments can extend basic operating system/environment design in support of user set and computing arrangement operations, including, as applicable, users directing/experiencing unfolding target purpose fulfillment refinement. Such PERCos operating system/environment capabilities can support, for example, enhanced resource discovery, Quality to Purpose resource assessment (individual and/or comparative), enhanced resource provisioning, resource situational identity attribute application, assiduous resource related identity assessment and persistent reliability, as well as combinatorial resource evaluation, provisioning, and purposeful resource operations management (e.g., Coherence Services, CPFF session provisioning and operating, and/or the like) capabilities. These and other PERCos capabilities can at least in part be delivered through one or more of PERCos based operating system reformulations and/or employment of PERCos based operating environment/system layers; virtual machines; identity devices including Identity Firewall and/or Awareness Manager hardened hardware and/or software, and/or services; PERCos purpose (which may be combined with Identity Firewall or Awareness Manager) firewall devices which may employ hardened hardware and/or software (e.g., supporting secured CPFF related processes and information); PERCos purpose fulfillment applications such as Purpose Class Applications or other Framework purpose fulfillment environments; purpose fulfillment plugins; and/or other computing arrangement operating session and/or environment enhancing techniques such as PERCos system local, network, and/or cloud services.

Identifying, evaluating, selecting, provisioning, and managing computer arrangement resources involves, at its root, the basic notion that resource identities must be reliable, that what is declared to be a unique instance of something, a resource, is actually that thing. When resource identity factors are persistent, for example, available over time and testable as to validity, such reliability can be particularly important, since evaluation of an instance that isn't what it is represented to be means such evaluation may be specious. There are many possible undesirable consequences if a resource isn't the resource it claims to be, and/or if its associated, pertinent attribute related information is not consistently, reliably available and accurate. With many PERCos embodiments, reliability of identity of a resource set (as may be specified in any given context) is a key capability.

With some PERCos embodiments, identity is not simply a resource's name and/or unique locator (and/or the like) that distinctively references a conceptual, electronically stored, and/or tangible instance of something—e.g., a resource set, including, for example, one or more resource portions. Such identifier, along with its associated general attribute set, may further be coupled with an array of available to user set, situationally significant attribute arrangements. Situational attribute sets may be associated with one or more contextual purpose specifications such as CPEs, Purpose Statements, operating purpose specifications, and/or the like, as well as with resource sets, user sets, computing environment arrangement sets, and/or the like. Such attribute sets can supply useful information for user sets and/or their computing arrangements regarding information concerning the "relevance" of respective resource sets in given usage situations, including, for example, informing regarding resource set material situationally related possible and/or predicted usage consequences.

Various PERCos embodiments involve a variety of capability sets that may be employed in securely creating and/or managing reliable resource identity information. These include, for example:

secure and reliable resource identity instances, including, for example, employing assiduous identity capabilities involving existential Stakeholder biometric information (for example, pattern information) acquisition and validation capabilities, where such biometric information may be liveness evaluated, including, for example, performing emitter and/or other challenge and response testing/assessment set. Such biometric information, or information derived therefrom, may be cryptographically secured and bound to their associated resource set descriptive information sets. Such binding of Stakeholder assiduous biometric information with such descriptive resource information may involve securely combining or otherwise securely associating such information sets, which may then be cryptographically hashed to ensure information integrity. Such information sets may provide, along with such resource descriptive identity information set, one or more at least in part Stakeholder biometrically signed certifications of the genuineness of such resource descriptive information, such that such resource information may be known as unaltered and Stakeholder party certified. Such resource identity information set may be a summarized and/or otherwise be available as an at least in part transformed information set. Such resource identity information set may be used to reliably and explicitly authenticate a resource set instance as valid, by for example, checking such resource set information against corresponding identity or resource cloud service corresponding resource identity information set for a match. Resource Stakeholder biometric information may be authenticated, which may include validating that a resource information set Stakeholder biometric information set corresponds, for example, to same stored, reference biometric information set managed by a cloud service identity utility, and stored, for example, as attribute information of a Stakeholder corresponding Participant resource instance.

reliable, purposefully managed resource provisioning and/or processing management in a manner consistent with, and at least in part ensuring the security of, user set target contextual purpose related process and information sets, including, for example, securing against unintended one or more consequences that may result from using a given one or more resource sets in a given set of user set purposeful circumstances, and which may further include, for example, the use of PERCos CPFF, Identity Firewall, Awareness Manager, and/or the like secure hardware and/or software implementations. Such reliable, purposefully managed resource operations may employ purpose related standardized and interoperable security and/or efficiency rigor levels to help ensure computing purpose fulfillment processes and/or communications are performed consistent with user and/or Stakeholder target contextual purpose objectives and interests and are free of, or otherwise managed to minimize, unintended consequences.

At least in part, in some embodiments, situational identity and related contextual attribute sets can reflect resource set places and degrees of appositeness (e.g., relevance), such as, reflecting one or more individuals' and/or groups' perception of, and/or one or more user and/or Stakeholder related computing arrangements interpretation of, one or more resource sets, user sets, computing arrangement tangible environment sets, and/or the like relevance related to one or more contextual purposes. Such relevance interpretation may involve Stakeholder set relevance assertions expressed through the use of, for example, Repute Creds quality of relevance to purpose information (e.g., Quality to Purpose relevance value expressions), also as described in U.S. application Ser. No. 13/815,934, incorporated herein by reference. Such human perception set and/or computer based logically determined attribute information may, in some embodiments, identify a given resource set in situ, that is, relative to the situationally applicable, such as specified contextual purpose, relevance of a resource set regarding its use and/or contemplated use, relative to other resources, users and/or other factor sets, and/or relative to material consequences that may result from such resource sets' use. Such in situ representations may be expressed through the use of Repute Cred Quality to Purpose assertions and/or the like user purpose related interoperable and standardized arrangements. Some PERCos embodiments support such situational in situ characterization by informing user and/or their computing arrangement sets regarding (or otherwise including) such identified resource sets' direct situationally relevant attributes, whether directly descriptive and/or consequential.

In some embodiments, relevance of situationally significant identity attributes to user set contextual purpose fulfillment may be key to evaluating a given resource set's relative usefulness, as well as to understanding the consequences resulting from such resource set use. A resource set usage consequence set is often substantially influenced, and may be determined, by the nature and circumstances of such resource set use. Important circumstance situationally relevant considerations may have a great deal to do with interpreting the relative usefulness of a resource, that is, for example, if a resource is good for one person, it may be bad, or at least not optimal, for another person in the context of a specific user target contextual purpose, given the totality of circumstances. As a result, and given the emergence of the vast distributed resource store set supported by the internet and modern computing, some PERCos embodiments can enable users and/or their computing arrangements to perceive, given their specific set of circumstances, which resource one or more sets will best serve user sets given their target contextual purpose expressions combined with other relevant situational conditions, which may, for example, be expressed at least in part through Purpose Statement specifications.

PERCos, in some embodiments, uses its user set contextual purpose expression matching to resource associated contextual purpose expression related information to determine (or contribute to determine) the identities of candidate, useful to user purpose fulfillment, resource set one or more instances. In such circumstances, resource set persistent reliable identity attributes may include Repute Quality to Purpose attribute values that assist users and/or their computing arrangements in providing resource identity one or more attribute instances germane to (e.g., consistent with) user target contextual purpose fulfillment. Repute, (e.g., Cred metric) Quality to Purpose attribute value sets, and/or the like, may be included in their associated resource instances, may be associated by reference to such resource instances, and/or may be determined in a manner responsive to user situational target contextual purpose circumstances and/or contextual purpose expression sets, that is, for example, be accessed as associated with one or more contextual purpose specifications and/or be created dynamically in response to situational resource identification and resource evaluation for purposeful operations.

In such PERCos embodiments, resource identity and associated attribute (and/or other contextual) information related computing arrangement capabilities may support user pursuit of user purposes, where such purposes comprise, for example:

1. Obtaining knowledge enhancement (including, for example, information determination and/or discovery),
2. Experiencing entertainment,
3. Social networking,
4. Receiving tangible world results (such as manufacturing results, delivery of goods, and/or the like),
5. Receiving intangible world results (such as realizing financial profit, and/or accumulating other intangible items, and/or the like).
6. Effecting computing process set completion (e.g., transaction and/or communication execution/completion), and/or
7. Any other form of user computing arrangement related—purposefully sought—interim results and/or concluding Outcomes.

Secure and Reliable Identity

There are two root sets in a computing arrangement computer session set: a user set that is directly participating and/or is participating through instructions otherwise provided to such computing arrangement, and the computing arrangement composition. When a user set initiates a computing session, the user set is reliant on the composition of the computing arrangement to behave as expected in service of the user set. As a result, under many circumstances, priority factors in assuring the reliability of a computing session comprise:

the resource composition is comprised of precisely the constituent resources that are claimed to be present, such resource composition is consistent with providing the computing arrangement services desired by its user set, and the resource set respective attributes, in their respective parts and as a whole, are consistent with the computing arrangement services desired by its user set, and further that such attributes do not include characteristics that will produce unintended, or at least materially undesirable, consequences.

Underlying the above listed priority factors is the basic principle that the identity of a resource must be reliable—it must persistently represent its corresponding subject matter, whether intangible and/or tangible, real-world explicit instance and/or abstract. At the root of users and computing arrangements relating to possible resource sets, whether people, software, information, communications, devices, services, and/or the like, is the reliability of identity of resource instances and other sets—if a resource identity set is not persistent, that is, not securely reliable and materially consistent over time, then there is no way to evaluate a resource's relevant essence, that is, its nature as relates to user purpose and possible unintended consequences.

If a resource set's identity is persistent and consistently corresponds precisely to its instance, and if the resource sets that are materially applicable to user set computing arrangement performance are available for user set and/or computing arrangement inspection, then if user sets and/or their computing arrangements have the tools and/or experience that enable them to interpret resource set attributes in context of user desired computing arrangement services, such user sets and/or their computing arrangements can selectively apply or restrict resource sets based on resource set reliable identity and associated, situationally applicable attributes. Such selective use of resource sets can determine resource provisioning, resource collective session environment, and allowed resource operations. Using such processes, user sets and their computing arrangements can experience significantly more secure computing.

As is clear from the above, identity is at the root of security. If the name of a "thing" unreliably changes, one can't refer to the thing in a sensible and consistent manner. Unfortunately, much of today's secure computing technology relies on behavior recognition (e.g., signature recognition) or otherwise on interpretation of identity and attributes in manners that may not be comprehensive or otherwise reliable. There is no notion of root identity assurance for a resource, and no interoperable, standardized knowledge ecosphere applying to all resource types and associated with user contextual purposes, for situationally interpreting resource identity attributes to determine the appropriateness, including risks, of employing any given resource set and/or set combination. Further, there are no means for dynamically instantiating at least in part interoperable and standardized computing target purpose session specific resource capabilities and environment formulation.

The problem of identity management should be examined from the perspective of how identity information is to be used, who is using such information, the reliability of such identity information, and how responsive such information may be from the standpoint of user purpose fulfillment. The identity system capabilities described in various PERCos embodiments are specifically designed to serve user interests (versus an often singular emphasis on commercial resource stakeholder interests). PERCos identity capabilities, and associated PERCos particularity resource processing management will, in contrast to, for example, conventional federated identity management, fundamentally expand and enhance the root significance of identity information as a primary, foundational input set for the identification, evaluation, and employment of computing resources in the rapidly expanding, emerging digitally connected resource universe.

Some PERCos embodiments address these largely unaddressed computing environment security and performance considerations with the following:

1. Root identity, established through assiduous existential biometric and/or other assiduous, contextually sufficient means, where a set of identifying information is securely associated with a resource set information set in a manner that is supported by:
   a. A desired combination of resource set information and associated root identity information (for example including existential biometric Stakeholder information), bound or otherwise securely associated together, directly and/or virtually, to produce information sets that are unalterable without such alteration being recognizable using reasonable testing means,
   b. A desired testing arrangement for such combined information sets that can reliably determine whether such bound information sets are genuine, that is such testing can test any respective resource set instance to determine whether it was "artificially" produced to spoof at least some portion of a resource set's genuine information set.
2. Situational identity involving situational attribute sets, where contextual purpose related specifications (including preference, profile, crowd behavior, and/or the like information sets), which may be augmented by user selection, provides input used to determine attribute set information applicable to a user set target purpose contextual specification and/or the like, and where such purpose specification information may be employed to identify and/or provision purpose class applications and/or other Frameworks that may provide specific resource sets, and/or otherwise provide resource organizing scaffolding for, contextual purpose specific computing sessions.
3. Cosmos wide interoperable and standardized Repute and/or the like. Cred assertion. Effective Fact (and may further include Faith Facts), knowledge base arrangement enabling the association of assessment information regarding persistently and reliably identified resource sets to be accumulated and reliably, flexibly, and in some circumstances automatically, employed to provide informing and decision supporting input regarding contextual purpose corresponding resource instances, such as Repute and/or the like capabilities employed with PERCos compliant resources (Formal resources, Informal resources, and/or other employable resources),
4. Exceptionally reliable means to establish root identity for humans through the assessment and associated information extraction of identity information corresponding to individual humans using existential biometric assessment means, for example, through the use of tamper resistant, securely hardened Identity Firewall components and/or Awareness Manager appliances, and/or the like, and associated local and/or network, such as cloud based, services.
5. Exceptionally reliable means to enable computing users to securely control resource provisioning and/or operational management through contextual purpose based control of resource provisioning constraints and/or functional management (e.g., situational particularity management, such as resource isolation and/or operations control) through the use of tamper resistant, securely hardened, Contextual Purpose Firewall Framework component sets and/or appliances.

Some embodiments, employing a combination of the above, as well as other PERCos complementary capability sets, assure that:

1. Resource identities are at least in part reliable through the use of hardened Identity Firewalls and/or Awareness Managers, and resource instances are what they claim to be.
2. Resource identity attributes can reliably, situationally reflect the impact a given resource set, or combination thereof, will have on a given user computing arrangement, through the use of PERCos situational attribute arrangement, and Repute Cred, EF, FF, and/or the like capabilities,
3. Only resource sets with identity attributes consistent with user target contextual purposes will operate in computing session instances that employ user set and/or Stakeholder set sensitive information and/or processes, assured by CPFF related arrangements, such as hardware/software CPFF implementations employing, at least in part, contextual purpose standardized and interoperable specification information.

An objective served by identity-related capabilities described herein is to enhance, supplement, and/or otherwise support a user set's capacity to identify, evaluate, select, and/or use resources consonant with the best, practical pursuit of, and/or other achievement of, user purpose fulfillment. This objective is supported by, and the capabilities herein support, contextually balanced resource identification and evaluation framed and/or informed by practical priorities associated with situationally specific purpose fulfillment circumstances. Such contextual purpose situationally specific fulfillment depends on whether a user set (and/or a user set's computing arrangement) has the tools and/or knowledge for identifying and evaluating resources. Other than a user set's past knowledge and any associated experiences, this tool and knowledge requirement can substantially rely on selected and/or otherwise provided crowd, expert(s), and/or other filtered, selected sets input regarding purpose relevant qualities of purpose fulfillment resource potential instances and/or combinations. As a result, users can evaluate and conceive their application of resources towards purpose fulfillment and/or users can simply apply a resource arrangement recommended by one or more trusted purpose related expert sets, and where the foregoing may include identifying and evaluating expert sets and then applying their formulations to resolve towards purpose fulfillment.

In the evaluation of any resource set, an identity and its associated attributes together comprise the set, essentially an individual "identity cosmos". They can collectively convey both the distinguishing name and/or pointer/sets and its/their associated identity facet characterizations. In a purpose associated context, from a universe of possible attributes or set of described attributes, a name as a conceptual place holder and its situationally germane attributes meaningfully contribute to human and/or computing system specific understanding related to contextual purpose assessments.

Generally, the possible attributes of an instance comprise a potentially immense set, but it is the attributes that are germane to one or more purposes or other situations that primarily comprise the conceptual pattern that people hold in their minds as their perception of things, abstract and/or concrete.

In some embodiments, the name set of a "thing" is its anchor, about which its satellite attributes are arranged in one or more conceptual pattern sets normally interpretable by people as characteristics and perceptual pattern arrangements that are associable with, and often bound to, user purpose classes. An optimized resource identification, evaluation, and selection architecture should substantially contribute to an individual user's (and/or their computing arrangements') perception/understanding of a resource. Such perception/understanding and its situationally relevant "layout arrangement," in some embodiments, comprise in part an attribute aggregation/distribution based at least in part on a target purpose set situational context (purpose and any other employed contextual variables). Such perception/ understanding layout may include relative weighting and pattern arrangement of attribute instances and other sets as they correspond to a user set's and/or associated computing systems' perceived perceptual significance applied to respective attributes relative to purpose. Thus, resource instances, from the perspective of their relevance to a purpose set, may be comprised of resource instances and general and/or situationally specific attributes and the relationships among such identity associated attribute set members, where the latter may be pre-stored in association with any one or more such purpose sets and/or dynamically generated in accordance with situational contextual purpose specification related filtering and/or other processing.

Situationally relevant attribute sets may at least in part be catalogued in identity systems associated with one or more classic category domains. With PERCos, in some embodiments, attributes can represent situationally relevant attribute aggregations associated with contextual purpose specifications (CPEs, purpose classes, and/or the like), where such attributes may be a subset of a set of resource set instance attributes (such set may be a global listing of attributes denoted as associated with a resource set). Such subsets may be stored explicitly associated with, and/or dynamically generated in response to, purpose specification instances.

Since in most topic and purpose domains users have limited expertise and resource awareness, that is, in most areas of life individual people are not true, or even relatively, domain experts, the efficient and effective selecting and/or otherwise assembling of target purpose applicable/desirable resource sets is a great challenge, and often in a practical sense, insurmountable. With the new human reality of billions of people interfacing with potentially trillions of internet available resource sets, PERCos embodiments provide new capability sets for the individual to interface with the effectively boundless resource possibilities. PERCos capabilities provide technologies that support systematized, interoperable, and standardized global resource identity, and associated attributes, one or more environments. These environments can profoundly simplify, under many circumstances, user identification, selection, and analysis of resource sets. Such environments can help order the vast, diverse, inchoate resource possibilities available to users in our modern digitally networked world into responsive purpose solution, or otherwise contributing to purpose solution, resource sets. These ordered sets can, at least in many circumstances, indicate and/or otherwise determine the best information and tools available for a given situation, a given purpose set, from the many billions, and in combination, relatively incalculable resource opportunities.

Identity reliability serves, under certain circumstances, as an essential anchor related to the evaluation of resource instances. Further, any one or more provenance related identities associated with a resource identity may be, in certain circumstances, essential evaluation anchors. Therefore, capabilities for reliably providing one or more methods by which an identity of a resource instance and/or the identity of one or more resource related provenance instances, can be assured, in relation to one or more levels of identity reliability rigor, is a key set of capabilities available in certain PERCos embodiments.

From the standpoint of a user attempting to employ resources with which such user is substantially to entirely unfamiliar and/or otherwise unable to sufficiently evaluate, anonymity attributes regarding key provenance and related inferred or explicit certifications by provenance parties (Stakeholders) severely undermines the ability of users to assess any given resource's Qualities to Purpose, including effectiveness, positive to malicious one or more intents of one or more Stakeholder sets in regards to at least certain one or more user interests, and/or the like.

PERCos Capabilities: A Response to a Nearly Boundlessly Diverse and Purpose Uncalibrated Resource Universe In response to the unprecedented scale and diversity of internet based resource possibilities, some PERCos embodiments include, for example, features supporting new forms of complementary, synergistic capability sets for human/ computing arrangement contextual purpose expression/ specification, including contextual purpose relational approximation user/computing interface/communications formulations, wherein, for example, user purpose class related specification information can be correlated to purposefully organized resources (including resources associated with at least in part standardized contextual purpose expressions). Correlating such user contextual purpose specifications to purposefully organized resource sets, such as, for example, those in (e.g., as members of) one or more purpose related resource contextual purpose classes, can provide constrained, practically sized information one or more sets for further manipulation/prioritization through use of, for example, information from resource purpose and attribute spheres of knowledge information arrangement(s) (such as can be made available through use accumulation and organization of Repute Cred, EF, and FF instances and aggregations) and/or, for example, through matching resource metadata against PERCos auxiliary dimension user contextual purpose specification, Purpose Statement, and/or the like information. Such an organizing of resource (and/or resource one or more portions) information regarding contextually relevant, including resource Quality to Purpose attributes such as Repute assertions, facts, and/or the like, can support efficient, highly manipulable and situationally adaptable to user target purpose resource filtering of optimal to situational user target contextual purposes from vast, distributed resource and related information stores.

PERCos capabilities can encourage a greater flourishing of web-based resource publishing by greatly improving resource availability and resource accessibility, as well as supporting a far more "evenhanded/fair" interface between users and resource possibilities, by allowing users to find, and Stakeholders to be motivated to create, more finely tuned and/or optimized to user contextual purpose resources. Such a capability set, in various embodiments, inherently supports the availability and proffering and/or provisioning of Quality to Purpose identified/assessed resource sets as they relate to active user contextual purpose sets. This can offset, to some extent, the hegemony of traditional, familiar brands, which in many instances may both not have the particular optimizations appropriate for a specific user contextual purpose fulfillment and further will not offer resources in the context of a, for example, global array of independently sourced, contextual purpose organized and assessed offering sets.

PERCos capabilities can encourage the formation of a "self-organizing" knowledge, contextual purpose centric, resource cosmos. For example, some PERCos embodiments of such an, at least in part, self-organizing (e.g., global or domain set focused) cosmos can be organized, for example, at least in part, according to contextual purpose related, assiduous resource identity instances, and at least a portion of their respective associated attribute information, including, for example, Repute information and/or the like associated resource sets (where such Repute instances, and/or information extracted or otherwise derived therefrom, may serve as contributing attribute information for resource sets having associated contextual purpose specification information that correspond to specific Repute contextual purpose set subject sets). Such organizing of contributing attribute information, for example, may include resource associated contextual purpose specification information, such as contextual purpose class and/or other contextual purpose relational information.

Such resource cosmos embodiments can be employed in knowledge and other information networking in support, at least in part, of the identifying, evaluating, selecting, provisioning, and/or operationally managing of resources in accordance with best fit to user purpose where, for example, such operations can apply, responsive to user contextual purpose considerations, cosmos knowledge expert input resource information regarding resource opportunities having optimal resource one or more qualities to user set contextual purpose characteristics. Such expert input may be embodied in, for example, expert Purpose Class Applications and/or other Frameworks. Such expert input may also be provided, for example, in the form of Repute Cred assessments and arrangements such as aggregate Creds that can be, for example in some PERCos embodiments, applied when desirable, for example, when appropriate Repute Cred Stakeholders have one or more Effective Fact advantageous attributes related to providing Qualities to Purpose resource evaluation input relevant to given user set contextual purpose related specifications. Complexities related to organizing and/or otherwise specifying Stakeholder desirable EF and/or other attributes (such as high Quality to Purpose aggregate Cred scores), can be automated, that is hidden from users, when, for example, user sets can simply select "apply expert Repute mode". This can allow, for example, sophisticated, tailored to user values and/or otherwise contextually appropriate shaping of the contributor set that provides Quality to Purpose and/or the like resource and/or resource portion identification, evaluation, selection, prioritization and/or other organizing, provisioning, and/or operational management, including informing CPFF session resource deployment and operational management, such as asserting that a given resource set has a low Quality to Purpose Trustworthiness, Reliability, and/or the like. Such input can be can be employed in expert mode operations—for example, selected by user set preference settings as may be set for general computing use, or associated with one or more purpose specifications, such as with CPEs and/or Purpose Classes. and/or with resource and/or domain classes. For example, expert and/or other filtering based attribute shaping (e.g., determination) of Quality to Purpose and/or the like input source providers can, for users, operate transparently across one or more contextual purpose class related sessions involving differing purpose objectives and resource arrangements/elements.

PERCos, in various embodiments, provides capabilities that uniquely support resource identification, evaluation, selection, purpose related knowledge enhancement, and/or the like, from the standpoint of the quality of a potential resource set as it may contribute to fulfilling a user target purpose set. Such support informs the user as to situationally practical and advantageous resource sets and/or otherwise enables situationally applicable, practical, and/or otherwise desirable resource sets to be provisioned. Such informing and/or provisioning, in various PERCos embodiments, can take into consideration user target purpose objectives as mediated by non-Core Purpose contextual considerations such that user sets are informed regarding, and/or are computing arrangement supported by taking into account, the purpose fulfillment impact of resource sets in relationship to multi-dimensional contexts, such that users can apply, and/or have applied for them, the best purpose resource tool solution sets in pursuit of user set target purpose fulfillment. This informing of user sets includes enlightening user sets so that they have fuller understandings of Quality to Purpose considerations, both positive as relates to purpose fulfillment, and any negative, such as unreliability, efficiency impact, and/or malware concerns, regarding resource set anticipated impact on purpose fulfillment, which processes may involve expressing Quality to Purpose one or more values to users regarding the results implications flowing from the use, or anticipated use, of given resource sets (and/or their constituent components).

Resource Quality to Purpose Creds and/or the like, and associated Stakeholder identity (e.g., declared EF) and Cred information (regarding a resource set and/or specifically a Stakeholder set of such resource set), can, in some PERCos embodiments, be aggregated, combined, and/or otherwise employed to produce highly specific, or as appropriate, approximately relevant, resource set(s), depending, for example, on target contextual purpose set and related situational conditions (e.g., employed as frame(s) of reference). Such contextual purpose based results can reflect, at least in part, relevant one or more situationally applied Quality to Purpose metrics used to assess and, for example, prioritize resources (and/or resource associated one or more Stakeholders). Such Quality to Purpose metric assessment processes can reflect the perception set of at least a portion of a computing community as regards a given target contextual purpose set and its impact on perceived applicability, such as Quality to Purpose, of given resource sets to such given user set target contextual purpose sets. Such representation of purpose fulfillment applicable resource sets can include, for example, reflecting resource relative value as relates to other resource sets and/or ranking expressed as degrees of relative approximations and/or precise matching to target contextual purpose sets.

In some PERCos embodiments, sets of the above capabilities, including, for example, their associated specifications and/or processes, may be integrated together (e.g., synthesized), at least in part, through the operations of PERCos novel contextual purpose Coherence and user interface services. These services may at least in part manage the integration of disparately sourced specifications and/or other input data comprising the merging of various user target purpose and/or resource situational input considerations into one or more integrated operating specification sets, where such operating sets may be based at least in part on relevant contextual purpose and computing environment considerations, and assiduous identity and associated identity attribute specifications (including, for example, attributes associated with contextual purpose classification and/or other purpose specification instances). Specifications involving user selection sets, contextual purpose specifications, user computing arrangement environmental information, resource identity related considerations, and augmenting sources (profiles, preferences, user and/or historical crowd resource evaluation and/or usage behavior), can provide input for the creation of purpose fulfillment operational specifications provisioned at least in part as a result of PERCos Coherence, Identity. and/or like PERCos services. Processing such input results in PERCos services generating and/or responding to, for example, CPEs, Purpose Statements, and/or other purpose specification building block and/or operating specifications.

1 The Role of Reliable Identities in PERCos

Capabilities for reliably establishing and discerning identity are key to productive human and other resource interactions. Whether in the realm of commerce, social interactions, government, and/or other domains, abilities to reliably identify and otherwise characterize individuals and their inter-relationships with one another and with documents, information stores, tangible objects and their interfaces, electronic files, networks and other environments, organization administrative services, cloud services, and/or the like, are fundamental to reliable functioning of human activities and institutions. Such reliability of identity is necessary for user and/or Stakeholder sets to determine which resource and resource portion sets are best suited to their given target purpose, as well as to be able to, in an informed manner, anticipate the outcomes of resource usage. Reliability of identity becomes particularly important in the new, human universe of an internet of resource instances of extraordinary size and diversity, including, for example, of content, sourcing, and/or the like. Without reliability of identity and associated resource set attributes, users are unable to apply best purpose suited resources from such nearly boundless computing supported global environment, since such an environment is largely populated by a vast multitude of unknown, or poorly understood by user set, diverse and diversely sourced, spectrum of things and their portions. In such an unprecedentedly new and disordered universe, persistent, reliable identity instance identifiers and associated attributes serve as foundation information sets for user set evaluation of the unfamiliar or not fully comprehended, as well as a basis for the comparative analysis of resource instances regarding their relative Quality to Purpose user set fulfillment attributes. Such instances can comprise any uniquely identifiable potential tool instance including, for example, information sets representing any applicable tangible and intangible item sets such as software, databases, documents and other published information instances, services, devices, networks, Participants and/or the like.

PERCos embodiments provide variably diverse sets of capabilities supporting reliable, assiduous identity assurance. Such assiduous identity capability sets, at least in part, fulfill previously unmet network based resource identification, evaluation, selection, provisioning, and usage management, including contextual purpose related security, efficiency, reliability, consequence management, and session environment assembly. As a result, PERCos technologies are, in part, a response to the challenges introduced as a result of global adoption of, and benefits accruing from, the complementary combination of modern computing, communications, and networking advances. Such novel PERCos technology sets can, in various combinations, materially contribute to transforming the current state of the internet from an immense, disordered resource repository of nearly boundless diversity and size, into a coherently purpose-ordered array of dependably identified, reliably evaluable, resource cosmos.

Reliable identification and/or evaluation of resource instances depends upon fundamentally reliable association of identity instances, and associated germane attributes, with their corresponding tangible and intangible resource instances and their varying situational relevance. As a result, in many PERCos computing embodiments, resource associated identities are assiduously determined (e.g., in the case of human identities, through the use of existential biometric techniques) and bound directly and/or virtually to their intangible corresponding resource instances, and/or to interface and/or attribute information and/or transformations thereof, of resource tangible and/or intangible instances. Such binding may involve, for example, binding such reliable, assiduously determined and assured identifier set of a resource and/or resource portion set to situationally germane resource attributes, such as those, for example, that are descriptive of a resource set and which may include associated Repute set. e.g. Cred. EF, FF, and/or the like information instances, for example, and/or may comprise information derived therefrom and, for example, represented in some metadata and/or other data storage arrangement. Such identifier information may, at least in part, for example, be bound to other attribute information of relevant associated user contextual purpose and/or the like instance sets, relevant computing environment sets, and/or relevant human party and/or group sets.

PERCos technologies can, for example, enable efficient and effective identification, evaluation, filtering, prioritization, selection, provisioning, managing, and/or the like of resource sets, that may optimally similarity match users' target contextual purposes. Purpose Statements, and/or the like sets through the use, at least in part, of:

Assiduous establishment of reliable persistent "root" identities, digital representatives for any instance having a digital presence that can be uniquely described—such as, for example, tangible and/or intangible resource sets that may include: Participants (such as published Stakeholder sets), users, services, process sets, information sets, software applications sets, resource logical portion sets (for example, parts of one or more resource sets, such as, for example, one or more chapters and/or drawings in a book, a CPU processor of a laptop), and/or any combination of the foregoing and/or the like, including, for example. Foundations and Frameworks (e.g. Purpose Class Applications)—and can be individually characterized in the form of an operatively unique name set and/or a reliable locator. Such root identities may further include, in some embodiments, one or more resource descriptive attributes, such as Stakeholder identity sets. Stakeholder Effective Fact sets, one or more environment set descriptive attributes, one or more user set descriptive attributes, one or more contextual purpose attribute sets, and/or the like. Such establishment of assiduous identity may include, for example, registration capabilities that individuals may use to provide their one or more existential and/or other biometric, interface, contextual purpose, other contextual attribute set, and/or other relevant information (either explicitly organized as registered resource instance attributes and/or organized as resource attribute information in a data store such as a database arrangement). At least a portion of such information sets may, for example, be captured, analyzed, fused, and/or securely stored to subsequently be used to assiduously authenticate, or otherwise contribute to authentication of, such registered instance sets during, for example, user set evaluation, selection, and/or provisioning, and/or use, of situation-specific target contextual purpose fulfillment, where such authentication may involve authenticating one or more user sets that are functioning as resources for other user sets.

Publication capabilities whereby, for example, a Stakeholder set, $STK_1$, may associate an assiduous, reliable identity set—for example, Stakeholder publisher set existential biometric identity information employed as certifying a resource set—with resource set information, $RS_1$. For example, such Stakeholder set may provide one or more assiduous identity information sets, and/or otherwise be tested to authentically be (e.g., provided through biometric testing results), information corresponding to previously registered $STK_1$ assiduous identity information. Further, one or more resource and/or Stakeholder identity attribute information sets, such as a resource information corresponding hash, can be in some PERCos embodiments, for example, securely bound to at least a portion of such identity set. In some embodiments, $STK_1$ may enable users and user systems to evaluate and/or validate $RS_1$'s provenance by attributes that provide, for example: i) information sets that bind one or more of $STK_1$'s reliable identifier sets with $RS_1$'s identity information set, and further bind the bound information set to certain of such resource sets characterizing attribute information sets; ii) purpose-related information sets, such as, for example, one or more description sets, and/or the like: iii) one or more Reputes of $STK_1$ of such resource; and/or iv) the like. One or more secure processing environments, such as, for example, protected processing environments (PPEs), comprising hardware and/or software for associating an instance set's persistent identities with one or more formal (i.e., standardized and interoperable) and/or informal (such as, for example, free text metadata) identity attributes. Such identity attributes may, for example, refer to and/or contain operatively and/or potentially relevant specification sets describing target contextual purpose specification sets. In some embodiments, formal identity attributes may be standardized and interoperable, in part to support efficient and effective discovery and exploration of resource sets for achieving optimal interim results and Outcomes, by enabling efficient, for example, similarity matching, identification, selection, prioritization, filtering, evaluation, validation, provisioning, management, and/or the like.

One or more authentication mechanisms for assiduously binding user sets. Stakeholder sets, and/or other cross-Edge objects with one or more portions, and/or at least in part transformations (e.g., through application of an algorithm), of their corresponding computational reliable identity information (such as, for example, computing arrangement identities of tangible users and/or Stakeholders with their corresponding Participant sets, information in and/or derived from therein, and/or the like, and with other resource and/or resource portion sets, respectively). In some embodiments, identity frameworks may enable user sets and Stakeholder sets to establish to a sufficient degree of rigor in accordance with a target contextual purpose set a Participant identity, through, in part, registering Participant information, comprising their assiduous, for example existential biometric, information Participant identities using, for example, their existential biometrics and/or other relevant information (such as, for example, their names, addresses, preferences, profiles, federated identities, and/or the like).

In some embodiments, authentication mechanisms may use one or more PERCos Identity Firewalls comprising one or more hardened hardware and/or software capability sets for supporting assiduous identity characterization and/or recognition including, for example, existential biometric and environment attribute determination and/or testing. Such capabilities may involve, at least in part, securing the performance of biometric and/or environmental sensors and/or emitters to help ensure that one or more of their process arrangement functions are not influenced inappropriately by instructions and/or other data introduced to produce inaccurate, unreliable, mislabeled and/or otherwise mis-associated with an attribute set (including, for example, a resource instance identifier set), and/or at least in some manner inefficient (as, for example, relates to user and/or Stakeholder contextual purpose), identity-related sensor and/or emitter processes, resulting information, one or more resulting processes (for example, purpose and resource usage related), and/or at least in part one or more information transformations thereof. Such sensor and/or emitter related processes may include secure, for example, encrypted, communications capabilities, further information encryption capabilities, misdirection and/or obfuscation capabilities, external to the firewall received data and/or instruction inspection and/or management, identity-related information storage, identity-information similarity matching including, for example, pattern (e.g., biometric template) matching, malware and/or efficiency event management, and/or the like. Such firewall technology capability sets may be, in some embodiments, integrated at least in part with PERCos CPFF capabilities and/or the like, for example, in composite CPFF and Awareness Manager appliance firewalls comprising device appliance and/or hardware component (e.g. computer bus compatible chipset) capability arrangements.

Identity management supporting the identifying, selecting, collecting, evaluating, accepting, accumulating, aggregating, organizing, storing, retrieving, and/or otherwise enabling the use of tangible and/or intangible resource and/or resource portion sets through such set's interface and description (e.g. attribute) sets. Such identity management capabilities may enable users. Stakeholders, process sets, resource sets, and/or the like to inform and/or be informed and/or provision and/or the like resource and/or resource portion sets based upon, for example, reliable situational identities. Such situational identities may comprise identifier and associated resource instance target purpose germane attributes, which such attributes may be stored associated with any such target contextual purpose set, computing arrangement environment set, and/or computing arrangement user set, and as relevant, may be, through Coherence. PERCos at least in part compiled and/or transformed into, an information set comprising a situational identity identifier set and other attribute information set which may be employed in performing PERCos purposeful operation sets in pursuit of situation-specific target purpose sets, such as, for example, perform online investment, access and/or create/edit sensitive—such as valuable trade secret—documents, reliably participate in social networks, publish resource sets, and/or the like.

A variety of means, at least in some embodiments, to organize contextual purpose germane identity-related information sets, for example, using certain PIMS and/or PERID services, and providing support for, for example:

Identity database arrangements and/or other database arrangement functional capabilities associating resource identifiers with corresponding resource attribute sets, and where, for example, certain contextual attribute sets may describe resource contextual purpose set information, for example in the form of one or more CPEs, and/or, resource associated concept characterization information, for example, in the form at least in part of Concept Description Schemas (CDSs).

Contextual purpose database arrangements and/or other database arrangement functional capabilities, wherein resource attributes such as, for example, resource instance sets (for example, resource class) simplification Facets, attribute classes, and/or resource identifiers, are associated with CPEs, Purpose Statements, stored operating purpose specifications, and/or the like.

User set database arrangements and/or other database arrangement functional capabilities associating user set identifiers with corresponding resource set identifiers and/or attributes, and where, for example, user set attributes may be associated with such resource set identifiers and/or attributes, including, for example, CPE attribute sets and/or components.

Expert and/or standards body/utility pre-defined purpose class neighborhood resource groupings, wherein such groupings are associated with contextual purpose specifications, including contextual attributes, and at least in part organize, for example, assiduously identified resources and resource portions for use in purpose fulfillment of such class purpose expressions (CPEs, and/or the like), Resource (including, for example, resource portions) and/or user set identification, evaluation, ordering, and/or the like means, including resource storage arrangement set, that in response at least in part to contextual purpose specifications, Purpose Statements, contextual purpose operating specifications, and/or the like, generate, for example, at least in part contextual purpose logically related and/or otherwise estimated quality to purpose fulfillment ordered resource set for further evaluation by user set and/or their computing arrangements, and wherein such resource sets may, for example, include assiduous resource and/or portion unique identifiers and contextually germane attribute sets.

Semiotic and Logical graph representations, for example in some PERCos embodiments employing existential graphs, conceptual graph interchange format (CGIF), and/or semiotic CDS representations of resource set, conceptual contextual purpose, and/or user set topologies, which, for example, may be at least in part in accordance with, and/or have some other specified relationship set relative to, user and/or expert specified target contextual purpose specification sets and/or corresponding Purpose Statements and/or other contextual purpose specifications, for use, for example, in resource, user, Stakeholder, environment, and/or contextual purpose evaluation and/or relationship representations, such as, for example, in support of resource, user, and/or environment set target contextual purpose related selection.

And/or the like.

Standardized and interoperable capabilities for expressing at least a portion of resource set identifiers and corresponding attributes, enabling users and/or Stakeholders to stipulate Contextual Purpose Expressions. Such capabilities can, in some PERCos embodiments, support, for example, expressing Master Dimension and Facet and/or CDS (which may overlap with the former) at least in part attribute concept approximations and any associated values. Such standardized and interoperable capabilities support efficient approximation computing through employing such concept simplification capabilities in support of identifying and/or selecting resource and/or resource portions. Expression elements may include, for example. Formal and/or Informal resources and/or portions thereof, CDS. CPE, user, and/or other constructs.

And/or the like.

In some embodiments, sufficiency of reliability of identities may vary based at least in part on user and/or Stakeholder contextual purpose. For example, users who know each other well may not need highly reliable identities to setup and operate an online networking session such as a video chat. In contrast, a bank receiving a request to transfer a large amount of funds from a client's account to another individual's account may require that the client assiduously authenticates by presenting a live, existential biometric match, augmented by contextual location information, to his or her high reliability assiduously produced Participant identity. The client, in turn, may require the bank to present sufficiently reliable identity ensuring the client is securely communicating with the client's bank and appropriate cloud service, instead of some interloper trying to steal the client's funds and/or confidential information. In such a case, such bank cloud service may provide, for example, an associated certified identity set corresponding to a bank authorized personnel set that presented themselves for existential biometric certification during the setup of the bank communications. Further, if the amount of the transaction exceeds a certain level, for example, such bank employee set may certify the transaction as it occurs through a matching of such assiduous biometric of such bank authorized to certify employee set with their, for example, corresponding Participant registered identity set. Such Participant identity matching of "live" (e.g., procedure contemporaneous) biometric certification may be performed by a third-party identity utility/cloud service similarity matching the bank provided certification set with stored Participant identity biometric attribute set, and where liveness testing, including for example, time anomaly and challenge and response (may be, for example, transparent) is performed, and where such utility/cloud service could ascertain whether such matching achieved a sufficient match correlation result.

In some embodiments, PERCos may provide means to cohere, using, for example, PERCos Coherence service capabilities, both the client's requirements and bank's interests, which may potentially conflict.

In some embodiments. PERCos identity capabilities may support assurance of authenticity and integrity of identities, at least in part, by using "hardened" security enhancing identity hardware and/or software (e.g., IF and/or AM, that may support techniques, for example, that employ cryptography, information hiding, sandboxing, hypervisor virtual machine isolation, as well as, for example, security related obfuscation, misdirection and other probing and/or reverse engineering hardened environment countermeasure techniques). At least a portion of various PERCos embodiment hardened environments may take the form of PERCos Identity Firewalls (and/or take the form of combination hardened Awareness Manager or Identity Firewall arrangements with CPFF firewall arrangements) and include, for example:

- Communication capabilities that authorized and/or otherwise relevant parties may use to securely transmit, for example, sensor and/or emitter, identity-related and/or control information sets, from user, administrator, and/or Stakeholder computing arrangement locations to and/or between cloud and/or network service(s) and/or administrative nodes.
- Processing elements for: i) assessing and/or managing the qualities of operations of at least a portion of device arrangement processing information and/or environment-based input (e.g., from assiduous biometric and/or environment sensing): ii) performing other sensitive, for example remote to user computing arrangement, identity operations, such as, for example, registration, authentication and any other validation, evaluation, event identification (e.g., for sensor input information related timing anomalies, communication anomalies, processing anomalies, and/or the like), event response, cooperative processing with remote PERCos services (cloud, network, and/or administrative such as corporate/organization), and/or the like, in a tamper-resistant manner; and/or iii) local identity information management of one or more operations.
- Encryption technology for protecting sensitive information, including, for example, identity attribute information sets, from tampering.
- Software and/or information obfuscation and/or misdirection techniques, so as to support tamper resistance of internal Awareness Manager/Identity Firewall related information and/or processes.
- Techniques for at least in part ensuring the security of PERCos hardware packaging (e.g., using epoxy and/or tripwires) and other countermeasure technologies for enhancing tamper resistance by, for example, employing techniques embedding electromagnetic spectrum and/or other shielding capabilities into, and/or as a layer of, the hardware package of, for example, a secure Awareness Manager/Identity Firewall component and/or appliance set and employing integrated circuit reverse engineering countermeasure techniques, such as, for example, employing diffusion programmable device techniques. Countermeasures may include technologies for managing/preventing decapsulation, optical imaging, microprobing, ElectroMagnetic Analysis (EMA), and fault injection, and/or the like, as well as anti-power analysis countermeasure capabilities for simple power, differential power, high-order differential power analysis, and/or the like analysis techniques.
- Tamper resistant storage structure arrangements for storing identity-related information sets and/or methods including Identity Firewall memory arrangements. Such arrangements can support secure ephemeral identity processing related information and for maintaining local and/or administrative and/or cloud service based identity related information storage such as Identity Firewall processing, input, communications, and/or other related information storage. These arrangements may support, for example, resource identifier set processing related Identity Firewall processing, communications, and/or the like audit information, including for example, Awareness Manager identifier instance sets and/or grouping (e.g., class) information (for example, auditing target contextual purpose unique identifier and associated germane attribute information, such as identity associated contextual purpose specifications, emitter instructions for biometric and/or environmental assessment, absolute and/or relative timing event related information (e.g., biometric assessment timing information) and/or other existential biometric sensed information). Such tamper-resistant storage arrangements may include local Identity Firewall, network based administrator, and/or cloud service instances, which such instances may, in some embodiments, store information in distributed, independently managed tamper resistant arrangement set(s) (e.g., different service, administrative, and/or user computing arrangement instances and locations).
  - Such distributed storage arrangements, at least in part, may support redundant (for security and/or reliability), and/or cooperative arrangements where such may be based upon, for example, frequency of stored instance usage and related efficiency considerations, and/or different security, commercial interests, privacy, and/or other stored information instance specifications/considerations.
- Sensors and/or signal emitters to securely establish the identity parameterization of, authenticate the presence of, and/or monitor and/or interact with users and/or Stakeholders and/or their physical environments to obtain corresponding to such parties' respective biometric (for example, existential time anomaly and/or other liveness tested) and/or other contextual information sets. Such sensors and/or emitters may be employed within at least a portion of such hardened hardware arrangement, such as an Awareness Manager, and/or they may be, or variously be, deployed "downstream" from Identity Firewall hardware arrangement instance one or more sets such that communications, such as instructions to, and sensing and/or emitting information from, one or more of such sensors and/or emitters, are provided, respectively, from and to an Identity Firewall protected location set, such that sensor and/or emitter set operations and/or information sets are at least in part protected by such Identity Firewall capabilities, and, for example, are, at least in part, operatively isolated from malware input and/or unauthorized probing/testing. For example, such Identity Firewall capabilities may be positioned on a computer bus such that PERCos embodiment related control information at least in part "flows" downstream to such emitter and/or sensor sensing information along a bus pathway arrangement, and at least in part, for example, such PERCos embodiment related environmental and/or biometric emitter and/or sensing information flows upstream to such Identity Firewall capability set.

Some embodiments of PERCos identity framework arrangements may provide one or more PERCos Information Managers (PIMs), which, in some embodiments, may operate as part of PERCos Platform Coherence Services, to, for example, in part dynamically manage sensor-related operations in accordance with situation-specific contexts, such as provided by contextual purpose specifications and/or other target purpose relevant information sets, where operations may include, for example:

- Sensor and emitting processing, such as, for example, deploying and configuring one or more sensor and emitter arrangement arrays to establish identity parameters (such as biometric pattern information), including, for example, authenticating the presence of, monitor, and/or actively test (e.g., liveness test with timing anomaly analysis) users and/or Stakeholders to obtain, for example, existential biometric and/or environmental (e.g., including position/location, tangible item environment arrangement, and/or user identity related movement/travel) contextual information, including for example, information pattern sets.
- Extracting and fusing (including temporal fusing) relevant sensor identity information sets into relevant identity information sets such as biometric pattern sets.
- Analyzing extracted information sets.
- Establishing communications media and/or protocols used by identity processing elements to communicate with each other.
- Interacting with relevant managers (such as, for example, identity managers, registration managers, external managers, utility managers, repository managers, and/or the like).
- Cooperatively operating with other PERCos PIM, Coherence, and/or other relevant service sets including performing PIM operations, at least in part, in a distributed manner involving a plurality of separately operating user, resource related cloud service, administrative, and/or the like PIM storage and processing instances (including, for example, employing distributed PIM analyzing and/or decision capability sets).

In some instances, PIM arrangements may, for example, obtain, cohere and resolve relevant specification sets that express, for example:

- Policies, rules and/or the like for performing PIM operations.
- Degree(s) of rigor, including, for example, authentication requirements, associated with a contextual purpose expression, Purpose Statement, and/or other purpose specifications set and/or component set of any such set.
- Stored authentication template sets needed to, or available to be applied to, perform sufficient to contextual purpose authentication processing, and which such template specifications may include authentication based authorization parameters (e.g., pass/fail conditions/values) and/or event identification metrics and/or other relevant parameters.
  - Sensor capabilities available for observing and/or capturing human and/or environmental biometric and/or contextual information sets.
  - Emitter capabilities available for providing signal information. Such emitter capabilities may, for example, emit electromagnetic energy and/or sound waves radiated in the form of visible light, infrared, ultrasound, and/or the like, to provide testing and/or evaluation signals that may produce sensor sensing—such as biometric—information that may test, for example, liveness over time, support interpretation of retinal and/or iral and/or cardiovascular circulatory biometrics, and/or provide controlled and specified exposure of tangible objects for various sensing observations, and/or the like. Such exposure ("light up") of a biological (and/or other physical instance set) may provide signal input that, when combined with any other relevant, same time same type inputs (environmental lighting, other sound input, and/or the like), produces reflection information which may be measured, for example across a time interval, as a sequence of observed item and/or environment set information. A test set of sensing such item and/or environment set may first acquire baseline information (and/or such information may be stored as item and/or environment set attribute information), such as pattern information, and when such emitter set provides output to light up such item and/or environment set, background information may then be removed, and/or otherwise accounted for, if desired, to provide remaining, exposure produced (e.g., reflection) characterizing information sets. Given knowledge of background information in the absence of emitter projection of sound and/or electromagnetic signals, and given knowledge, for example, of emitter characterizing information (signal strength, frequency, and/or other characteristics), exposure produced information can be distinguished from information created by sensing background light and/or background sound such item sets and/or environment set. Sensor information sets may be encrypted and/or bound to and/or otherwise securely associated with user set computing arrangement and/or Identity Firewall (and/or the like) unique identifier information, time stamped emitter descriptive information (e.g., frequencies, amplitudes, wavelengths, burst durations, and/or the like), and/or such computing arrangement and/or Identity Firewall arrangement information. Further, since administrative and/or cloud service identity service arrangements may share unique secrets with corresponding user computing arrangements, such computing arrangements (including Identity Firewall sets and/or Awareness Manager arrangements), may share, for example, unique pseudo-random generation secrets (keys) with corresponding instances of their remote service arrangement sets, which may have, or may be able to therefore produce, the pseudo-randomly generated emitter instance set specific emitter descriptive information so as to facilitate analysis of corresponding sensor information associated with such identifiers.
- Extraction capabilities comprising one or more algorithms for extracting, and/or correlating and/or otherwise analyzing, relevant biometric and/or contextual features.
- Analysis capabilities for analyzing extracted biometric and/or contextual features to compare them with stored authentication templates.
- Communications capabilities, such as integrating and/or otherwise resolving encryption methodologies, transmission capabilities, secure handshaking protocols, signing capabilities, and/or the like, into communications frameworks employed in identity related communications between DIM, Coherence, and/or other PERCos service arrangements in support of identification, identity processing, authentication, and/or related analysis related to PERCos and/or other system users, Stakeholders, resources, and/or the like.

Some PERCos embodiments may associate (in some cases, dynamically and/or assiduously generated) chains of authority within Stakeholder sets with one or more registered human "root" Stakeholders (and/or agents thereof, such as any applicable Stakeholder employees, authorized consultant sets, other sets contracting with Stakeholder sets, and/or the like). For example, suppose a department of an organization publishes a resource set. That department may exist within a hierarchy of divisions within the organization, with one or more of said divisions represented by Stakeholder Participants that are assiduously bound to one or more human Stakeholders and/or other, more "senior," for example, managing, Stakeholder Participants, who are authorized to represent departments at or below a given level in a Stakeholder organization (and/or Stakeholder agent) chain of authority. In some circumstances, such human root provenance authority may be essential enabling practical systems that support an effective relationship between users and a nearly limitless array of potential resource sets in pursuit of target purposes.

In some embodiments, when a human agent in a Stakeholder chain of authority associated with a resource set has a change in status (such as, for example, his/her Stakeholder authority (e.g., right to certify) is removed), there may be an identity attribute set associated with the resource set that characterizes such a change in a standardized and interoperable manner, and may, for example, provide specification information for a method set governing any such change. Such characterization set may provide information such as "Stakeholder removed for improper conduct," "Stakeholder agent removed because of a change in position," "Stakeholder agent removed but in good standing," "Stakeholder agent removed upon the authority of "senior" Stakeholder agent X (which was signed, as required for removal, by agent X using his/her existential biometrics)" and/or the like. Such provenance and method information, supported by such simplified interoperable interpretable attribute sets, may have associated Boolean and/or other algorithm and/or other applicable informational supplementary resource sets. Such explanatory, and method related, information sets can provide users and other parties with the means to access explanatory resource Stakeholder related authorization provenance relevant information, and/or methods, for the removing of one or more authorities in a resource set's provenance history and/or changing such Stakeholder instance authority's status (e.g., a summary of circumstances of removal and/or a change of provenance information from "active" Stakeholder to "expired" and/or "authority removed" Stakeholder and/or Stakeholder agent). As a result, even when creators, publishers, and/or distributors of a resource set are organizations and/or enterprises, knowledge of the resource set's human chain(s) of authority, as well as relevant current status information, may enable users to obtain assurance of a resource set's authenticity with sufficient reliability and informative properties so as to at least in part support target purpose set user, Stakeholder, and/or other party informed provenance perspective, evaluation, and/or usage of resource sets, whether, for example, before initial usage of a resource set, and/or during and/or after such set has been applied. Such provenance information, and related methods, may further be employed in circumstances where a "senior" Stakeholder authority, such as an original publisher of a resource, removes or "suspends" the certification, or otherwise the certification authority, of a Stakeholder set comprising a subsequent, for example, follow-on member (for example, a modifier, retailor, owner and/or the like) of a resource chain of handling and control.

Some PERCos embodiments may enable (and some may require) users and/or Stakeholders to establish one or more reliable, published persistent Participant identities to represent their respective digital personas (and may further represent their organizations) by associating one or more "sufficient" (e.g., as specified and/or otherwise required) identity attributes and any associated metrics with each Participant identity. In some PERCos embodiments, Participant identities are resource sets, and like other PERCos resource sets, may have attributes that characterize them, such as, for example, associated CPEs and/or other purpose expressions, any associated CDSs, authentication information sets, provenance and/or other contextual information sets (including Reputes), and/or the like.

In some embodiments, Participant identities may have varying degrees of reliability, and may be classified into separate groups having a shared "level" of reliability. Any given level can have an associated rigor specification set, including associated methods, such as tests, for example, validations and/or establishment methods, for producing Participant attribute information for a tangible instance of a contemplated Participant (e.g., specific person) undergoing existential biometric assessment to provide assiduously reliable, existential quality, biometric pattern information. Such Participant identity information—associated with one or more Participant persistent identifiers (which may include a root identifier) can, for example, be tested and/or otherwise assessed, based upon attribute information, including: i) the reliability of authentication information sets (e.g., Participant attribute biometric templates) and ii) authenticity and integrity of other, for example, germane attribute information sets, such as provenance and/or other contextual information sets (for example. Reputes such as Creds, EFs. and FFs, environment information such as location, user and/or user class behavioral pattern information, and/or the like). The value of the foregoing is at least in part dependent on the persistent reliability of methods for binding, through secure inclusion in the same Participant instance and/or by secure and reliable reference, Participant identifiers and Participant attributes in a manner that further can be reliably and persistently employed to test the correspondence of Participant existential and/or other attribute information with their respective tangible users and/or Stakeholder sets and/or agents thereof. Such testing can, for example, employ capabilities, such as similarity matching using timing anomaly and/or other liveness comparison of registered, published Participant existential biometric information with user and/or Stakeholder set subsequent resource publishing, evaluation, and/or usage process sets.

FIG. 1 is a non limiting illustrative example of timing anomaly service monitoring user and environment through assiduous images.

In some embodiments, users and Stakeholders may establish binding between themselves and their respective Participant identities that have varying degree of reliability and strength. For example, time-based biometric authentication methods that support liveness analysis and/or timing anomaly detection techniques may be stronger than authentication methods that use static information sets (e.g., passwords, photo snapshots, and/or the like) since static information frequently is exposed to misappropriation, while liveness, and in particular, across-time (i.e., dynamic) biometric behavior, may be very difficult to impossible to situationally "construct," responsive to situational conditions, without construction of timing anomalies inconsistent with normal biometric behavior, for example as shown in FIG. 1. In different PERCos embodiments and/or selectable within a given embodiment, different authentication methods may have varying rates of "false acceptance" and/or "false rejection." and adoption of authentication methods in support of purpose fulfillment may reflect, in part, the situational consequences of obtaining false acceptances and false rejections. The employment of cross-time biometric user and Stakeholder representations and testing may, with certain biometric assessment types, such as 3D facial recognition, which may be augmented and/or replaced, for example, by other biometric liveness testing (retina, thermal vascular/pulse, and/or the like) and/or by transparent and/or low burden challenge and response techniques (such as transparent visual locations on screens for user visual focus, Identity Firewall arrangement emitter based lighting frequency and/or intensity variation reflection information, electromagnetic and/or sound wave tangible object assessment, and/or the like) and may produce biometric authentication capability sets that may not be subject to biometric signal substitution and/or other biometric spoofing, subject to properly managing other possible system vulnerabilities, and may therefore be more reliably employed to certify and authenticate computing arrangement resources when compared to existing technologies.

In some embodiments, the assessment of reliability of Participant identities may, at least in part, depend on provenance of at least a portion of identifier associated identity attributes. For example, consider a Participant identity. $PId_1$, associated with a Stakeholder organization which has been granted authority by such Stakeholder set to represent a division of the organization. Evaluation of reliability of $PId_1$ may, at least in part, depend on one or more identity attributes, including, for example, attributes that refer to and/or contain $PId_1$'s authorizations as specified by one or more human members in a chain of authority. In particular, reliability of a given $PId_1$ may at least in part depend on existence of a chain of authority containing one or more root identities representing, for example, senior root certifying authorities who may authorize one or more further parties, such as $PId_1$, to act as agent(s) for such Stakeholder party (Company X represented by Participant X). A root certifying party may be specified through a process involving the publishing of such a Participant instance, for example, a PERCos Formal Resource Participant instance, whereby the publisher of such Participant resource instance is declared the root certifying Stakeholder. Publishing Stakeholder of Company X may declare through specification by, for example, employing its Company X's Participant X instance attribute, that "individual $PId_1$ is an (or the) authorizing party for certifying resources on behalf of Participant X (and/or otherwise represents Participant X for some or all of Company X's certifications)", or "individual $PId_1$ may be specified, and function, as the root certifying administrator for Participant X and may further delegate such certifying authority (and/or other authority set) to further individuals and/or organizations" (represented as, for example, PERCos Formal (and/or Informal) Resource Participant instances, in various PERCos embodiments. Such hierarchies of individuals and/or organizations may be authorized by an attribute specification set of Participant X and/or $PId_1$, as a root hierarchy instance, where each level may have certifying authority, as may be specified, for general or any specified limited subclass of certifying responsibilities. Such chains of authority may be limited, for example, as to the number of delegated "levels," domain and/or purpose types (e.g., classes) including, for example organizing at least in part by resource instances types (e.g., classes, lengths, media types, and/or the like). Such chains of authority may, for example, in some embodiments, limit the number of allowed certifications by a given individual Participant, such as a person and/or organization, and/or limit certification number per time interval and/or calendar period and/or limit at least in part by specification criteria through to a certain calendar date/time.

Such declaration of such authorized role for $PId_1$ may be specified as limited to one or more PERCos contextual purpose classes, such as certifying publications published by department Y of Company (Participant) X. Such declaration, regarding chain of authority authorization for one or more other parties, for example, by a senior, for example, root Participant authority, may also, in some PERCos embodiments, be embedded and/or securely referenced as a control attribute of a PERCos published resource. A declaration, for example using a PERCos resource instance (and/or class set, such as a purpose class set) attribute, can specify, for example, another organization (or an individual), such as Participant Z, as a party that is acting, or may act, as a delegate resource certifying agent (as a publisher or other certifier) generally, or in a manner limited as described above (through at least in part the use of an attribute set specification set). In such a case, Participant Z, in some embodiments, may be authorized to allow Participant Z agents to certify, for example, PERCos Participant Z's resource sets. In such instances, in some embodiments, Participant instances corresponding to such respective Participant Z agents may have been previously published using, in part, existential biometric techniques, and when a resource instance (e.g., a document) is certified, for example, as published by Participant Z wherein the certifying/signing agent's existential biometric information is embedded and/or otherwise associated with the published resource instance (e.g., in the form of encrypted hash biometric information bound/combined with a hash of relevant document information, such as size, date, and organization information). Where such Participant instance was previously published by such agent with, for example, a PERCos and/or the like identity cloud service as a Participant resource set, such agent Participant's existential biometric information (or a portion and/or transformed set thereof) can be similarity matched with the agent's existential biometric information supplied during such Company X's Participant Z document publishing process. At the same time, such root authority identification information, for example, at least in part at least sufficient portions of such root authority's existential biometric information, may be bound to such same resource document instance, may also be similarity matched against such root authority individual's Participant existential biometric information instance (representing a root certifying authority), and wherein publishing of and/or authorizing a PERCos resource, involving, for example, publishing documents for Company X as PERCos Formal Resource instances, requires, and for example, is satisfied when such chain of authority senior party certification may be tested by, for example, a cloud resource management utility and/or other service provider as similarity matching the Participant identity liveness, including, for example, timing anomaly evaluated/tested biometric one or more attributes. Multiple existential biometrics role types may comprise sets that are bound together as plural and/or chain of authority certification representations. Such representation schemas may be distinctive to different respective organizations, and may be maintained by one or more cloud authorities, e.g., utilities, resource providers and/or the like. Such authority identity authorization sequence arrangements may employ hashes representing a hierarchy, or other arrangement, of resource provenance authority for plural people. Such authority schemas, whether complete or at least in part comprised of role types (VP, resource certification, department resource certifier, and/or their respective explicit human identifiers) can be maintained for checking at a later time and/or date during a resource publishing process set, and/or resource evaluation and/or usage process set.

Some PERCos embodiments may enable users and Stakeholders to register reliable Participant identities by providing sufficient information that can be used to subsequently bind users and Stakeholders assiduously to their respective Participant identities, where the strength of binding depends, at least in part, on the quality and/or rigor of provided registration information sets and subsequent authentication methods. Human users and Stakeholders may, depending on situation specific and/or embodiment requirements, enable creation of assiduous identity templates by securely registering their physical and/or behavioral characteristics, such as, for example, keystroke properties, gesture patterns, gait movements, eye movement patterns, facial related patterns and/or other characteristics, iris and/or retina patterns and/or other characteristics, vocal related patterns, cardiovascular system related patterns (e.g., involving capillaries, veins, arteries, and/or blood pressure information), and/or the like. Such characteristics may be captured and analyzed, in some circumstances, over a period of time to extract time-dependent feature sets such correlation of facial features during changes in facial expression, where the foregoing and/or the like may be securely stored as templates and/or reference data sets for later use singly and/or in combinations of two or more feature sets. In some circumstances, such multiple information sets may be analyzed so as to extract time correlated patterns among various modal features. For example, speech phonemes in voice and corresponding lip movements may be analyzed to generate one or more correlated patterns that could be used in a template.

Non-human users including, for example, non-human Stakeholders, such as organizations of any type, also may enable creation of assiduous identity templates by referring to and/or providing highly reliable registration information sets (such as, for example, existential biometric registration of organization agents such as authorized employees, consultants, and/or the like and/or PKI certificates signed by trusted authorities).

In some embodiments, people may provide multiple biometric information sets to improve the reliability of templates that result from a registration process, a method that may, for example, increase an already high level of registration rigor by providing information that may subsequently be used for multimodal authentication. For example, an additional one or more authorities and/or other parties may, at some time after the publishing of a resource instance, present themselves for existential biometric certification of integrity, applicability, and/or Cred Quality to Purpose assertion for a PERCos and/or the like resource and/or resource portion.

In some embodiments, multiple modal reference sets may support adaptive authentication using one or more biometric data sets, by, for example, providing a means to authenticate using different sets or weightings of biometric data when one or more modal biometric data sets are noisy, sporadic and/or otherwise have unacceptable error rates and/or reliability/accuracy concerns. In a relatively simple example, a human Stakeholder. $S_1$, (or a stakeholder agent set for a Stakeholder organization) may have undergone tests for three modal biometric attributes during registration, comprising $S_1$'s fingerprints, voiceprints, and 3D video one or more sequences. Ideally all three biometric data sets may subsequently be used in an assiduous, multimodal authentication one or more processes. However, when $S_1$ is in a noisy environment, such as an apartment next to railroad tracks, authentication of $S_1$ in some cases may be performed using only fingerprints and 3D imaging. Although authentication of $S_1$ in such instances may be less assiduous than when high-quality voiceprints can be obtained in support of authentication, it nevertheless may be possible to authenticate with rigor sufficient for certain purposes while avoiding unacceptable rates of false negatives caused by poor voiceprint data. Further, when, in such an example where such voiceprint analysis is not practical, timing anomaly analysis on the 3D imaging data acquired for authentication may be performed at the local computing arrangement, for example in a hardened Awareness Manager appliance, and/or such analysis may be performed at an identity cloud service arrangement to evaluate for anomalies indicative that the apparent biometric information is not provided in real-time in a manner consistent with it being veritable biometric information. Alternatively, or in addition, an emitter at such user testing location/computing arrangement may employ an emitter set that radiates ultrasound and/or electromagnetic signals in the direction of the $S_1$ Stakeholder and the signal set produced as a result of exposure of $S_1$'s face to emitter output is used to provide further information regarding the details and dynamics of $S_1$'s face, and where the use of, for example, transparent to $S_1$ emitted signal types may produce greater detail, providing a higher level of biometric information acquisition reliability. Furthermore, information produced by exposure of $S_1$'s physical computing arrangement/testing environment to emitter signals may also, in some instances, be used to generate environment physical object arrangement and feature information (which may be stored as at least in part pattern information) and such information can be used in similarity pattern matching against historical stored $S_1$ physical environment information to provide additional assurance as to the integrity of asserted identity of $S_1$, for example as shown in FIG. 2.

Figure 2:
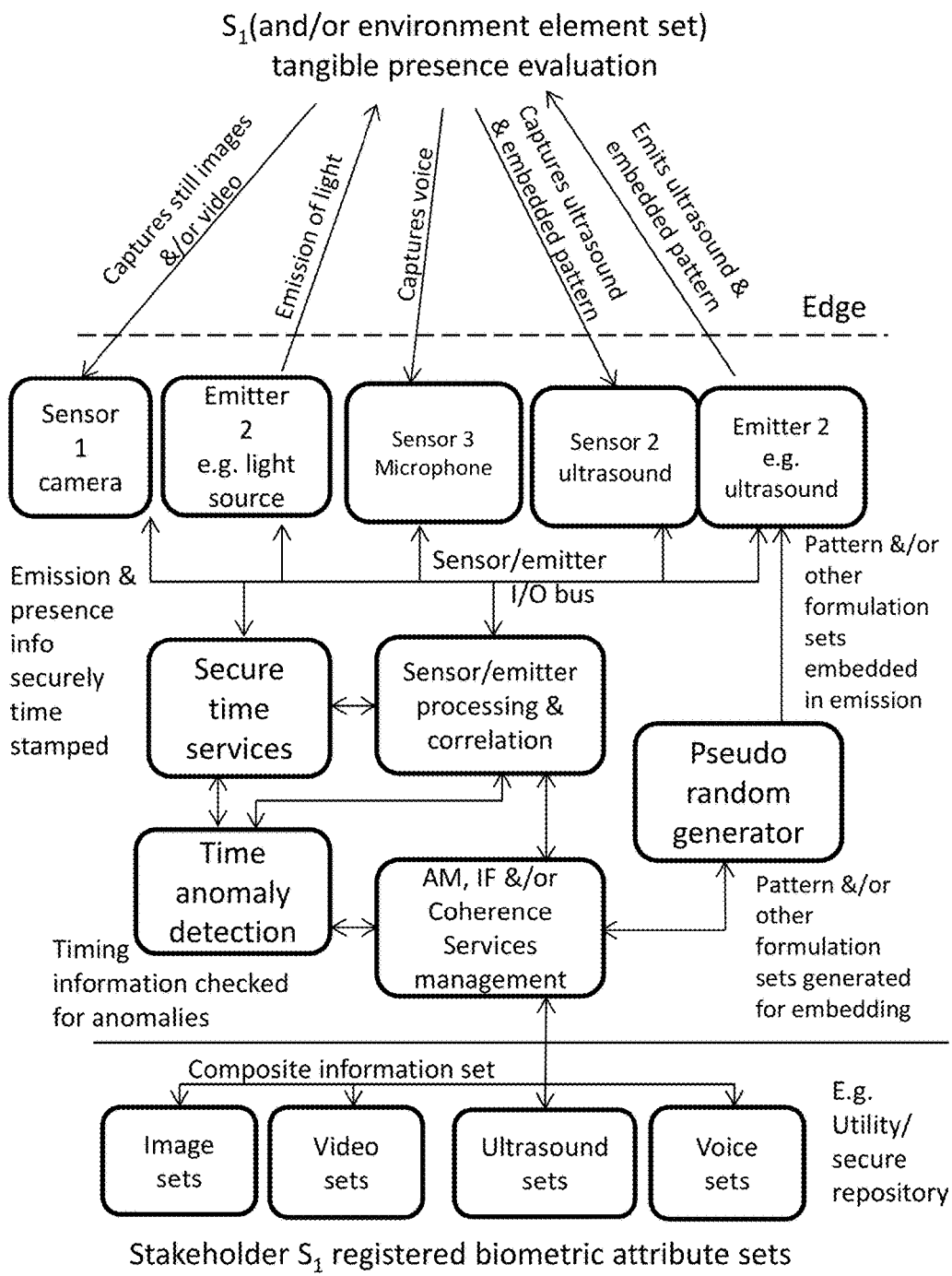
FIG. 2 is a non-limiting example of multi-modal sensor/emitter operations in support of reliable identity verification.

FIG. 2 is a non-limiting example of multi-modal sensor/emitter operations in support of reliable identity verification.

In some embodiments, user and/or Stakeholder sets may associate one or more authentication identity attribute sets and associated methods with their Participant identities. Such attributes and methods may enable differing levels of rigor of binding, of rigors of testing, and/or of compositions of Participant attribute information, for example, as any such level and/or other organization designation are associated with contextual purpose expression specification sets and/or other purpose specifications. Certain Participant attribute information may not be available for any given certain level/designation set so as to protect privacy regarding such information and/or certain Participant attribute information may be conditionally available, such as in return for consideration, such as financial payment, provisioning of a service, and/or satisfying some other explicitly identified type of consideration or requirement.

For example, in some embodiments, a Stakeholder set, $Stk_1$, may comprise a publisher of software programs. In differing circumstances, $Stk_1$ may associate two different authentication attribute with method sets, $attr_1$ and $attr_2$, with $Stk_1$'s Participant identity where $attr_1$ relates to and/or contains $Stk_1$'s video image representation information set for authentication image matching processes and such a representation may enable authentication to be performed at a modest level. In contrast, $attr_2$ contains a more rigorous existential facial biometric set with pattern matching and timing analysis and requires, or provides, a rigorous multi-modal reference biometric data set. If such $Stk_1$ wishes to provide software that will be provided with high levels of reliability, that is, in a manner that users can be assured that such a software resource is what it is claimed to be, and, as a result, can be reliably evaluated as to the Quality to Purpose, then such second modality of authentication may be used.

In some instances, when a session or otherwise participating party is, for example, an individual or small group, such participating party may evaluate a contemplated or actual user set for participation in a common purpose computing session such as a plural party social networking and/or communications scenario (e.g., a video conference). Such evaluation may involve disclosing an identity associated participant attribute set, including, for example, an ability to test such user set's existential biometric sets information using liveness, including timing anomaly, testing and analysis, using, for example, Identity Firewall and sensor and emitter capabilities at an evaluated user set's computing arrangement. Such biometric signal acquisition might be performed at the computing arrangements of each user in a common purpose session and might be required by some one or more user sets as a prerequisite condition set to engage with one or more other user sets. Further, such evaluation information requirement may be associated with, and/or included within, a contextual purpose expression and/or other purpose specification set and/or preference setting.

A Stakeholder (and/or other user) set may be authorized to, and/or may require, the right to, acquire usage provenance information going forward for a PERCos resource, such as for $Stk_1$'s software application. For example, aspects of such provenance information may include usage, for example, information regarding user actions and/or user usage history and/or forward going user activities, such as, for example web sites visited, contact lists and information, selections made, purchases made, and/or the like. Such requirements may be associated with differing or different authentication methods, including identity validity testing, schemas, such as, for example, described in PERCos embodiments, and/or may be further associated with differing and/or different attribute availability, privacy, and/or other usage schemas as may be responsive to the use of a Stakeholder set's resource set contextual purpose related specifications (such as associated with $Stk_1$'s software application) and/or a user set's descriptive, contextual purpose expressions, Purpose Statements, and/or the like.

Figure 3:
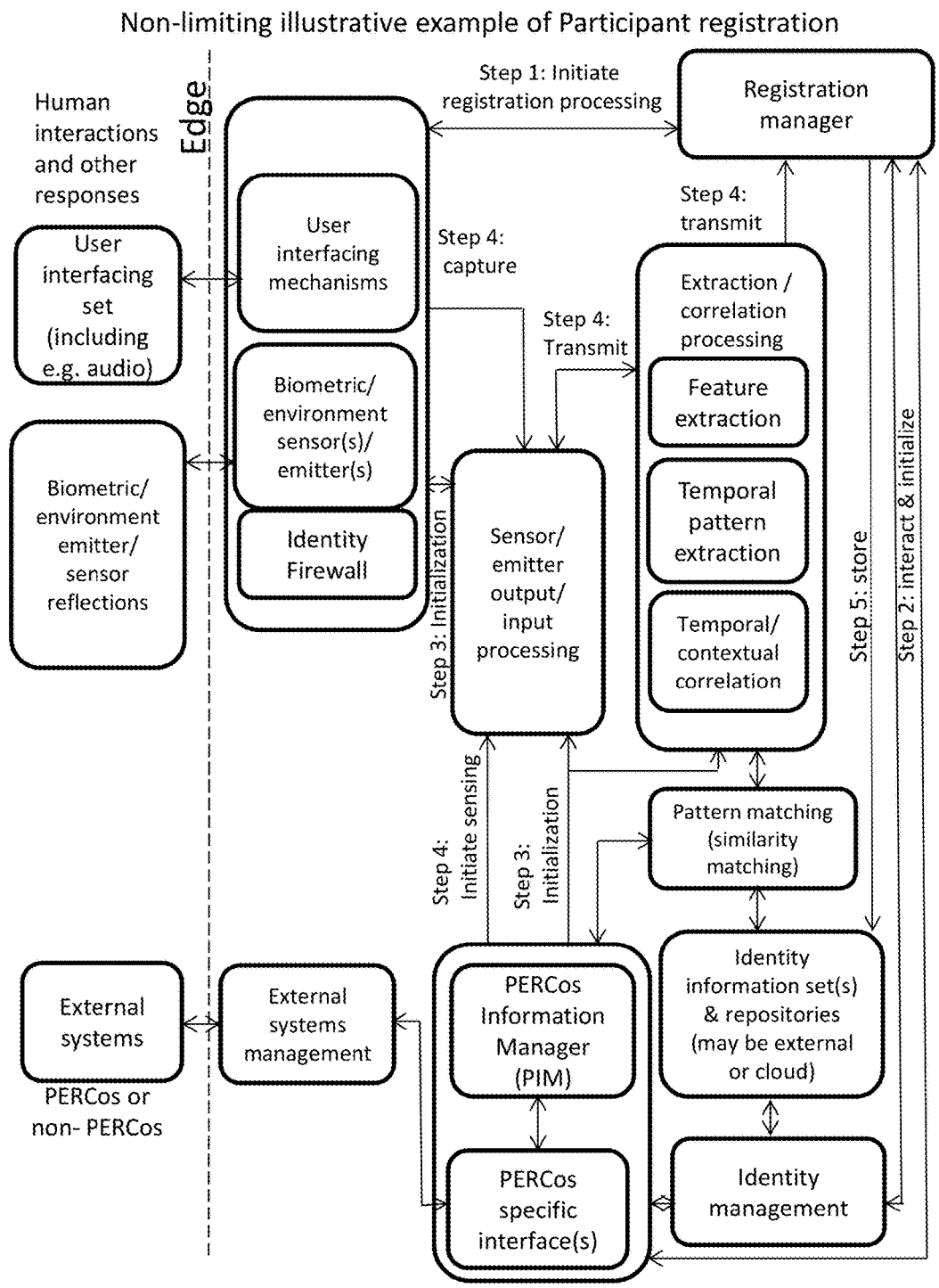
FIG. 3 is a non-limiting illustrative example of Participant registration.

FIG. 3 is a non-limiting illustrative example of Participant registration.

FIG. 3 illustrates a non-limiting example embodiment of existential biometric registration. Step 1 in FIG. 3 shows an individual interacting with a registration manager (local, network administrative based, and/or cloud) instance to perform an assiduous registration of Participant and/or the like process set. Registration manager arrangement instance in turn interacts with a local, network, and/or cloud PERCos Information Manager (PIM) arrangement to decide the sufficient level of rigor (step 2) and associated method set, where such decision may be based, in part or whole, on instructions from any one of, or cooperative plural arrangement of, local user computing arrangement, administrative network based, and/or cloud service identity management entity. Based in part on such decision, the PIM instance may coordinate with identity-related functional elements (such as, as situationally applicable, emitter electromagnetic radiation and/or sound wave element sets, sensor processing element sets, extraction/correlation processing element sets, repository element sets, and/or the like) to step 3. In some embodiments, the PIM instance (and/or like capabilities in one or more other PERCos embodiment managers) may interact with external systems that may manage environmental systems, such as closing the blinds, dimming the lights, and/or the like. In some embodiments, one or more such PIM instances may operate as component managers within local, administrative organization, and/or cloud based service sets, such as with PERCos Coherence and/or identity manager sets of capabilities, and some or all of such capabilities may operate within a PERCos Identity Firewall/Awareness Manager arrangement, such as one or more secured, hardened, for example, against intrusion, disruption, and/or substitution component one or more devices resident on the communications bus of a user and/or Stakeholder computing arrangement, and/or located within an Identity Firewall/Awareness Manager appliance that operates within or in conjunction with such user and/or Stakeholder computing arrangement.

Step 4 illustrates sensor processing deploying one or more emitter and sensor sets to capture an individual's existential biometric and/or environmental contextual information sets, transmitting the captured information set to extraction/fusion processing elements, which may, for example, process and/or correlate the captured biometric and/or contextual information set so as to correlate feature sets between captured biometric features to extract temporal patterns, indicative of veritable human "liveness". This includes PIM monitoring identity-related processing elements to ensure that they adhere to their respective specification sets.

In step 5, analyzed biometric information sets that have been hashed using one or more cryptographic hash functions and securely bound to the individual's identity for storage in one or more locations in accordance with a storage specification set (such storage may be located at a remote cloud service set). In some circumstances, information sets may be stored to provide robustness by deploying one or more fault tolerance algorithms, such as, for example, Byzantine algorithms. An information set may be also decomposed and each decomposed data set may be individually hashed and arranged in a hash tree, such as a Merkle tree.

In some embodiments, one or more biometric templates may be extracted by feature data sequence matching to support differing situation-specific contexts, including differing target purpose sets, including, for example, organizing situation-specific contexts that at least in part comprise contextual purpose classes.

In some embodiments, Participant identities representing humans may make reference to and/or contain attributes derived from non-biometric information, such as, for example, authorizations, personal information (such as a person's name, address, academic credentials, skill sets, preferences in one or more domains, profiles, historical data, and/or the like), contextual information (such as one or more contextual purposes, purpose classes and/or other purpose neighborhoods, Reputes such as Cred Quality to Purpose Facets, and/or other Master Dimension variables such as Facet resource information (for example, in the form of complexity plus a rating, such as 6 on a scale of 1-10, sophistication plus a rating, educational level plus a rating, and/or the like, as may be described by a direct Stakeholder such as a resource publisher)), and/or the like. For example, consider a professor of physics at a well-known university. The professor may have a Participant identity that represents the professor's professional identity and one or more attributes that express the professor's level of expertise in his/her specialization, one or more Effective Facts expressing his/her academic credentials and affiliations and peer-reviewed publications, Cred assertions published by indirect Stakeholders expressing the Quality to Purpose of his/her work, and/or the like.

In some embodiments, Participant identities may contain attribute sets outlining and/or enumerating a person's computing resource one or more arrangements, such as PERCos one or more Foundations (which may include user computing arrangement interface information), for interacting across an Edge between the tangible world and the digital domain, such as home network equipment/configuration and devices (such as computers, laptops, smart phones, tablets and/or the like), each of which may comprise a set of hardware and software systems that both enable their interactions and have one or more identifying characteristics that may be instantiated as identity attributes associated with them, and/or as represented by resource class and/or other type identifying information. For example, IP network devices are provided with a unique MAC address that is used as part of network operations, and each smart phone that has a cellular network connection is provided with, for example, a unique IMEI number. Many of the devices a user may employ, for example a laptop, have unique identity attributes, which for example may comprise a specific "fingerprint" set representing a subset of individual elements that comprise that specific laptop (hardware and software) and such set may have situationally based attributes, such as attributes relevant while using a device for one's business activities such as employee functions for a corporation, and a differing set of attributes for personal activities, and where either of the foregoing may have situational attribute sets associated with different contextual purposes.

In some embodiments, user and Stakeholder Participant identities may contain attributes that express qualities of their surroundings, such as colors, shapes, sounds, geographical location, population of tangible items, other humans (and/or non-human animals) in the background, and/or the like. For example, when working on a proprietary corporate document, if an individual's voice is heard in the user set's computing arrangement room and the detected individual isn't identified by voice recognition protocols as matching a name on both contextual purpose and computing environment lists, then the computer may automatically hide or otherwise event manage content, such as not displaying a document, hiding a webpage, playing video and/or audio, halting output (on a printer), and/or the like. Such actions to protect privacy and/or other rights may be highly selective, such that one displayed document, video, webpage, and/or the like may continue to be displayed, while another document, video, webpage, and/or the like may be restricted, concealed, displayed only in summary form, not printed or otherwise outputted, and/or the like.

In some embodiments, such reliable Participant identities may be registered with one or more identity management services, such as trusted utilities, by, in part, securely binding one or more biometric and/or non-biometric identity attribute sets with tangible identity information (e.g., a name, address, and/or the like). Such registered Participant identities may be associated with one or more contextual purpose class sets and/or individual instances and may include standardized metrics, such as values reflecting importance to Participant on an absolute scale and/or prioritized importance relative to other contextual purposes as extracted from usage information and/or resulting from user specification. For example, a user set may specify such attribute information as part of user profile information where such information reflects importance values for respective contextual purpose classes that are associated with user set Participant identities (including, for example, organization identities), and/or user computing environment (e.g., room at an address, on a floor, at a GPS, cellular, and internet address/location). Such information characterizes usage and/or importance of, and/or interest in, any specific purpose class CPEs, other purpose related specifications, and/or any other of the foregoing information types, at least in part user based/extracted and/or user setting, where such information may be included as, and/or otherwise contribute to, attribute information (e.g., CPEs aggregated into a contextual purpose class set value representation of importance) of such Participant identities. As with other Participant sets, user sets, and/or computing arrangement sets, such information may be maintained in an information storage arrangement that may be discoverable and/or otherwise associated with such identities, for example, in response to target purpose situational requirements and/or other conditions. Such Participant identities may also include, at least in part, transformations of user historical behavior (for example, contextual purpose and/or resource related usage aggregations and/or other associations) presented, for example, as user Participant associations with respective contextual purpose classes, user classes and/or other user sets, and/or resource sets (including, for example, resource classes and/or persistently, reliably identifiable resource portions).

In some embodiments, registered reference templates (stored template information) may be dynamically updated to adapt to changing biometric and/or environmental characteristics. For example, most people have regular habits which can be represented as pattern information that may be associated with one or more of their situational identities and/or associated with one or more groups with which they are associated and/or can be determined that they share attributes in common. For example, an individual may stop by a coffee shop on the way to work, call home before leaving work, talk to his/her spouse when he/she calls home (which pattern can be biometrically assessed and validated, for example, through use of biometric voice recognition capabilities of such spouse), connect several times a day to certain news services (such as the New York Times, CNN, BBC), update information on their shared family Facebook page an average of five times per day and almost never less than two times a day, have certain common routes of travel that occur on certain days (taking subway and/or car commute routes), shop at certain stores on a regular basis and/or at certain times of day, and/or a certain number of times a week, maintain one or more blogs and/or publish comments on Twitter, and/or the like, all of which may be in accordance to timing patterns (by day, hour/minute, week) as described herein. Registration processing may be provided with one or more control specifications that specify that a registrant is monitored over a period of time to capture such habitual characteristics and/or the like and update their reference data sets as appropriate and, if specified, communicate some portion of such information to, for example, organization and/or cloud service locations for participant attribute information storage, similarity matching, authentication and/or other event management. PERCos based operations may perform similarity matching within local user computing arrangements, at administrative network locations, and/or at cloud services, and/or the like, to determine that the user set using a computing arrangement set is, is likely to be, and/or may be, required or requested to be further tested to assess, identify, securely validate, and/or the like. Such processes may be transparent or apparent to user sets, and may vary by embodiment and/or be based at least in part on security rigor sought, computing and/or other efficiency overhead, desired transparency to user, and/or be based at least in part on other considerations, and may involve one or more factor challenge and response, using, for example, PERCos existential biometric liveness (including emission) testing with emitters/sensors, and timing anomaly analysis.

For example, suppose a person. $P_1$, habitually is accompanied by a group of specific people in the room when $P_1$ assumes a Participant identity, $PId_1$, to pursue one or more target purpose sets (such as publishing resource sets). Registration processing may capture biometric information of these "background" people and store the captured information as part of $P_1$'s one or more templates with the set of activities, and, for example, associated with one or more contextual purpose class CPEs, Purpose Statements, and/or the like. In some embodiments, registration processing may invoke biometric recognition techniques to identify people in the background. Regardless, when $P_1$ assumes $PId_1$, authentication procedures may capture biometrics of background people and attempt to match biometric data sets with stored templates derived at least in part from previously captured biometrics. If they do not match, then authentication processing may in some instances initiate and perform additional testing to authenticate $P_1$. Such identity processing may further involve assessing privileges associated with given individual participant identifications and associated biometric information and, for example, apply flexible security and/or privacy management rules. For example, when a given individual is detected entering such a room. PERCos identity management may determine that certain content being displayed on a user set computing arrangement can continue to be displayed, but may conceal one or more documents, videos, teleconferencing participants, audio from certain one or more parties or regarding certain one or more topics (which may, for example, be voice and semantically recognized for topic relationship), for example, from such teleconferencing session, and/or the like, by either presenting "blank" and/or "silent" spaces in place of such content, replacing such content with situationally innocuous content (such as a pastoral picture), and/or expand the screen space of other, allowed content, to conceal that content is not being displayed and/or otherwise make best use. Such techniques can also be employed with other output means, such as differentially controlling content communications to different parties participating in teleconferencing and/or controlling printer output such that a person without the appropriate privileges wouldn't be present when a given set of content is being outputted.

In some embodiments, users and/or Stakeholders may register their respective Participant identities by publishing them with one or more third parties (such as, for example, identity management services such as cloud service identity utilities) by providing information sets sufficient for subsequent, rigorous authentication by, or supported by, said third parties and, when applicable, by employing sufficiently secure and reliable identity information acquisition means such as using a PERCos Identity Firewall, an Awareness Manager with PERCos Identity Firewall capabilities, and/or elsewise using a user set computing arrangement with integrated and hardened and/or otherwise secured biometric sensor, emitter, and/or identity control information implementations. Such identity managed services, in some embodiments, employ secured communication pathways from such identity control implementations (e.g., Identity Firewall) to remote administrative organization services and/or, for example, cloud identity management services. Securing such identity communication pathways and processes may involve, for example, an isolation of such communication means from the non-biometric and/or non-environment sensing related processes of such user set, non-Identity Firewall arrangement computing environment. Such Identity Firewall embodiments can help ensure the reliability of biometrically and/or environmentally sensed user identifier information used in the registering and publishing of Participant identity information. Such Participant information may then be employed in ensuring the reliability and integrity of resource set information through, at least in part, matching Participant biometric and/or environmental pattern information, including, for example, employing liveness testing to authenticate such information, to corresponding information employed in the biometric, for example, existential biometric, signing of information comprising, and/or otherwise establishing the identity of, user relevant signed resources. Such Participant information can also be employed, for example, in evaluating and/or authenticating for social networking purposes, current and/or candidate users (and their identity related qualities) that a first user set (e.g., an individual, a parent of a child, a group) is considering to interact, or is actively interacting, with. Such current and/or candidate users may be, for example, existentially biometrically evaluated, including, using for example, timing anomaly analysis, to establish, for example, through comparison to a registered Participant information set, who such current and/or candidate party sets are, and/or to ensure that any such parties are whom they claim to be, and, through the use, for example, of PERCos Repute Cred, EF, FF, and/or the like Participant set related capabilities, ensure that such party set meets acceptable criteria for establishing and/or continuing any such social network (or commercial networking, expert advising, and/or the like) relationship.

In some embodiments, the reliability and integrity of biometric and/or environment analysis related identity attribute information, for example, information employed in publishing Participant information sets, may be further ensured through the use of one or more dedicated and/or otherwise assiduously managed identity related communications pathways, such as communications pathways to and from such Identity Firewall capabilities. Such Identity Firewall at least in part securely managed communications capabilities may allow only minimal, firewall supervised information communications from such user set other "local" computing arrangement meeting specifically identity assessment and reporting related instructions, for example, instructions to activate or deactivate any sensor and/or emitter set, and may alternatively or in addition allow secure remote identity services from network based administrative and/or cloud identity service arrangements to communicate software and/or driver and/or security, auditing, information transfer, Participant information (such as biometric pattern) and/or the like information, using a secure communications arrangement, such as a separate communications link.

For example, a PERCos Identity Firewall may take the form of a hardened component connected to a user computing arrangement bus between such user set local computing environments processing and storage activities and one or more of such computing arrangement's identity related biometric and/or environment sensors and/or emitters, and control communications. Such hardened component may also manage certain processes related to securing the reliability, integrity, and evaluation of sensor and/or emitter biometric and/or environment identity and event information and communications, including storing and employing pattern signature and other information related to the foregoing, as well as providing secure timing services. Such Identity Firewall can ensure the reliability of Participant related authentication processes by providing time anomaly related biometric and/or environment signal analysis, such as signal information analysis based upon emitter signal specifications, detection by sensors of interactions between emitter signals and human and/or non-human environmental elements, and related timing correspondence and unfolding sequence analysis. In some embodiments, in support of such Participant identification and/or authentication processes, an Identity Firewall may turn on a sensor A and/or employ a random instruction generator to instruct emitter B (for example, an ultrasound emitter) to emit a, for example, pseudo-randomly chosen changing frequency and energy radiation set over one or more time intervals, such that representation information of such emitted signal can be bound with received sensor and/or other received biometric and/or environment information and cross-correlated according to time, emitter output and sensor input signal and timing characteristics so as to support the evaluation and identification of other anomalies representing, for example, untrusted information provisioning results caused, for example, by outputted signal set reflection (and/or other redirected and/or otherwise modified) information logical (to expected norms) inconsistencies, and/or, as applicable, other biometric and/or environment sensed information. In some embodiments, this methodology supports users, user systems, and/or Stakeholders interacting with other parties to ascertain and/or authenticate other registered parties' Participant identities, and such identification and/or validation can normally be performed with great reliability, when employed with PERCos assiduous biometric (and environment) analysis and authentication arrangements (for example, existential biometrics, Identity Firewall capabilities, timing and other pattern anomaly biometric liveness signal analysis, and/or the like).

In some cases, a third party, such as a cloud identity service, may issue a token certifying the authenticity of the binding between the Participant identities and associated users or Stakeholders. For example, suppose a Stakeholder, $Stk_1$, registers a Participant identity, $PId_1$ with a trusted identity manager by securely acquiring and communicating an existential biometric information set. The trusted identity manager may issue a token that $Stk_1$ in some cases may use to perform PERCos activities (such as, for example, publishing a resource set) for which the authentication is deemed to have been sufficiently assiduous. Users interested in using the resource set can evaluate and/or validate provenance of the resource set by validating the issued token.

Authentication methods can be used to assess the validity of claimed identities of people and/or things, and may involve various strategies and tactics. Strategies for authenticating a user may involve a validation of what the user has or has access to (e.g., secure token, biometric certificate, mobile device and/or e-mail account sets), what the user knows (e.g., password set, their favorite color and/or other applicable challenge and response) and/or what the user is (e.g., authentication through biometrics such as, for example, facial, fingerprint, iris, retina, cardiovascular, and/or the like recognition). Often an authentication process may involve a matching of information sets (e.g., password sets, biometric measurements, and/or the like) that were provided by, or obtained from, a user at the time of, for example, identity registration, against information that may be provided by and/or obtained from a user when they are authenticated, such as biometric information. Biometric authentication methods, especially assiduous existential authentication methods that prove liveness of a specific human by, at least in part, recognizing inaccurate, fraudulent, and/or otherwise misrepresentative, biometric information sets as a means to prevent, for example, such as, to identify, spoofing and/or other improper authentication attempts, so as to, in many instances, provide significant advantages in computing arrangement related security, reliability, integrity, and/or the like.

Existential authentication may enable individuals to authenticate themselves by using one or more liveness detection techniques to capture their physical and/or behavioral characteristics and compare them against corresponding stored biometric reference information sets. In some embodiments, existential authentication of an individual may include using challenge response techniques that may or may not require the individual's cooperation, that is, they may or may not be transparent to user recognition. For example, authentication processing may request an individual to blink a specified random number of times, hold up the individual's hands, point their forefinger to the right, and/or read a word or phrase out loud, and/or the like. In other circumstances, authentication processing may subtly illuminate using an emitting arrangement such as one that emits electromagnetic radiation, with ultrasound, and/or the like, an individual's face to capture his/her physiognomy, particularly its dynamics over some period of time, and/or any other tangible, physical reactions, including, for example, facial emotional reactions to audio and/or visual user computing arrangement emissions. Such challenge-response protocols may be extremely difficult (and, in many circumstances, either not possible or very impractical) for aspiring disrupters to fabricate an apparently adequate response because of the enormous computational resources that would be necessary to even approximate an appropriate response in relatively real time. Given the situationally specific nature of emitter emitted radiation and the complexity of building real-time biometrically authentic appearing responses, parties with malicious intent may be unable to prevent the creation of observable and/or otherwise analyzable anomalies in physical feature dynamics.

Even if, at some point, malicious parties were able to somehow assemble sufficient resources to spoof appropriately detailed human feature dynamics of a biometrically observed individual, they would have to generate in real time, for example, a video clip that matches the individual's expected response and then insert it in a manner that does not result in unnatural discontinuities and/or other timing anomalies, for example, at the beginning, during, and/or the end of a clip. Discontinuities in the individual's apparent position and/or motion could be detected, for example, by authentication processing.

Authentication security and/or reliability, can, in many circumstances, be enhanced through the use of situationally unique (e.g., pseudo-randomly generated) emitter electromagnetic radiation sets and/or sound wave sets, in some instances transparently radiated towards a user. The use of such essentially unpredictable sound and/or electromagnetic emission sets to expose users and/or their tangible environments can yield biometric liveness and/or other signal sets that greatly compound the difficulties facing parties with malicious intent who attempt to spoof identity authentication by presenting biometric misrepresentations. In such cases. PERCos supported sensors, such as those protected by PERCos Identity Firewall sets and/or securely encapsulated within PERCos Awareness Manager sets, can employ reflections (and/or other changes in emitter signals) caused by user interactions with known (and, in some embodiments, controlled) patterns of emission to demonstrate key aspects of a test subject's tangible facial contours and/or other features. Further, with the implementation of PERCos Identity Firewall capability sets, depending on embodiments, a large portion, to all, remote computing spoofing attacks on a user "local" computing arrangement could be prevented and malicious parties would have to be physically present in the user computing arrangement local environment to successfully carry out an attack.

Existential authentication may further be used in the signing of pre-published resources, that, for example, remain directly under a Stakeholder set's and/or Stakeholder set's agent's (where the agent may be a Stakeholder Authorized Agent (SAA), such as an authorized employee of a corporation) control, whereby a resource in preparation may, for purposes of decryption, access, variably controlled use, may require a match between a party set attempting to work with such a pre-publication resource, and their corresponding local administrative network location, and/or cloud identity service, Participant corresponding information set. In some embodiments, for example, such access and/or modification rights for a given authorized Employee M in Corporation X's Department Y to work on intellectual property documents may derive from a match against a Corporation X root authority party's (Authority N's) Participant identity, where Authority N has signed or otherwise certified using (directly or through a service arrangement), at least in part their assiduous, existentially tested biometric information (for example, which may be an attribute identifying component of their Participant identity set) that such Employee M, as a result, at least in part of such signing or otherwise certifying, has the right to work on intellectual property in development and research in Department Y and with such Department Y's documents. Employee M is identified, for example, through an at least in part existential biometric authentication of such employee's identity and rights by matching relatively real-time—when attempting to access a Department Y document—acquired existential biometric information of Employee M against his/her Participant identity information, including assiduous biometric information. Such Employee M can be further authenticated by, for example, a network service, such as Corporation X's and/or Cloud Service Q's, checking a certificate issued by such corporations root authority party Authority N and attached or included in Employee M's Participant information set, for example, checking such certification (a network service based certificate ensuring such certification has been performed) against their stored Authority N Participant assiduous biometric pattern information and/or performing a "real-time" existential biometric test where Authority N asserts or reasserts such Employee M Department Y document usage rights. Assiduous authentication may use one or more methods to authenticate users and Stakeholders to provide sufficient degrees of rigor in accordance with situation specific context sets, including for example, target purpose sets. In some embodiments, assiduous authentication may operate over a period of time wherein the degree of authentication may improve as the assiduous authentication process proceeds and may include assiduous evaluation and/or validation of the party's target contextual purpose related historical behavior and related qualities information sets, including, for example, relevant Reputes (such as Creds (including, for example, Creds on Creds). EFs, FFs, and/or the like). Appendix Set A provides non-limiting illustrative examples of such processes.

In some embodiments, assiduous authentication of an individual may involve using one or more emitters and/or sensors over differing timelines and/or periodicity to monitor and/or observe the individual over extended periods of time and may use, for example, one or more accumulation techniques to build information sets suitable for rigorous processing and evaluation. For example, data capturing monitoring and/or observations of an individual may be time-stamped and analyzed to extract time-based biometric features and/or patterns, such as time-based gait, and/or physiognomy dynamics, over time patterns extracted from analysis of sequential motion video frames.

User and/or Stakeholder authentication may be performed at a variety of locations relative to an individual, including within a secure Awareness Manager device in the individual's local computing arrangement, particularly if said device is able to provide assurances to various parties of its trustworthiness at levels sufficient to satisfy, for example potentially assiduous, requirements for authenticating human identity. In many instances, for example, a cloud-based authentication may be provided by a third party that authenticates users and/or Stakeholders and, in some embodiments, may issue one or more certificates, other tokens, and/or the like, expressing quality of authentication related information. In some embodiments, the authentication rigor level for a user and/or Stakeholder set, such as an individual, $P_1$, associated with a Participant identity. $PId_1$, may, at least in part, result from:

Reliability, security, performance and/or trustworthiness of one or more of $P_1$'s emitter, sensor, and/or computing arrangements, Reliability, security, performance and/or trustworthiness of service providers who provide authentication acquisition, evaluation, and/or validation services associated with $PId_1$.

Reliability, security, performance and/or trustworthiness of relevant aspects of "local" to user set computing arrangements, including, for example, communications between such user set local computing arrangements and identity identification related, e.g., authentication, and/or the like, administrative and/or cloud services.

Integrity, timeliness, situational adaptivity and/or appropriateness, with liveness testing and analysis, of relevant, for example. Participant and/or the like associated/incorporated identity biometric templates and/or related biometric attribute information that can be used as reference data to perform authentication. Such reference biometric information, and/or at least in part transformations thereof, may be employed in user and/or Stakeholder authentication in conjunction with Identity Firewall related emitter radiation reflection and/or other user interaction related information and/or when performing liveness testing, including when performing timing anomaly analysis using, at least in part, Participant and/or the like registered and published assiduous biometric information against such stored template information.

Quality, reliability, security, and/or information integrity/accuracy of registration services with which $P_1$ registered $PId_1$.

The quality of similarity matching and anomaly analysis in matching user and/or Stakeholder Participant and/or the like registered assiduous biometric information sets against situationally differing, subsequently acquired, user and/or Stakeholder biometric information.

Based at least in part on an evaluation of one or more of the above, the third party may authenticate $p_1$ and issue one or more certificates, other tokens, and/or the like, expressing the reliability of, and/or one or more other qualities regarding the binding between $p_1$ and $PId_1$.

In some embodiments, a registration service that registers human users and/or Stakeholders may ensure integrity of relevant biometric templates by providing secure end-to-end arrangements including secure sensor and emitter sets, secure communications means, and/or other elements of user and/or Stakeholder set computing platform arrangements to provide biometric templates and, as applicable, other attributes, which may then be analyzed to extract relevant features that are then cryptographically signed.

Figure 4:
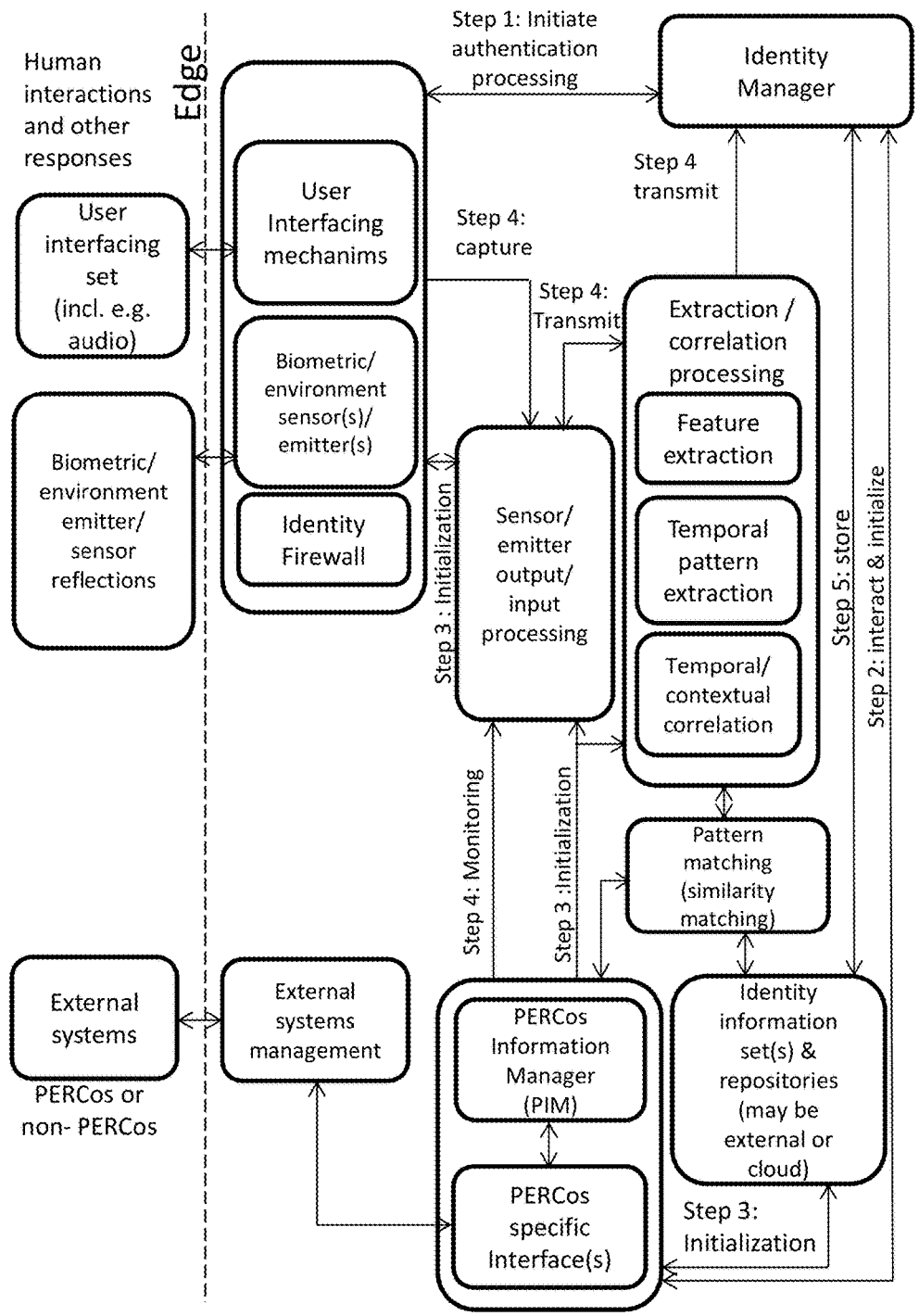
FIG. 4 is a non-limiting illustrative example of user initiating authentication processing.

FIG. 4 is a non-limiting illustrative example of user initiating authentication processing.

FIG. 4 shows an illustrative example of an existential authentication in which a conventional biometric authentication process is enhanced by explicit or implicit liveness detection challenges that neutralize potential subversions of a conventional biometric authentication. In this example, sensor processing may time stamp captured sensor data to leverage accurate time measurements to establish the time correspondence and/or alignment of biometric features to extract temporal patterns and feature correlation analysis which are compared against corresponding biometric templates in the feature data sequence matching.

In this example, when an individual requests to authenticate himself in pursuit of a target contextual purpose, an identity manager instance may retrieve the individual's stored reference biometric and contextual templates (step 2). Based in part on the retrieved reference templates, the identity manager instance interacts with a PIM instance to determine the biometric and/or contextual information sets the individual needs to provide (step 3). The PIM instance, in turn, coordinates with sensor processing to agree on biometric and/or contextual information it needs to capture and with extraction/correlation processing to agree on the analyses of the captured information set (step 4), which are provided in step 5.

Figure 5:
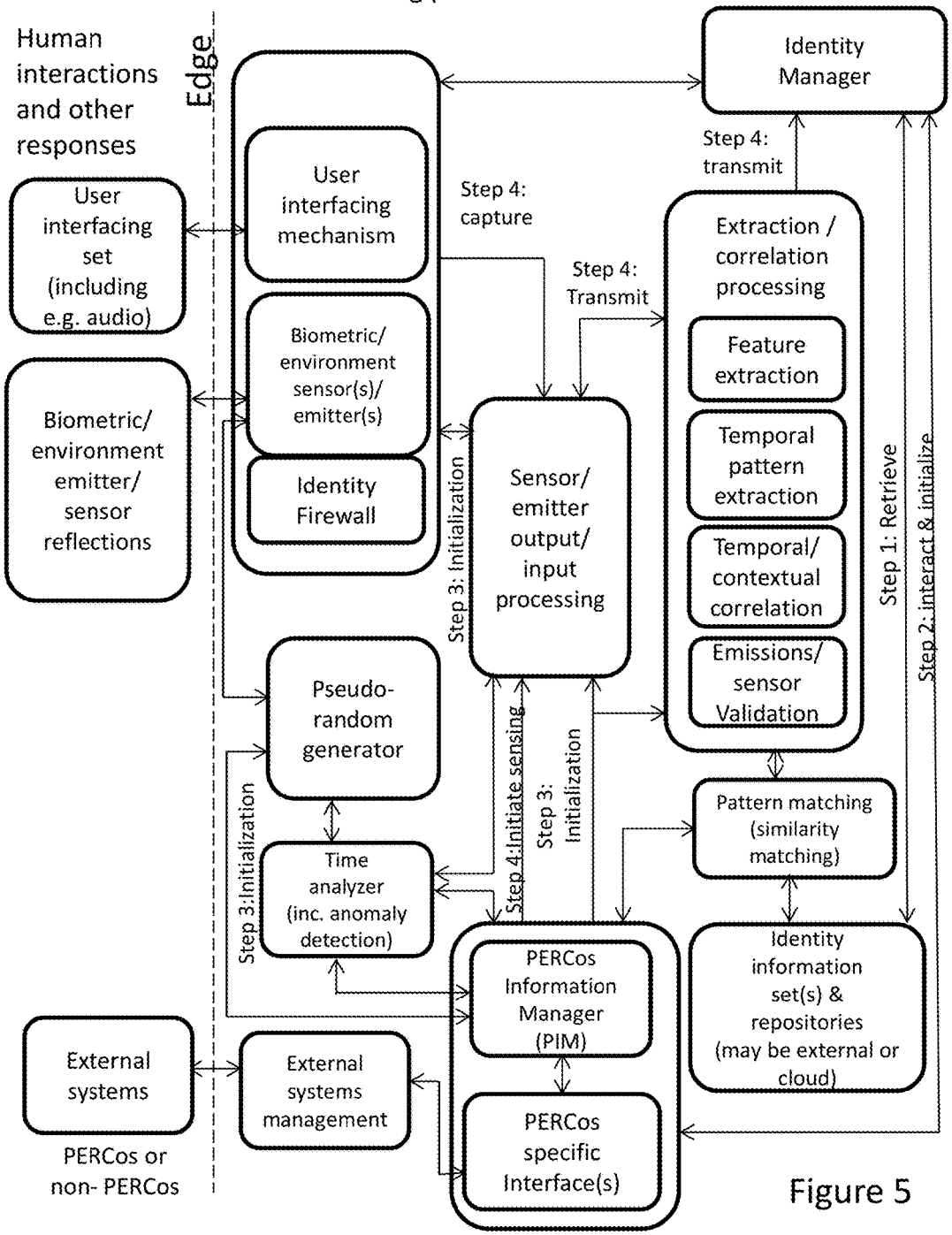
FIG. 5 is a non-limiting illustrative example of existential and/or assiduous authentication involving pseudo-random emissions sets.

FIG. 5 is a non-limiting illustrative example of existential and/or assiduous authentication involving pseudo-random emissions sets.

In some circumstances, the identity manager instance may decide that the biometric and/or contextual information set provided by the individual, and/or otherwise observed, is not sufficient. In such circumstances, as shown in FIG. 5, the identity manager instance can initiate a challenge and response protocol by retrieving from the repositories the individual's biometric and/or contextual information sets (Step 1) and then interacts with the PIM instance to determine the challenge (Step 2). The PIM instance, in turn, initializes pseudo random generator (to generate unpredictable, randomly generated emission instruction set), sensor and emission processing, extraction/correlation processing, time analyzer, pattern matching processing (Step 3). Sensor and emitter processing, in turn, instructs the emitter set to paint the individual and at least a portion set of the individual's computing arrangement environments and the sensor set to subsequently capture the reflection and/or responses of the individual and/or individual's environment, which is then processed and matched against the stored biometric and/or contextual information set and transmitted to the identity manager instance (Step 4).

The combination of biometric feature extraction and liveness detection supported by an accurate time base, such as that provided by one or more secure clocks, may in various instances make it more difficult for disrupters to subvert reliability and/or integrity of identities. A particular liveness determination may, for example, comprise capturing and analyzing changes to certain facial features in response to visible light exposure from an emitter, where emitter illumination intensity alternates between two levels with level durations determined by values created by a pseudo random generator. In some embodiments, such changes may result in corresponding (approximately) time synchronous changes in the size of the user's pupil which may be easily evaluated by biometric authentication techniques (and, in some instances, by using timing anomaly analysis), but nearly impossible to replicate by an imposter using a video representation of the user. In fact, the changes in illumination could be subtle enough such that the imposter may not even be aware that liveness detection is taking place.

In some embodiments, users, and Stakeholders, may establish, and/or otherwise specify, associated with a Participant identity set, that such Participant identity set is provided with an authority to act on behalf, at least in some manner for some activity set, for such authorizing Participant and/or like party set, where such authorized set has, at least, for example, under certain specified conditions, such authorized authority. Under such circumstances, such user and/or Stakeholder identity related information can be associated with one or more Participant identities such that such Participant identities include appropriate authorization information enabling such as applicable users and Stakeholders to fulfill, for example, certain target contextual purpose sets, and/or otherwise, including, for example, delegating at least a portion of such authority to one or more other parties. For example, suppose a Stakeholder agent is a division manager of Company Z, and is responsible for publishing software packages. The division manager may bind himself to a Formal resource instance by registering and publishing a Participant identity that satisfies such conditions as necessary to provide such Participant resource with sufficient authority for the division manager to delegate publishing to another Stakeholder employee or to a secure computing arrangement to perform software publishing for such division for such company.

In some embodiments, differing authentication methods may provide varying degrees of security, reliability, trustworthiness, and/or the like, and hence, may be assessed as having sufficient rigor for a user to authenticate a Participant identity so as to acquire different authorization privileges, and/or the like. In instances where substantial sums of money may be at risk—for example, when an individual wishes to transfer a large sum of money from one bank, $B_1$, to another bank, $B_2$—the individual may need to be authenticated using an assiduous method that provides a very high degree of security and reliability, such as, for example, authentication based at least in part on assiduously generated multimodal biometric information sets.

In some embodiments, authentication of individuals using multimodal biometrics may provide a higher degree of security and reliability than using a single modal biometric. In such authentication processing, individuals are observed using multiple sensors to capture multimodal biometric characteristics and corresponding biometric information sets are fused and/or otherwise integrated and/or evaluated using a common time base, so as to extract time correlated patterns among various modal features. Non-limiting examples of such types of embodiments include:

- Recognition of speech phonemes in voice and corresponding lip movements
- Speech phoneme recognition, lip movement, and facial expression analysis
- And/or the like For example, authentication processes that use multimodal biometrics based on captured video and voice information sets may correlate facial expressions with speech and compare dynamics across said information sets against previously registered templates that correlate speech phonemes with facial expressions for a given individual.

Other biometric functions that may be correlated, include, for example, breath analysis, auditory techniques for evaluation of cardiovascular function, other cardio information (for example, data derived from audio, video, pressure, and/or other sensors), various other sensing of vein patterns, sub skin pattern detection and the like, all of which may, further, be associated with a time base so that time based anomaly detection methods may be employed.

In some embodiments, security and/or reliability of authentication may be enhanced by tracking one or more biometric features over time. For example, image analysis of facial expression characteristics may be carried out continually (or continuously) over a period of time via video sequence acquisition. Such multiple sensing event based authentication methods insures that an individual's Participant identity is not hijacked during that time, through, for example, evaluation of the sensing event sequence for continuity and/or "normal" patterns of expression and/or behavior and/or the like. Such continual/continuous monitoring protocols in many instances may substantially limit opportunities for a disrupter to intercede, undetected, into an individual's initially legitimate operating session.

Individuals may also have rhythms when interacting with their computing environment, such as, for example, keyboard typing patterns (such as, for example, rhythm, speed, and/or the like), speech characteristics (such as, for example, timbre, intonation, and other speech phoneme) pen/finger movements as they move about computer screens (such as, for example, stroke, pressure, shape, and/or the like). These characteristics may include one or more timing-related computational information sets, such as, for example, representing frame rates, network timings, local and/or remote clocks and/or other timing-related computer domain information.

Historically, biometric techniques support capturing, analyzing and/or extracting representations of one or more anatomical, physiological, and/or behavioral characteristics, singly or in combination, in support of registration, authentication, and/or in otherwise acquiring identity information for an individual and/or group of people. Biometric techniques may provide support, for example, for individualized access control to environments, services, content, and/or the like, and/or otherwise identifying individuals and/or sets of people who have been monitored by, or initiated, biometric testing procedures. Generally speaking, different techniques provide varying degrees of integrity, rigor, security and/or reliability, qualities that may depend on the conditions of the environment in which a biometric measurement is made, that is, different biometric techniques may have differing degrees of suitability for differing circumstance sets.

In some embodiments, liveness detection techniques may deter and/or otherwise impede imposters from masquerading as legitimate, for example, other specific, human users and Stakeholders, by inserting forgeries of physical and/or behavioral biometric characteristics into a biometric information determination (capturing and extracting), authentication, and/or related event management and/or communication process set.

In some embodiments, liveness detection tests may expose a person undergoing authentication to dynamically, such as pseudo-randomly, set time-varying patterns of external challenges, and/or exposures to emitter emissions, to elicit corresponding time-varying changes in one or more of the person's biometric corresponding sensor received information sets. Such liveness detection tests may or may not require conscious response. In some embodiments, such pseudo-random pattern and/or emitter signal set may employ a shared secret—which may be uniquely shared by specific user sensor and/or emitter sets and may be protected within an Awareness Manager or Identity Firewall hardened environment—with one or more administrative and/or cloud services, enabling secure instructions and/or updates to be transmitted to such emitter set and enabling at least one of such service set to uniquely identify the specific, dynamically selected pseudo-random emitter parameters as may be, for example, encrypted and securely bound with its associated sensor including information set, and where, for example, such pseudo-random selection and management emitter processes may be, at least in part, conditioned by one or more services that support, for example, one or more of the following:

- selecting one or more specific emitters,
- specifying signal strength sets which may be situationally relevant as to, for example, user computing arrangement physical environment considerations for any given such biometric signal acquisition process set,
- security rigor level, power consumption and/or other efficiency considerations,
- establishing the duration and/or periodicity and/or random sequence of emitting process sets,
- and/or the like.

In some circumstances, it may be desirable to perform liveness detection testing either transparently to a user set, or in as unobtrusive and/or natural manner as possible, such that the subjects of liveness detection tests may not be aware or fully aware that the tests are taking place and/or may not need to consciously cooperate with at least one or more portions of such testing.

In some embodiments, as with the foregoing, a liveness detection processing element may receive a control specification set from an authorized manager and/or at least in part managing service (such as, for example, an identity manager cloud service) expressing one or more parameters and/or conditions for performing a given liveness detection test set. For example, suppose an individual, $I_1$, is the subject of a liveness detection test. A control specification set may specify to an emitter set located, for example, in a PERCos Awareness Manager, to change the illumination emitted towards (and/or otherwise in the environment of) $I_1$ to cause measurable changes in his pupil diameter, iris characteristics, and/or other facial properties. Such lighting changes may evoke changes that can then be evaluated as to their consistency with known, related assiduously acquired $I_1$ biometric facially related information, for example, evaluating consistency with $I_1$'s known response pattern information. This form of liveness test, one that is supported by a "challenge" (in this case, the illumination pattern set) may be very difficult to impossible for an imposter/malicious party to predict and/or replicate, particularly when the timing and/or extent of, for example, illumination, conditions are dynamically determined in an essentially unpredictable fashion by, for example, a pseudo random generator.

Further, such liveness tests may offer situationally sufficient assiduousness in defining and/or testing biometric identity attribute sets, particularly when combined with PERCos timing anomaly analysis and secure, and in some cases hardened, components and/or devices such as Identity Firewalls. Awareness Managers. and/or other hardware and/or software based methods for supporting acquisition, processing, and/or communication of identity related information sets.

In some PERCos embodiments, a combination of one or more of liveness detection approaches may be used in support of assiduous, at least in part biometrics based, registration and/or authentication of individuals. A non-limiting set of example approaches includes:

- Instructing an individual to read a set of words that are dynamically selected from a data base, a subset of which may have been spoken previously by the tested individual and stored by the testing authority, providing means to capture and analyze voice timbre, intonation, and/or other speech phoneme patterns.
- Using a user set computing arrangement display set and employing content display positioning and/or other content composition arrangements (based, for example, on content location, lighting and/or contrast intensity, color use, and/or the like) so as to induce reflection and/or other emission interaction information indicative of true, real-time response to an emitter output set, such as eye location and other responses, such as retina sizing and change dynamics, color reflection patterns from human facial features, and/or the like.
- Using techniques that establish 3D physical presence of an individual, such as 3D scanning and/or video protocols and/or 2D image acquisition over time, with a calculation of a reliable, corresponding 3D image pattern set, and testing movement in time of such 2D and/or 3D sets for dynamic sequence biometric liveness integrity, where such testing may assess, for example, progressive unfolding of a test subject's facial changes and analyzing for its correspondence to normal, and/or such individual's registered, biometric across-time facial change attributes, including, for example, testing for timing anomalies indicating attempts to insert misrepresentation information.
- Using 2D video acquisition, particularly in combination with secure data transmission, and/or challenge/response protocols.
- Assessing gait characteristics using, for example, gyroscopic and/or accelerometer sensors on a mobile device.
- Fingerprint and/or wrist surface (e.g., as may be acquired by wearing a wrist band set) and/or the like detection that includes measurements "local" to detecting arrangement including, for example, body surface temperature, heart and/or blood flow activity (e.g., pulse and/or blood flow dynamics/distribution characteristics indicative of distinctive to unique specific human identifying information), other cardiovascular information sets such as distinctive and/or unique vascular patterns, and/or the like.
- Using sensing systems that recognize general human presence, such as those that make use of thermography and NIR (near infrared) radiation, in some embodiments in support of biometric tests capable of assessing properties indicative of specific individuals.
- And/or the like.

In general, subversion of liveness tests by external attack may be at least in part impeded through secure data transmission protocols and/or by secure sensor environments, such as provided by Awareness Manager and/or the like components and/or appliances, that in some embodiments may cryptographically sign data streams produced by an authentic sensor set and/or emitter set. Attempts to subvert liveness tests locally by an individual who has direct physical access to the normal testing environment may present at least in part other challenges. Such local subversion attempts, for example, may be, in some embodiments, unimpeded by secure data transmission or by secure sensing environments and/or protocols, but may be, for example, disrupted or prevented by challenge/response protocols, multi-modal biometric acquisition and/or authentication, biometrically produced, situationally specific, across time sensor information timing anomaly analysis, and/or identity related component and/or device and/or appliance physical hardening methods.

In some embodiments, one or more features of a human set's tangible presentation, through activity, tangible physical characteristics, behavioral characteristics, response to stimuli (evident and/or transparent), and/or environmental conditions (e.g., the quality of noise in a given user computing arrangement's room) that occur(s) over one or more periods of time, may be captured and analyzed to extract patterns, and examined for anomalies, that, can be employed in authentication, reality integrity analysis, and/or the like processes. In some circumstances, such PERCos capabilities can significantly contribute to establishing existential biometric authentication, where, in combination with other PERCos capabilities, a user and/or Stakeholder set can have a very high level of confidence, after the performance of timing anomaly authentication procedures, in the authentic representations of other parties, not only for Participant and/or the like representations, but for all forms of resources which are existentially biometrically vouched for by, for example, their publishing human Stakeholder (including, for example. Stakeholder agent) set, and/or the like.

Time-based testing, in some embodiments, may involve capturing and analyzing activities/behaviors and, in some embodiments, matching them against previously established one or more time-based identity reference sets. In some instances, situationally specific contexts may require various types of time-based tests, including those that, depending on embodiments, and/or circumstances (including, for example, specification requirements), may or may not involve liveness detection.

In some embodiments, timing anomaly detection may support liveness detection by assiduously observing a user set and/or other party set in the vicinity of at least a portion of such user set computing arrangement, across one or more time intervals, in "real time" to extract relevant biometric and/or contextual features and patterns. Such information may then be compared, including for example, similarity matched, against features and/or patterns that have been previously established and/or calculated (including, for example, contemporaneously) for such same user set, and/or for "normal" behavior for a person and/or at least a portion of such user set, and/or for tangibly and/or behaviorally similar persons as represented by feature, feature transition over time, and/or other pattern information. Such information may further include employing operating session patterns to detect one or more variations in features that differ from normal and/or expected results by a degree that exceeds, for example, some specified parameter set, such as, a threshold set, deemed to be indicative of the possibility or determination that said results represent inauthentic, spoofed, or otherwise misrepresented biometric information.

Feature and pattern sets may, at least in part, for example, be determined by experts, by one or more algorithms (which may include, for example, estimation of network or other communication variances, for example using packet inspection or other techniques) image, audio and/or other biometric sensor input evaluations and/or any combination of the foregoing.

For example, suppose an interloper, $ilp_1$, tries to substitute a pre-recorded video segment of a previously authenticated person, $psn_1$, to transfer funds from $psn_1$'s bank account to $ilp_1$'s bank account, or students taking an online closed-book examination try to subvert their own biometric video streams to cover inappropriate behavior, such as looking at reference materials for answers. Such disrupters (e.g., $ilp_1$ and students) would have to interject their content seamlessly, which would require that they were able to ensure that their recorded video, and any other sensor information (which for example may be transmitted in an encrypted form as part of that stream and/or through a further communications means) matched live video feed, and any associated information sets, at the point of insertion and thereafter. Doing this in the time available, without creating a detectable (by either humans and/or machines) discrepancy is extremely challenging and likely not possible, at least given current technology knowledge.

In some embodiments, temporal anomaly detection services may be supported, in part, by a trusted clock that appends cryptographically signed timestamps to sensor data. Such timestamps may enable an authentication process to detect potential inconsistencies, including time sequence delays presented as timing anomalies in a sequence "flow" of video information events. For example, suppose that a biometric liveness testing procedure uses a sensor to capture a tested individual's movement, such as lifting the individual's hand, over a period of time. An interloper attempting to insert inauthentic information in place of true sensor data must generate and insert into a data stream the individual's movement in a temporally consistent manner that doesn't create anomalies in the sequence of time stamps.

Figure 6:
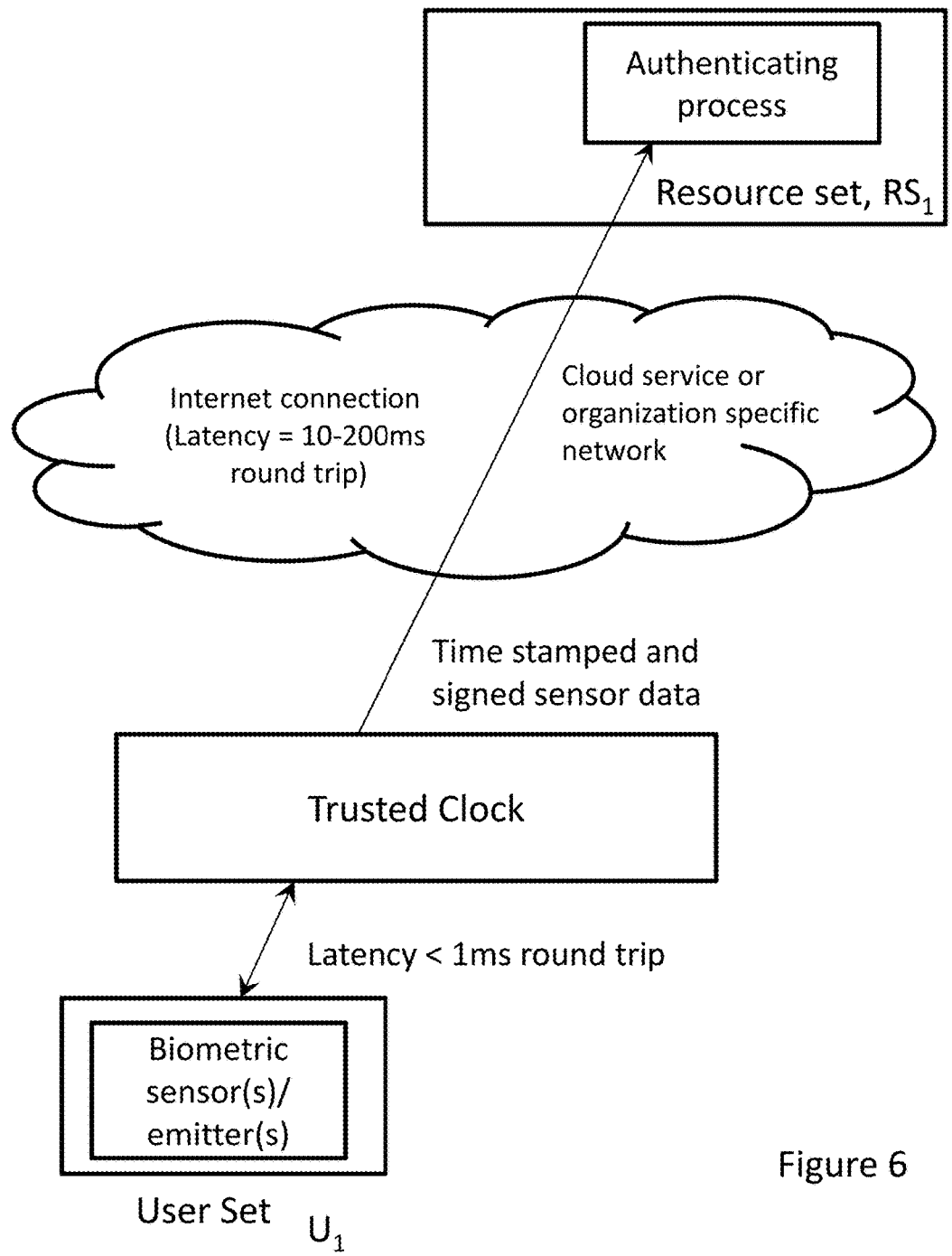
FIG. 6 is a non-limiting illustrative example of a trusted clock supporting existential authentication.

FIG. 6 is a non-limiting illustrative example of a trusted clock supporting existential authentication.

For example, as shown in FIG. 6, suppose a user. $U_1$, interacts with a remote resource set, $RS_1$, over a slow internet connection and that typical latencies for the connection between the two parties are between 40 and 80 milliseconds. If $RS_1$ includes a process that involves real-time authentication of $U_1$, such latency would result in significant and varying delays between the times when biometric sensor data is generated by $U_1$'s computing arrangement and when it is received by a remote authenticating process. This uncertainty of approximately 40 milliseconds in the receipt of sensor data may, in some instances, be sufficient imprecision for an interloper to avoid detection when inserting false content into an authentication data stream process. However, use of a trusted clock in, for example, a hardened bus component or computing arrangement attached component set or appliance in the form of an Identity Firewall, or an Awareness Manager with Identity Firewall and/or in a CPFF firewall, that is in close proximity to the sensors (e.g., less than 1 millisecond round-trip latency) may allow sequential elements in a data stream to be timestamped with substantially smaller imprecisions, thereby greatly enhancing the capabilities of authentication processes for detecting potential timing anomalies.

Figure 7:
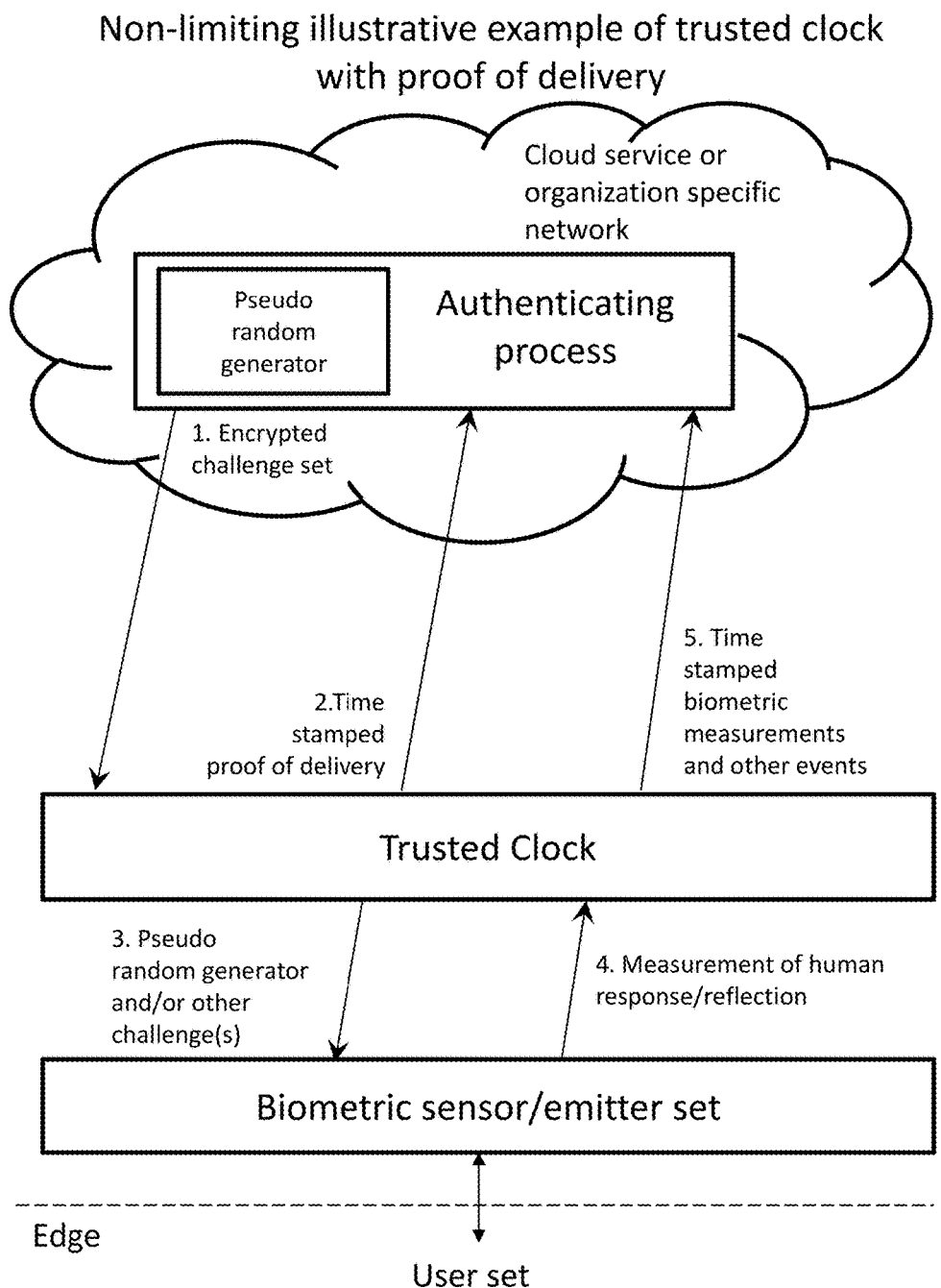
FIG. 7 is a non-limiting illustrative example of trusted clock with proof of delivery.

FIG. 7 is a non-limiting illustrative example of trusted clock with proof of delivery.

To further support efforts to counter attacks from interlopers, some embodiments may make use of trusted clocks that are able to: i) decrypt encrypted challenges issued from authenticating processes: and/or ii) generate cryptographically signed proof of delivery of such challenges. For example, as shown in FIG. 7, such proof of delivery may significantly reduce the amount of time that an attacker has to respond to an authentication challenge. FIG. 7 shows one non-limiting embodiment of an authentication challenge and response that proceeds through the following steps:

1. An authenticating process, for example, in the cloud, sends an encrypted authentication challenge, such as, for example, an instruction to emitters in an Awareness Manager (and/or other identity related system protecting one or more biometric sensor/emitter sets), where non-limiting examples of instructions may include:
    a. Instructions and/or directives to be understood by, and expected to draw a response from, a user, such as, for example, written instructions on an LED display, an audio command output through a speaker, and/or the like. In some embodiments, such visual and/or audio instructions may be selected from an extensive database, and/or the like, using pseudo random and/or other essentially unpredictable methodologies.
    b. Instructions to "paint" the user environment with, for example, electromagnetic radiation and/or sonic emissions, in a manner that, in some embodiments, may be transparent to users. Such emissions may be intended to elicit sensor detectable one or more, in many instances user specific, human physical reactions (e.g., dynamics and extent of iris size changes) and/or to assist in acquiring images of a user, for example, over a time period in which, for example, lighting conditions may be varied in an essentially unpredictable manner.

Such encrypted challenge may be produced by a cryptographically secure pseudo random generator and/or may be otherwise essentially unknowable to a potentially disruptive human and/or process before its conversion to plaintext, and as a consequence, an attacker may not be able to determine the nature of the challenge during a time period that may be available for effectively spoofing an authentication event.
2. On receipt of an encrypted authentication challenge, the trusted clock sends a time-stamped proof of delivery message back to the authenticating process. This timestamp precedes the first opportunity that the attacker has, as described in the next step, to see the plaintext contents of the encrypted challenge.
3. The trusted clock forwards the authentication challenge as a plaintext, encrypted, and/or mixed set message to the user's computing arrangement and such challenge may be instantiated by an Awareness Manager and/or the like within and/or in proximity to such computing arrangement. Such challenge may be enacted by one or more emitter sets which may, for example,
    a. comprise an HMI device set such as, for example, a speaker and/or an LED that delivers a message, such as, for example, "raise your right hand", to the user, and/or that directs the user to communicate a second factor, for example biometric, identity associated password, and/or the like.
    b. trigger emission of electromagnetic radiation and/or ultra-sound to paint a user environment, in a pattern that may have spatial and/or temporal components.
    c. And/or the like If a displayed to user message is provided, then this may, in some instances, be the first point where such a challenge can be interpreted as plaintext, and therefore the first point at which a potential interloper might gain sufficient knowledge to generate false biometric information sets. In such processes, malicious parties and/or processes may have no possible or at least practical means to gain knowledge of biometric and/or other challenges with sufficient time to effectively spoof such authentication, and/or the like identity related, processes unless such interloper set has gained physical access to the user computing arrangement environment and/or has at least in part control of sensor devices not protected by an Awareness Manager and/or the like.

4. The sensors measure the human and/or physical response to the user interpretable challenge and/or the emitted signal set one or more reflection and/or other interaction based information sets and send corresponding response information back to the trusted clock which adds appropriate one or more timestamps and signatures to, for example, the one or more sensor information sets.

5. The trusted clock forwards the securely time-stamped, signed biometric information set to the authenticating process as, for example, an encrypted, bound together, virtually, and/or in the same information package set, information set of time-date one or more stamps, emitter composition information (e.g., pattern information and/or the like, such as "employed ultrasound Pattern XYZ156 for 5 seconds after time stamp 0 until time stamp 20, and Pattern BTU198 for 5 seconds after time stamp 20 until time stamp 40"; or "action taken, initiate ultrasound, employed pseudo-randomly generated sound wave pattern set with x to y then y to x continuously varying amplitude at time 1 and time 2") and/or sensor information sets. The authenticating process may then correlate and/or otherwise analyze the combination of the time-stamped sensor/emitter information sets to check, for example that:

a. Sensor detected electromagnetic and/or sonic radiation indicative of user set and/or physical environment elements is consistent, and based on, for example, physical laws, with the radiation that emitters were instructed to generate. For example, electromagnetic and/or ultra-sound emissions may be expected to be reflected off a human face in a way that is consistent with results obtained from facial recognition processing.

b. Human responses to emissions are normal and/or as expected. For example, if a user set is exposed to a transparent-to-user change in lighting, authentication processing may examine the sensor information set to detect an expected response in the human user's pupils, and one that may be consistent with known (e.g., those obtained during a registration process) specific user set responses.

c. Human responses to HMI directives are as expected. For example, if a human gets a directive to raise his or her right hand, the authenticating process may analyze the response to detect the appropriate human response.

In some embodiments, such analysis processes may be based, at least in part, on determinations of temporal accuracy and/or consistency. For example, emitters may have been instructed to change the frequency of emitted radiation in a particular temporal pattern and the authenticating process may then check that the corresponding sensor set have detected the same (or otherwise correlating) temporal pattern in the reflected emissions and that this pattern has consistent time-stamps with no timing anomalies.

In some embodiments and circumstances, for example if a user computing arrangement display arrangement has been compromised, or if a sensor array is physically in the user computing arrangement environment and oriented to effectively acquire needed information, an attacker may have a chance to observe a challenge after a trusted clock has sent, for example, to a remote cloud or administrative identity service arrangement, a time-stamped proof of delivery, and such related cryptographic capabilities have decrypted an associated challenge. But the attacker then must generate deceptive one or more false responses in the time that it would take for the challenge to be delivered to the user and for the sensors to measure the response of the user. Moreover, the authenticating process has access to accurate timestamps of the times when the challenge was delivered and when the user's responses occurred, and, if a time stamp processing arrangement is sufficiently secure, an attacker will not be able to produce corresponding time stamps that spoof such relevant biometric arrangement.

In some embodiments, monitoring for timing anomalies may be undertaken, for example, by a PERCos monitoring service instance, which may then, for example, on detection of an event, pattern or other information that varies sufficiently from the specifications being operated upon by that monitoring service, generate an event, exception and/or other message to one or more other resources, for example to a PERCos exception handling instance. This process may result in a user being warned as to the event/exception, and/or one or more other resources being invoked to, for example, undertake further evaluations and/or take one or more actions, such as suspending the current operating session.

In some embodiments, a variety of identity-related testing methodologies and/or techniques may supplement biometric techniques to provide enhanced assiduous authentication in accordance with situationally specific context. Such methodologies and techniques may be used to, for example:

Evaluate and/or validate the provenance of identity information sets (including biometric and contextual information sets) and algorithms used to perform authentication. For example, suppose an individual such as a user or Stakeholder registers the individual's biometric Participant identity with an identity manager. $IM_1$, using an emitter/sensor set, $SPK_1$. Identity-related testing methodologies may enable assessment of the reliability of the individual's identity information set by assessing $IM_1$'s identity attributes such as associated Repute and/or the like Creds. EFs, and/or FFs, as well as attribute filtered Cred and Aggregate Creds asserter contributing parties (for example for contributing to creating, or filtering, to find specification matching existing Aggregate Creds) in accordance with user set EF and/or FF attribute priorities expressing $SPK_1$'s reliability (e.g., consistency, trustworthiness, and/or the like), reliability of the communications path between $SPK_1$ and $IM_1$, reliability of system components, such as CPFF and/or identity manager arrangements, and/or the like.

Acquire environment related pattern information, for example, including analyzing consistency of environment and/or activity related information sets, such as, for example, information sets provided by motion sensors in a phone held by a user, and/or background information sets in a video clip of a user, such as, people, animals and/or other objects in the background. The foregoing may include, for example, acquiring pattern information related to a portable user computing arrangement's motion movement patterns, personal location route movement patterns (routes walked and/or other physical movement, for example at work and/or at home) including vehicular travel routes, and/or the like, altitude, temperature, humidity, other weather pattern information which may be acquired transparently, as background and/or otherwise incognizant to user sets. In some instances, analysis may involve determination of consistent motion of objects (e.g., a moving car) or, for example, changes in object brightness when subject to, for example, dynamically set changes in illumination.

In some embodiments, a user's computing arrangement may be instructed by an authentication process to acquire environment information by producing sounds and/or electromagnetic radiation that are dynamically set, for example, by pseudo-random emitter instruction generator, and that can be measured by the user's computing arrangement sensor microphone, time stamped, and relayed back to the authentication process, and sound reflections, for example, in a room or a vehicle or other environments that have reasonably consistent acoustic signatures, can be stored and periodically (or continuously) monitored by using sound emissions from a controlled emitter to identify differences identified between, for example, current tested sound reflection pattern sets and stored, corresponding to such location and/or other environment reference sound patterns. User set computing arrangement sensor acquired reflected sound or electromagnetic radiation, when compared to stored, signature for such environment reflection sets, may present anomaly sets indicating or demonstrating malicious spoofing. Such attempts, for example, at malware and/or signal (reflected) substitution, may demonstrate environment changes compared to expected environment characteristics, as represented by registered, stored environment attribute information sets. Such changes from expected reflected information sets may indicate that corresponding user computing arrangements are not located at their respective claimed location and/or are not associated with a claimed user set. Further, timing anomalies resulting from, for example, failure to, in a timely manner, provide appropriate sound (and/or electromagnetic radiation) reflection information to appropriate user computing arrangement subsystems, such as an Identity Firewall and/or to a remote identity administrative and/or cloud services, may demonstrate an attempt to employ unauthentic user and/or resource sets. When, for example, a transparent, pseudo-randomly generated signal set (such as electromagnetic or inaudible sound wave) is projected to a computing arrangement user set, any attempts, for example, to build an information set that would appear to be, for example, a 3D video representation of an authorized party with the appropriate transparent reflection information sets superimposed as reflected sound and/or such radiation, would take material time from a video sequence standpoint and cause delays in such spoofing activity sufficient to cause an anomaly set indicative of a spoofing attempt.

Validate the presence and/or identify the absence of human habitual characteristics. Humans are normally behaviorally and physiologically at least in part consistent, that is, humans are, by and large, habitual beings. There are many activities that, varying by individual, form patterns of considerable consistency and frequency. Employing and accumulating human set usage patterns and relationships such as employing human motion and route detection techniques to formulate representations of individual and/or group human gait, and using GPS and/or cellular and/or the like positioning technologies (e.g., as may be found in smart phones, watches, computers, game sets, and/or the like) for monitoring and pattern accumulation and pattern relationship analysis and attribute mapping providing map locations (e.g., frequent trips to two different coffee shops, one near work, one near home), movement tempos, specific routes and repeated variations thereon, and/or the like, as behavioral identity attributes, as well as employing spoken (i.e., vocalized) word and phrase patterns accumulated as patterns having varying frequencies and relationships. Such monitoring of user set vocabulary usage, semantic and syntactic usage patterns can employ microphones in many portable, electronic devices (e.g., acquired by using microphones in smart phones, computers, and/or the like) and, as with other behavioral identifying attribute sets described herein, can be monitored and accumulated as marker attribute patterns for human sets. In some embodiments, such sets can be used in any applicable combination as use identifying information sets, along with other identifying information, such as user and/or Stakeholder existential biometric information. In some embodiments, user or Stakeholder set human habitual attributes may be monitored and compared with known habits registered and published as attribute information associated with, and/or included within, Participant information sets.

In some embodiments, identity-related testing methodologies may involve multiple devices and communication channels, which may require successful attackers to compromise multiple devices and/or communication channels in order to falsify identity-related testing, such as testing for registration and/or authentication. For example, biometric authentication of a person based at least in part on video data provided by an internet or otherwise cellular and/or other communication technique set connected camera may be supplemented by an analysis of motion sensor data provided by a phone that the person is holding, where such phone user computing arrangement serves as an independent, second factor authentication channel. In some embodiments, identity-related testing methodologies may enable analysis of video streams for indications of how, where, and when the person's user may have interacted with the phone, that is, patterns of mobility and corresponding usage, such as specific calls and patterns extracted therefrom, and validate that this information is consistent with information provided by the sensors in the phone during some current time period. In some instances, if the person is not holding a phone, such checks may be initiated by challenging the person to pick up the phone. It may be that the camera capturing video input is on a different device than the phone and may use a different communication channel. An attacker attempting to falsify sensor data may have to adapt data from one sensor to match with data being provided from another sensor, compromise both devices, and/or compromise communication channels—that is, redundant, independent cameras and communication channels may be used simultaneously to validate, and mutually confirm, that information received sufficiently matches information stored, for example, at a cloud identity service in the form of, for example, a Participant registered and published information set.

In some embodiments, identity-related testing methodologies may include *Byzantine* fault tolerance algorithms to provide correct results even when one or more identity testing techniques (such as independent authentication processes) fail in isolation. For example, authentication processing may use four different assiduous techniques to compensate for a single failure, use seven assiduous techniques to compensate for two failures, and so on. For example, suppose a user, John Doe, a government employee, is working on a highly classified project. For Mr. Doe to enter into a sensitive compartmentalized information facility after hours, the facility's master Awareness Manager (AM) may employ four subordinate AM sets, where each AM set has its own sensor sets comprising one or more of a fingerprint scanner, microphone to capture voice patterns, iris scanner, and/or video camera to capture gait and facial movements Each AM set has its own authentication process set that uses differing algorithms to process its sensor captured information sets (including, for example, algorithms for performing multimodal analysis) and compare them using an associated repository that contains the reference information set. In this example, even if one subordinate AM set is compromised or fails for whatever reason, the master AM can use Byzantine fault tolerance algorithms to correctly and assiduously authenticate Mr. Doe.

PERCos resource and/or resource portions may be supported in some embodiments by some or all of differing resource interface and/or descriptive information attribute format and/or components. PERCos resources may be provided in the form, for example, of Formal Resources, Implied Resources, Ephemeral Resources, and Compound Resources, where all Resources except Ephemeral Resources have persistent, operatively unique identities (e.g., they should not be ephemeral or intentionally temporary and unreliable as an identity, along with any enforcement of this criteria depending upon the embodiment). PERCos resource portions may inherit the form(s) of their parents. For example, a PERCos resource portion may be of the form, Formal Resource portion, if its parent is a Formal Resource. Resource portion sets, which may be part of the same parent or of differing parents, may be arranged into composite Resource portion sets.

In some embodiments, resource portions may have attributes comparable, at least in part, to published PERCos resources such as Formal resources. For example, an author of a chapter of a reference book can be registered as an author Stakeholder for a resource portion of such reference book.

In some embodiments, resource portions may be published as parts of a resource set. If published in their own right as resources as declared by specification, they become resources in their own right so long as such publishing satisfies any minimum requirements to qualify as a resource. In some embodiments, resources may be published as compound resource sets comprising a master/senior resource set, and constituent resources that are identified both as component resources and resources in their own right. In some embodiments, if a resource portion is modified, it becomes a new resource and may have provenance information regarding its modification, though if published separately from its parent, it may share identifier information with its parent source and may, if having been modified, share such identifier information, for example, in the form of having an, in part, new version number. Such new version number indicates such resource portion is a revised version of its previous form, as a portion of its original resource set. If the parent was XYZ book, and the portion was Chapter 10, and it was modified and separately published, Chapter 10 may now have dates for publishing of the parent and the revised portion, and its identifier might, for example, be XYZ4/2008Chapter10V2-6/2013 where XYZ4/2008 represents the identifier for the parent and the portion Chapter10V-6/2013 represents the revised portion of the parent. In such a case, resource portions may have a provenance information set comprising, for example, in part:

A unique identifier for identifying the specific resource portion.

Reference to parent resource provenance identity information.

Navigation interface for accessing resource portions within their respective parent resource one or more sets.

In some embodiments, identities of resource and resource portion sets may, for example, provide for the following one or more identity related attribute capabilities and/or other considerations:

Root assiduous identity information sets, which may include assiduous biometric identity information sets and associated methods, such as liveness tested, including time anomaly assessed, existential biometrics (e.g., iris, retina, vascular, eye tracking, cardiovascular functions such as circulatory pattern and heart rhythm information, and/or 3D facial movement) representing/describing one or more attributes of one or more Stakeholders associated with a resource set and/or one or more attributes of Stakeholder employee or consultants, agents, and/or the like of a Company X. For example, John Doe is Company X's Vice President Resource Authenticity, and may act as an agent for Company X through the use of his Participant biometric and other identity information employed in biometric authentication processes for matching against biometric evaluation of his live participation in Company X Formal Resource publishing instances. Mr. Doe can certify and register Company X PERCos published Formal Resource instances. John Doe has further biometrically certified employee John Smith's registered, published Participant identification set as conveying that John Smith may also certify publications for Company X, but limited to Department Y publications.

For example, suppose a mathematics professor at MIT authors a book on group theory. The book's assiduous information set attribute information may contain and/or reference one or more attribute sets of the professor. Such attribute sets of the professor may be resource sets and as such, may have one or more attribute sets, such as, Cred and/or Effective Fact attribute sets, containing and/or referencing one or more Creds (published by other mathematics professors), asserting and/or otherwise establishing or indicating the professor's expertise in group theory. In some embodiments, attribute sets, $AS_1$, such as, for example, Cred attribute sets, may have one or more Cred attributes (i.e., Cred on Cred) asserting, for example, $AS_1$'s Quality to Purpose (i.e., Cred assertions asserting Quality to Purpose of other professors' opinion of the MIT professor in relationship to group theory expertise).

This close binding of resource sets with their identifiers and other identity attributes of such Stakeholders supports users' and user systems' abilities to effectively evaluate and/or validate, including explore from various perspectives and attribute combinations and see aggregations of such Quality to Purpose assessments as regards a potentially boundless resource opportunities cosmos. This cosmos may be, for example, populated by purpose class, domain, user and/or class associated, and/or dynamically specified resource sets, in a manner that can greatly reduce the access obstacles, including obscurities and risks, that are currently associated with interacting with resource sets of unknown or previously unknown existence, provenance, and/or usage consequence implications, including Quality to Purpose considerations, by enabling users and user systems to reliably use novel standardized and interoperable approximation, contextual purpose, and resource and resource attribute capabilities and capability combinations, to identify, evaluate, provision, and/or operationally manage internet supplied resource sets.

In some embodiments, assiduous biometric information sets of one or more human Stakeholders may be bound directly together with secure metrics, such as cryptographic hash functions, where such binding, for example, may involve plural arrangements of hashes, such as, for example, Merkle tree implementations, and may encompass, for example, cryptographically protected information that represents existential liveness tested biometric Participant template information representing one or more Stakeholders, and, for example, further comprising one or more digital hashes representing at least one or more portions of a resource set's constituent elements. Such techniques may be used, for example, with a PERCos Formal or Informal Resource set, or the like (where, for example. Stakeholder certification may be declared, for example, with Informal Resource sets, where such Stakeholder and such inferred certification, such as an inferred Stakeholder publisher certification based at least in part on the Stakeholder's publisher related information, may further employ publisher reputation information).

In some embodiments, for example, "hashed" resource identity attribute constituent elements may include Formal or Informal Resource and/or the like subject attribute information comprising, for example, a hash of a software program that is the subject of such resource, as well as a hash of at least a portion, respectively, of the resource's purpose class information, metadata, certain associated Repute information sets, including, for example, Stakeholder Effective Fact information, and/or the like, and wherein such hash information set can bind constituent component information together (directly and/or virtually, e.g., by pointers) and both reliably identify and operationally secure/ensure any such resource. As a result, in combination, for example, with appropriate resource validating cloud service(s) and PERCos Identity Firewall capabilities, the resource and/or its constituent component information can be reliably authenticated, in part, for example, as a result of use of PERCos assiduous existential "liveness" biometric and time anomaly tested identity information being hashed and bound to other such resource elements secured information. As a result, under many circumstances, a user set can be assured that the resource set being used is reliably the unaltered resource set intended to be used, since the user set is relying on the direct assertion of one or more reputationally respected and/or otherwise considered appropriate authorizing parties as proffered by liveness tested existential biometrics of their respective one or more Stakeholders and/or authorized (which may themselves be existentially certified) agents, and/or sufficient to the purpose multifactor challenge and response and/or the like validation techniques.

Initial information set provided by one or more direct Stakeholders at the time of their publication, which may include, for example:

i) one or more descriptive CPEs and/or the like purpose specification sets, which may, for example, include contextual purpose classes and/or other purpose neighborhoods, contextually relevant other specification sets such as CDSs, Foundations, Frameworks, and other Constructs and/or other specification information, including, for example. Stakeholder Repute resource sets expressing, in part, one or more assertions as to a resource set's Quality to Purpose, for example, to one or more contextual purpose class specifications, Repute Facets (for example, quality to one or more CPEs as to reliability, efficiency, complexity, cost, and/or the like), and/or the like;

ii) descriptions of resource characteristic sets, which in some embodiments may, at least in part, include Master Dimension and/or auxiliary specification information sets, metadata, and/or the like;

iii) one or more control specifications, such as, for example, policy sets and/or rule sets for resource set usage;

iv) one or more attributes referring to and/or containing Stakeholder information set and/or other provenance information, such as, for example, the publishers, creators, distributors, owners/users, modifiers, and/or the like of resource sets;

v) relevant Reputes of Stakeholders, reflecting, for example, one or more expressions of the quality to specified purpose of any one or more provenance Stakeholders. Such information may include, for example, other party Cred and/or Aggregate Cred Quality to Purpose assertions regarding Stakeholder sets. Effective Facts. Faith Facts, and/or the like, including, for example, Creds asserting Quality to Purpose metrics relevant to Stakeholders' competency in producing quality subject matter for a resource contextual purpose class (e.g., a high quality reference resource for a certain contextual purpose class or other, persistently referable, purposeful resource neighborhoods);

vi) and/or the like.

Inferred resource information set, such as, for example:

Information set that may be inferred by being a member of one or more contextual purpose classes and/or other purpose neighborhoods, and/or otherwise being directly inferred from information regarding shared attribute one or more sets, associations with past user sets and/or attributes of any such user sets, and/or past operating performance attributes of any such resource set, such as efficiency, cost of operation, reliability, conflicts with other resources (e.g., compatibility), and/or the like. For example, suppose a resource set is a member of a purpose class $P_1$, which is related to another purpose class. $Q_1$. In some embodiments, the resource set may have an inferred information set comprising for example class attributes of class $Q_1$, class $P_1$, superclasses of class $P_1$, and superclasses of class $Q_1$, which may be employed in generating a contextual purpose neighborhood based at least in part on such attributes where resource "members" are, at least in part, weighted in prioritizing of overall Quality to Purpose by the relative closeness of such class attribute sets similarity matching to a user CPE set or Purpose Statement, which may be further weighted in prioritization by, for example. Repute Creds and/or other prioritization considerations.

Information set that may be inferred from the relationships a resource set, $RS_1$, may have with other resource sets and/or objects during fulfillment of a purpose set, such as, for example, $RS_1$'s any environment sets, other resource and/or resource portion sets that may fulfill, or otherwise contribute to the fulfilling of, a user contextual purpose set, and/or the like. In some embodiments, a resource set may have relationships with other resource sets whose provenances include Stakeholder Participant resource sets that may affect the resource set's Quality to Purpose generally, and/or Quality to Purpose reliability, efficiency, cost-effectiveness, user complexity, and/or the like considerations. In some embodiments, provenance information sets associated with a resource set may represent a dynamic network of identities (which may be existential biometric identity sets, situationally associated identity sets such as including previous owners who used a resource set for a given contextual purpose set, and/or the like), and identity attribute sets of interacting resources and/or resource components, for example, as associated with a given target contextual purpose and/or contextual purpose class and/or other purpose neighborhood.

/or the like.

Repute and/or the like (such as, Creds, EFs, FFs, aggregated Creds, compound Creds, Creds on Creds, regarding resource sets and/or any applicable form of Creds on Stakeholders of resource sets (which may be Participant sets), and/or the like) attributes that may be accumulated and/or aggregated over time in a periodically, to effectively continually, expanding, resource set organized Quality to Purpose attribute information ecosphere. In some embodiments, one or more acknowledged Domain experts for a resource set may evaluate and/or validate a resource set and publish a Repute instance asserting Quality to Purpose, generally, and/or to specific Facet types; users who have used a resource set may also publish their Quality to Purpose perspectives and/or EFs and/or FFs (the latter in accordance with embodiment policies) regarding published as one or more Creds and/or aggregate Creds; and/or the like, creating information ecosphere Creds and Aggregate Creds and Creds on Creds. When such a Repute expression set, $Rep_1$, is incorporated as one or more identity attributes of a resource set, $RS_1$, the direct Stakeholders of $Rep_1$ are considered to be indirect Stakeholders of $RS_1$.

Historical attributes related to resource set usage may, in some embodiments, accumulate over time and reference usage associated contextual purpose classes and/or CPEs and/or the like, Participants and/or other resource sets and/or user sets and/or conditions. For example, consider a resource set, $RS_1$. As users use $RS_1$ to fulfill their respective contextual purpose sets. $RS_1$ may accumulate historical information sets, such as $RS_1$'s Repute Quality to Purpose metrics in fulfilling user purpose sets, relationships $RS_1$ may have with other resource sets (including, for example, Participants), for example, in support of one or more target contextual purpose sets, and/or the like.

One or more resonance algorithms and/or other resonance specification sets that, in some embodiments may, in conjunction with associated resource one or more sets and/or one or more resource sets that may serve as one or more component sets of a resource set, support any such resource set and/or contributing resource set in contributing input regarding optimization of a target contextual purpose specification set so as to contribute to optimized interim one or more result sets and/or user set purpose fulfillment Outcomes.

Information sets regarding storage of resource sets, such as storage locations of resource sets and associated storage schemas, including resource set access operating constraints (e.g., time to retrieve, associated costs, and/or provisioning considerations), interface information, and/or other access considerations, such as access rights for accessing a resource set (and which may, for example, include restrictions associated with storage of the resource set), the protection of storage and/or resource sets and/or portions thereof (such as, for example, a resource and/or portion set may be encrypted and signed), distribution of storage (for example, a resource set may be stored in multiple locations to provide fault tolerance), and/or the like. For example, storage information set may include the usage of one or more cryptographic hash functions to protect one or more attributes of resource sets, one or more specification sets that define policies and/or rules for accessing the stored resource sets and/or parts of thereof, and/or policies for secure communications between user sets and storage sets, and/or the like.

Metadata information specified, and/or inferred and/or otherwise interpreted, so as to produce or declare attributes and/or ephemeral attribute information. For example, consider a CPFF, $CPFF_1$, that specifies operating considerations for, and enables users to, explore fixed income investments. One of $CPFF_1$'s metadata elements describes that $CPFF_1$ specializes in, and covers, exploring convertible bonds for its users where value amounts do not exceed $100,000.00 per transaction. As $CPFF_1$ is used, it may accumulate historical usage pattern information showing preferences associated with $CPFF_1$ based at least in part on the similarity matching of this metadata to user target purpose set activities. One or more attributes may represent such accumulated historical pattern of a resource set's metadata.

And/or the like.

In some embodiments, identity attributes, such as, for example, contextual purpose expression variables, such as purpose class verb and/or category domain types, attributes expressing contextual purpose expression Facet elements and metrics (such as Quality to Purpose, Quality to Reliability, and/or the like) and/or CDS sets, may be standardized and interoperable to support, in part, efficient and effective approximation, identification, evaluation and/or validation, similarity matching, selection, prioritization, management, and/or the like of resource sets in fulfillment of target contextual purpose sets. Other attributes, such as attributes containing and/or referring to free text metadata, may be informal and/or in some embodiments, may be explicitly formalized for standardization and interoperability, including where relevant, for example, being combined with values and/or other metrics as expressions of attribute qualities. In some embodiments, informal attribute sets may over time become formalized (i.e., standardized and interoperable) so that they can be more effective in corresponding to User Classes and supporting human approximation relational thinking, and the expression, for example, of CDSs and the identification of resource sets that may optimally contribute to fulfillment of target contextual purpose sets. For example, suppose a resource set, $RS_2$, a purpose class application that helps users explore fixed income investments, has a metadata identity attribute that states that it specializes in convertible bonds of green energy companies. In some embodiments, identity attributes may be modified over time, including, for example, expansion, reduction, and/or editing of attribute types, metrics, types and expression elements for related metadata, and/or the like, by one or more direct Stakeholders, which may further include information provided by new direct Stakeholders. For example, biometric attributes may change as individuals get older; Stakeholders may modify policy sets and/or rule sets that define access to their resource sets and/or parts thereof, and/or the like. Further, standardization for interoperability standards for resource sets, for example, for contextual purpose classes, may be modified over time, including, for example, expansion, reduction, and/or editing of standardization of resource expression types and elements, where such modifications may be implemented by experts working with one or more standards bodies, including, for example, identity, resource management, and/or purpose expression cloud service providers (for example, utility service providers), and/or by authorities associated with one or more affinity groups where such standardization modifications, including enhancements and specialized, applicable standardizations for respective groups, may be, for example, implemented for its members, group operations, and/or interfacing therewith.

In some embodiments, there may be a diverse range of centralized and/or distributed registration/publishing publication service arrangements, from "large" highly reputable services to "small" boutique services to organizations (such as large Corporation X) to affinity groups (National Association of Y). A large publication service may be willing to publish a wide range, potentially all forms, of resource types, whereas a boutique publication service, $SERV_1$, may specialize in resource sets that fulfill purpose sets in Domains of the $SERV_1$'s focus area(s), while an affinity group and or organization service serves their constituents and perhaps external parties interacting with such organizations and/or their constituents. For example, a small boutique publication service may specialize in publishing resource sets that fulfill purposes related to green energy. In some embodiments, a unifying service arrangement may, for example, establish and/or otherwise support one or more of:

1. interoperability contextual purpose expression standards, for example for Master Dimensions. Facets, and metrics for expressing values associated therewith.
2. purpose classes by, for example, having experts associated with domains related to human knowledge and activity areas define contextual purpose classes and where service arrangement further supports the population of such classes with "member" resource sets.
3. a consistent root unique identifier schema enabling unique reliable, persistent identifiers for each respective resource instance (and may further establish and support a persistent, reliable resource portion identification schema, and allocate or otherwise make available name ranges and/or other sub-domain and/or explicit instance sets of identifiers that it allocates and/or delegates to other parties, such as name/identifier services and/or to organizations, either as a component of, and/or in response to, a publishing service publishing process set, and/or during a registration/publication service arrangement implementation and/or maintenance updating process set.
4. a diverse set of registering/publishing arrangements, which it supports as a unifying service arrangement, performing the functions of an underlying global utility and/or standards body service set for one or more services described above in items 1-3, and supporting plural separate service arrangements providing Stakeholder and/or user sets with choices and competitive service offerings. Such unifying service arrangement may license such service providers to Stakeholder and/or user set organizations.
5. resource information knowledge bases comprising one or more of:
    a. resource information indexes of resource attribute and/or other metadata information, including, for example, contextual purpose expression information;
    b. purpose class, domain category class, persisted neighborhood, user class, environment class, and/or resource class information structures, including, for example, enumerating resource members of the foregoing, relationships among elements such as resource members of the foregoing and/or between the foregoing class instances,
    c. maintenance, operating, and expression capability sets including, for example, associated programming language(s); updating mechanisms (add, delete, modify, combine, inherit and/or the like); information access interfaces, for example, supporting technologies such as faceting, thesaurus, semantic (e.g., semantic search), knowledge graph, and/or the like operations and representations; and associated relational capabilities, for example, in support of relationships between class instances and/or class member instances of such publishing related classes; for example, the foregoing used for user and/or Stakeholder interface arrangements for resource information organization, identification, exploration, evaluation, purpose application formulation, provisioning, management, and/or like capabilities.
6. publishing service arrangements that provide, for example, user contextual purpose specification associated resource subscription, purchase/acquisition, rental, and user set and related affinity group membership rights management related support.
7. storage and/or linkage to storage locations information and interface knowledge bases for PERCos embodiment operative resource stores that correspond to resource information sets (PERCos and/or the like resource sets such as Formal and/or Informal Resource sets).

In some embodiments, different publication services may provide differing sets of services and tools and apply differing publication standards depending on rights, cost-related factors, efficiency, operational overhead, and/or the like. For example, publication services may provide a wide range of capabilities that Stakeholders may use, in accordance with their contextual requirements, such as, for example:

Validation that a resource set complies with one or more relevant publication standards.

Secure binding of root identity information set of resource set with assiduous biometric identity information sets and associated methods, such as, liveness tested existential biometrics of one or more direct resource Stakeholders.

Formulation of identity attribute information sets associated with their resource sets, such as root identity information set, which such attribute information sets may, for example, include provenance information, purpose-related information sets (such as one or more descriptive CPE sets, purpose classes and/or other purpose neighborhoods, and/or the like), Reputes of resource sets and/or direct Stakeholder sets, and/or the like.

Organization, publication, distribution, and/or management of identities, identity attributes, and/or other identity-related information sets. Such organization, publication, distribution and/or management may facilitate effective and efficient discovery of resource sets in fulfillment of one or more purpose sets. Some publication services may, for example provide fault-tolerant distributed publishing services by using strategies supporting independent operations (such as Byzantine algorithms).

Protection of sensitive and/or otherwise valuable resource sets and their associated applicable information store portions from unauthorized access, tampering, substitution, misrepresentation, and/or the like, for example, through the use of,
- Stakeholder identity attribute set validation, such as, at least in part, existential biometric validated access control,
- information encryption,
- other certification of resource sets and communications information,
- resource and information storage redundancy,
- contextual purpose fulfillment related operational fault tolerance and network caching and other efficiency optimization designs.
- and/or the like.

Evaluation and/or validation of identifier and applicable identity attributes of resource sets, for example, at least in part through validation of resource Stakeholder existential biometric information certifying resource sets (and/or attributes thereof) and binding such biometric attribute certification information to corresponding resource sets and/or attribute information in a manner supporting subsequent such resource sets certification and/or other validation techniques.

And/or the like

In some embodiments, publication services may have one or more Reputes, such as Aggregate Creds, representing assertions regarding such publication services and/or their Stakeholder one or more agents (such as owners, principal executives, and/or the like), various Qualities to Purpose, as well as Effective Facts, relevant to evaluating such publication services, that potential resource creator Stakeholders may evaluate and/or validate to select a publication service set (and Stakeholder publishers) that may be optimal for their requirements based at least in part on such information. For example, such Quality to Purpose information may include Quality to Purpose values for distribution of home energy efficiency improvement software applications. For example, suppose $C_1$ is a creator of a purpose class application, $PCA_1$, that enables users to explore green energy solutions for their homes, such as solar panels, insulating windows, and/or the like. $C_1$ may evaluate and/or validate various publication services to identify and select a publication service that specializes in publishing green energy related resource sets. In contrast, a creator of a more general purpose resource set may wish to evaluate and select based upon a wider audience and software publishing application area, by selecting a publication service that has a larger and less specialized user base, such as distributing home construction, maintenance, landscaping, liability, permitting, related applications. Such a broader publishing firm may be evaluated with a Cred and Aggregate Creds for distributing home energy efficiency improvement software, which may be important to such Stakeholder $C_1$ for evaluation purposes, but where Stakeholder $C_1$ sees that such broader publication service organization is less focused on their specific contextual purpose class, and wants a publisher with a primary focus on $C_1$'s market.

In some embodiments, publishers (and/or other Stakeholders, resource service providers such as identity/attribute service organizations or other arrangements) of a resource set that is a member in a plurality of purpose classes, for example, different, relational, parent, and/or child classes, may or will (as may be policy and/or otherwise specified by a publication service's standards body and/or utility) publish a class membership listing of declared, by direct, and/or by indirect, Stakeholders, resource set class membership lists and/or other membership representations, for the perusal of users and/or other Stakeholders to support evaluation of the focus emphasis of a given resource set, and/or associated direct Stakeholder relevant party set (e.g., a Stakeholder publisher such as a publishing entity), as regards a user set target contextual purpose (e.g., a resource Stakeholder creator). Such listing may indicate revenue, interest, work product percentage (number of offerings), internet activity such as postings and/or the like, focus of discussion materials, investment in support services (e.g., relative support), and/or the like priorities and/or other priority information for one contextual purpose class and/or other class set versus, and/or otherwise relative to, other contextual purpose classes for said same Stakeholder set, and/or a reliably, persistently identifiable portion thereof (such as a Stakeholder division, department, subsidiary, and/or the like). Such information may illustrate approximate Stakeholder interest, focus, activity, commercial results from, and/or the like, relative to a PERCos embodiment one or more classes, such as Purpose and/or Domain classes. Such information may also be ascribed to Stakeholders by indirect Stakeholders, such as Repute Cred asserters and/or the like.

In some embodiments, publication services may apply standards that direct resource Stakeholders of a resource set may need to comply with, such as, for example:

Providing sufficient assurance of assiduous authentication of direct Stakeholders, where in cases where Stakeholders are organizations rather than humans, there may be chain of authority that includes one or more individual authenticating humans. One or more direct Stakeholders may provide assurance by, for example: i) assiduously authenticating themselves as associated with the publication services; ii) providing one or more cryptographic tokens signed by a trusted third party certifying the assiduous authentication of one or more direct Stakeholders, and where such assiduous authentication may, for example, involve providing assiduously produced existential biometric identification information for such purposes.

Purpose-related information sets, such as, for example, one or more descriptive CPE sets, descriptive characteristics (which may include one or more particularity management attribute and/or Resonance and/or the like specification sets), one or more control specifications, and/or the like. Such purpose-related information sets may include one or more methods that users may use to:

Evaluate and/or validate a resource set Quality to Purpose, as purpose is specified by associated contextual purpose specification information (e.g., specific purpose), such as quality to ease-of-use, performance, reliability, trustworthiness, cost value, and/or the like.

Evaluate and/or validate a resource set's ability to adapt to situation-specific conditions, such as its ability to meet situational operating specification requirements for trustworthiness, reliability, authenticity, performance, cost, compatibility, and/or the like under varying conditions such as, for example, specific user CPE, Foundation, and Framework combinations and/or resulting events such as subsequent operating requirements, threat conditions, and/or the like.

And/or the like.

In some embodiments. Stakeholders—which include herein, as applicable for biometric assessment, Stakeholder agents such as employees, consultants, and/or the like—may provide certain information for a resource set. $RS_1$, by using one or more standardized and interoperable identity attributes (where an attribute may be a tuple comprising name, value(s), and zero or more methods for confirming the value), which may, in any of the examples below, take the form of an attribute set comprising a value set being associated with an attribute type and/or may include assertion information as, for example, expressed in the form of Repute Creds. and/or the like, associated with a contextual purpose:

Quality of Biometric Identity Attribute (i.e., Quality to Purpose Biometric Identity as associated with one or more purpose specifications), whose value represents the degree of assurance of the binding of Stakeholders regarding claimed tangible world presence, for example, derived from, at least in part, the number, type, and/or quality of biometric sensor tests (where such tests may or may not be existential). For example, suppose a Stakeholder of a resource set undergoes biometric sensor tests based at least in part on retinal scan, finger print analysis, and voice analysis. A utility may provide a composite value of 6 out of 10 for Quality of Existential Biometric Identity Attribute. Alternatively, if the Stakeholder undergoes, in addition to the foregoing tests, liveness testing based at least in part on, for example, blood flow monitoring, sub skin analysis, and thermography, the utility may provide a higher score, for example, 9 out of 10. The utility may further provide, if an assiduous PERCos Identity Firewall arrangement was employed, along with associated biometric information timing anomaly analysis, an even higher score of 9.9 out of 10 (or 10 out of 10, at least, for example, over a going forward time period such as 60 months, which could be renewed or alternatively reassessed automatically on a periodic basis and altered sooner if appropriate, or retested using, for example, upgraded biometric testing, firewall, and/or timing anomaly analysis capabilities as may be required, as well, with other Creds). In some embodiments, the Quality of Existential Biometric Identity Attribute may have one or more methods that can be used to assiduously confirm its value, and which methods may be respectively applied at least in part according to required or desired reliability/trustworthiness rigor level and/or other situational considerations.

Quality of Liveness Attribute (i.e., Quality to Purpose Liveness), whose value may be based at least in part on the degree of assurance of the liveness of a Stakeholder within a defined period of time based at least in part on timing and unfolding biometric dynamic feature characteristics. Such timing may involve a time period, and/or set of time periods (which may be pseudo-randomly selected and applied), and performed within the boundaries of the time period which $RS_1$ is published. Having the degree of assurance of the Stakeholder's existential physical presence at $RS_1$'s publication time can, under many circumstances, provide additional information on the integrity of $RS_1$. In some embodiments, the Quality of Liveness Attribute, for example, timing anomaly analysis, can be incorporated into a Quality of Biometric Identity Attribute. Such Quality of Biometric Identity Attribute (or Quality of Liveness Attribute), may be tested against stored, for example. Stakeholder Participant information, to establish that the Stakeholder (or Stakeholder's agent) in fact corresponds to the asserted Participant identity, and wherein such, for example, published Participant identity information set employed the same or substantially comparable, or at least comparably rigorous, Quality of Liveness timing techniques for assuring the presence of the biometrically assessed party.

A specification requirement and/or user set selection or decision to authenticate the bound resource and Stakeholder biometric information set, by user set and/or user set computing arrangement and/or identity/resource cloud utility initiating a liveness-tested recertification. Such process may be conducted, for example, in response to a direct user set and/or computing arrangement request and/or with user set computing arrangement participating, and/or otherwise monitoring, the authentication process, where such liveness tested bound resource set/Stakeholder biometric information is matched against such resource set information (including biometrics) available to such user set.

Quality of Resource Provenance Attribute (i.e., Quality to Purpose Resource Provenance), whose value(s) may comprise the degree of assurance of $RS_1$'s provenance information or subsets thereof (the Quality of Resource Provenance may vary between, for example, a Stakeholder resource publisher, a Stakeholder resource creator, and Stakeholder resource owners. In some embodiments. $RS_1$'s Quality of Resource Provenance Attribute sets may contribute to $RS_1$'s Quality to Purpose, including, for example, Quality to Purpose Reliability, Quality to Purpose Trustworthiness, and/or the like.

Publication services may publish a resource set by providing, for example, means to produce (and maintain) for use with, and securely associated to, PERCos resource sets, resource provenance information where such information may include, at minimum, for example, Stakeholder publisher identification information. For example, suppose a publication service publishes a resource set. Such publication service may provide, through an assiduously publisher produced identifier set, means for obtaining, or otherwise provides directly with the resource. Stakeholder attribute identification information sets, which at minimum includes the publisher identification information set, but may also include one or more other direct Stakeholder identification information sets (such as creators, distributors, and/or the like). In some embodiments, any such Stakeholder information set may be complemented by one or more Cred, EF, and/or FF information references, such as, for example, information in the form of, or extracted from, PERCos Formal Resource instance Repute sets, and where such information is employed as an attribute set in user and/or user computing arrangement resource set resource evaluation and/or for otherwise informing one or more metrics, such as, for example, a calculation of a resource set's Quality to Purpose, and/or the like.

In some embodiments, Stakeholders may express situation-specific conditions regarding resource sets by associating one or more identity attributes in terms of contextual variables that express aspects of any specifiable, relevant, and employed contextual information, such as, for example, verb oriented (published as effective for students of basic physics, not instructors of basic physics (that is learn basic physics versus teach basic physics)), functionality, efficiency, complexity, length, sophistication, productivity, financial cost, reliability, security, integrity, minimality, adherence to specifications, combinatorial consequences (with other resource sets) such as reliability and efficiency and including, for example, use with user computing arrangement Foundations, Frameworks, and/or the like. For example, in some embodiments, a publisher of a financial purpose class application, Fin-$PCA_1$, may provide identity attributes, including for example, a "security" attribute with a value of "high," a "reliability" attribute with a value of "medium-high" using qualitative values, "low," "low-medium," "medium," "medium-high," and "high," and/or the like. Indirect Stakeholders, such as, for example, financial securities experts, may publish one or more Repute Creds, representing their assessments of the publisher Stakeholder's attribute assertions and/or provide assertions for the same Quality to Purpose attribute and/or other contextual attribute variables, and may have, or see, their assertions being combined into average, aggregate values employing available such assertions and/or such aggregations of asserter Stakeholder assertions (e.g., indirect) where Stakeholder's and/or their agents (authorized employees, consultants, and/or other agents) meet certain criteria, such as having EF degrees in finance and/or years employed as financial analysts (e.g., with major investment banks, mutual fund companies, and hedge funds), popularity in total numbers of "friends," visits to their website(s), age range, nationality, and/or the like qualities. Users, who have used Fin-$PCA_1$, can publish one or more such Creds using their Participant identity as their Stakeholder identity, expressing their own assessment of Fin-$PCA_1$ in terms of, for example. Quality to Purpose metrics, such as, for example, overall usefulness, its reliability, ease of use, and/or the like. Such published Cred assertions may be processed and associated with Fin-$PCA_1$ as one or more identity attributes, and/or may be otherwise discoverable by users as relevant commentary on at least one or more aspects of Fin-PCA1.

In some embodiments, expressing contextual variables as resource identity attributes, and/or as values of identity attributes, may support one or more capabilities of one or more identity infrastructures, that, for example, may:

Assert contextual relevance of a resource set as relates to one or more contextual purpose sets and/or Purpose Statements and/or the like;

Associate one or more methods for evaluating and/or validating, including, for example, testing and/or, as consistent with purpose related specifications, updating, attribute contextual variables;

Aggregating one or more contextual variables (e.g., attributes) into a composite contextual variable, which may be, for example, represented as a resource attribute in the form of a CDS;

Define relationships between contextual variables and identities, identity attributes, and/or the like;

Organize resource sets based at least in part on their contextual variables;

And/or the like.

In some embodiments, experts, trusted utility services, and/or other Stakeholders (indirect, unless also publisher of the subject of the Repute instance, such as Cred) may publish one or more Reputes and/or the like that express their validation/assessment of identities and/or identity attributes of a resource set, such as its reliability, functionality, performance, and/or other situational relevance aspects for one or more purpose sets. Stakeholders of such Repute set, $R_1$, may associate one or more Repute sets (such as, for example, Effective Facts) with $R_1$, asserting their expertise and/or trustworthiness. For example, consider a purpose class application, $PCA_1$, for exploring nuclear physics. An acknowledged Domain expert. $ADE_1$, after evaluating $PCA_1$, may publish a Repute, $Rep_1$, expressing $ADE_1$'s assessment of $PCA_1$'s functionality and also associate one or more of $ADE_1$'s Repute set with $Rep_1$, such as Effective Facts expressing $ADE_1$'s qualifications, such as, for example, $ADE_1$ is a full professor of physics at an Ivy League university. In some embodiments, an association of, for example, $ADE_1$ Effective Facts to $Rep_1$—as well as, for example authentication information for such $R_1$— may be provided by including and/or otherwise referencing $ADE_1$'s registered and published Participant resource set, $P_1$, which may contain such Effective Fact information, as well as, for example, existential biometric authentication information certifying both $Rep_1$ and $P_1$. $P_1$ may further include Aggregate Cred, $ARep_1$, from full and associate tenured professors of physics at accredited North American universities ranking their aggregated, averaged view of the quality of university physics and applying a ranking Cred according to such group's ranking determination algorithm employed involving the assertions of such professors and producing an Aggregate, ARep, wherein such Aggregate Cred value. $ARep_1$, is associated with $ADE_1$ Stakeholder declared university's Department of Physics as an Associated Reputation value set for a Stakeholder Effective Fact and associated through, for example, a Stakeholder Effective Fact and, for example, an associated Repute Cred for the subject matter of the Effective Fact, and Associated Reputation value set may stipulate for $ADE_1$ to specify that Effective Fact and $ADE_1$'s university, where $ADE_1$ is a full professor as an aggregate filtered Cred value for Quality to Purpose educational university of 9.5 out of 10.

In some embodiments, a resource set may have one or more methods associated with its identities and/or identity attributes, for enabling dynamic evaluation/determination of the extent to which a resource set, in whole or in part, satisfies an associated prescriptive one or more CPE sets, for example, as declared as contextual purpose class sets, and/or the like. Such dynamic determination may be obtained through the use of one or more PERCos Platform Services, such as, for example, Evaluation and Arbitration Services. Test and Result Services, and/or the like. For example, a resource set, $RS_1$, may have an identity attribute comprising a contextual variable, $CV_1$, for expressing $RS_1$'s degree of reliability of authenticity, where $CV_1$ is a tuple comprising two elements. ($V_1$, method $M_1$) and ($V_2$, method $M_2$), in which method $M_1$ enables evaluators to check the credentials of a trust utility service that asserted value $V_1$, and method $M_2$ enables users and/or PERCos processes on their behalf to perform assiduous evaluation of the situational identities of $RS_1$'s Stakeholders, such as, for example, $RS_1$'s creator(s), publisher(s), distributor(s), and/or the like, where such assiduous evaluation of situational identities of $RS_1$'s Stakeholders may have recursive properties. For example, suppose $S_1$ is a Stakeholder of $RS_1$. Assiduous evaluation of $S_1$'s situational identity, $SID_1$, may include evaluation of relevant Repute sets associated with $S_1$, which, in turn, may involve evaluation of the identities and identity attributes of the asserters, publishers, distributors, and/or the like of the relevant Repute sets.

Based at least in part on the evaluation of such methods, an evaluator may publish one or more Repute Creds asserting the validity of these values. For example, an acknowledged Domain expert, $ADE_1$, having evaluated method $M_2$, may publish a Repute set, $Rep_2$, certifying the validity of $V_2$ and associate one or more methods that evaluators can use to evaluate $ADE_1$'s assessment. In such a case, users and/or user systems may accept such certification at face value, assess Creds or Aggregate Creds on $Rep_2$, and/or evaluate methods $ADE_1$ provided regarding performing $Rep_2$ to validate $ADE_1$'s assessment.

Figure 8:
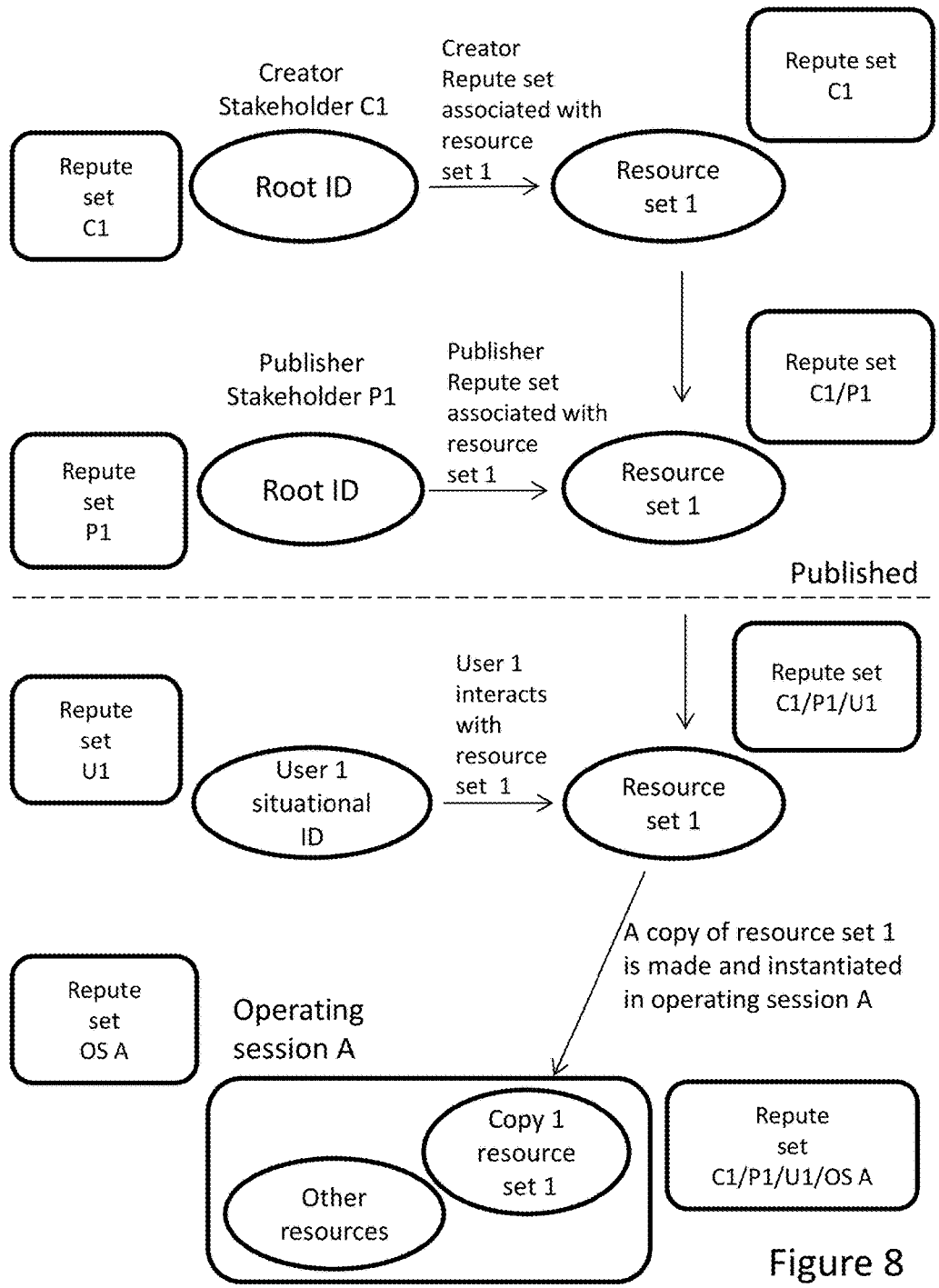
FIG. 8 is a non-limiting example of Repute set combinations.

FIG. 8 is a non-limiting example of Repute set combinations.

In some embodiments, one or more contextual variables may be aggregated into a composite contextual variable. For example, a trust contextual variable may be a composition of the following contextual variables:

- Non-bypassability: A non-bypassability contextual variable that expresses the degree of non-bypassability of a resource set for enforcing its specification, such as, for example, privacy, integrity, reliability, and/or the like. For example, suppose a resource set, such as a gateway/firewall, $RS_1$, has a specification set asserting that it blocks all unauthorized traffic coming into its protected environment. The degree of $RS_1$'s effectiveness in satisfying its specification set depends on the degree of non-bypassability of its protection mechanisms. Such degree of $RS_1$'s effectiveness may be expressed as a contextual variable
- Resource and/or process isolation: An isolation contextual variable that expresses the degree of isolation a resource set and/or a process set may provide. For example, an operating system may include apparatus and methods for isolating resource sets and/or process sets to prevent them from interfering with one another.
- Encryption: An encryption contextual variable that expresses the strength of encryption algorithms in terms of, for example, the types of encryption algorithms (such as, for example, 3-DES, AES), the length of the key, and/or other representations of the strength of the algorithm.
- And/or the like.

In some embodiments, contextual variables may have relationships with identities, identity attributes (including other contextual variables thus forming compound contextual variables) comprising, at least in part, discretely identified sets of plural contextual variables, and/or the like. For example, consider the contextual variable, $CV_1$, described above, that is associated with resource set $RS_1$. Identity infrastructure management may be used to maintain relationships, such as, for example,

- Relationship between contextual variable $CV_1$ and acknowledged Domain expert $ADE_1$, who published the Repute set $Rep_1$, asserting the validity of $V_2$ using method $M_2$; and
- Relationship between contextual variable $CV_1$ and a Repute set, $Rep_2$, describing, for example, $ADE_1$'s credentials, which $ADE_1$ had associated with $Rep_1$. For example, suppose an acknowledged security Domain expert, $ADE_1$, evaluates the effectiveness of an Awareness Manager, $AM_1$, in supporting assiduous acquisition of existential biometric identities of users and/or Stakeholders. $ADE_1$ may publish a Repute. $Rep_1$ that expresses $AM_1$'s effectiveness in terms of one or more contextual variable sets. Such contextual variable sets may have a relationship with one or more Reputes associated with $ADE_1$, such as $Rep_2$, asserting $ADE_1$'s expertise in evaluating Awareness Managers.

Some embodiments may use identity capabilities to arrange and/or otherwise organize resource sets based at least in part on their contextual variables. For example, consider gateways/firewalls. Their Stakeholders may have published one or more Repute sets asserting their functionality, security, efficiency, and/or the like in terms of one or more contextual purpose information sets. For example, a software arrangement uses a security method, and such security method is described as an attribute of the software, and an aggregate Repute by experts on that attribute gives it $8/10$ Quality to Purpose for securely maintaining information. Identity organization management service may provide a multi-dimensional infrastructure to organize firewalls, which may include in some embodiments, PERCos CPFF and/or Identity Firewalls, based, at least in part, on their contextual variables, such as, functionality, security, and the performance they may provide. For example, one dimension may organize firewalls based at least in part on their functionality, another dimension on their security, and/or the like.

In some embodiments, contextual variables may be associated with one or more metrics that express the degree of situationally relevant capabilities, e.g., as associated with CPE, Purpose Statement, and/or purpose operating specification set, that a resource set, process set and/or operating session set may provide, be capable of, assert, and/or the like. In some embodiments, identity organization management service may enable a combination and/or simplification of these metrics to facilitate comparison of situational relevance conditions. For example, in one embodiment, there may be a trust metric that summarizes a resource's non-bypassability, resource isolation, and encryption metrics, and returns a composite result expressed as a number on a defined scale (such as a scale from 1 to 10). Quality to Purpose Particularity, whose value(s) may comprise the degree to which $RS_1$ supports minimality, Coherence, isolation, efficiency and/or the like. For example, there may be two CPFFs. $CPFF_1$ and $CPFF_2$, that fulfill the same target purpose sets, such as secure social networking, but may provide differing Quality to Purpose Particularity. $CPFF_1$ may provide virtual machine isolation by depending on a Foundation set may have a higher Quality to Purpose Particularity than $CPFF_2$ that provides sandbox isolation using underlying operating system.

In some PERCos embodiments, identities and identity attributes may have one or more methods that can be used to evaluate and/or validate their Quality to Purpose in fulfillment of one or more target purpose sets. Users and user systems may use such associated methods to evaluate and/or validate identities and identity attributes to assess a resource set's quality in fulfilling contextual purpose sets. Creators of a resource arrangement set, such as, for example, a CPFF, may also wish to evaluate and/or validate the minimality, authenticity, suitability, combinatorial consequence set of use with other resource sets, and/or the like of one or more candidate resource component sets contemplated as comprising and/or serving as component elements of a resource arrangement set.

In some embodiments, the degree of rigor of evaluation and/or validation of a resource set's Quality to Purpose. Quality to Purpose Trustworthiness (may be identified as a subset consideration for Quality to Purpose), and/or the like, may depend on the user's situation-specific contextual purpose, Purpose Statement, purpose operating specification contextual relevance specification sets, and/or the like. In some cases, users interested in pursuing high value financial transactions may require a high degree of assurance of the reliability and trustworthiness of a resource set, such as may result from an assiduous evaluation of the resource set's available provenance information, which may involve, for example, evaluating and/or validating identities of relevant Stakeholders in real time by accessing their, for example, existential biometric reference data, and associated Stakeholder evaluating (assertions concerning) Creds, available and relevant Effective Fact set, and Creds upon such fact set.

In some cases, evaluation and validation may be recursive. For example and without limitation:

The evaluation of the Participant identities of Stakeholders may include the evaluation of relevant Reputes such as Creds. EFs. and/or FFs. In some cases, the evaluation may go up a Participant chain of authority to employ a human more senior, for such circumstance. Participant identity (such as, for example, executive who is a root authority for Corporation X in charge of certifying the certifier agents acting for the organization that published $RS_1$) and a user set may wish to evaluate a given resource and its aggregate to user purpose set Cred(s), the identity of the certifying Stakeholder or Stakeholder agent, the identity, if any, of a certifier of such certifier, Effective Facts regarding such Stakeholder, and/or their agents, Creds sets, such as Cred instances and/or Aggregate Creds on such Stakeholder and/or regarding relevant to purpose EF variables, and/or the like. Further, information resources that have Quality to Purpose satisfying criteria that rate, otherwise evaluate, and/or provide useful information for evaluation, may be employed in the evaluation of any such Stakeholders, their one or more agents (if any), their related EFs. and/or the like.

The evaluation of a Repute set. $RepSet_1$, whose subject matter is $RS_1$, may involve the evaluation of $RepSet_1$'s creator, publisher, distributor, and/or the like as well as any Reputes whose subject matter is $RepSet_1$ (i.e., evaluation of Reputes on Repute).

The depth and/or breadth of this analysis may depend on situation-specific context. For example, a purpose of an astrophysicist expert may involve a patient time consuming process set, and a commitment to spend hours or days in evaluating the accuracy and reliability of assessment of a resource set which may involve a deep and careful thinking, and evaluation a variety of inputs. On the other hand, a high school or college level student interested in gaining an introductory high level picture of what is astrophysics may look for a quick link to a summary resource that may be highly rated by Aggregate Creds, generally, and/or as to a summary article on astrophysics, such as may be found on Wikipedia.

Users and user systems can perform such assiduous evaluation in a variety of ways. One way is to deploy one or more sensor arrangements to capture biometric and/or contextual information sets of relevant Stakeholders and compare them against their stored biometric reference sets, for example, in the form of registered with a cloud service arrangement and published for authentication purposes Participant and/or the like resource sets. Another way is for users and user systems to delegate the authentication task to a trusted third party (such as a trusted, for example, cloud service identity utility) that after validating the relevant Stakeholders, may send a digital certificate or some other such proof of validation of relevant Stakeholder identities, for example, during a "live" online connection process set wherein such cloud utility is securely communicating, for example, with a PERCos embodiment Identity Firewall, and/or the like.

User sets evaluating, otherwise contemplating, and/or attempting to use a resource set for their situational contextual purpose sets may need to test, and/or verify, that the resource set's descriptive specification set meets or otherwise sufficiently satisfies user set's requirements for quality, functionality, confidentiality, integrity, reliability, performance, and/or any other measures of fitness to purpose. In some embodiments, some of these requirements may be verified directly by applying standard software and/or hardware testing methods, such as, in part, by using test suites that are designed to check the resource set's desired performance and/or functionality under various stress conditions. In another embodiment, testing and verification of the whole, or a portion, of the resource set's specification sets may rely on authenticating reputable Participants. and/or the like, who can opine and/or attest to the validity, and/or veracity, and/or fitness, and/or other relevant Quality to Purpose set of the resource set's situationally relevant descriptive specification sets, including operational characteristics such as perceived performance, ease-of-use, minimality, intended and unintended consequences, for example, in combined use with other resource sets, and/or the like.

In some embodiments, resource sets may be pre-evaluated and/or pre-validated, the result of which may be securely stored associated with such resource sets, for example, in storage arrangements of one or more cloud service resource identity and/or otherwise user contextual purpose assisting and/or resource provisioning services.

In some embodiments, Reality Integrity (RI) analyses are used to assess, or support assessment of, the degree to which an event set (real time and/or past), user set, environment sets, Stakeholder set, object set (including specifications, content) and/or any other subject set that resides on the tangible side of an Edge is what it claims to be. RI analyses may implement various mechanisms and/or methods for evaluating the validity of a subject set's descriptive specifications and other operational features. RI analysis may use Repute expressions, which may comprise Cred and/or the like assertions about one or more aspects of a resource operation and/or otherwise express Qualities of Reliability, Trustworthiness, and/or the like. RI analysis may also or alternatively employ other observations of the operation of a subject (including, for example, across-time physical and/or behavioral characteristics), and in some instances such subject's environment, so as to extract RI related "Fingerprints" and/or "Patterns." These Fingerprints/Patterns may result from multiple real time and/or non-real time observations of events and/or elements used to create signature matrix establishing asserted degrees of Reality Integrity (e.g., levels 1 to 10), and in some embodiments, for example, such Reality Integrity determinations may employ hardened PERCos Identity Firewall capabilities, with such degrees, for example, being at least in part determined in accordance with any applicable tests, such as liveness testing using such firewall protected emitter transparent challenge and response pseudo-random pattern emission reflections acquisition, PERCos timing anomaly analysis, unfolding across-time physiognomy pattern shifting, tangible image, video, audio, radio frequency, and/or the like environment analysis, and/or other techniques.

In some embodiments, such fingerprints/patterns may become an integral part of a resource's identity attributes. For example, using RI fingerprint/patterns, an embodiment may employ an RI method to identify whether a user of a smart phone is, or is likely to be, its rightful owner. RI pattern measurement could estimate, for example, the frequency and length of calls and texts to and from specific numbers; it could perform voice analysis on call parties and compare various call information sets with historical pattern information sets, including, for example, call party identities and respective times and durations of party respective calls, semantic analysis of call content types, as well as patterns associated with the foregoing of call GPS, cellular, and/or the like location determinations, route movement, and/or the like. In some embodiments, such RI pattern analysis may also measure when, where, and/or how often applications such as Google maps, bus schedules. Facebook, and/or the like are accessed in a typical day of the week by the presumed rightful owner, as well as "listen to" or "see" environmental information, acquire pattern information for such, and evaluate potential environmental anomalies and possible spoofing related timing anomalies, including, for example, employing transparent pseudo random electromagnetic radiation and/or sound wave emissions challenges and response (e.g., reflection) analysis, and where the foregoing may, in some instances, be secured by PERCos Identity Firewall capabilities. If an RI analysis method detects that a measured pattern of use changes in an event triggering (e.g., to a specified extent) manner in any given day, it may determine that the mobile phone may have been stolen and request that the user be re-authenticated. Alternately, or in addition, RI analysis may, based at least in part on any one or more such events, and/or on instruction sets from one or more authorities, such as through instruction sets from administrative and/or cloud service identity and/or RI services, where the foregoing may initiate further RI testing (e.g., as described) to more reliably determine device status and/or status sequence(s), and/or it may at least in part disable, as applicable, devices in response to events and/or instructions from one or more such authorities.

As discussed above, RI analyses may include methods for establishing the integrity of one or more subjects based at least in part on identity attribute information sets associated with that subject; such methods may also be incorporated as part of the relevant resource identity attributes. This may include, for example, evaluations of, without limitation, identity attribute sets which may incorporate provenance, contextual, biometric and/or other relevant informational attributes such as Repute information, for example, Creds and/or the like. As described earlier, such evaluations may result in metrics indicating the degree of assurance of the validity of assertions regarding an event set and/or environment related set (real time and/or past), user, and/or Stakeholder, the foregoing including any type of applicable tangible object and/or subject set.

RI analyses and testing may be used in, for example, assessing individuals and/or events. For example, RI may be used in, at least in part, evaluating and authenticating users. Stakeholders, "background" humans in a user tangible computing environment, user set computing arrangement resources (through evaluating user and/or Stakeholder sets and/or their environments and/or their respective resource sets), through, for example, assiduous biometric and environmental evaluations, including, for example, through application of one or more assiduous existential and/or multimodal biometric and/or environment testing and analysis techniques. RI may be used, for example, in combination with PERCos Awareness Managers, including their sensor/emitter sets, in detecting and validating events, such as user gestures, other voices in the room, changes in room illumination, movement of a mobile device to another room (for example along a known path to a known other room) and/or the like.

In some embodiments, users, Stakeholders, process sets, and/or resource sets may employ situational identities for identifying resources and/or identifying, evaluating, preparing for, performing, and/or managing PERCos purposeful operations, such as, for example, pursuing target contextual purpose sets, publishing resource sets, evaluating and/validating resource sets, and/or the like. A situational identity comprises contextual purpose-related identity, specified and/or calculated as relevant in a given set of circumstances, and where such circumstances, and/or appropriately corresponding operational representative information, may be input to and/or components of CPEs, Purpose Statements, and/or purpose operating specification sets. Such situational identities may have one or more identity attributes that refer to and/or contain operatively relevant information sets for a given set of purposeful operations in accordance with one or more control specification sets.

In some embodiments, situational identities of users and Stakeholders, such as their Participant instances and other resource types, may comprise situation-specific identity attributes that may include any environmental, temporal, computing arrangement operational, and/or other contextual, considerations that may be relevant for performing PERCos operations in pursuit of one or more situation-specific target contextual purpose sets, including, for example, sets specifying contextual purpose classes of target purpose considerations and objectives. For example, consider a user, Professor A, a professor of medicine at an Ivy League medical school, who registers and publishes for general reference, a Participant identity information set. She may establish a situational identity for her students, one for her academic colleagues, one for her teaching responsibility activities and another for her research activities including her work with graduate students, one for media interaction on medical matters, one for family member interactions, and another for her social networking activities, with each comprising attributes, such as some or all of her academic credentials; situationally applicable Reputes published by fellow colleagues, including those integrally familiar with her research; friends, and/or family, asserting the quality of her sense of humor; personal interactions, personality traits, personal information such as hobbies, social, athletic, and/or political interests; childhood background information, and/or the like. Professor A may use an appropriate one of her situational identities (which may be applied automatically through interpretation of the target purpose of a given computing arrangement activity set) for identity components of communications with her fellow medical researchers, and she may modify attribute sets of said situational identity over time, such as updating and/or confirming her biometric information and other situational attributes that may be situationally appropriate, so that colleagues she has never met can authenticate her identity before, for example, sharing their research results with her. Professor A's situational academic identity attributes may include an existential biometric authorization from a root university authority, for example, an Associate Dean of Students for resource rights management certification, that certifies that Professor A can access her Student's academic records. It may also authorize, for example. Professor A to authorize up to five further parties, such as her instructors, to access such records. Her situational identity may be dynamically updated, based for example on an event, such as a time period expiration unless reauthorized, to include, exclude, otherwise terminate or reauthorize, her authorization identity attribute, based at least in part on temporal attributes (such as, only be included during the academic year), environmental attributes (such as, only while she is at a secure location, such as, her university office), and/or the like.

In some embodiments, situational identities of a resource set may comprise identity attributes that contain and/or refer to operatively relevant information sets, such as providing instructions for operational processes including, for example, providing methods that, for example, seek current, updated values for an attribute type. A situational identity of a resource set may initially comprise relevant identity attributes of resource sets, such as, for example, identity attributes provided by one or more direct Stakeholders such as, for example, root identity and related biometric assiduous information sets, purpose-related resource characterizing specifications, and/or the like, as well as, for example, one or more Reputes, such as expert Creds, including, for example, specific Cred instances and Aggregate Creds regarding, for example, Professor A's Quality to Purpose for researching dermatological conditions (such as an 8 out of possible 10 rating), another attribute regarding Professor A's Quality to Purpose as a clinician in dermatology, and a further attribute regarding Professor A's Quality to Purpose in providing mentor services to non-MD graduate students in dermatological research, published by one or more indirect and/or contributing Stakeholders. Over time, such situational identity sets of a resource set may accumulate additional identity attributes, such as, for example, identity attributes expressing satisfaction users may have experienced using the resource set in, or otherwise contributing towards, fulfillment of their target purpose set. Such expressions of satisfaction may be aggregated and published as one or more Reputes (for example, Cred assertions. Compound Creds. Aggregate Creds, Creds on Creds, and/or the like), which may be associated with one or more identity attributes of one or more situational identities of the resource set.

In some embodiments, process sets at least in part based upon target purpose situationally applicable specifications (and input, as may be applicable) may establish situational identities to perform target purpose set (and/or purpose class) PERCos operations. Such situational identities may have a cohered set of identity attributes, such as, for example:

One or more authorization process sets needed to achieve their results.

One or more interface specifications that define the operations of process sets (such as, intended and unintended consequences, and/or the like).

One or more control specification sets that define, for example, policies, rules, and/or the like that process sets need to enforce.

And/or the like.

For example, consider a neurologist, $Doc_1$, who needs to diagnose a patient, $P_2$, and needs to access $P_2$'s medical records at a hospital, $H_4$, using a process set, $PS_3$. The attributes of $PS_3$'s situational identity may have attributes, such as.

Attributes that express a resolution of $Doc_1$'s authorizations to access $H_4$'s patient records with $P_2$'s permission to allow $Doc_1$ to access $P_2$'s patient records. For example, $Doc_1$ may not have the authorization to access $H_4$'s patient records.

$PS_3$'s purpose related attributes, such as, for example, to perform a diagnosis of $P_3$'s neurological problems. In such a case, $PS_3$ may be allowed to access only those portions of $P_2$'s medical records that may pertain to diagnosing neurological problems.

In some embodiments, process sets that are mobile objects and/or other organized instances that may be employed in one situation-specific computing environment set, then another, may dynamically self-organize their respective situational identities to be purpose processing ready for their new situation-specific computing environment set. For example, consider an operating CPFF instance, $OCPFF_1$, that, at least in part, enables such mobility by:

Utilizing particularity management layer sets that provide, at least in part, standardized and interoperable interfaces that: i) hide the particulars of underlying $OCPFF_1$ implementations: and ii) include one or more method sets that support migration of resource sets from one platform to another. Such particularity management layer may facilitate migration between situation specific computing environments by minimizing the need for re-provisioning of $OCPFF_1$ as it migrates from one situation-specific computing environment to another. This is based at least in part on one or more events reflecting the transition from one computing environment set to another—any, as appropriate, one or more of such method sets that are applied to, and/or "withdrawn" or "inactivated." by no longer being applicable for, such attribute one or more sets, and provisioning, that is "activating" such newly applicable to subsequent computing environment attribute sets. Further, as a result of such a transition, one or more attribute sets may have new, different value sets (including, for example, value ranges), or may be triggered after further event and/or new state information evaluation in accordance with associated specifications, such as contextual purpose information. Such mobility between different contextual purpose specifications may similarly cause differing attributes to be applicable and such purpose transition to new contextual purpose set may be processed in the same or a similar manner as transferring to a new computing environment and the event of such transition to a new contextual purpose set may cause some attributes to be "withdrawn" (e.g., cancelled or no longer applied) and others to be "activated."

At least in part, self-organize its, and/or one or more of its component resource set's, identity attributes by using one or more techniques to select, collect, aggregate, update, derive, cohere, and/or otherwise transform relevant identity attributes, including, for example, Reputes, such as Creds, EFs, and/or FFs and/or the like, to enable its situational identity to be purpose processing ready.

In some embodiments, situational identities and/or some or all of their information may be variously stored, (e.g., stored with situationally applicable attribute arrays) at least in part in accordance with, for example, frequency and/or importance of usage with their relationships to contextual purpose specification and/or purpose class and/or other purpose neighborhood sets (for example, associating them with CPEs. Purpose Statements, operating specifications, and/or the like of respective such instances), and/or as associated with other resource and/or information sets (including, for example, resource classes), associated with user computing arrangement environments (e.g., Participant N's mobile device A and notebook home computing B environment settings), and/or as associated with user sets (including, for example user classes, Participant sets, and/or the like).

In some embodiments, for example, an operating CPFF instance, $OCPFF_2$, may dynamically self-organize its situational identity, $SId_2$, as it migrates from one situation-specific computing arrangement, such as for example, the home office of a user, $U_1$, to another, such as, for example, $U_1$'s mobile tablet, which latter mobile tablet may migrate among situation-specific computing arrangements as the location of such tablet alters security management and/or other considerations. For example, $OCPFF_2$'s situational identity, $SId_2$ at $U_1$'s office may include the situational identities of $U_1$'s home office computing arrangements. When $OCPFF_2$ is moved to $U_1$'s tablet, the set of identity attributes of $SId_2$ may be modified to reflect $OCPFF_2$'s $U_1$'s tablet. For example, $SId_2$ of $OCPFF_2$ operating on $U_1$'s home office may include an authorization identity attribute that enables $OCPFF_2$ to communicate with the user's company servers. But when $OCPFF_2$ is moved to the tablet, $SId_2$ may no longer have that authorization. In some embodiments, such differing CPFF instances are managed as separate CPFF resource sets, that is they don't morph from one composition of attributes to another, but rather different CPFF resource sets, for example, may be applied as conditions exist that no longer apply to an old OCPFF, and a CPFF that applies to a new condition set, if available, is user and/or user computing arrangement selected for the applicable contextual purpose set fulfillment.

In some embodiments, PERCos capabilities can extract or redeploy CPFF framework information set along with applicable operating condition state information. Such information is evaluated, and as applicable, cohered, if in the context of receiving one or more environments' Foundations and/or other germane user computing arrangement environment information, such resolving is practical in light of such specification and operating information. Such cohering/resolving establishes a readiness of operating state of such receiving environment or initiates such receiving state, with the foregoing in compliance with CPFF related situational specifications. If conflicts arise, or if other adaptations are desired, the initiating environment or receiving environment may interact with one or more user sets and/or authority sets (which, in some instances, may be remote administrative organization and/or cloud service arrangements) for user and/or such administrative set input selections and/or evaluations in support of, if desired, provisioning, and, in some instances, storing operable states.

CPFFs may include, for example, rights management instructions whereby, for example, image, video stream, audio, and/or textual content, during a video conferencing session is restricted from being stored and/or copied and/or has associated time outs for retention periods applied to the receiving party set. Such control restrictions and/or modifications to content handling may be applied differently to different content resources, and/or to user sets that come into the field of "perception" of a user set computing arrangement, for example, an at least in part, Identity Firewall secured, pseudo-random emission challenge and response, emitter/sensor arrangement.

In some embodiments, for example, an operating CPFF instance, $OCPFF_2$, operating in user $U_1$'s tablet is provisioned with a resource arrangement $RA_1$. When $OCPFF_2$ migrates to a new situation-specific user computing arrangement environment belonging to a new user, $U_2$, it may migrate some of its resources and/or their constituent parts and re-provision other resource sets and/or their constituent parts (such as applicable condition state information set) to form a new resource arrangement, $RA_2$. In such a case, the composition of such situational identity $SId_2$'s identity attributes may change to reflect this re-provisioning, such as, for example:

the deletion of Repute information attributes and/or the like of the direct Stakeholders and relevant situational identity attributes of $RA_1$'s replaced resource sets, the addition of relevant Repute information attributes and/or the like of the direct Stakeholders and relevant situational identity attributes of new resource sets.

In some embodiments, when users, Stakeholders. and/or resource sets request to perform a purpose operation, the process set associated with the purpose operation may assiduously evaluate and/or validate their respective situational identities. For example, consider a CPFF, $CPFF_1$, that enables users to explore fixed income investment strategies. When situational identity, $SId_1$, associated with Participant A, is used to explore a particular fixed income strategy that requires subscription, such as a subscription to an online investment information cloud service, $CPFF_1$ may evaluate $SId_1$ to ensure that $SId_1$ has sufficient authorization. If not, $CPFF_1$ may request additional authorization, such as, for example, the evidence that Participant A is a subscriber of such investment information cloud service.

Situational identities may be ephemeral or persistent. Persistent situational identities may be stored in one or more locations (such as databases, cloud services, and/or the like) and may be published as PERCos resource sets. For example, a resource set may have its situational identities stored in multiple locations, based at least in part on situation-specific context. For example, a PERCos Identity Matrix (PIDMX), an organizational structure used, for example, for managing identities, identity attributes and/or other identity-related information sets associated with a resource set, may have a control specification set expressing storage locations for storing the situational identities of the resource set.

In some embodiments, a user set may form and/or interact with one or more social and/or commercial groupings in which an individual set, at least in part controls at least certain provisioned resource sets, for example, as to privacy, selective availability, function, and/or usage consequence. Such resource sets may include portions of resources and/or their information sets, such as selectively making available attributes, including, for example, their reliable identity attribute sets (either situational, and/or as available, global (general attribute)), and one or more policy sets regarding their privacy, use and/or deployment. In this manner, in some embodiments, Participants or, as applicable, other users, for example, may retain, at least in part, control of at least a portion of their resource sets rather than delegate those rights to, for example, one or more service providers. Such service providers respective one or more sets of privacy and/or use policy sets regarding provisioned resource sets, are normally structured so as to optimize such providers commercial interests, but don't provide general capabilities for structuring policies to reflect specific user set, and social and/or commercial group common interests and/or requirements through at least in part standardized and interoperable policy structuring and enforcement sets of capabilities.

For example, an individual may decide to join a group based upon its respective qualities, including, for example, resource sets available to and/or otherwise under the control of a group user set, one or more of the contextual purpose expressions set by such user set and/or otherwise associated with such group, and/or one or more policies that are requirements and/or other related considerations for participating with other member sets. Such consideration of social and/or commercial interactions based at least in part on such resource and respective contextual purpose sets gives participants the opportunity to enhance interactions by personalizing their representations and/or memberships in policies of such a group and providing capabilities for forming an optimal balance of interests and preferences of multiple parties that may yield potentially much more enjoyable, efficient, profitable, and/or otherwise satisfying experiences and/or other results.

Social network members can propose and/or contribute resource sets to a group and identify themselves as situationally having rights to use such resource sets (which may vary respective to given resource one or more sets) by publishing encrypted and/or otherwise sufficiently secured "address" arrangements that represent which groups, and/or participants sets within groups, may use, and, for example, how they may use, which resources, and also allows only authorized group members to retrieve resource rights holder's sets applicable situational identity attributes. To access a resource, group member sets may be required to first test/prove that he/she/they is/are authorized to use the resource set.

In some embodiments, a purpose managed participation ecosphere may comprise both local and cloud based capabilities such that participants may determine, through, for example, specifications and/or user set decisions and selections, the degrees of information, collaboration, sharing and/or other interactions of resource sets under their control with other participants. For example participants may determine that they are prepared, for one purpose, for example as members of an interest group, to share with those group members a resource set, for example a document that will be only be available to those members, but subject to any rights and restrictions as may have been applied by an original document Stakeholder to users of such document.

In some embodiments many such groupings may be based at least in part on one or more purposes, for example a participant may specify share with groups labeled "neighbors", "family", "auto racing", "trading", "home improvement" and/or any other purpose, including for example "learn chess", "teach yoga" or any other purpose for which they wish to establish social networked relationships. These purpose managed participations may involve participants, for example, as represented by Participants, providing, through, for example, use of their PERCos PIDMX, one or more sets of appropriate identity information that is sufficient for the interactions for such participation. Such information, may in some embodiments, for example, remain under the control of the participant, but such control may be subject to the extent of any other party sets specified rights. Providing participants with purpose-oriented granularity for their identity information distribution, situational deployment, and associated resources interactions enables them to, in general, more effectively, flexibly, and in a contextually responsive manner, manage and control their cross-Edge digital representations, whilst enabling those with whom they are interacting to benefit from their reliable identities, for example using existential biometric identity information, which may underpin such purpose oriented identity information sets with a very strongly reliable identifier set.

Figure 9:
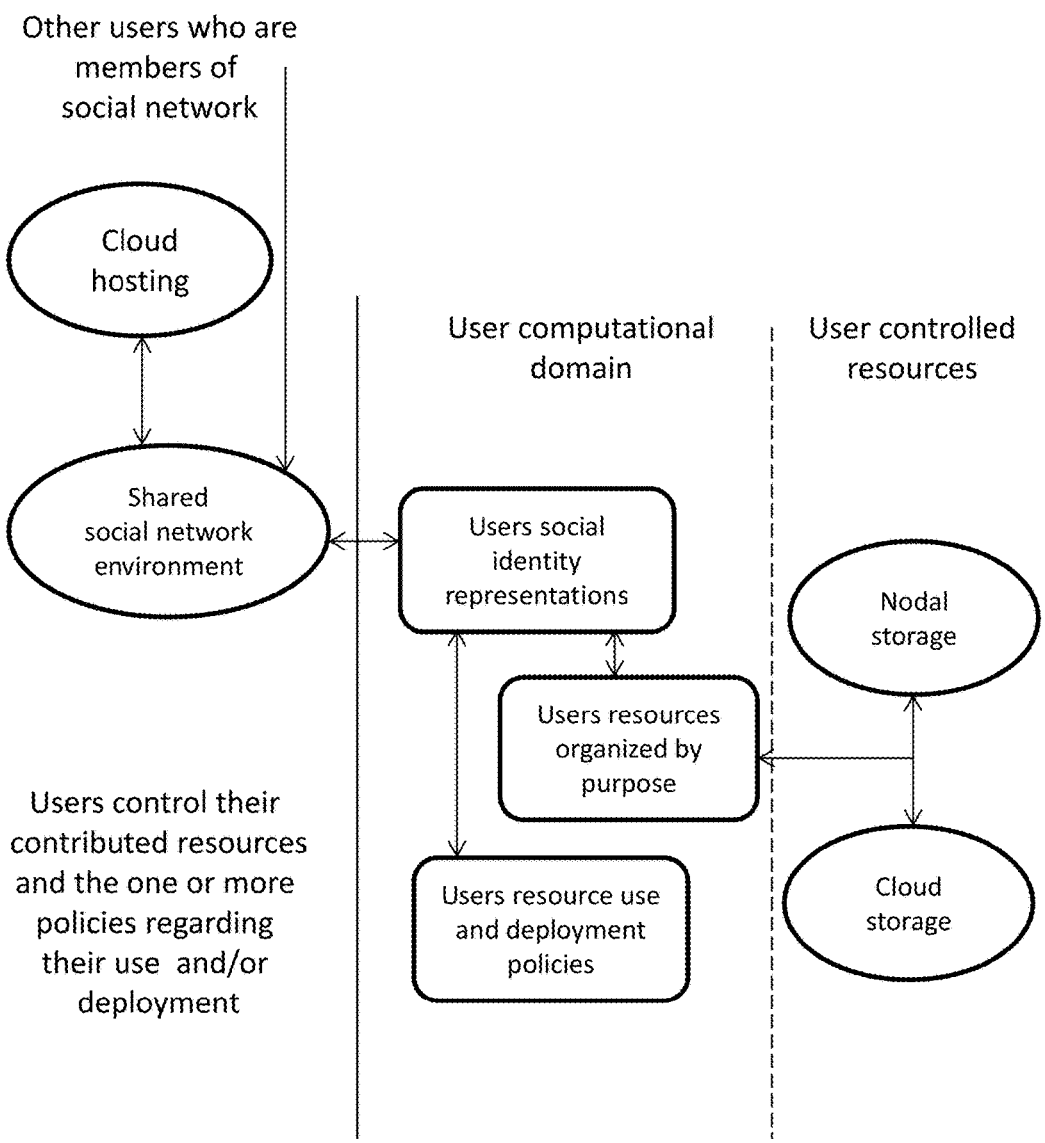
FIG. 9 is a non-limiting illustrative example of purpose managed Participant Ecosphere.

FIG. 9 is a non-limiting illustrative example of purpose managed Participant Ecosphere.

In some embodiments, this may, as shown in FIG. 9, involve users using common resource sets, including, for example, one or more cloud-hosted service sets, and/or their own localized resources, for example, including partial access to their networks, devices, systems and/or the like. Such a shift in participant interaction resource availability dynamics may include the use of, for example, one or more isolation techniques, such that members of a group may provide each other with a portion of their storage (and/or other capabilities such as processing, applications and/or the like) capability sets on their machines (and/or networks, cloud service sets, and/or other delegated resource sets), such that resources, which may include for example, messages, documents, images, videos, software applications, and/or the like, may be distributed to these environments for use by (control of which may be under one or more, for example, purpose and/or other specification sets) one or more recipients, and/or shared among a plurality of distributed users, either synchronously, for example, in a common purpose session, and/or asynchronously, for example, in a common purpose session set, or otherwise. As with many other PERCos related computing activities, such situational resource allocation may be, at least in part, under the control of a PERCos embodiment CPFF specification set.

In some embodiments, such CPFF and/or the like sharing may employ, for example a VM set, hosted by, for example, one of the participants, cloud services, distributed sets, and/or other arrangements. These shared resource environments and their associated policies may be persisted through one or more methods, such as a file which is then secured through encryption in an appropriate storage medium.

Some PERCos embodiments support uniquely distributed personal and enterprise social and/or other networking arrangements which differ in certain basic configuration and functionality formulations from currently available, essentially silo vertically configured, commercial offerings (Facebook, Twitter, Google Groups and Google+, Yahoo Groups, LinkedIn, and the like). In some embodiments, PERCos capabilities may support contextual purpose based formulations of environments configured to reflect the objectives, personalities/character, policies and/or related priorities, and/or the like of user communities such as affinity groups, enterprises, ad hoc arrangements of people, as well as those of individual sets. With PERCos capabilities, proffering of information on, for example, community social interaction "walls," can capture and/or otherwise convey the gestalt of groups, as well as organization information, experience processes, and privacy and other policy variables. With such PERCos capabilities, policy variables can be controlled by such respective groups (and/or individuals) and social and/or commercial interaction can take place on the basis of individual and group priority set, and reflect the nature of individual and group character, rather than reflect the commercially controlled, largely self-serving policies, of a centralized service provider. As with purpose class applications and other PERCos frameworks, purpose based user and/or computing arrangement set community policy design and operating criteria may be formulated as common purpose environment frameworks, representing one common, for example, affinity group environment built upon an underlying standardized and interoperable at least in part contextual purpose foundation and supporting common purpose interaction on an affinity group level, as well as supporting user set, including affinity group, interoperability by employing such underlying standardized framework schemas, including contextual purpose specification and environment framework standardized and interoperable structures.

Enabling purpose based. "personalized" community and individual set social and commercial networking can involve various features support by one or more PERCos embodiments, including, for example, some set of:

1. Contextual Purpose interoperable, standardized specification capabilities for social and commercial interaction policy organization, matching, and/or multi-party common purpose resolution.
2. Distributed means to enforce and, as may be necessary, reconcile, independently supplied specifications and/or actions of disparate communities and/or individuals, such as through the use of Coherence capabilities.
3. Capabilities supporting portable PERCos resource instances, such as Formal PERCos Resources, whereby identity information, including for example Repute Cred, EF, and FF, and/or the like and/or other attribute information, can be "mined/published" and distributed in a distributed, reliable, policy controlled, and/or secure manner.
4. Assiduous, for example, existential, identity capabilities enabling a distributed environment to have, for example, in the context of peered arrangements, comparable—and under some embodiments, significantly superior to cloud service silo—identity persistence, trustworthiness, resistance to attack, privacy, situational attribute, management, and other features. Sets of such features may be important in supporting user set satisfying interaction among distributed parties involved in common purpose and "meta" (inter-group) common purpose activities, including supporting interaction between unfamiliar (or, as applicable, largely unknown) to each other user set, as well as unfamiliar (or unknown) to user sets non-user type resources, in a safe, informed, and contextual purpose satisfying optimized manner, for example, based at least in part, upon Repute Cred, EF, FF, and/or the like attribute information and/or other relevant attribute considerations, adaptive to user priorities.
5. Situational identity supporting capabilities, such as those that can be supported in some embodiments by PIDMX and PERCos identity and Coherence services and/or the like, for effective resolving to appropriate interaction common purpose computing situational specifications, including, for example, common purpose specifications.
6. Distributed rights management capabilities where rights and/or other security, privacy, consequence management, and/or the like policies can be reliably associated with resource sets and Participant and/or the like users, and/or Stakeholders and/or the like, in support of informed evaluation and management of resource selection, provisioning, and/or operation, and including, in some embodiments, support for root and derivative identity assiduous biometric certifying authority capabilities supported by reliable assiduous, for example, existential biometric, identity capabilities, whereby authority to certify a resource and/or otherwise act as an agent for a resource Stakeholder, may be delegated to one or more agent party sets such as employees, consultants and other contractors, family members, and/or other trusted parties.
7. PERCos resource provenance capabilities in support of reliable resource evaluations and distributed interactions and other operations, for example, informing as to group membership of parties who are recorded as members of resource Stakeholder and/or Stakeholder agent provenance sets and situational attributes relevant thereto.
8. And/or the like.

Some PERCos embodiments may support the initialization and use of customized and, in some instances, dynamically formed, and relatively ephemeral to persistent for a time period set to indefinitely persistent purposeful PERCos social, commercial, and/or the like networks. Such networks, at least in part, may, in some embodiments, not rely upon a central PERCos authority set such as a cloud service social networking provider/controlling and homogenizing authority, and/or related centralized administrative service enforcing a single, for example, generalized, model set, but may work cooperatively with such for certain, key PERCos related one or more social and/or commercial networking interactions and related functions. For example, a group of people, and/or groups of people in the form, for example, affinity groups, could get together to establish, for example, an ephemeral, temporarily persistent or durable subnetwork, and employ embodiments of PERCos technology sets, including common contextual purpose specification coherence. Such subnetwork members and/or their computing arrangements may exchange authentication/authorization information, establish and/or otherwise agree upon standardization and interoperability expression and interaction specifications, and start such a network, complete with services such as supporting PERCos technology compliant resource publishing, user and resource (including Participant) identification, authentication, evaluation, validation, provisioning, process management (such as event management), and/or resource related information storage and related policy enforcement arrangements. Such a network could be protected by a variety of means, such as for example. Byzantine fault tolerant protocols, webs-of-trust, locally centralized service management, and/or the like, and can enable secure, reliable, persistent resource publishing and identity management systems. Such a network may interoperate with an existing PERCos infrastructure arrangement set and, over time, may accumulate its separate and/or share with other PERCos networking arrangements, Repute Creds, EFs, FFs. and/or the like, as well as other PERCos embodiment compliant resource, contextual purpose, use, and/or the like information bases regarding resource availability, Quality to Purpose of resource sets and/or subnetworks, including related reliability, security, trustworthiness, efficiency, and/or other suitability to purpose attributes and related information sources (user set and/or crowd behavioral, profile, preference, purpose and/or domain class, and/or the like information sets).

Some such PERCos embodiments may provide one or more standardized and interoperable Frameworks for organizing, merging, splitting and/or otherwise managing one or more suitable to purposes, that may be customized, and further may be ad hoc. PERCos distributed arrangements without the need to rely exclusively upon one or more centralized PERCos authority sets, utility sets, and/or coordinator sets (but may work cooperatively with such). Employing one or more Frameworks—for example, common purpose Frameworks for at least in part contextual purpose inter user set environment specification and/or formulation—for such circumstances can provide users with editable and/or directly employable template sets for providing and/or specifying (pre-set and/or variably settable) control and/or capability sets for organizing such distributed arrangements as purpose related distributed environments. For example, such Frameworks and associated support software can support defining target situationally appropriate one or more purpose-related policy sets, resource evaluation capabilities and processes, user interface management, resource provisioning, process-related event management, and/or the like, and where such control and/or capability sets may be consistently or variably distributed, centralized, peer-to peer, and/or the like.

Figure 10:
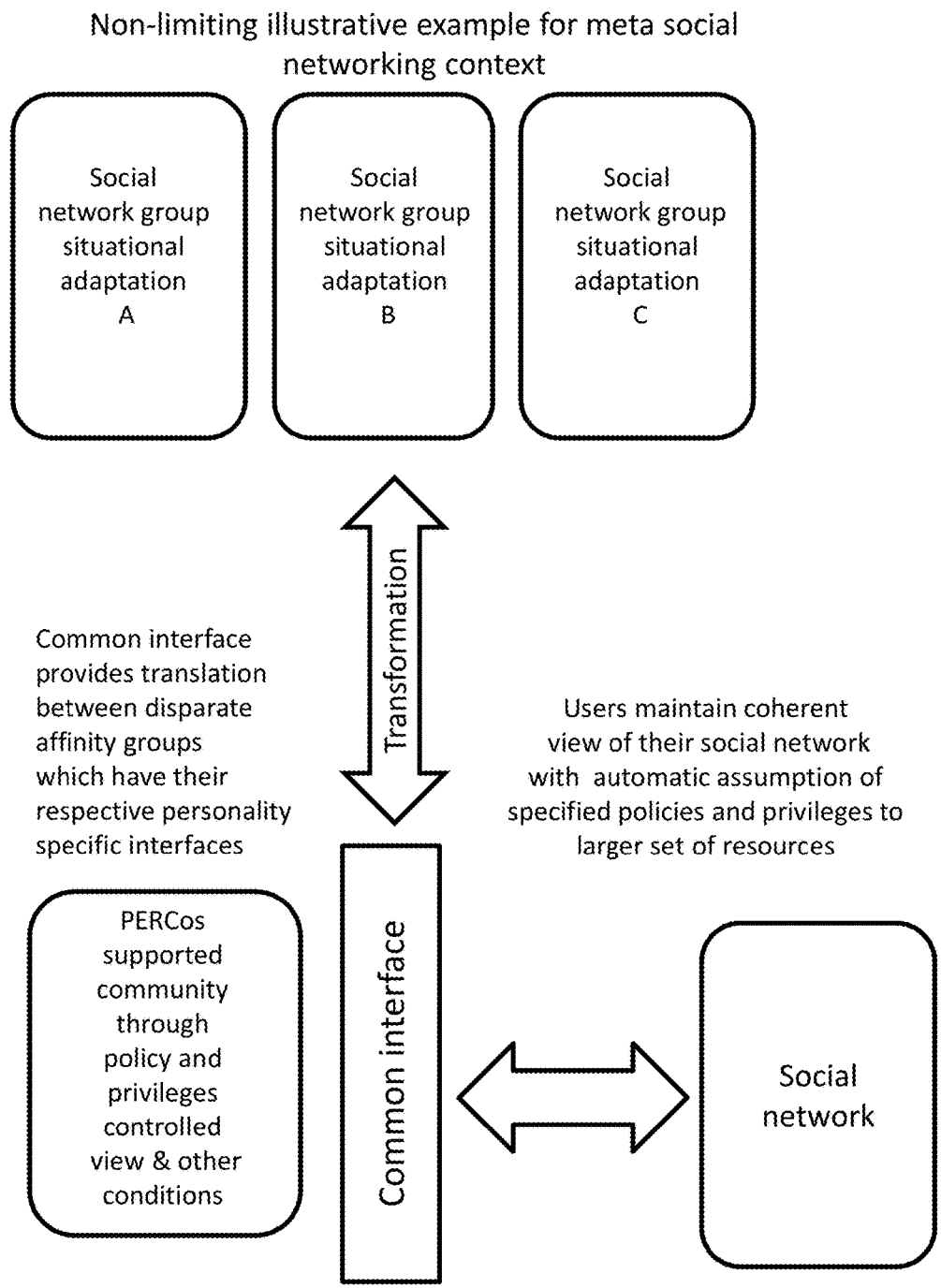
FIG. 10 is a non-limiting illustrative example for meta social networking context.

FIG. 10 is a non-limiting illustrative example for meta social networking context.

Some PERCos embodiments may support the transformation from "simple" social and/or commercial network multi-party sharing to purpose framed communities and interaction management. Users can maintain a view consistent with their existing social network but gain privileged access to a larger set of resources and/or experiences (e.g., sharing photos) based at least in part on, for example, user persona and situational purposeful computing with associated resource policy management. Such models may enable both individual characteristics and other attributes sets of core or atomic or sub plural groupings, such as interface characteristics, policy characteristics, resource employment and availability, and/or the like, while participating in a multi-party to meta-group environment employing standardized and interoperable interface, policy, and resource employment and availability capabilities, including for example meta-group implementations specified by, for example, contextual purpose frameworks. Such meta-group arrangements may have standards for translating between atomic group and/or lower level groupings at least portions of interface, policy, and/or resource employ and availability policies and renderings into common format, common purpose computing standardized and interoperable arrangements, enabling groups to have their distinctive characteristics and meta groups to share and interact using familiar, reliably consistent, and appropriately supportive interoperable standards where, for example, certain content, visual arrangements, access to user sets and/or other rights, and/or the like may be available in the common purpose standardized "format" and other sets of such content, visual compositions, access to user sets and/or other rights may not be available and/or in respective instances, be conditionally available. Further policies of any given group, in some embodiments, may provide input to and/or control, for example, by policy and/or by active selection, regarding what may be made available, by a core group or sub-group, to common purpose meta-group interfaces, content arrangements, resource, user and/or related attribute availability, and/or the like, from their own such arrangement types, that is certain visual characteristics of one group may not be displayed to a meta-group, or may be displayed in a converted/modified fashion so as to conceal, secure, and/or otherwise maintain proprietary, at least in some manner, to such core or sub group arrangement.

Figure 11:
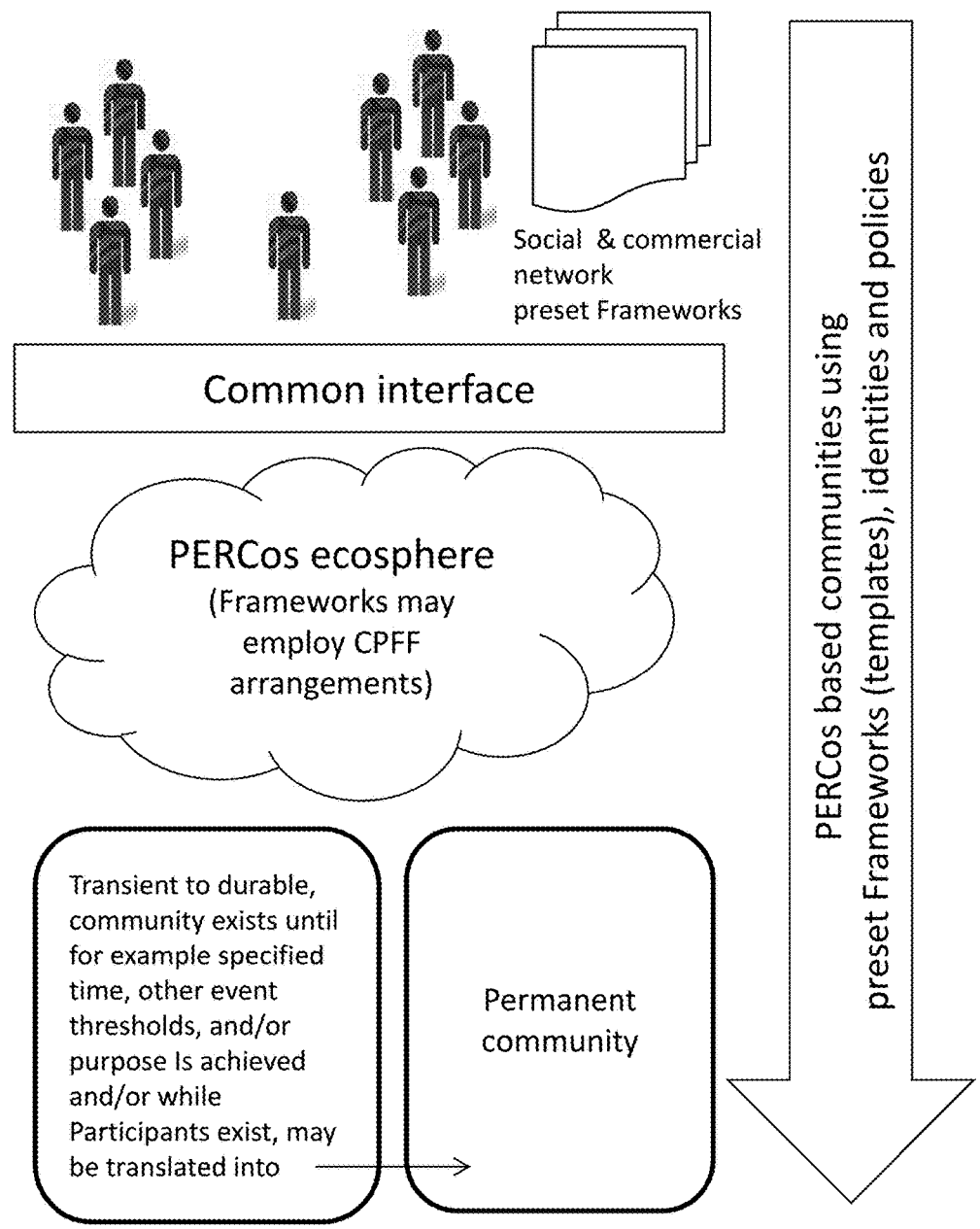
FIG. 11 is a non-limiting illustrative example of creation of purpose based communities using published PERCos Frameworks.

FIG. 11 is a non-limiting illustrative example of creation of purpose based communities using published PERCos Frameworks.

Some PERCos embodiments may support the creations of communities both transient and permanent using published Frameworks as templates. Communities may transition from being in a transient state to a durable permanent state.

Figure 12:
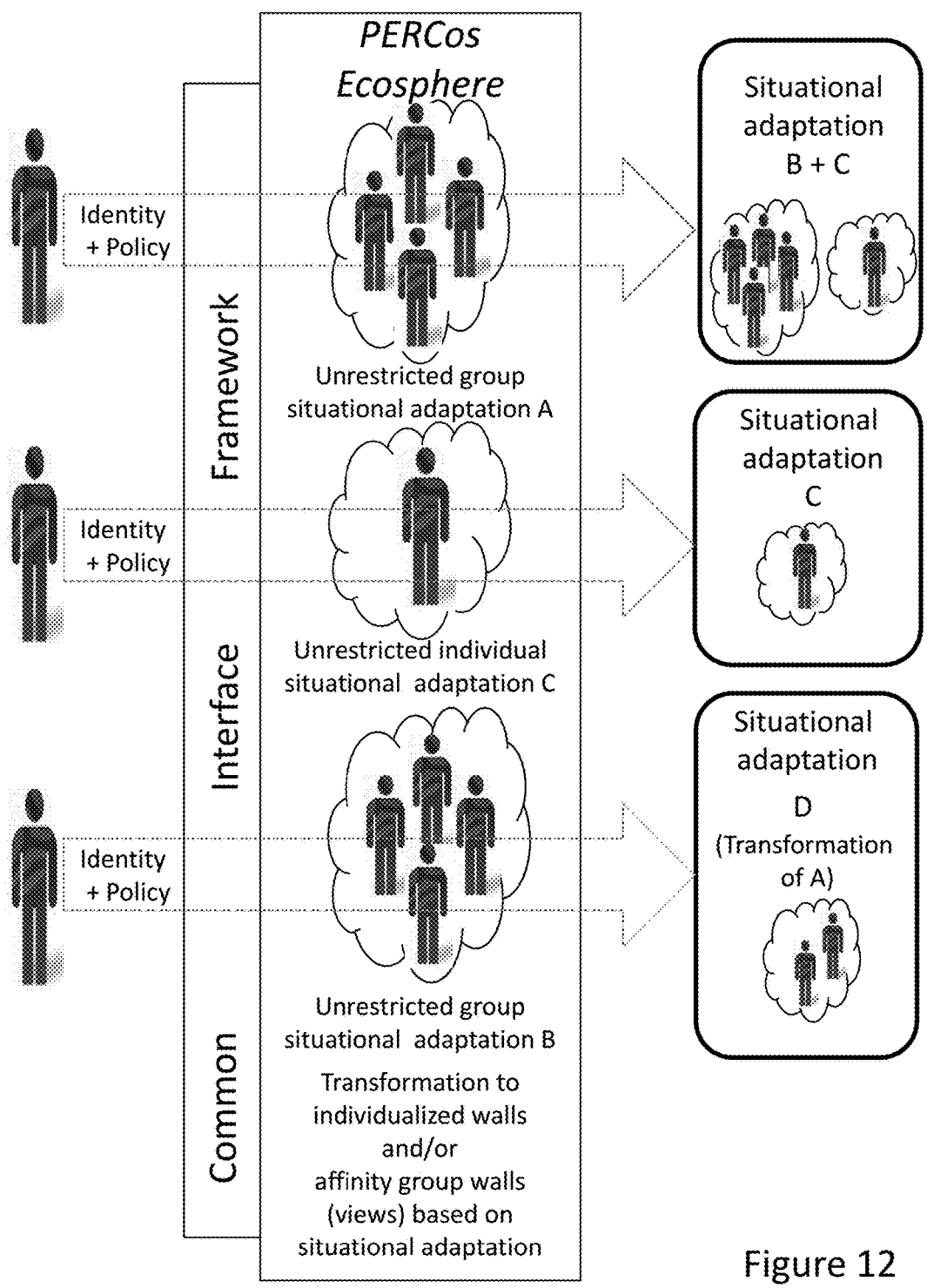
FIG. 12 is a non-limiting illustrative example of standardized and interoperable Framework common interface.

FIG. 12 is a non-limiting illustrative example of standardized and interoperable Framework common interface.

Some PERCos embodiments may support the creation of policy-managed view (walls) and/or based at least in part on existing individual social network profiles and/or social network communities. In some embodiments such views may be enabled by standardized and interoperable Framework common interface. Further, such distinct character individualizations for given user sets (including, for example, large affinity groups, including commercial social networking environments), can include policy management for other aspects of content management, such as rights management concerning access to various content locations (such as web pages), types, specific portions within walls or other content/information views, including any user set desired privacy, content presentation, and/or other applicable policy specifications and arrangements. These views may be derived directly or indirectly from existing groups and/or individual profiles and interaction with views can be, for example, managed by view policy requirements and/or preferences of one or more participating Groups, such as Group A can access x set of information from Group Y's network, but not Group Y's z set of information. Creation of these views (walls) may be based at least in part on user identity and/or other associated policy information, through expression types and/or metrics. Such policy expressions may be constrained by distributed networks social interaction "platform" requirements related to interoperability, including, for example, specifications for presentation through transformation into "common" (e.g., standardized) inter-party view sets, such as, for example, resulting from the use of contextual purpose, party identity related, and/or other presentation arrangements.

Figure 13:
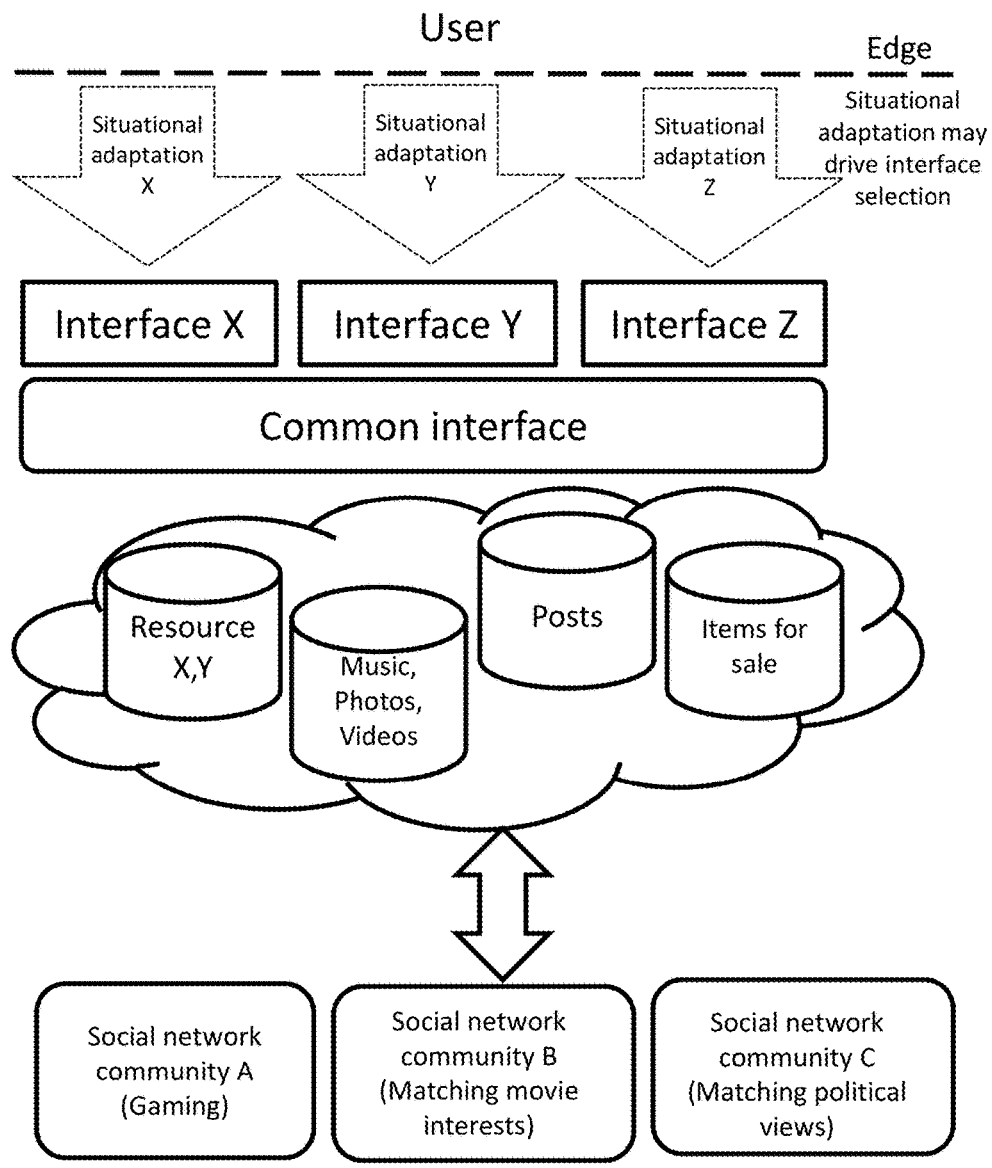
FIG. 13 is a non-limiting illustrative example of contextual purpose situational interfaces and common interface adaptation.

FIG. 13 is a non-limiting illustrative example of contextual purpose situational interfaces and common interface adaptation.

Figure 14:
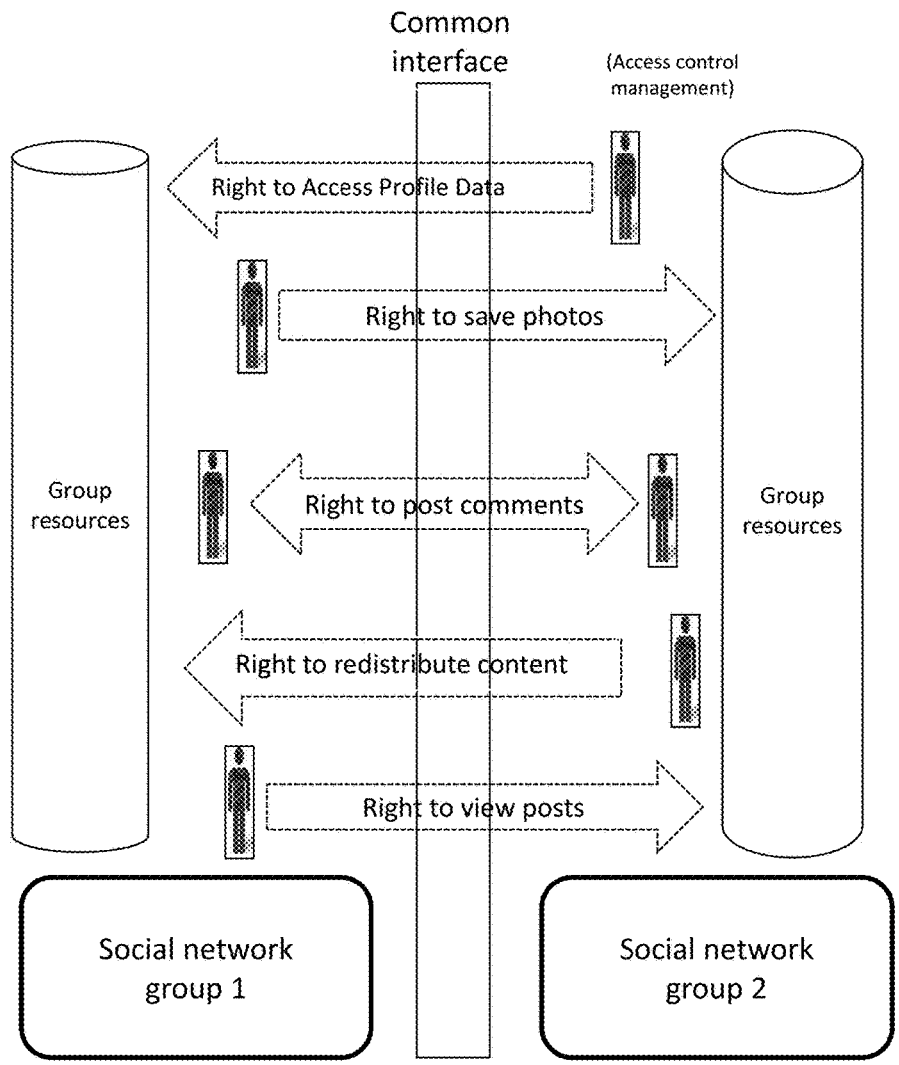
FIG. 14 is a non-limiting illustrative example of granting of rights based on situational adaptation.

FIG. 14 is a non-limiting illustrative example of granting of rights based on situational adaptation.

Some PERCos embodiments may support the creation of a variety of resource arrangements that can be grouped into social network communities that exploit resources from a large, disparate universe of resources and resource set implementations. These arrangements may be derived directly or indirectly from existing groups and/or individual profiles and configured to policy/purpose priorities of participating entities (including, for example, individuals). Creation of these distributed resource arrangements may be, at least in part, based at least in part on user identity and/or other policy sets associated with user context—contextual purpose specifications, profiles, preferences, user historical and/or crowd related information, and/or the like—and/or with policy sets associated with resources deployed for use in such arrangements. User set persona, e.g., a user's situational attribute related set, may be used to automatically designate, select, use specific interface(s) that may be tailored to the specific purpose(s) associated with, including for example specified by, aspects of a user set's situational adaptations.

In some embodiments, a common meta interface may be used to provide policy management and content arrangement that may then be updated in various individual group environments, such as not having certain information, such as a portion of an information update, go to a user's Facebook wall, but have the user's personal, or corporate page updated with the full set or variably with differing portions of the update information, and where the foregoing could be based at least in part on such updates purpose class information, such as associated the full set to one purpose class, and any portions thereof to be differentially handled as regards to updates and/or other policies regarding updating associated social and/or commercial networking user set instances.

Figure 15:
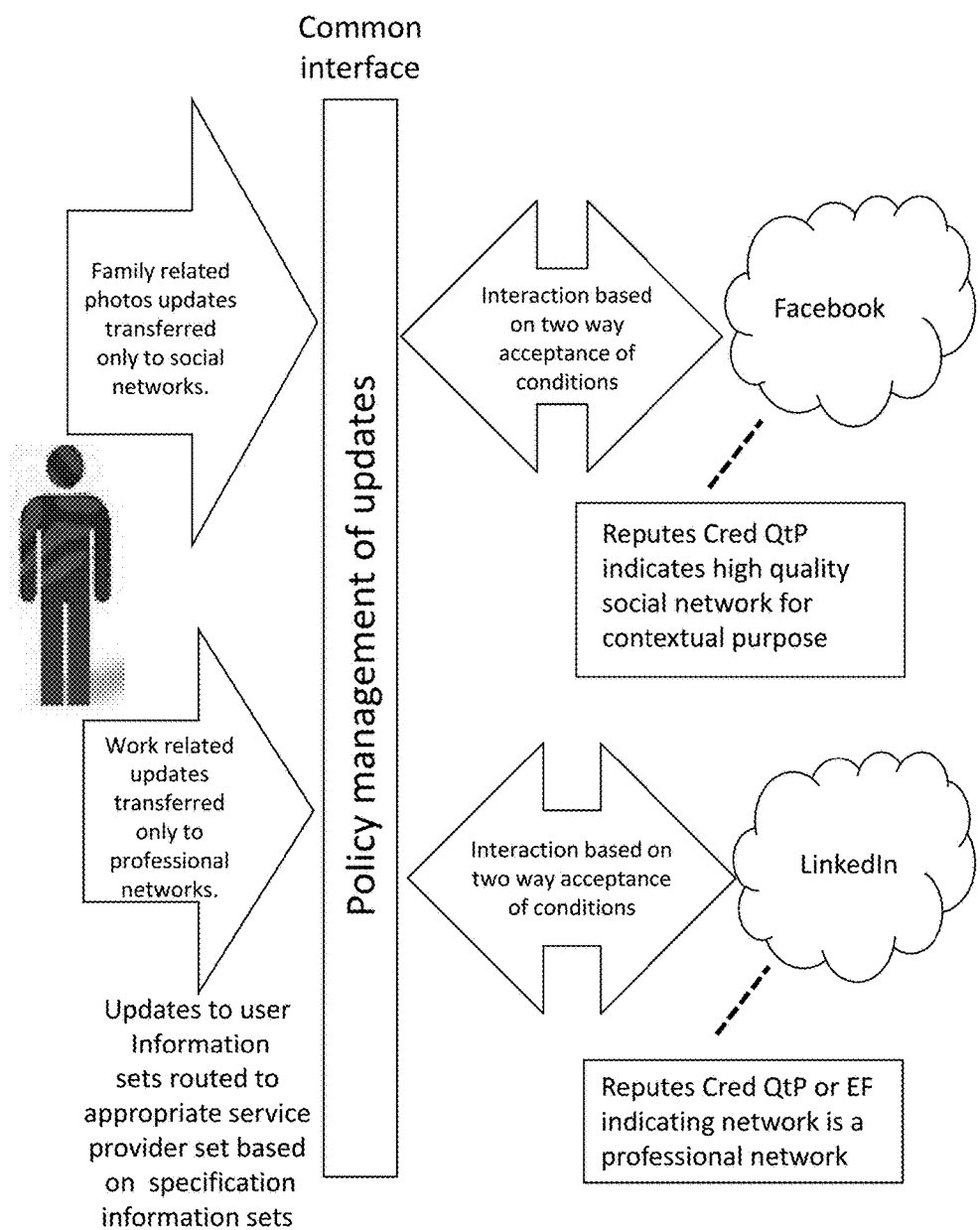
FIG. 15 is a non-limiting illustrative example variable, policy controlled update process between cloud services and PERCos common interface.

FIG. 15 is a non-limiting illustrative example variable, policy controlled update process between cloud services and PERCos common interface.

In some embodiments, coherence processing sets may enable a resource set to determine the efficacy and/or relative optimality of its interaction in pursuit of a target purpose set with other resource sets by cohering and resolving their identity attributes and/or other purpose-related specifications, such as potential operating conditions, as may be included in Purpose Statements. Further, for example, various initial candidate resource sets, when combined, for example, with a user computing arrangement Foundation, may be compared to evaluate its estimated relative performance in Quality to Purpose satisfaction relative to other potential sets. Also, differing user computing arrangement conditional Foundations may be evaluated as to conditional resource sets requiring, for example, certain conditions, such as a user decision to be made before being available (for example, a user has a license, for example, to cloud service X, which gives a discount to content type Z, rather than X making it generally available without a user decision set).

For example, a resource set. $RS_z$, may have identity attributes that specify constraints regarding resource sets that $RS_z$ may interact with. For example, to construct an optimal resource arrangement, a PERCos embodiment may need to cohere and resolve specifications of resources in the resource arrangement to ensure mutual satisfaction of Stakeholder purpose specification specified requirements. For example, $RS_Z$ may have a specified attribute set that stipulates it will operate with a resource $RS_X$, but not with a resource $RS_Y$; and/or resource $RS_z$ and resource RSx will have conflicting requirements regarding reporting aspects of user purpose fulfillment session usage information which may support the free availability of resources, where such different resource sets each require exclusive usage rights to such usage information that characterizes (or otherwise contributes to characterizing) a user set's use of a resource set; and/or where resource $RS_X$ has certain interface requirements for interoperating with another resource set when resource $RS_X$ is functioning in resource arrangement role AB and its operation is dependent on interoperating with a resource having a resource arrangement role CD and where such respective resource $RS_z$ and $RS_X$ sets both need to support the same interface specification MN.

As an additional example, suppose that $RS_1$ is a highly confidential product development information set. $RS_1$'s identity. $ID_1$, may have one or more identity attributes that express a specification set, $SP_1$, indicating an authorization set, $Auth_1$, which any resource set needs to comply with in order for $RS_1$ to interact with them. Before $RS_1$ interacts with any resource set such as, for example, a Participant, $Part_1$, coherence processing may cohere and resolve $RS_1$'s identity attributes with $Part_1$'s identity attributes, such as, for example, ensuring that $Part_1$ has sufficient authorization, such as, $Auth_1$. In turn, $Part_1$, may have identity attributes that refer to and/or contain one or more profiles, preferences, authentication information, authorizations, Repute, and/or the like information, of $Part_1$'s user or Stakeholder instance, and a software resource set may have identity attributes that correspond to associated descriptive CPE sets, purpose classes and/or other purpose neighborhoods. Reputes, other attribute, and/or the like information. In such a case, coherence processing sets may cohere and resolve identity attributes by cohering and resolving specification sets they refer to and/or contain.

In some embodiments, coherence processing sets may perform a wide range of operations throughout PERCos Purpose Cycles from purpose specification related operations, for example, formulating Purpose Statements and purpose operating specifications and/or applying Resonance specifications, to supporting unfolding user purpose formulations such as performing, in response to specifications, background coherence during purpose class application operations, to purpose fulfillment results processing. Coherence operations during unfolding user purpose formulation on behalf of a user set in pursuit of a target purpose set may include cohering and resolving the identities and situational identity attributes of relevant resources, such as Participant sets, as they relate to, for example, such user set Participant identity, target contextual purpose attribute information relevant to their situationally specific target purpose fulfillment operations, and further evaluating resource set attributes for purpose fulfillment consistency (such as, for example, evaluating resonance algorithms, AI expertise, Frameworks such as Purpose Class Applications, purpose classes and/or other purpose neighborhoods. Reputes, information resources, cloud services, and/or the like), identities of resource Stakeholders of identified and otherwise consistent resource sets, and/or the like, so as to produce target purpose evaluative and/or operational resource sets. For example, a user's Participant identity has a contextual purpose situation-specific related attribute set specification, requiring a high level of integrity, security, and reliability. Coherence processing may, for example, include ensuring that resource sets used to support purpose formulation (and their associated publisher Stakeholder sets) comply with the respective users sets' requirement set.

In some embodiments, coherence processing sets may enable resource sets in pursuit of fulfilling a target purpose set to at least in part assess sufficiency of another resource set by cohering and resolving their identity attributes. For example, suppose $ID_1$ is an identity of a resource set. $RS_1$, containing highly confidential product development information. $ID_1$ may have one or more identity attributes that express a specification set, $SP_1$, requiring a condition of trust that any resource set, $RS_2$, that interacts with $RS_1$ will not disclose confidential information from $RS_1$ and resource set, $RS_1$'s Stakeholder publisher has a sufficient Quality to Purpose trustworthiness aggregate Cred value where such aggregate Quality to Purpose trustworthiness values where assertions contributed by parties having Effective Fact (e.g., industry category, revenue, and/or the like) characteristics similar to the Stakeholder publisher of $ID_1$. Before creating a resource set where RS and $RS_2$ interact, a PERCos embodiment may ensure, for example, using its Coherence service set, that the identity of $RS_2$ satisfies the desired, specified, degree of trust set specified by an $ID_1$ attribute set.

In some embodiments, a coherence processing set may elevate coherence resolution to a "higher-order" authority coherence arrangement such as, a network and/or cloud service administration coherence arrangement, which may have further relevant attribute information and/or may evaluate overall balance of interests, for example, in regards to a balance of trade-offs for target purpose fulfillment. Such "higher-order" authority, for example, an administrative authority within a corporation, may evaluate, given contextual purpose specification considerations and/or the like, whether the corporation's balance of interests merits an exception to such an attribute requirement. Such "higher-order" authority coherence arrangement may resolve $sp_1$, at least in part, with or without cooperative processing, with such one or more "lower-order" authority Coherence arrangements, such as, for example, user set computing arrangement node Coherence instances. Such elevation can be stepped through a sequence of elevation arrangements if a given coherence arrangement instance is unable to adequately satisfy requirements and/or related optimizations in accordance with specification and/or user set indication/ selection. Such elevation may involve such attribute (and/or other specification related) requirement conflict, for example, a best resource set to purpose, but given one failure related to matching purpose specification attribute requirements to resource attribute (or related) sets, being presented to a higher order authority existentially biometrically authorized Participant and/or the like individual for a cross-Edge decision, such as selecting and authorizing an override to an attribute set requirement set.

For example, in some embodiments, a network administrative or a group administrative coherence arrangement may elevate one or more portions (or all) of $sp_1$ to a cloud service utility set and/or governmental authority independent of user and/or associated administrative participants perspectives. In some cases, such resolution may result in requesting a user for guidance, such as, for example, requesting permission to acquire the needed resource set (at some cost) or to use other another Framework set that may enable the user set to obtain a resource set having optimal or required performance characteristics, but may not satisfy at least a portion of the user sets attribute related security requirements.

In some embodiments, coherence authority may comprise, at least in part, one or more authorized through certification attributes, human instances, which may be plural parties, and where such plural parties may function at different authority levels within an organization, and where such human instances may directly make coherence decisions, for example, on behalf of government regulatory, social affinity group, and/or corporate administrative entities (for example, Participants).

In some embodiments, a coherence authority arrangement, requested to resolve a set of situationally specific specifications of one or more users and/or Stakeholders in accordance with purpose-specific specifications and/or some profile specification sets, may negotiate with multiple "lower-order" coherence authority arrangements, such as, for example, user computing arrangement node coherence instances negotiating, in a weighted, by seniority and/or some other weighting scheme set, to produce a democratically, or otherwise equitable or agreed to given the conditions, target purpose-specific specification, profile, and/or other specification set.

In some embodiments, coherence processing in support of unfolding purpose development may include resolving input specifications, provided by plural to potentially a large number of sources, such as, user providing and/or selecting CPE sets, experts providing resonance algorithms, Stakeholders providing relevant Reputes, Frameworks that may provide scaffolding to frame user inputs and provide interactive interface environments for contextual purpose sets, other resources, and/or the like. For example, suppose a user wishes to perform online banking related functions. Coherence processing may include resolving a user sets' situational identity attributes, such as attributes that express the user's preferences for privacy with the identity attributes that express the bank's interests, requirements, and/or the like. For example, coherence may configure whether the bank may share information about the user to partner organizations based at least in part on user preferences, and a user may have a subscription to certain investment advisory information which may be applicable to certain banking activities, and where such investment advisory information application set is coherable with, that is consonant with, banking services security policy requirements, since such application set attributes and Creds describe satisfactory security characteristics.

In some embodiments, coherence processing may include evaluating and selectively cohering and resolving identity attributes of multiple Participant identities involved in multi-user common purpose operating sessions. For example, suppose extended family members of a social network wish to have a common purpose operating session to exchange family news, some of which is confidential. A coherence processing set may analyze target purpose situationally applicable identity attributes (including those that express preferences, and those that express Effective Fact filtered Aggregate Creds regarding Quality of Trustworthiness) of all the extended family members to detect possible conflicts, and may try to generate a cohered purpose specification that would provide optimal results, as well as present, for example, a list of one or more family members that might require, for example, a written confidentiality agreement, or might be precluded from attending the common purpose session. For example, some members of the social network group may want to restrict the dissemination of certain information to a specified collection of other members and/or some members of the social network may have constraints on what content they want to receive.

For example, suppose a user, $U_1$, is interested in exploring online brokerage firms. $U_1$ may have a Participant identity, $PId_{U1}$, whose attributes refer and/or contain $U_1$'s profiles and preferences (such as, for example, $U_1$'s need for privacy, integrity, preferences for fixed income investment, preference for a global mixture of assets, specified budget levels, and/or the like), and/or the like. Brokerage firms also have Participant identities representing their commercial interests (such as, for example, fees for their services), requirements (such as non-repudiation, security, integrity, and/or the like). Stakeholder Participant Repute and/or the like information, as well as comparable Participant information describing their applicable employees and/or agents, and/or the like.

Coherence processing sets may cohere and resolve $PId_{U1}$'s identity attributes with identity attributes of Participant identities of and/or otherwise germane to, such brokerage firms. For example, suppose a brokerage firm, $B_1$, may use a proprietary software package, $soft_1$, to provide its proprietary services, which are associated with $B_1$'s Participant identity $PId_{B1}$. $PId_{B1}$ may have identity attributes expressing requirements stating that users must be strongly authenticated using assiduous existential biometric authentication to use any of its proprietary services and agree to pay associated fees for using them. Coherence processing set may compare the fees associated with $soft_1$ with $U_1$'s budget to determine their consistency. Further, Coherence may assess whether a given brokerage firm, and/or its applicable one or more employees have sufficient Quality to Purpose Cred and/or the like ratings regarding global asset investment, versus a concentrated knowledge in North American assets. If the applicable contextual purpose expression, preference, profile and/or like information of both parties is not sufficiently consistent, Coherence processing may exclude $B_1$ from candidate set of brokerage firms, and if the contextual purpose comparison analysis is a comparatively optimal result, such $B_1$ may be prioritized as a candidate, most user set contextual purpose compatible, brokerage firm.

In some embodiments, identity attributes may require updating, for example, acquisition of more current, and, for example in some case tested for a result set, information such that certain identity attribute information may express situationally-relevant purpose specifications that may require dynamic and/or periodic adjustments. Such adjustment may be applied to ongoing contextual purpose related activity sets through updating attribute information and, if modified, or modified beyond certain specified extent, may notify user sets and/or resource providers, including, for example, requiring user set and/or resource Stakeholder (which may be provided by an authorized agent) input. For example, suppose security experts found security vulnerabilities in $soft_1$. In such a case, identities attributes of $PId_1$ may reflect this change and as a result, its identity attributes may no longer be consistent with $U_1$'s identity attributes specifying $U_1$'s security requirements and, for example, such user set may be notified, and/or the cohered operating specification set will no longer execute unless appropriate modifications and/or further specifications and/or authorizations are made.

In some embodiments, purpose fulfillment processing in pursuit of a situational contextual purpose set may identity, select, and provision one or more resource arrangement sets, one or more of which may dynamically and situationally adjust to the requirements specified by the situational purpose specifications, including specifications supporting recognition of, and/or response to, event "triggers" precipitated by session information one or more developments.

For example, in some embodiments, during the process of identifying and selecting resources for an operating session, coherence processing may evaluate, for example, which identified resources both meet the requirements of a user set target contextual purpose expression and/or Purpose Statement and/or the like set and of other selected and/or candidate resources, for example as combinatorial sets, and may use the results of such evaluation to guide the selection process, for example, by cohering selected and/or newly assembled contextual purpose fulfillment purpose class applications and/or by presenting to such user set a prioritized set of potential contextual purpose resource set options, which such prioritized set may include values reflecting one or more of the information variables and/or coherence employed Quality to Purpose assessment values for user set evaluation and/or modification. For example, a user exploring brokerage firms may have investment budget preferences, fee preferences, Quality to Purpose for investment Cred and/or the like type preferences, physical proximity to user set preferences, and/or the like, that may be cohered with the fee structures, locations. Cred Quality to Purpose assessments, investment portfolio size, and/or other relevant attributes related to accounts at different brokerage firms. Such coherence processing may guide the selection of those brokerage firms that best meet the user purpose.

In some embodiments, coherence processing may process specifications associated with an input framing of user purpose and/or with resources in a resource arrangement to find "shadow" resources that may be associated with a resource arrangement for use when adapting to changing situations and/or for potentiating such resource arrangement performance effectiveness quality to target purpose. For example, suppose that a brokerage firm, $B_1$, has some requirements on the security of the user's computing arrangement when the user is interacting with $B_1$'s software, $soft_1$. This specification may allow the user to continue working with his or her general purpose operating system when the threat level is low (e.g., a threat situation less than or equal to 3) (or under certain other potential higher security threat circumstances, such as user set computing arrangement being used, for example, at a more vulnerable physical and network configuration location), and may require a more secure system when the threat level is higher:

```
(security contextual variable (seniority = 5)
   (if required-rigor-level <= 3 then
      (performance >= 8 and ease of use >= 6 and security) > 4 and reliability > 5)
   else
      (required-rigor-level (security) > 7 and reliability > 8 )))
```

With such a specification, a PERCos embodiment may identify, select and provision resources from the user's general purpose operating system that comply with this specification set in normal circumstances where the threat level is low and identify and select (and/or acquire), if available, shadow resources, with a higher degree of security assurance, from and/or for the user's computing arrangement use for such case when the threat level is high.

Once a set of resources have been identified, selected and provisioned in an operating session fulfilling a user purpose, situational particularity monitoring may invoke coherence to adapt to changes in a current situation to ensure that operating resources in the operating session are mutually compatible and still meet the requirements of a user set target purpose. For example, consider an operating session comprising a purpose class application, $soft_1$, provided by a brokerage firm operating on some general purpose operating system resources from a user's computing arrangement. If the situation changes, e.g., the threat level increases to a high level of threat, the user's general purpose operating system may no longer be compatible with the security requirements associated with $soft_1$'s identity. Particularity monitoring may respond to such a change in the threat level by invoking coherence to identify, select and/or provision resources from the user's computing arrangement, and/or, for example, involve the associated user set in evaluation, authorization, and/or selection processes, regarding provisioning a resource set that is compatible with $soft_1$'s requirements related to a higher threat level.

PERCos Identity Services (PERID), PERCos Information Management Services and PERCos Identity Matrix (PIM) identity management embodiments can, in some embodiments, provide a wide range of identity management capability sets including tool sets and service sets, and/or the like for collecting, accepting, organizing, storing, identifying, selecting, retrieving, and/or otherwise managing vast arrays of identity-related information sets. These capability sets enable effective and efficient establishment of reliable situational identities that users. Stakeholders, process sets, resource sets, and/or the like can use to perform purposeful operations sets in pursuit of situation-specific target purpose sets.

For example, consider a CPFF, $CPFF_1$, that enables advanced students, teachers, researchers, and/or the like to explore physics knowledge sets. An identity management embodiment may collect and/or accept vast arrays of identity-related information sets on $CPFF_1$ so that when a student who has both a strong mathematics and general physics background requests to explore physics knowledge sets, $CPFF_1$ may establish a situational identity reflective of such student so as to enable the student to evaluate and assess $CPFFInstance_1$'s sufficiency in satisfying his/her target purpose.

Figure 16:
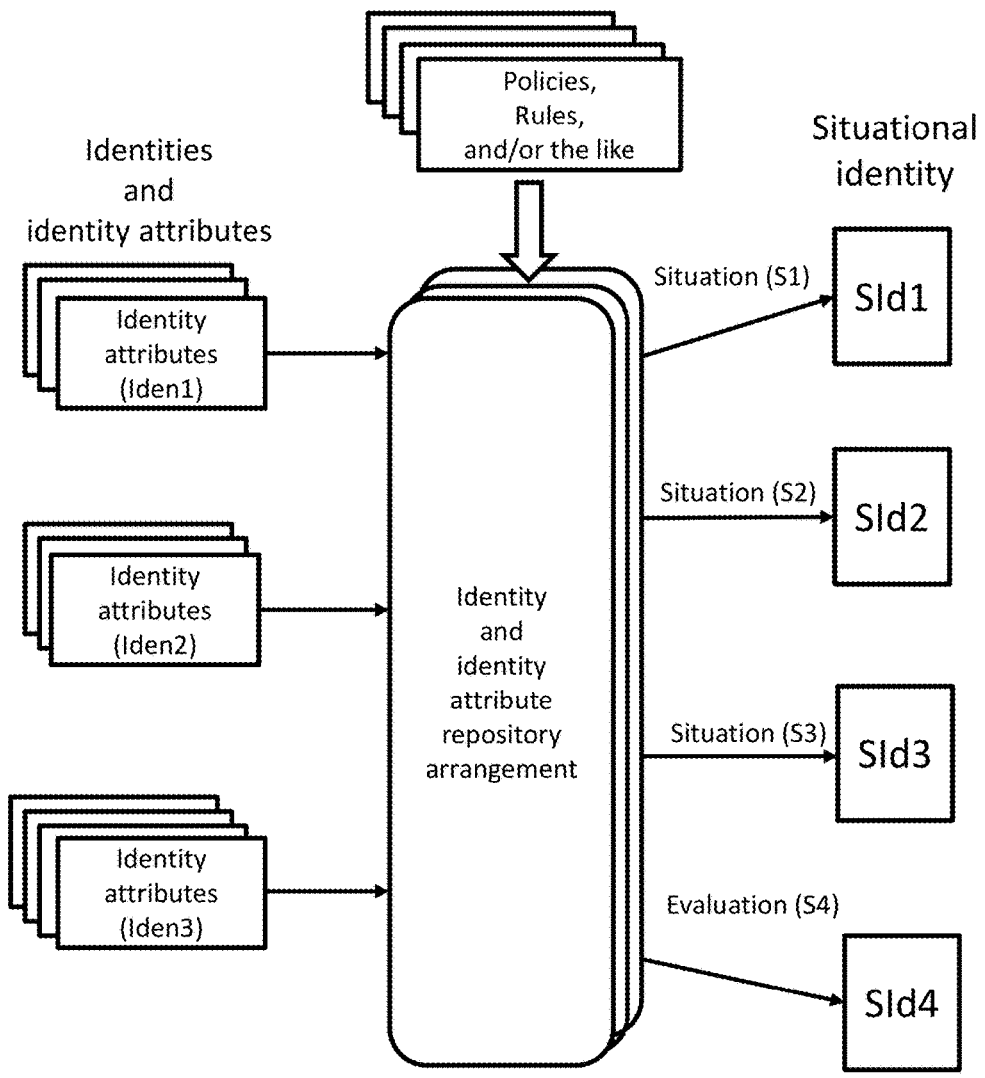
FIG. 16 is a non-limiting illustrative example of identity attribute arrangements.

FIG. 16 is a non-limiting illustrative example of identity attribute arrangements.

In some embodiments, as shown in FIG. 16, identity management embodiments may separate collection and storage of identity attribute information from their usage, such as, creating situational identity, for example, comprising a resource set identifier set and associated attribute information substantially germane to such resource set identifier in the context of a target contextual purpose set and related conditions and characteristics (e.g., relevant profile, preference, historical behavior, Cred, user computing arrangement environment (including, for example, other resources) and operating context, and/or the like), and/or evaluating such identifiers and at least a portion of such attributes to assess resource (including, for example, resource portion) optimality in pursuit of situational specific target purpose sets. Collection of identity attribute information of an instance set including, for example, resource sets, including a Participant set; other user sets; contextual purpose sets, including, for example, purpose class sets' user computing arrangement and/or environment sets, including for example, environment sets at given locations (where such environment sets may be any one or more portions of such environment instances) and/or the like—may occur during the lifecycle of an instance set to capture a wide range of operations (such as its creation, modification, interaction with other resources, publication of its Reputes, relationship set with contextual purpose and/or other purpose related specifications including, for example, relationship set with contextual purpose classes, and/or the like), and/or the like in a variety of situations. A resource set may, at least in part, be evaluated in accordance with control specifications and any associated algorithms and/or values, including, for example, any relevant policies and/or other rules that may govern access to and/or interpretation of identity information in fulfillment of a situation-specific purpose set.

For example, suppose a person registers his/her existential multimodal biometric information set as a Participant information set using time stamped information instances extracted from an ultrasonic fingerprint scanner, voice scanner, ultrasound receiver, and video camera set, augmented by both pseudo-random ultra-sound emitter information and biometric timing anomaly analysis. Depending on such person's specific target purpose as a user set, the user set and any associated resource, such as cloud service, requirements, such user may need to submit to authentication of varying strength when subsequently pursuing a given purpose set. For casual web browsing in a PERCos environment, the user might not need to submit to any authentication, whereas for a high-value financial transaction, the user's financial institution, and/or a purpose class, such as one that may be managed by a CPFF, may require that such user undergo assiduous, for example existential, liveness, and/or emitter, such as ultrasound at least in part based challenge and response and associated timing anomaly, testing authentication.

Moreover, for example, in some embodiments and operating models, the financial institution may perform further liveness detection (such as including challenge questions and response) and/or persistent or periodic timing anomaly testing to ensure such user's effectively continuous presence during sensitive operations and/or information display and/or other communications.

In some embodiments, identity framework may enable a user set to organize his authentication information set at least in part to accommodate his purposeful activity types, other conceptually logical organizational arrangements, and/or as associated with Stakeholder resource related requirements. For example, such a user set may organize identities of people based at least in part on user set relationships with them, such as, immediate family, extended family, close friends, professional colleagues, acquaintances, and/or the like, and may further organize these groups and/or their members according to contextual purpose classes. CPE specification sets, and/or other purpose related specifications. In doing so, the user set may be able to create ad hoc contextual purpose networks. For example, a user set may create an ad hoc network comprising its extended family members so that the user set can keep in contact with such members, and such ad hoc network may be at least in part mutual in that the user set may join with other, in this example, extended family member sets, to create an extended family common purpose networking arrangement. Such arrangement may organized be as extended family member based network arrangement, with close family units functioning as subgroups of such metagroup extended family network, and where each member of a subgroup, each subgroup, and/or the metagroup, may maintain rules and/or other policies regarding interaction, sharing, privacy, content usage other conditions, and/or the like common purpose environment policies. Such "compound" networking group and member arrangement may operate in accordance with such member and group specification sets seniority of rules and controls authority schema, which may cohere, in given target purpose interaction circumstances, into, for example, operating target contextual purpose specifications compatible with the contextual purpose specifications set of such metagroup, subgroup set, and/or grouping of individual users, in compliance with the coherable interests of each party, that is each group and members conditions and specifications. In some embodiments, in such circumstances, conflicts among inter party rules and/or other policies and/or target purpose related specifications may be resolved by, for example, coherence services and/or group and/or member corresponding user and/or administrative set input, or such coherence may declare such coherence resolving process as situationally, operationally invalid due to, at least in part, conflict between such multi-party rules and/or other policy instances and/or a lack of required information completeness.

Any such family group may also create a larger ad hoc network that may include user set friends, colleagues, and/or acquaintances. For this larger network, as for an extended family meta group, a user set may use a template set that allows the user set to establish an authentication and/or other factor set identity evaluation policy and/or other rule set based, for example, on user sets relationship with other user sets (including, for example, such groups), and where such relationship set may be, at least in part, for example, based upon shared usage of, interest in, and/or involved resource set relationship with, contextual purpose related specifications, such as CPEs, Purpose Statements, operating specifications, and/or the like. For example, suppose a group of friends decides to have an online video based get together. Given that they are all friends and, under most circumstances, can reliably recognize each other, the policy may require a relatively weak authentication process. However, if a get together involved distant acquaintances who may not be well known to other session participants, then a policy set may require a much stronger authentication, and/or evaluation and/or validation of the acquaintance's Participant registered and published resource set along with applicable, associated Reputes such as Creds, EFs, and/or FFs, and/or the informing reputation and characterization information.

In some embodiments, PERCos may provide flexible capabilities for enumerating and/or characterizing resource sets (such as, for example, purpose sets, purpose classes and/or other purpose neighborhoods. Participants, Frameworks including purpose class applications, attribute resource instances. Reputes, software, documents, databases, devices, resource logical portion sets, and/or the like) and/or portions thereof with contextual attributes that may be situationally applied, where instances of such contextual attributes may comprise any descriptive concept or quality of any identifiable subject, whether such instance is a "simple" quality, such as the color "red," or comprises a plural attribute conceptual and/or computer interpretable logical arrangement, such as a PERCos descriptive specification, Resonance algorithm, and/or the like.

For example, consider a PERCos Formal resource. Such a resource has at minimum a persistent identifier, a Stakeholder publisher, a contextual purpose expression, and a subject matter (which is at minimum some human interpretable descriptor of, including a reliable unique identifier of or reliable pointer to or some indicator that there is no reliable identifier or pointer for and the subject is defined by the resource subject identifier itself and has the indefiniteness of a conceptual abstraction, a quality or thing perceived). Each of these four instances may, in some embodiments, constitute attributes, where, for example, the identifier may be an alphanumeric string, the subject matter might be a name and version, for example, of a software program and a location pointer, the Stakeholder publisher might be an instance of a Participant resource information set or a pointer thereto, and a contextual purpose expression comprising at least two attributes, a verb (specified or inferred) and a domain category (noun).

In some embodiments, users and/or user groups (such as, for example, tenured professors of physics, Mercedes licensed auto mechanics, board members of public US companies, members of the AKC, and/or the like) generally have one or more contextual attribute sets that characterize them. For example, a user who is a tenured professor of physics at MIT may have attributes, such as, the user's academic credentials, rank, and/or the like.

In some embodiments, PERCos attribute capabilities may comprise and/or support some or all of the following:

One or more Unique IDs
One or more names for attribute sets
"Handle" IDs, which may be employed in different contextual purposes and have differing associated rights, usage consequences, privacy considerations, and/or the like
Status, such as, whether an attribute set is resolvable, and/or complete, incomplete, or unknown, where the status of an attribute set is indicated as:
Resolvable of its value set can be, for example, reliably obtained to a specified degree and/or in accordance with one or more specified method sets.
Complete if its full value set is available.
Incomplete of it is known or anticipated that the value set is not full or finished.
Unknown if it is unknown whether it is complete or not.

Type, such as Repute Cred Quality to Purpose, Effective Fact, Faith Fact, authentication, attestation, location, color, size, interface, and/or the like.
Method sets for calculating, evaluating, and/or otherwise generating attribute value sets and/or value sets representing at least in part data and/or structured information such as attribute information, purpose specifications (such as CPEs), and/or resource sets.
Method set for validating attributes, such as, their integrity, authenticity, reliability, and/or the like.
Integrity, confidentiality, and/or the like protection over attribute contents
Situational and/or other event attribute management control that is at least in part responsive to situational contextual purpose specification information (including, for example, purpose class and/or operating specification situationally specific information). Such control capabilities may at least in part manage attribute set privacy, usage consequence, combinatorial consequence, CPFF and Awareness Manager, and/or related operations.
Generalized attribute relationship framework for capturing, storing, and/or otherwise managing attribute relationships.
One or more contextual information sets, such as, what (resource sets), who (Participants), where (environment), and purpose. In some embodiments, contextual information set may be expressed as one or more (contextual-axis name: axis value-set) pairs. For example, an attribute set may have one or more purpose axis pairs, where value of purpose axis may be a CPE set, purpose class and/or other purpose neighborhoods set, and/or the like.
User and/or network (including cloud services, administrative and/or communications) environments.

In some embodiments, attributes may be formal (standardized and interoperable within a group set or globally) or informal (such as, for example, not PERCos standardized and interoperable free text metadata and/or other attribute information arrangements, in a form PERCos can interpret and/or otherwise employ, a form does not employ PERCos standardized expression and/or value set schema(s)). Formal attributes may be standardized and interoperable through the use of, for example, one or more standardized and interoperable expression elements and any associated values employed in understanding, identifying, evaluating, ranking and/or otherwise prioritizing, selecting, arranging, provisioning, and/or otherwise managing one or more resource sets and/or portions thereof in fulfillment of one or more situation-specific target purpose sets. Such operations can employ, for example, similarity matching analysis and/or other association of resource sets with CPEs (employed as framing contextual purpose expressions), Purpose Statements, and/or the like. Such CPE and/or other at least in part purpose expression information may be augmented by further input from, for example, PERCos resonance specifications, profiles, historical behavior information, preference selections, and/or the like, and the foregoing may at least in part provide user set contextual purpose attribute identifying and/or contextually related information for at least a portion of such matching operations.

In some embodiments, these expression elements may include Dimension sets, Facet sets, in the form of their applicable instances and any associated values whose employment may support in part, one or more Concept Description Schema (CDSs), which are multi-dimensional structures used in expressing and/or organizing, concepts (which may be human perceived and may correspond to User Classes). Such concepts may represent differing relative characteristics (such as, similarities, differences, nearness, clustering, graphing, and/or the like) for providing elements for user perception, and user and/or computing arrangement evaluation and/or validation.

In some embodiments, acknowledged Domain experts (and/or other as may be applicable comparable parties) may employ CDSs through, in part, the use, for example, of Dimensions (Master and/or auxiliary and/or the like), Facets, and/or the like to represent standardized and interoperable Domain-related attributes that may be used to express direct, asserted, and/or associated qualities of given resource sets. Such employment of CDSs may enable attributes to be declared in the form, for example, of Facets, that are classified into Dimensions, which in certain embodiments may consist of a conceptual cluster of Facets, and which conceptual cluster may be complemented by other attribute information, such as attribute information extracted from resource metadata, usage environment, user set, value chain attributes (such as may be indicated in PERCos provenance information), and/or the like. For example, attribute sets that refer to and/or contain Quality to Purpose specifications may be classified as Repute Dimension instances, attributes that refer to direct characteristics of a resource (complex, lengthy, cost over $15.00, and/or the like) may be classified as resource Dimension instances, attributes that refer to and/or contain time-related specifications may be classified as time Dimension instances, attributes that refer to and/or contain environment-related specifications may be classified as environmental Dimension instances, and/or the like.

In some embodiments, such classification of attribute sets into Dimension instances can, in certain embodiments, facilitate efficiency of operations for identifying and/or similarity matching, including, for example, appropriately prioritizing, resource sets and/or resource set portions in response to user set contextual purpose and/or other situational specification information. For example, resource sets that share a certain quantity and/or quality of attribute instances, as may be represented by PERCos attribute information (and as may be specified in PERCos resonance specifications), such as Facet approximations, may have significant value associated with user set contextual purpose specification sets, though such CPE and/or the like purpose specification set have not been directly specified as purpose specification and/or purpose class purpose specification one or more sets of a resource set, though such resource set has a substantial portion, for example, of such attribute characteristics. Examining and comparing resource shared attributes between attribute profiles of identified and/or otherwise known desirable to user set target purpose resource sets (for example, desirable as expressed by Repute Creds), and other resource opportunities, may result, with some PERCos embodiments, in the proffering and relative ranking of candidate resource sets.

In some embodiments, such Dimension sets, Facets, and/or the like, such as, for example, Repute Quality to Purpose Facets and associated value attribute information regarding resource sets and/or their Stakeholder parties and/or agents, may enable, for example, approximately, conceptually characterize desirable attribute sets of resource instance sets, in support of applying an approximation of user set contextual purpose orientation (e.g., reflecting a user set User Class through approximating specific user set purpose nuances and contextual conditions for a target contextual purpose instance). Such characterizations, enabled at least in part through standardized contextual purpose expressions, can be, for example, directly and/or after transformation, employed in user contextual purpose information (e.g., CPE, Purpose Statement, and/or the like) similarity matching analysis and/or other association analysis against resource set attribute information, including at least a subset of applicable resource and/or resource portion set respective CPE, metadata, and/or other attribute related information.

In some embodiments, CDSs may contain as elements, for example, one or more resource sets associated with attributes and/or attribute arrangements, such as contextual purpose specifications (a compound form of attribute set that may have a persistent unique identifier), and/or they may be in part or whole comprised of attribute arrangements that may be associated with resource one or more sets and/or portions thereof, one or more contextual purpose sets, one or more party sets, and/or one or more environment sets, and/or the attribute arrangement may be discovered as associated with a resource one or more sets during a resource set discovery process.

Further, in some PERCos embodiments, at least a portion of resource, environment, user and/or stakeholder instance sets may not only have their respective attributes (e.g., "primary, first order attributes"), but at least a portion of their attribute sets, such as CDS sets, may themselves have "secondary" attributes, including in some embodiments, one or more CDSs representing descriptive information that are associated with a primary, first order attribute CDS sets.

In some embodiments, plural attribute can be encapsulated within one or more CDS sets, where a CDS can comprise instances of, and convey, attribute set information corresponding substantially, to human concept sets such as User Classes (human perceptual units readily used by, and readily interpretable by, one or more humans). In some PERCos embodiments, attribute information/value sets can include resource sets, where CDSs are published as, for example, PERCos Formal resources.

In some embodiments, organizations of attributes may take the form of information arrangements, which may be distributed to and stored locally and/or remotely at user set, at administrator set(s), at network locations, and/or in cloud service and/or the like arrangements. These attribute management and store arrangements can, for example, provide relationship information involving abstraction of resource attributes involving Master Dimension Facet types and values, where such attribute type information bases organize attributes in accordance, at least in part, with resource and/or resource portion instances, parties (user sets and/or, as applicable, their constituent members), contextual purposes, and/or reputation specifications, and where such representations can, in some embodiments, support conceptual, perspective schemas that may correspond to User Classes and may represent, at least in part, attribute and/or resource/resource portion relationship sets as such sets are associated with contextual purposes, resource sets, parties, and/or reputation information such as Repute Creds, EFs, FFs, and/or the like (understanding that any of the foregoing may, in some embodiments, be provided in the form of respective resource sets).

When a purpose specification such as a CPE is published as a Formal resource, its subject, the CPE, may be the same as its associated purpose specification. CDS instances may be employed to frame concepts in association with PERCos Frameworks, such as purpose class applications, and/or Foundations.

Figure 17:
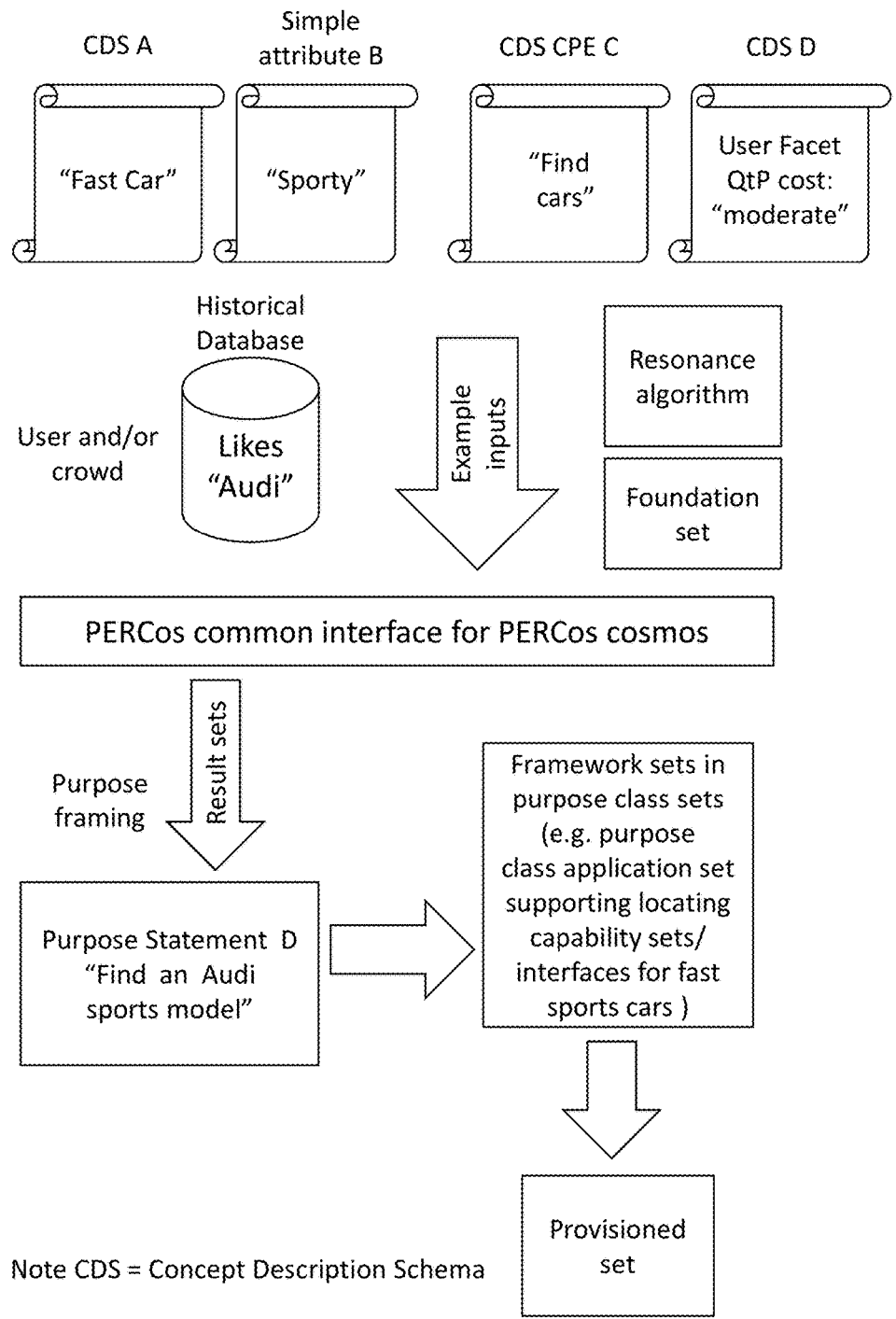
FIG. 17 is a non-limiting illustrative example of employing attribute sets to frame purposes and matching resource sets.

FIG. 17 is a non-limiting illustrative example of employing attribute sets to frame purposes and matching resource sets.

FIG. 17 is an example of using one or more attribute sets (comprising CDSs, simple attributes), resonance algorithm to generate a purpose specification, $PS_1$ for a user who likes Audis and perform similarity matching to identify resource sets, such as, purpose class applications. In this example, an expert may have published a resonance algorithm that specifies that users with a moderate budget may like Audi A3 models. Attributes. "fast cars," "sporty," "German cars," "[Quality to Purpose: moderate]," and "Audis" may be cohered and resolved by purpose framing to generate PSI, which may be similarity matched to one or more PERCos Framework sets, such as purpose class application sets, that can be provisioned (including being bound to user Foundation resource set) to provide user with optimal interim results and Outcomes.

Figure 18:
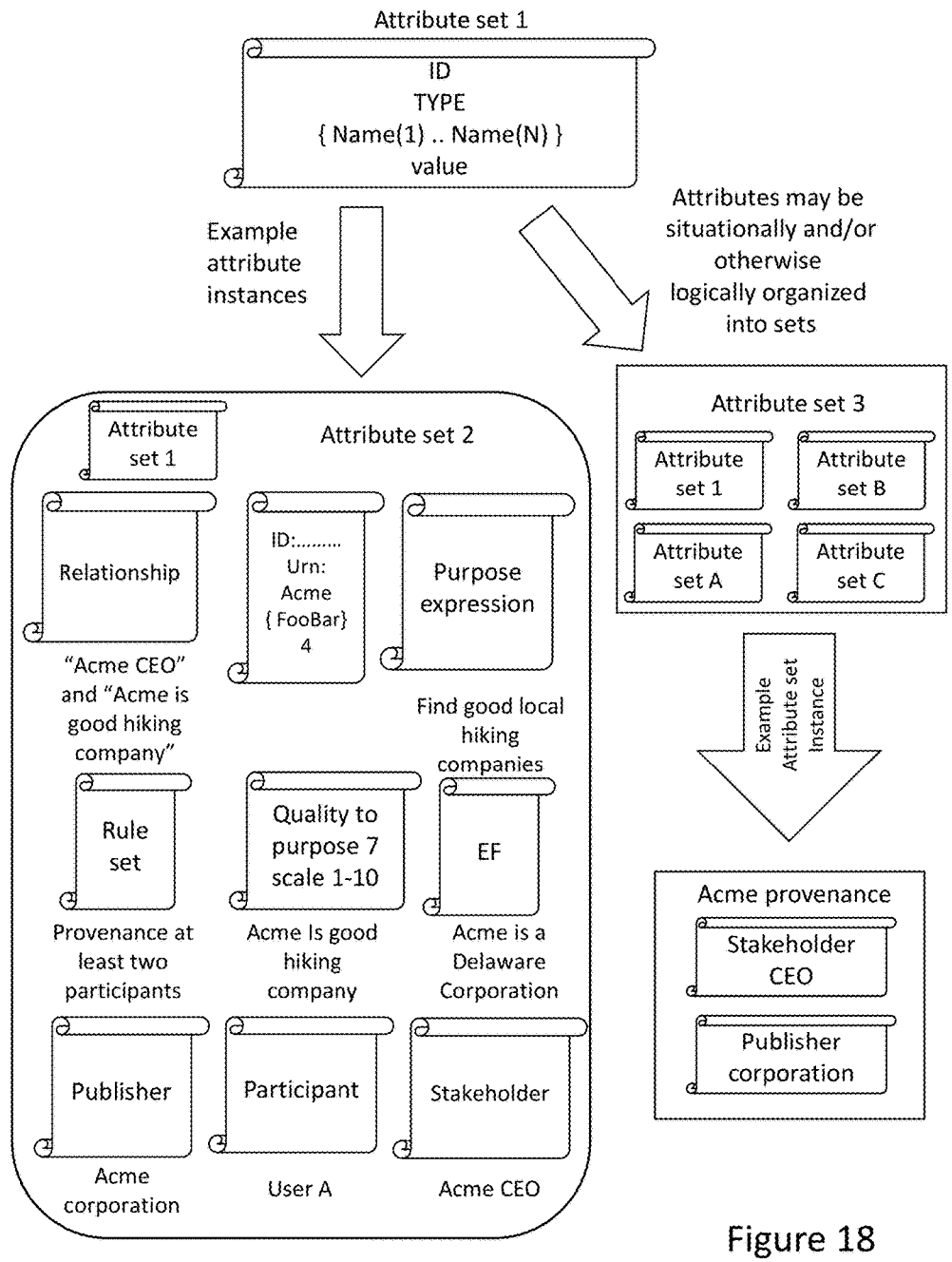
FIG. 18 is a non-limiting illustrative example of PERCos attributes organizations.

FIG. 18 is a non-limiting illustrative example of PERCos attributes organizations.

As shown in FIG. 18, some potential instances of PERCos attribute sets, which may include purpose expressions (such as, [verb: find, category: good local hiking companies], Reputes, relationships between attribute sets and/or resource sets, Participant instances (including Stakeholder Participants), rule sets, representations of provenance, and/or users (who may also have been registered, and published as user set corresponding Participant information sets). The example also illustrates how one or more attributes may be organized into sets and used collectively in one or more context sets, such as for representing such as, for example, representing provenance.

In this example, Acme is a stakeholder whose Participant representation is a registered, published party that is also the Stakeholder publisher of its Participant representation, with, for example. Jon Doe, President of Acme, as the publishing agent whose existential biometric ID is acquired, encrypted/hashed, and associated with his Participant representation information set (and any tangible world interface information) and the Participant instance for Acme might contain information stating that Jon Doe is a registered agent who may act on behalf of Acme, generally, or in accordance with specific limiting, such as situation related, specifications, while Jon Doe's Participant instance may reference Acme as a Stakeholder for which Participant representation of Jon Doe may act as agent, at least under such certain circumstances. Users who want to use Acme's services might evaluate Acme PERCos resource provenance where such users could identify Jon Doe, the President, including his Participant corresponding resource set, such as, for example, his existential biometric information set, and may further evaluate, for example. Repute Creds regarding Jon Doe as associated with Jon Doe's Participant representation instance, as a stakeholder who has a Participant representation and unique ID.

Some embodiments may have a rule set requiring that a provenance attribute set contains at least two Stakeholder instances where they may, or may not, be the same party—e.g., the two Stakeholders can be the same party in two roles, the publisher and the provider (for example, a web service or retailer). Such a rule may be an embodiment wide requirement—a minimum of a publisher and some type of provider—or such a rule may be specified as a general, or situationally specific, condition, for example, as set by a user and/or administrator as a preference setting.

Figure 19:
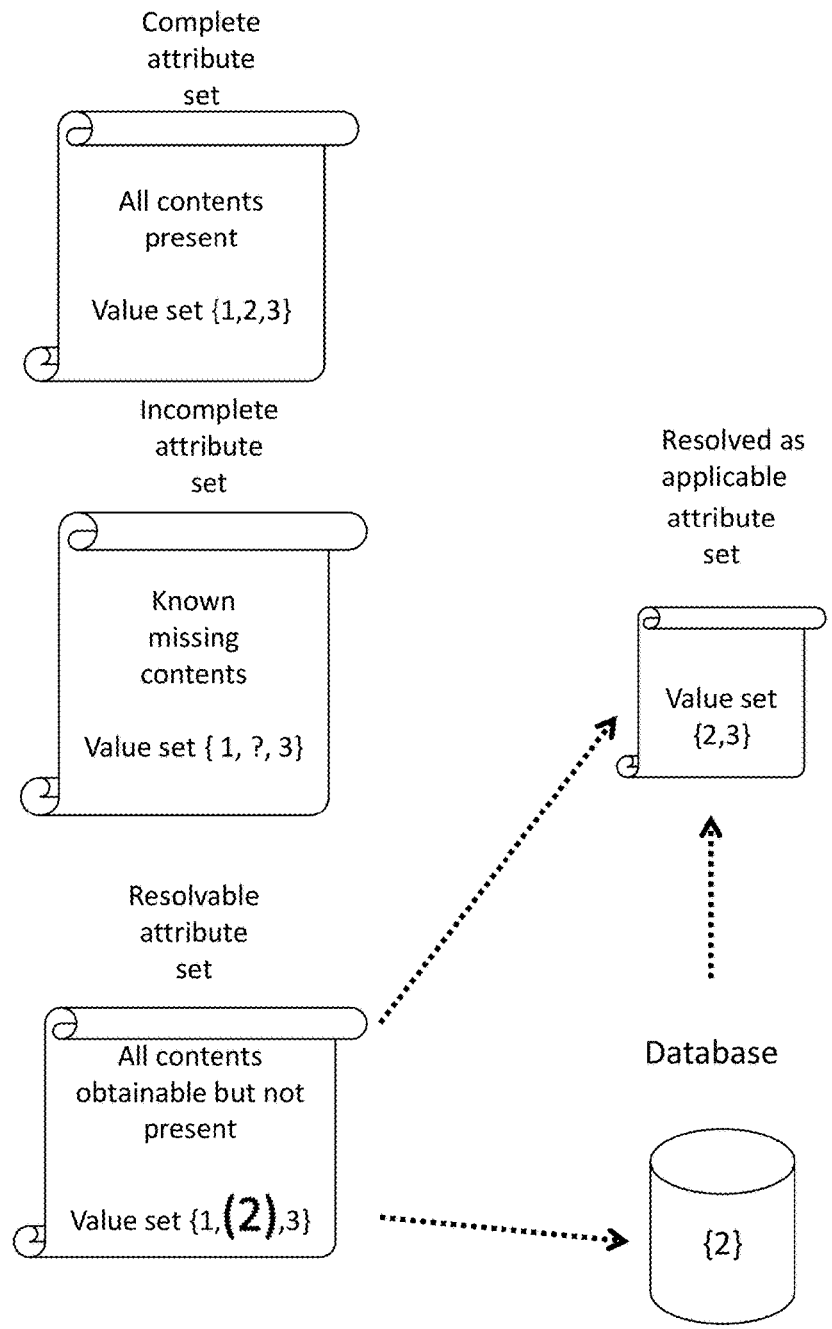
FIG. 19 is a non-limiting example illustrating attribute status, comprising complete, incomplete, and resolvable attribute sets.

FIG. 19 is a non-limiting example illustrating attribute status, comprising complete, incomplete, and resolvable attribute sets.

FIG. 19 depicts a non-limiting example of the status of attribute instances specifying whether an attribute instance is resolvable, complete, and/or incomplete, or unknown (as to completion). In some PERCos embodiments, an attribute value set may be resolvable but some values and/or attribute value contributing information may not be locally present and some PERCos attribute embodiments may support referencing external repositories, for example, cloud service databases and/or other attribute set storage arrangements—which arrangements may be distributed and respectively under the control of plural different parties—to fully resolve a given attribute set value set contents, and further in some embodiments, one or more aspects related to completely resolving an attribute set may be conditional, for example, requiring payment by the user and/or requiring the user have certain specified privileges, such as being a member of a certain group (e.g., a class of parties, such as subscribers and/or members of an organization (e.g., IEEE)). If the status of an attribute is incomplete or resolvable, the entire value of the attribute may not be encapsulated within the attribute itself. Instead it may contain a subset and/or transformed instance of the value set and/or information set.

In some PERCos embodiments, resource sets may have attribute sets whose qualities can vary significantly, for example:

1. A simple quality expression such as a reliable pointer (such as URL specification) or unique identifier alphanumeric expression (though any such identifier may be, at least in part, for example, comprised of/represent, one or more embedded attribute sets which have been encoded within an identifier set).
2. A CDS information set, made up of directly interpretable plural attributes representing a simple to highly compound set of human conceptual units, such as those comprising a CPE, or
3. A structured form, such as a PERCos Formal resource, which has an organizational schema and various information units.

Any of the foregoing, expressed generally for the instance, and/or as to any set of their respective uniquely identifiable portions, may have attributes, where such attributes may have further attributes. For example, a resource comprising a document and related information, such as in the form of a PERCos Formal resource, may employ the document's abstract to represent its subject matter and/or it may provide a reliable pointer/locator method to the document's location, where such subject matter can be found, and may be further examined or used. With such resource in this example, each of the Formal resource identifier, subject, purpose expression, and Stakeholder information, along with a resource aggregate Cred for Quality to Purpose, can be resource instance attributes and may be comprised of component attributes, e.g., a purpose expression with a verb and category, a Stakeholder company with an agent person's name(s) and biometric information (and/or a Stakeholder sets corresponding Participant registered, published resource), a unique identifier made up of sections representing different identifier pieces, for example, fused together as a naming schema, but readable and meaningful as to its portions; etc.), and, in this example, a Repute Aggregate Cred published resource instance.

In some embodiments, resource related attribute sets may, at least in part, embed references to external attribute sets such that such a given resource set attribute set may be readily resolvable so as to provide complete resource attribute information provisioning, or may be resolvable, but are resolvable components of declared as incomplete attribute information sets (such completeness or incompleteness representing declarations by direct and/or indirect Stakeholder respective resource related publishers and/or the like). Such referencing as to attribute resolution may be situationally identified, that is as relates to a given purpose related specification set and can be expressed directly, and/or by reference, in the form of resource attribute notational expression attributes (for example, complete, complete when resolved, incomplete and/or the like). Such notations for a given resource attribute set may differ as to attribute sets for different purpose expressions, that is a given resource set (and/or user set and/or computing environment set) may have contextual purposes related to specific situations (as defined by specifications and/or other input) and which such one or more attribute sets may be, at least in part, determined as a result of specified method sets, which may involve conditional attribute set compositions that result from event sets, such as test result values specified by attribute set related methods that produce situationally specific results. As a result, one complete set of attributes for a resource associated with one contextual purpose specification and set of conditions may materially differ from a second attribute set associated with a different contextual purpose specification and/or set of situationally applicable conditions, and any such attribute set may differ at different times, for example, due to different, provided input values.

For example, a resource set may directly embed all Stakeholder set resource set (and/or user set and/or computing environment set) specified attribute information sets (recognized as complete attribute sets) and/or embed all recognized as relevant, but which are further recognized as not comprehensive, attribute information sets (incomplete attribute sets). A resource set may have attribute sets declared by its direct resource Stakeholder set, and/or by an indirect Stakeholder set (such as a Repute instance Stakeholder publisher where the subject is the resource set and the Stakeholder has an indirect interest in the resource set).

In some embodiments, this ability to flexibly associate resource sets with attribute sets and attribute sets with other attribute sets enables PERCos based systems and/or their user sets to more effectively evaluate resource sets for situational contextual purpose consequences and qualities to purpose and further can support, for example, capabilities for granting access and/or other rights to use a resource set at least in part based, for example, on applicable attribute related specification sets and/or user actions. For example, such evaluation of, completion of, and/or use of attributes for user contextual purpose fulfillment may be at least in part based on situationally determined attribute sets derived, at least in part, as a result of purpose fulfillment related sets of rules, environmental considerations, user rights and/or profile information, resource and/or other contextual purpose descriptive elements, and/or any combination thereof, and/or user selections, biometrically identified user reactions to events, and/or computing arrangement input. Such situational attributes may be predefined as an attribute set.

In some embodiments, situational resource (and/or user and/or environment) identity notations (complete, incomplete, resolvable, and/or the like, along with any associated values, e.g., a 7 on a scale of 1 to 10, which may indicate an assertion of a nearly complete/comprehensive set from attribute Quality to Purpose standpoint) can, for example, inform user and/or their computing arrangement sets as related to outcome reliability by enabling decisions to be based at least in part on completeness state of attribute information estimation (regarding available attribute sets and, for example, in the form of approximations of completeness as may be related to user target contextual purpose). Such information sets may enable users and/or their computing arrangements to evaluate "work" (e.g., overhead) that may be required, at least as described by Stakeholder(s) so that users, stakeholders, and/or the like sets can be informed regarding attribute set completeness, readiness, and/or relevance qualities as relates to a contextual purpose specification. Such qualities information may, for example, be stipulated as generally related to classes of, and/or specific instance sets of, resources, users, environments, relative portion sets of the foregoing, and/or the like and such completeness and/or relevance qualities can be expressed as Repute and/or the like Quality to Purpose, EF, and/or FF specification sets for attribute sets associated with resource and/or resource portion sets, user sets, and/or user computing environment sets.

In some embodiments, resource complete and incomplete attribute sets may be defined as being associated respectively to one or more CPE (e.g., CPEs for purpose classes) and/or other purpose specification sets. For example, a given resource set, $RS_1$, may have differing attribute sets for differing purpose specifications, such as, for example, an attribute set $AS_1$, for one purpose specification set. $PS_1$, that is operatively different from its ($RS_1$'s) attribute set. $AS_2$, for another purpose specification set. $PS_2$, where both $PS_1$ and $PS_2$ may be declared to be complete or incomplete, and in either case, may involve resolved and/or resolvable attribute sets.

Figure 20:
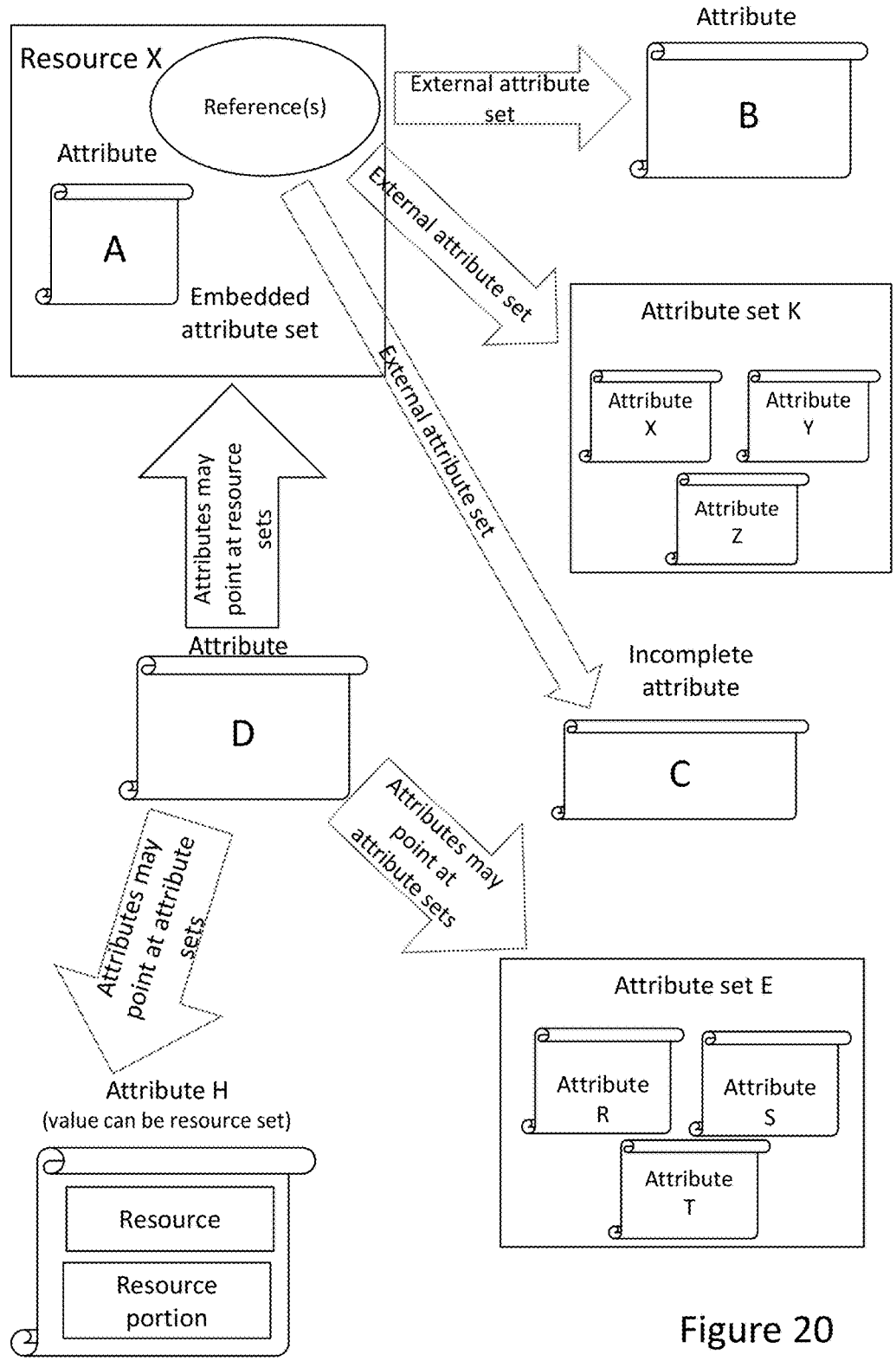
FIG. 20 is a non-limiting illustrative example of relationships between attribute sets and resource sets.

FIG. 20 is a non-limiting illustrative example of relationships between attribute sets and resource sets.

FIG. 20 shows an example configuration where a given resource, Resource X, fully encapsulates an attribute set and also references to external attribute sets and may have further discoverable attributes, such as Attribute H.

Figure 21:
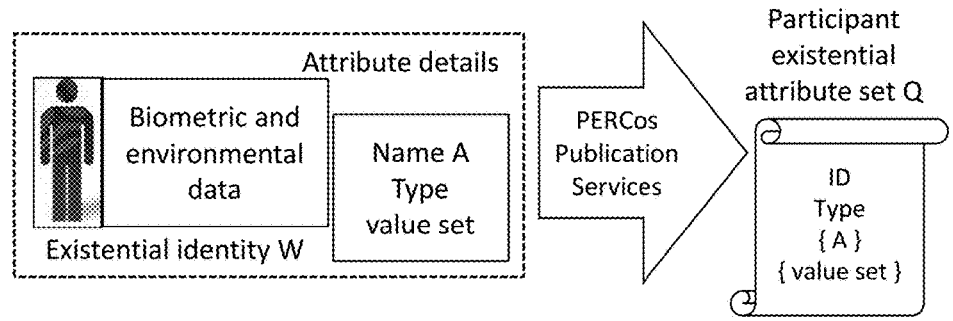
FIG. 21 is a non-limiting illustrative example of publication and re-publication.
Figure 21:
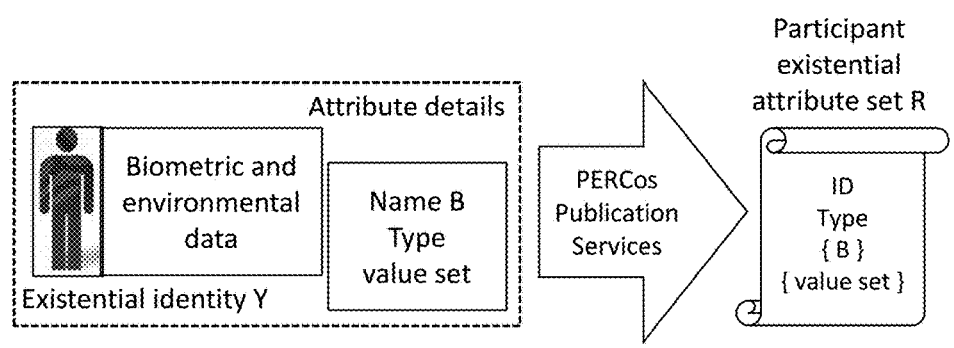
Figure 21:
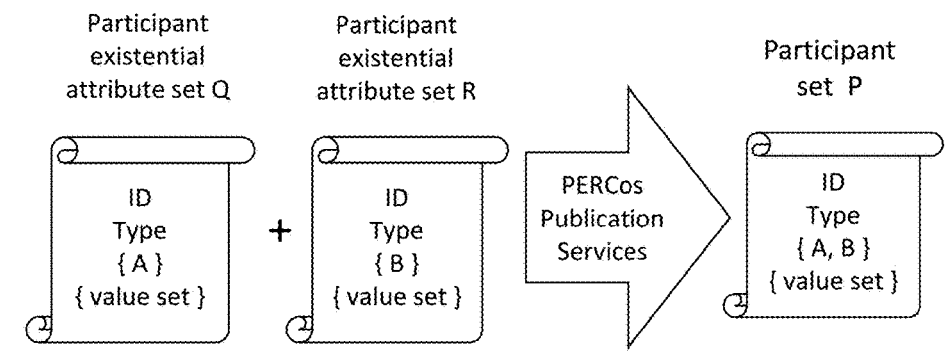

FIG. 21 is a non-limiting illustrative example of publication and re-publication.

FIG. 21 shows an example PERCos embodiment that supports the publication and republication of attribute sets. In this example, attribute sets may be republished with additional names and/or with additional and/or alternative existential signatures associated with Stakeholders.

Figure 22:
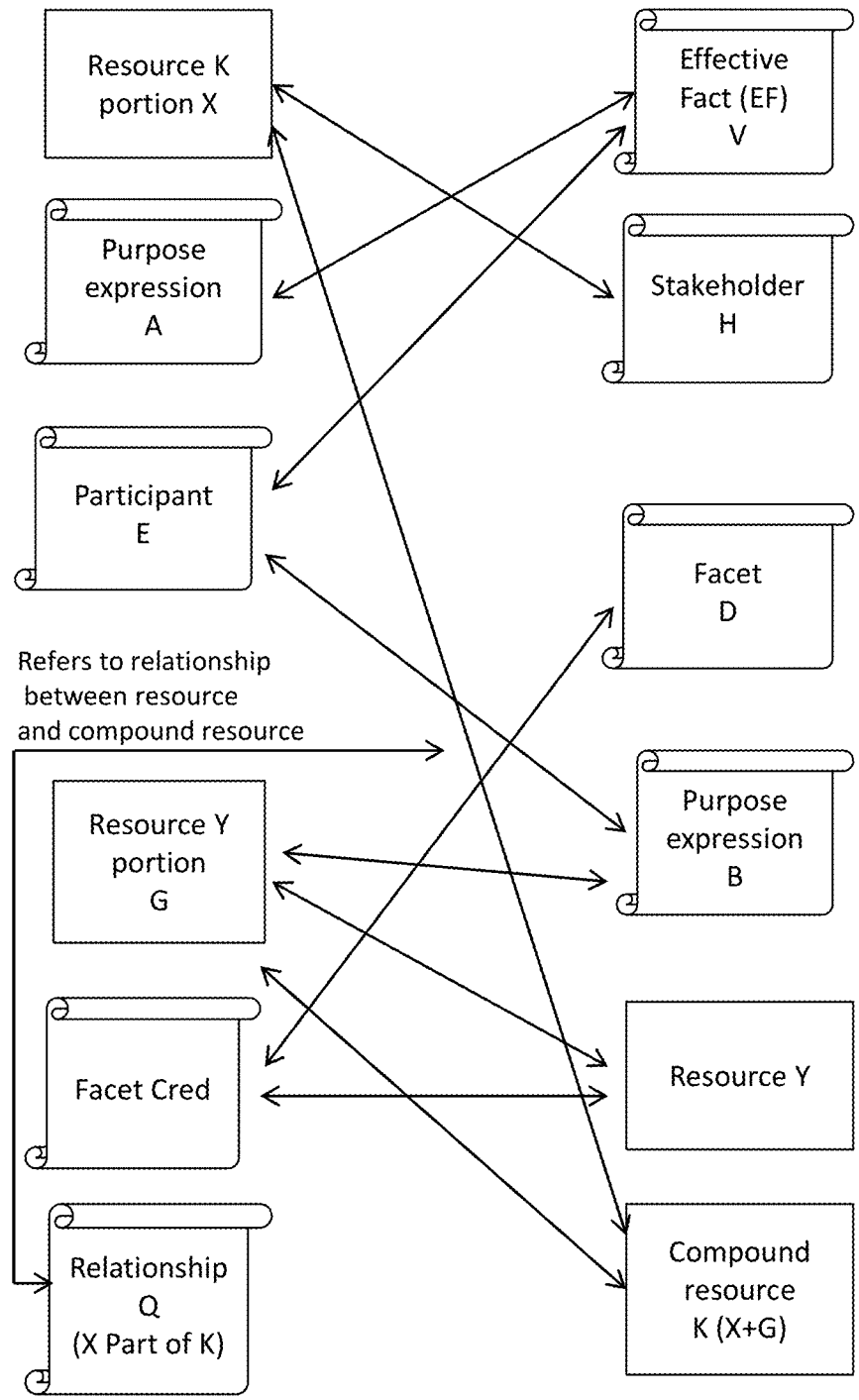
FIG. 22 is a non-limiting illustrative example of attribute and resource associations.

FIG. 22 is a non-limiting illustrative example of attribute and resource associations.

FIG. 22 shows a non-limiting example set of a PERCos embodiment that supports an intricate web of associations between resources, resource portions, Compound resources, and various types of attributes. In some embodiments, PERCos supports attributes referencing resources, resource portions, and other attributes. In some embodiments, PERCos supports the discovery of attributes and/or resources, which may not have direct connections but indirect connections (secondary or tertiary, etc. relationships, or connections that may be inferred from the relationship of other sets of resource and/or attribute associations and/or inferred using semantic and/or artificial intelligence capabilities analyzing as available one or more attributes. In some embodiments, users and/or computing capabilities may look at an attribute resource set in context of its resource one or more associations and, as a further step, look at, and interpret by analysis, such associated resource set and/or set instances' attributes, and/or any applicable attribute set's and/or associated resource set's associated one or more associated contextual purposes expressions (attributes) and/or the like.

Figure 23:
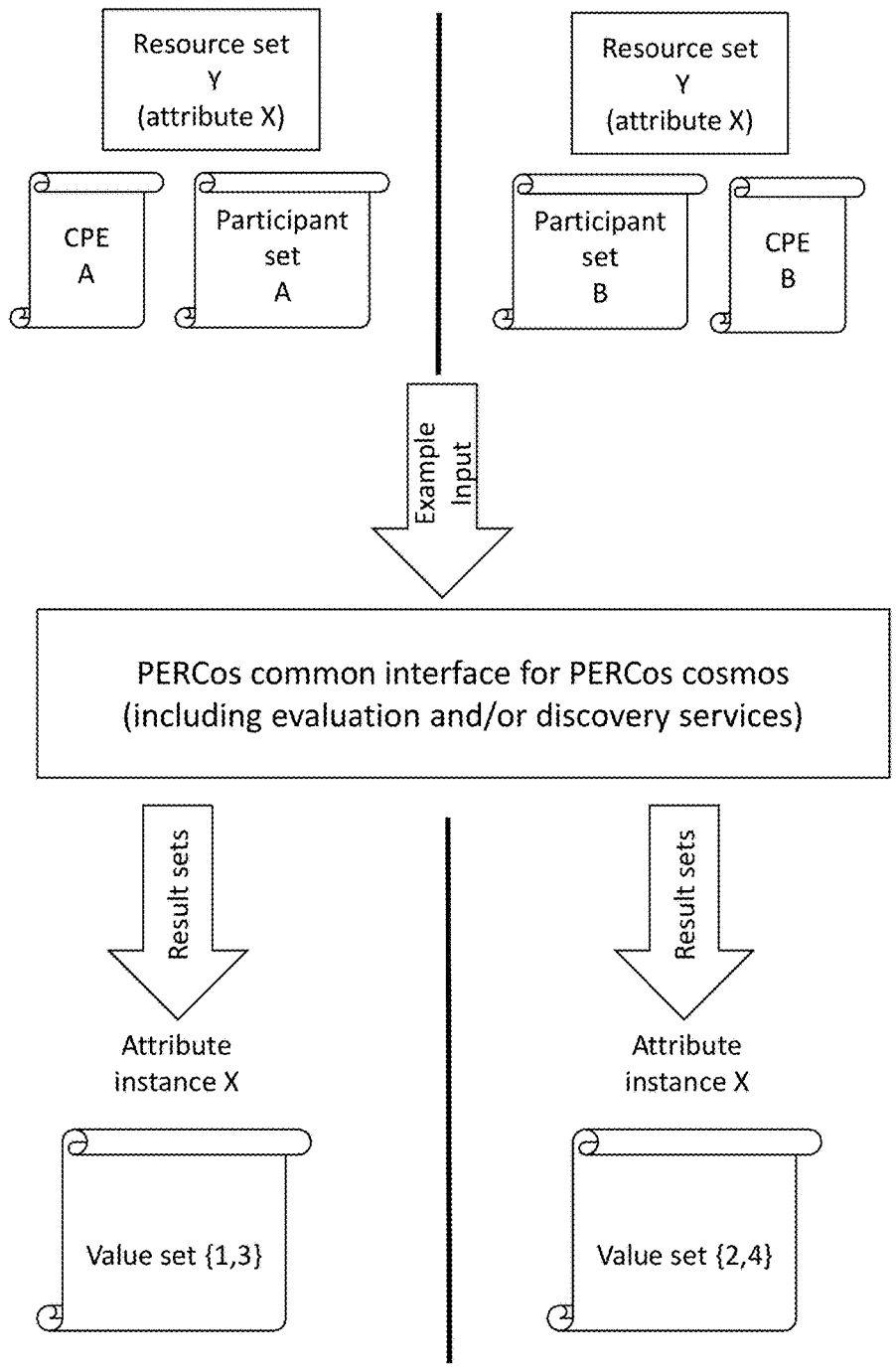
FIG. 23 is a non-limiting illustrative example of evaluation and/or discovery through attributes.

FIG. 23 is a non-limiting illustrative example of evaluation and/or discovery through attributes.

FIG. 23 shows an example PERCos embodiment that supports discovery of heterogeneous sets of information and/or data such as attribute sets, resource sets, and resource portion sets via certain PERCos embodiments system supported discovery capabilities. To simplify the discovery process, some PERCos embodiments may use PERCos template specification types, such as incorporate the use of PERCos Frameworks and/or Foundations, as well, for example, CDSs, for identifying one or more contextual purposes and associated attributes, including as applicable, resource sets, which can aid in user and/or computing arrangement decision processes, including similarity and association analysis employing conceptual and results approximation related to purpose, resources, and/or attributes.

Figure 24:
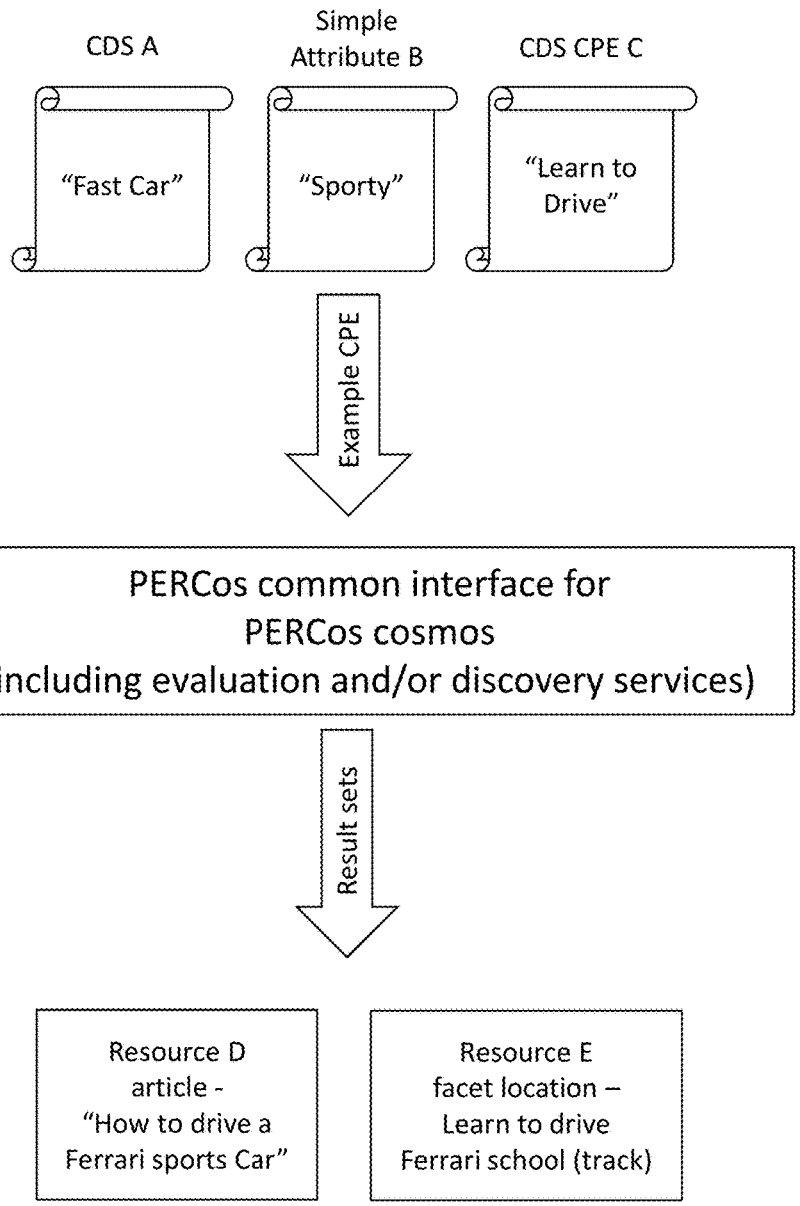
FIG. 24 is a non-limiting illustrative example of resource set discovery through the use of a combined attribute sets, including CDS, CDS CPE, and simple attributes.

FIG. 24 is a non-limiting illustrative example of resource set discovery through the use of a combined attribute sets, including CDS. CDS CPE, and simple attributes.

FIG. 24 shows an example PERCos embodiment that supports the use of a combined attribute sets to discover resource sets. In this example, a user may discover resource sets, D and E through the use of CDSs, "fast cars" and "learn to drive" and a simple attribute, "sporty." In some embodiments, such discovered resource sets can be then filtered based on, for example, their Reputes, user profiles, user preferences, historical data, resonance specifications, and/or the like to identity and select a resource set that may optimally fulfill user target purpose sets.

In some embodiments, relevance of attribute and/or other identifier information sets, under many circumstances, may depend in the context of resource sets, Participants, location, and purpose.

Figure 25:
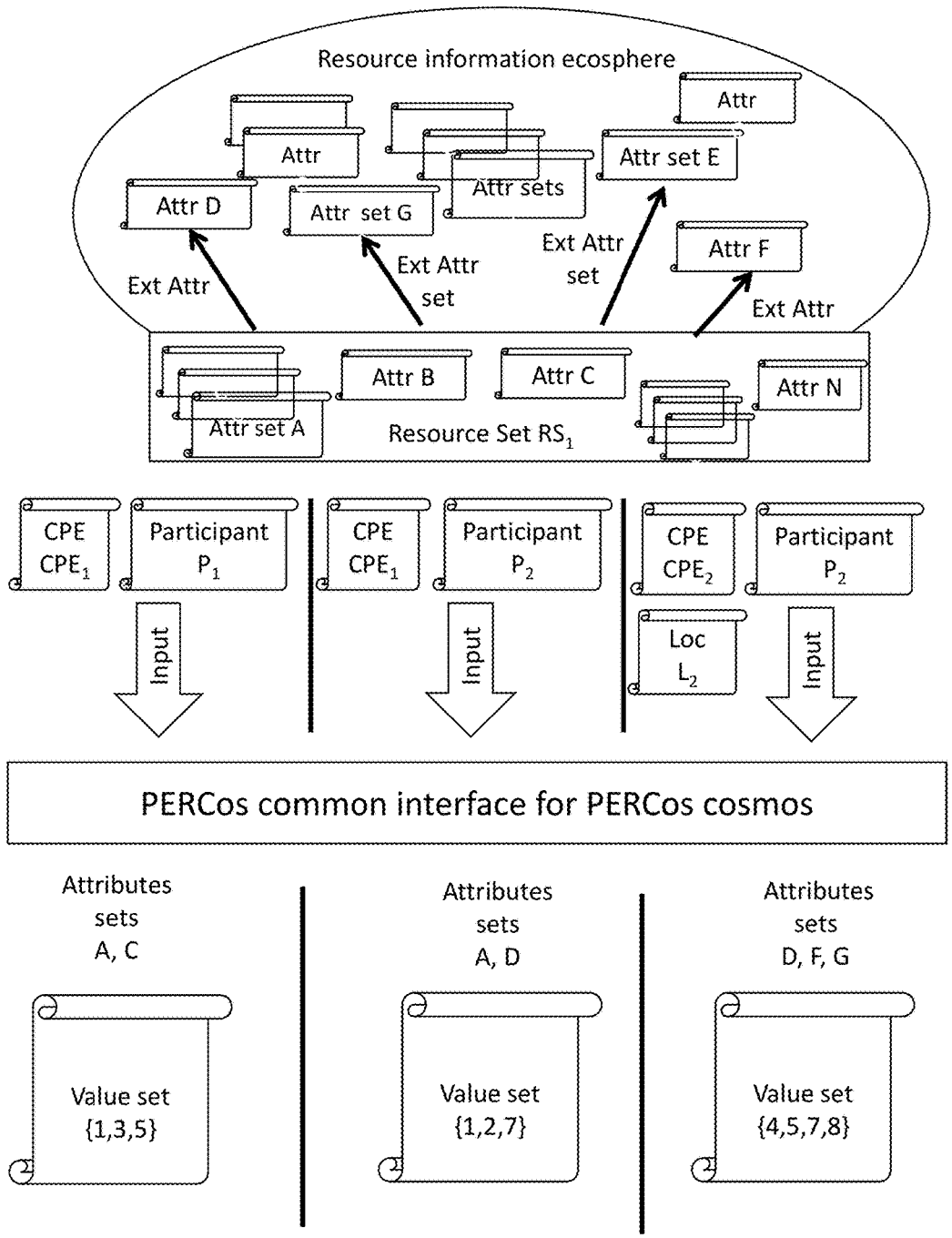

FIG. 25 is a non-limiting illustrative example of relevant attribute sets for a given resource set. Participant, CPE, and/or the like.

FIG. 25 illustrates a non-limiting example of identifying and selecting a set of relevant attributes of a given resource set. $RS_1$, based on their relevance to Participants, purpose, and/or location.

In some embodiments, such contextual information may be represented in the form of (contextual-axis-name, axis value) pair, such as, for example Resource-axis, whose value may comprise one or more published resource sets and/or any reliably identifiable portions thereof, for example, PERCos Formal or Informal resource sets and/or portions thereof, and may also point at the attribute information sets of other resource sets, for example, pointing to one or more portions of such referenced resource set attribute information set as may be considered germane by a resource set attribute information Stakeholder, such as a resource direct publisher or publisher of Repute Cred, EF, and/or FF information on such resource information.

Purpose-axis, whose value may comprise one or more contextual purpose expression (CPE) sets, purpose classes and/or purpose neighborhoods, and/or the like.

Participants-axis, such as, for example, Stakeholder Participants, user Participants, and/or the like, including for example, including their respective profiles and/or other characteristics.

Environment-axis, whose value may describe environment factors and/or conditions. For example, such value may be used to determine the applicability of an attribute set.

For example, a resource set. $RS_1$, such as an e-book on group theory, may have identity attributes, including the following attributes:

```
(Attribute104,
    (Identifier: RS102))
(Attribute105,
    (Type: e-book)
    (Identifier: RS102)
    (location: URL103 – location for locating RS₁)
    {(purpose-axis: {[learn: group theory], [learn: finite group theory]})})
(Attribute106,
    (Type: Repute)
    (Identifier: RS102)
    (Quality to Purpose: 8)
    { (Repute-axis: { (AggCred:
        (Quality to Purpose: 8)
        (Subject: RS102)
        (Purpose: [learn: group theory])
        (Publisher: PublisherID-101)
        ({Repute₁, Repute₂, ... Repute_n}))
      (Cred
        (Quality to Purpose: 9)
        (Purpose: [learn: finite group theory])
        (Subject: RS102)
        (Publisher: UID101))})})
``` where

Attribute 104 expresses a unique identifier for $RS_1$,

Attribute 105 expresses location for finding $RS_1$ in the cloud. It also has a purpose axis that describes one or more $RS_1$'s purpose sets Attribute 106 expresses $RS_1$'s Quality to Purpose produced by evaluating two sets of Reputes, one aggregate Cred that $RS_1$'s publisher, PublisherID-101, had aggregated Reputes, $Repute_1$, $Repute_2$, ... $Repute_n$ that have been published by various mathematicians, and a Cred, published by UID 101.

In some embodiments, identity attributes may be attributes, and as such, may be formal (i.e., readily interpretable) or informal (such as, for example, free text metadata). Formal identity attributes may comprise one or more standardized and interoperable expression elements that may be used to identify, evaluate, rank and/or otherwise prioritize, select, arrange, provision, and/or otherwise manage one or more resource sets (including, for example, combinations of sets and/or portions thereof) in fulfillment of one or more situation-specific target purpose sets. Some of such processes may involve, at least in part, similarity matching analysis and/or other approximation computing to associate one or more resource set instances with CPEs and/or other purpose specifications (for example, contextual purpose expressions. Purpose Statements, and/or the like). In some embodiments, expression elements may include Dimension Facet set instances and any associated values whose employment may support in part, for example, one or more Concept Description Schemas (CDSs).

In some embodiments, identity arrangements may provide organizational structures, such as PIDMX, to provide effective and efficient identification, evaluation, and validation of resource sets, where validation may include assessment of the strength of binding and/or binding methods among resource identity information, including resource descriptive information and associated resource existential Stakeholder biometric information, and, for example, including any associated rigor metrics for binding among, and/or otherwise assessing, the strength and reliability of any other identity relationship associations. In some cases, assessment of the binding may be based at least in part on situational responsiveness to contextual purpose specifications, Purpose Statements, and/or the like.

In some embodiments, identities and identity attributes may have associated policies and/or other rules that govern their access, where policies may be authorization-based, time-based, and/or the like. A policy may also be applicable to all or parts of an identity attribute set and plural different policies may apply to a given attribute set of a given resource set. For example, a resource set may have an identity attribute set that specifies its Stakeholder information set, some of which (such as its publisher information set) may be public, whereas some of which (such as its creator information) may be private and requires appropriate authorization, and further, whereas its provider Stakeholder information may need to be verified as to its current applicability, since provider Stakeholder may change over time (an elapsed provider Stakeholder identity may still be, in some embodiments, maintained in a resource set provenance information set).

In some embodiments, policies may express a time period during which an identity attribute may be valid. For example, a resource set may have a warranty attribute for a specified period of time, after which the attribute is no longer valid. These identity attributes, individually and/or in combination, may be maintained and/or included in PIDMXs or other identification organizational structures to provide evaluators (such as, for example, users. Stakeholders, resource sets, and/or process sets) with additional contextual information they may need in fulfillment of their purposeful related operations, such as, for example, resource set identification, selection, and/or management.

In some embodiments, a resource set, $RS_1$, such as, a Participant, with, for example, sufficient authorization, may retrieve one or more identity attributes and/or other identity-related information sets (such as at least a portion of related resource purpose classes, interface information, and/or the like) associated with a resource set, $RS_2$, from a PIDMX to create one or more designator sets for $RS_2$, which RS can then be use to interact with $RS_2$.

In some embodiments, users, Stakeholders, process sets, and/or resource sets may maintain their own PIDMXs comprising identifiers, identity attributes, and/or other identity-related information sets, including for example, designators they can use to access resource sets. For example, suppose a user is in pursuit of exploring restaurants. The user may evaluate such identity information set in the user's PIDMX to determine, for example, a restaurant's quality to situation-specific purpose set (such as, for example, casual dining, special occasion dining, and/or the like), the physical location of restaurants, restaurant's Reputes, reliability of Reputes, and/or the like.

Figure 26:
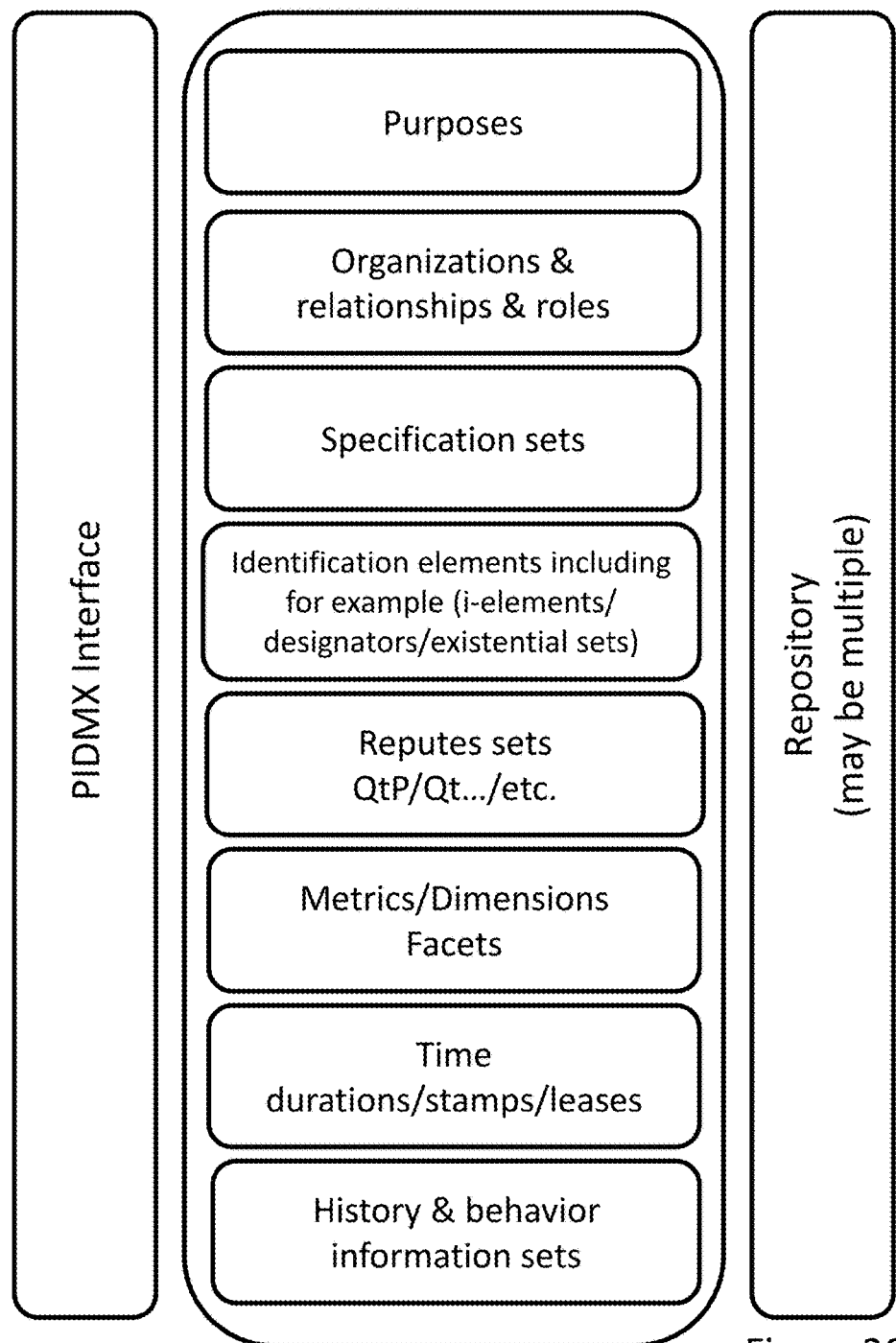
FIG. 26 is a non-limiting illustrative example of a PIDMX embodiment.

FIG. 26 is a non-limiting illustrative example of a PIDMX embodiment.

In some embodiments, identity manager sets may use multi-dimensional PERCos Identity Matrices (PIDMXs) to efficiently and effectively capture, update, add, retrieve, organize, aggregate, control, persist and/or otherwise store, evaluate, validate, similarity match, prioritize, and/or otherwise manage, in whole or in part, identity-related information associated with resource instance sets (including Participant instances), such as, for example:

Identities, such as, for example, identifiers, that may be used to uniquely identify a resource instance set.

Identity attributes associated with one or more identities (identifiers), where identity attributes may refer to and/or contain any identity-relevant information, such as, for example, biometric reference data sets, Reputes, credentials/rights/authorizations, preferences, purpose specification sets, purpose classes and/or other purpose neighborhoods, Foundation sets, purpose class applications and/or Frameworks (including CPFFs), Resonance specification sets, and/or the like. Identity attributes may have one or more methods that can be used for their evaluation and/or validation.

Identity relationships, such as, for example, relationships derived from interactions resource instance sets may have had and/or have with other instance sets.

Policies and/or rules for controlling access to identity-related information. In some embodiments, such policies and/or rules may include policies for persisting identity-related information, such as, frequency of persistence, information-set of persistence, location(s) for storing persisted information sets, and/or the like. For example, policies may state that certain information sets related to one particular Stakeholder are to be persisted daily, whereas certain information sets related to another Stakeholder are to be persisted weekly. Specifications may also specify storage strategies such as, for example centralized, distributed, superior-subordinate, peer-to-peer, and/or the like, including frequency of persistence, location of repositories for maintaining the information sets, and/or the like.

Organizational strategies, such as, for example strategies of aggregating, merging, filtering, distributing, persisting and/or the like one or more identity-related information sets, such as, for example. Reputes, Resonances. Frameworks and Framework classes, biometric representation sets, purpose specifications and/or classes and/or other neighborhoods. Participant and/or user classes, environment classes, and/or the like. For example, identity-related information sets may be organized in a PIDMX, based at least in part on differing logical dimension simplification, standardization, and/or approximation aspects, such as, purpose dimension, reliability dimension, and/or the like.

For example, an identity manager, $Imgr_1$ may be provided with:

One or more control specification that may state that $Imgr_1$ is to collect identity-related information for entities, $e_1$, $e_2$, and $e_3$, where an entity $e_i$ may be either a user or Stakeholder as represented by a Participant instance.

One or more interface specifications that may specify for each i, $1 \leq i \leq 3$, one or more methods, $M_{ij}$s, that user sets and/or Stakeholder sets and/or computing arrangement sets on their behalf, may use to access entity $e_i$'s biometrics identity representation sets and associated one or more control specifications that express authorizations/rights required to invoke $M_{ij}$s.

One or more organizational specifications that may define the organization of PIDMX, such as organizing identity-related information based at least in part on a set of dimensions, distributing them across multiple locations, replicating strategies, and/or the like.

In some embodiments, a publisher and/or other one or more authorized Stakeholders may specify one or more organization specifications for organizing their associated resource sets' identity elements. For example, consider a Participant identified set providing services as a CPA. Such CPA set may interact with users, who may be potentially interested in such services. The CPA set may express an organization specification that specifies that its associated PIDMX create a relationship, called "potential client." Whenever the CPA set interacts with a potential client, such set may provide instructions to such PIDMX to capture the client's identity and relevant identity attributes (such as, for example, the client's name, location, and/or the like) and associate the potential client relationship with CPA set's identity and/or with a CPA associated Participant set (when there are, for example, plural CPA set Participant sets, for example, as employees Participant sets). The CPA set may also specify an interface specification that enables the CPA set (and/or, for example, an employee Participant set) to obtain a list of potential clients, based at least in part on time of a certain types of interactions, client locations, CPA set Participant instances, and/or the like.

In some embodiments, PIDMXs may be published as resources. Publishers and/or other authorized Stakeholders and/or the like may associate one or more control, interface, and/or organizational specifications that express policies, other rules (including, for example, filtering algorithms) and/or other methods with a PIDMX that govern its operations. For example, a publisher may publish a PIDMX as a resource and associate a control specification that expresses that PIDMX control access rules regarding identity-related information sets, such as, for example, providing access to a given identity-related information set only upon presentation of appropriate authorizations and/or completion of specified authentication processes, and/or ensuring that an identity-related information set is only available to specific other identities upon one or more sets of criteria, such as validation of presence during information provisioning (such as display) to an authenticated party employing existential reality integrity analysis and/or presentation of one or more specification satisfying Repute Creds. EFs, and/or FFs and/or the like.

In some embodiments, PIDMX may, at least in part, organize its identity-related information using a set of organizing principles that enable efficient and effective use of such information sets in fulfillment of target contextual purpose sets. Such information sets may include resource related attributes and metadata, including, for example, information sets organized in accordance with relationship(s) with other resource sets and/or resource related information, such as, for example:

contextual purpose expression and/or other purpose related specification sets and/or purpose neighborhoods, such as purpose classes;

user sets, which may include, for example affinity groups and/or user classes, and where users sets may be Participant resource sets; and/or resource environments, which may be identified as resource sets, such as Foundations and/or Frameworks, and/or which may include, for example, user computing arrangement location (current, historical, potential, and/or the like), and/or other environment information such as information regarding tangible items proximate to such user computing arrangement so as to inform regarding, for example, user computing arrangement environment composition information which may be used, for example, for authentication and/or other reality testing related processes.

Many current resource information systems, for example, telecommunication network systems, financial transaction systems, and/or the like, create, to varying degrees, time stamped logs that are commonly used for debugging purposes and as such are typically organized based at least in part on debugging related events. Such systems designed with little or no consideration for, and normally no standardized and interoperable support for, resource potential utilization in pursuit of, and/or otherwise associated with, contextual purpose operations, such as purpose fulfillment optimization. Such purpose fulfillment optimization processes may involve PIDMX supplied information that provide, for example, attribute related information regarding resource set deployment with other resource set combinatorial consequences. PIDMX information may also, for example, assist CPFF processes by provide attribute information informing managing computing processing environment minimalism to support optimal contextual purpose computing session privacy, security, efficiency, and/or outcome predictability. Such PIDMX information may for example, support resource eligibility for use and/or use management during CPFF resource identification, evaluation, and processing instances, for example, performing CPFF identity and/or identity attribute related constraining and/or other minimizing of resource provisioning and/or selected processing activities.

In some embodiments, PIDMX may compile and associate compendium instances with their respective resource sets providing, for example, situationally significant purpose specification—such as CPE—related attribute and/or the like information sets informing, for example, regarding purpose related resource sets, where such information may have been acquired from expert resources (who published such information associated with at least a portion of such purpose expression and/or corresponding purpose information), who provide or provided such information on an expert consulting basis as, for example, Participant experts, and/or, for example, as a result of historical (current session and/or in the past) user and/or crowd (for example Effective Fact crowd filtered) resource usage aggregation of situationally significant associated attribute and the like information instances. The foregoing information may be at least in part organized into logical sets, for example, as associated with purpose classes, attribute classes, users classes, and/or the like, and such attribute and/or the like information may, at least in part, be provided in the form of relational instances, associated with, for example, one or more of user target purpose specification sets related to user local and network computing arrangements, device types, and/or tangible environment information, such as user computing arrangement location(s), tangible and/or network configuration and/or identifiers; profile; preference; Foundation; Framework; Repute Cred. EF, FF; user set; and/or the like information compilations. Such information may also be organized, at least in part, according to contextual purpose fulfillment sessions dates, time durations, and/or one or more identifiable consequences, such as cost, delivery, manufacturing event (e.g., quantity), and/or other monitored event, such as processing results information. Such information instances may be associated with Participant sets (on behalf of users, Stakeholders. and/or process sets, as situationally appropriate identity-related information sets, that may be organized, at least in part, as situationally germane attribute and/or the like information sets and/or information derived therefrom, wherein such information may be employed in the identification, evaluation, and/or management of resources in support of optimal user target purpose operations and outcomes.

Such situationally significant information sets may be associated with specific and/or classes of contextual purpose sets, where in some embodiments. PERCos operations and/or purpose sets processing may be, for example, important in filtering to identify and prioritize resource sets (including for example, appropriate portions thereof), such that users and/or their computing environments may evaluate, select, provision, validate, and/or manage the resource sets so that users and/or their computing arrangements may apply best contributing or directly purpose fulfilling resources that possess situationally significant qualities, relative to other resource opportunity sets, towards purpose fulfillment in a balanced, situation-specific manner, such as, for example, considering functionality, quality of user experience, and/or qualities of trustworthiness, compatibility with applicable Foundation sets, cost, reliability, combinatorial (e.g., consequence effects) appropriateness with other target purpose relevant resource sets, and/or the like.

In some embodiments, PIDMXs information may be employed to manage identity attributes by at least in part organizing them, at least in part, using the following concepts as organizational qualities, such as, for example, without limitation:

Purpose sets, purpose classes and/or other purpose neighborhoods, and/or the like. Each resource may have one or more purpose specifications associated with it, for example a Descriptive CPE, and may have other purpose specifications associated with its use, for example one or more prescriptive CPEs and/or other contextually related purpose specifications such as purpose class specification instances. Such purpose specification information may include, for example, specifications incorporating profile, preference, environment, combinatorial consequence, historical usage, Repute and/or the like sets, and/or the like information, that may comprise generally, and/or situationally, relevant resource attribute and/or otherwise associated information sets.

Other purpose relevant organizations, relationships, and roles—A resource set may have an organizational relationship with other resource sets, for example a resource set may be part of a Foundation, Framework and/or other Construct. Such purpose and/or other purpose relevant relationships may further include, for example in addition to purpose neighborhoods and/or the like, classical category Domain, PCA, Framework, Foundation, Resonance, CDS, other Constructs, and/or any other purpose related information regarding resource interactions with and/or contemplated as purposefully relevant, and/or otherwise declared as having a relationship any given with Resource set. Resources may also have one or more associated Roles, which in some embodiments may include PERCos standardized resource Roles such as, a roles as "text editors" and domain reference compendiums in a Framework, as a main storage device in a Foundation, as banking service provider in a cloud services related Framework, and/or the like.

In some embodiments, purpose relationships expressions may be standardized and interoperable and include standardized expression elements, such as, for example:

Comprises (where, for example, one resource may comprise further resources)

Associated with (for example, is or has been operatively associated)

Is part of (for example, is a part of a Construct)

Is managed by (for example, has an associated persistent management instance)

Is a parent to/child of—is a Sub Class/Super Class of a class. For example, a purpose class, such as, "learn group theory" is a subclass of "learn mathematics" and a superclass of "learn finite group theory."

Is required by/dependent on

Is correlated with contextual purpose (n)

and/or the like

Operational specification sets—In some embodiments, resource sets may be associated with one or more operational specification sets, which for example may include control, organizational, optimization, and/or interface specifications. In some embodiments, each contextual purpose and/or organization instance may have associated specification sets, including parts thereof. In some embodiments, a resource set, which may be managed by one or more managers where each may have operational specifications. For example, suppose a resource set is being managed by a set of resource manager instances, each having differing trust and reliability metrics. In such a case, the resource set may use differing, potentially more constraining specification sets with those resource managers that have lesser degrees of reliability or trust than with those managers that are more trustworthy.

Identification elements—In some embodiments, identity-related information may be represented in terms of PERCos PIMS standardized identity management elements, such as i-Elements and designators. In some embodiments, these may be used to as a means to reference and potentially initiate interaction with resource instances. For example, consider a document processing resource set, such as, for example, Microsoft "word," that is installed on a user's computing arrangement. The user may have a designator as a means to reference initiate "word" instances to create, modify, and/or the like a word document. Such instances may inherit the identity attributes of their parent. Such attributes may be retained by the instance and in some embodiments, may include templates for the generation of such elements as may be used by the instance. For example the instance may have a template for a designator that is used in circumstances where trust levels may vary.

In some embodiments, such elements may include one or more identity information sets, which may be biometric in the case of human actors. Other information sets may be created as i-Elements, representing information sets derived from, in part, resource characteristics specifications and/or PIDMX information sets, which may, for example be used to facilitate information management systems, such as, for example, PIMS.

Reputes—In some embodiments. Stakeholders may publish one or more Reputes (such as Creds) about resource sets through interactions with, for example, one or more PERCos Platform Services (such as Repute Service, Publication Services, and/or the like. For example, a resource set, $RS_1$, may have one or more Stakeholders publish one or more Reputes whose subject matter is $RS_1$. Such Reputes may include one or more standardized metrics, such as, for example. Quality to Purpose. Quality to Reliability and the like, as well as further Repute expression metrics, which may, for example, be specific to the purpose associated with the instance, to a group, class or other organization with which the instance is associated and/or the like.

Dimensions Facets and Metrics and User Valuations—In some embodiments. PERCos Dimension and Facets and/or auxiliary Dimensions may be associated with resource sets, such as, in some embodiments, resource Facet examples including complexity, size, cost, organization (such as, for example, singular or compound), and/or Repute Facet instances, for example, standardized quality metrics, such as for example Quality to Purpose, Quality to Purpose Reliability, Quality to Purpose Efficiency, Quality to Purpose Cost, and/or the like. In some embodiments, resource sets may retain metrics for resources with which they have interacted. In some embodiments, this may include one or more performance metrics, such as, for example, user expressed purpose satisfaction, value contributing to optimization, and/or other user expressions that may be expressed in standardized and interoperable forms with, as applicable, associated values. Such user purpose expressions may include those specific to a particular purpose set, purpose neighborhood set (such as a purpose class set) group, and/or any other logically, persistently identifiable or otherwise computable arrangement.

Time—In some embodiments, resource sets and/or operating (i.e., instantiated) resource set, and/or processes and/or results history monitoring services arrangement may retain time-related information sets regarding their own interactions and/or interactions with other instance sets. For example instances may retain the length of a lease, events, time periods and/or any other pertinent time information associated with any of the other characteristics they may retain. PIDMX may support the retention and organization of time information and the association of that information with one or more other organizational dimensions such that evaluation of both the dimensions, for example, the levels of performance, security, reliability and/or other evaluations may be determined as well as the time periods, situational events, and/or the like Other History—Instances, in some embodiments, may retain further characteristics of interactions with other resources, both from the perspective of the resource itself, that is its own interaction history, and/or the history, subject to any, for example, specified as relevant, control specifications of resources with which it has interacted. In some embodiments this may include performance information sets, which for example are specified by the standardized metrics described above.

In some embodiments, a PIDMX may comprise at least one interface, a set of organizing principles, as described herein, and one or more repositories. A PIDMX interface may, in some embodiments, be similar to a PERCos Resource Interface, in arrangement and instantiation. For example there may be control, interface and organization specifications, one or more method specifications and associated method implementations, and a PERCos kernel. In some embodiments, although PIDMX has a PERCos-compliant resource interface (i.e., the interface is based at least in part on or essentially be the same structure and/or organization as a PERCos resource interface), only when the published by an appropriate PERCos Publishing service does such an interface and/or the PIDMX it represents, become a PERCos resource. The utilization of common resource interface templates, in some embodiments, derived from and/or supplied by PERCos Platform services, for example PERCos Identity Services, can provide a convenient and effective method supporting interoperability.

PIDMX organization specifications may, in some embodiments, determine the locations, schemas, contents and other characteristics of repositories associated with and/or controlled by PIDMX, through for example PIDMX interface and specifications of that interface.

In some embodiments, the relationships between resources that have interacted may be retained by information arrangements of one or more of the resources involved in such interactions such as in PIDMX arrangements (and/or through other resource information store arrangements, including, for example, resource delegates and/or proxies). Such a retention may take the form of processes that operate to create, retain, and/or augment one or more tokens, which may be cryptographically protected and support integrity of one or more persisted resource relationships. The utilization of such retained relationship representations may provide users and Stakeholders with the means to ascertain whether they (or their delegates) have previously interacted with a resource, and consequently to evaluate that resource based, in part, on this representation, for example represented as a token, and any associated further information sets. In some embodiments, such tokens may include, for example:

Previously interacted with resources, where such interactions were positive (PIT-Positive Interaction Tokens)

Previously interacted with resources, where such interactions were negative (NIT-Negative Interaction Tokens)

Previously interacted with resources, where such interactions were neither positive nor negative, but have an associated level (LIT-Level Interaction Tokens (value))

In some embodiments there may be other tokens which, for example provide a reference to one or more policies for processing such resources, including testing of those resources for their authenticity.

In some embodiments, a resource set (including, for example, a Participant) that has had previous interactions with another resource sets (including for example other Participants) may generate one or more appropriate tokens that are associated with those resources. As the interactions require at least two parties, such tokens may form a symmetric pair, such that both parties in their future interactions may recognize the legitimate counter party. These tokens may then be combined with one or more system elements such as CPFF, IF, AM and/or other PERCos enabled hardware and software to invoke appropriate policies and/or responses to such recognized resources. In some embodiments these tokenized representations may, for example, be instantiated as parts of one or more communications protocols For example, one or more embodiments may include two or more independent communications interfaces, the first of which receives all communications and puts these into a secure buffer, and only those that provide a suitable token are passed on for further processing. Those communications that do not meet the appropriate policies regarding such tokens, may then be subject to further identity evaluations, such as liveness detections, for example, through an independent sub system that, for example, is isolated through use of a CPFF, or similar, processing isolation set. For example, those communications that meet the appropriate identity criteria may then be passed through for further processing, and those that do not are then discarded.

Figure 27:
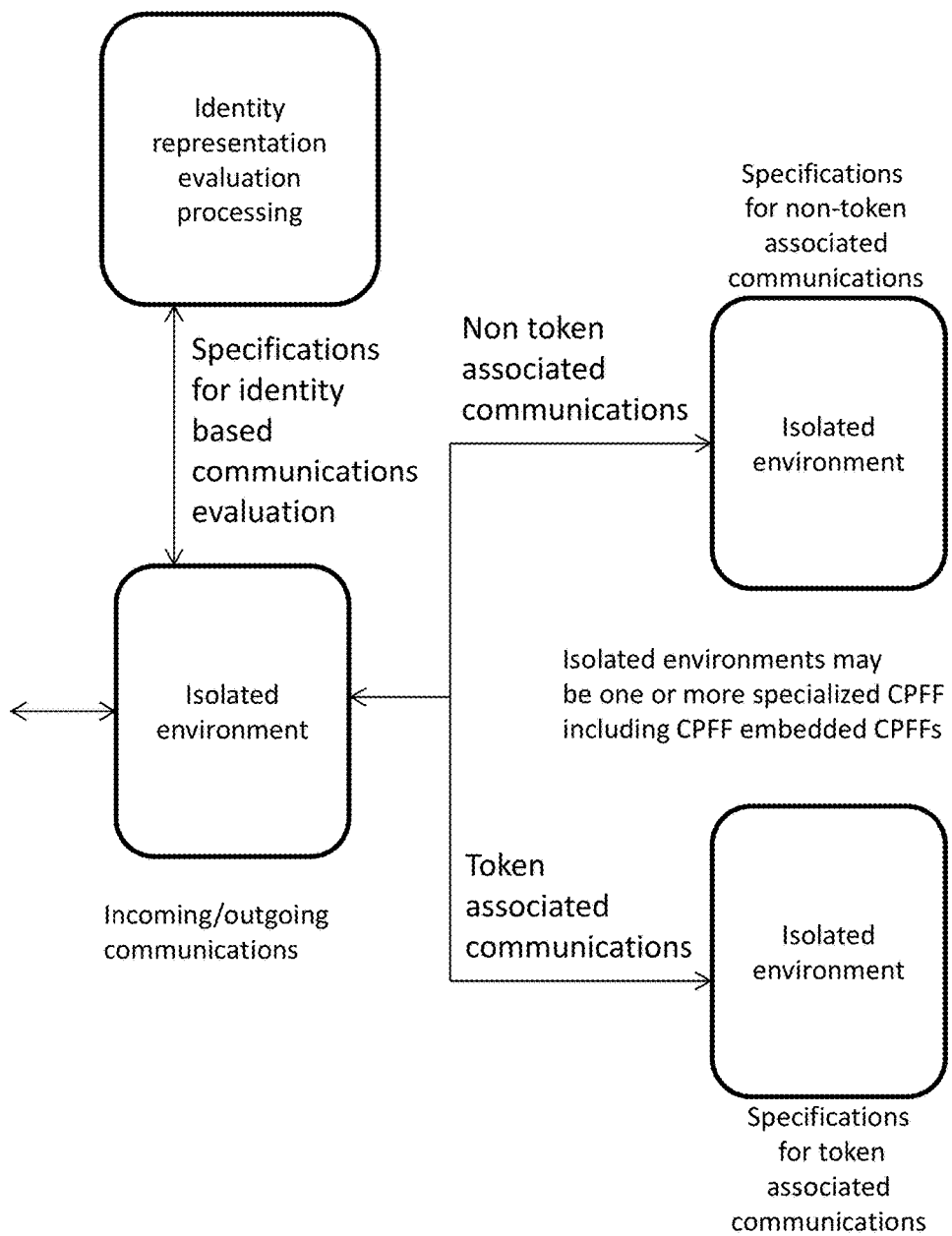
FIG. 27 is a non-limiting illustrative example of communications interactions processing based on, in part, associated resource tokens.

FIG. 27 is a non-limiting illustrative example of communications interactions processing based on, in part, associated resource tokens.

In some embodiments, a PIDMX associated with a resource set, $RS_1$, that may provide its resource manager instance with one or more identity attribute sets and/or the like characterizing information sets for one or more target contextual purpose operations. Such attribute sets and/or other information sets may include, for example, one or more specification sets that may provide information the resource manager instance may need to operate $RS_1$.

Figure 28:
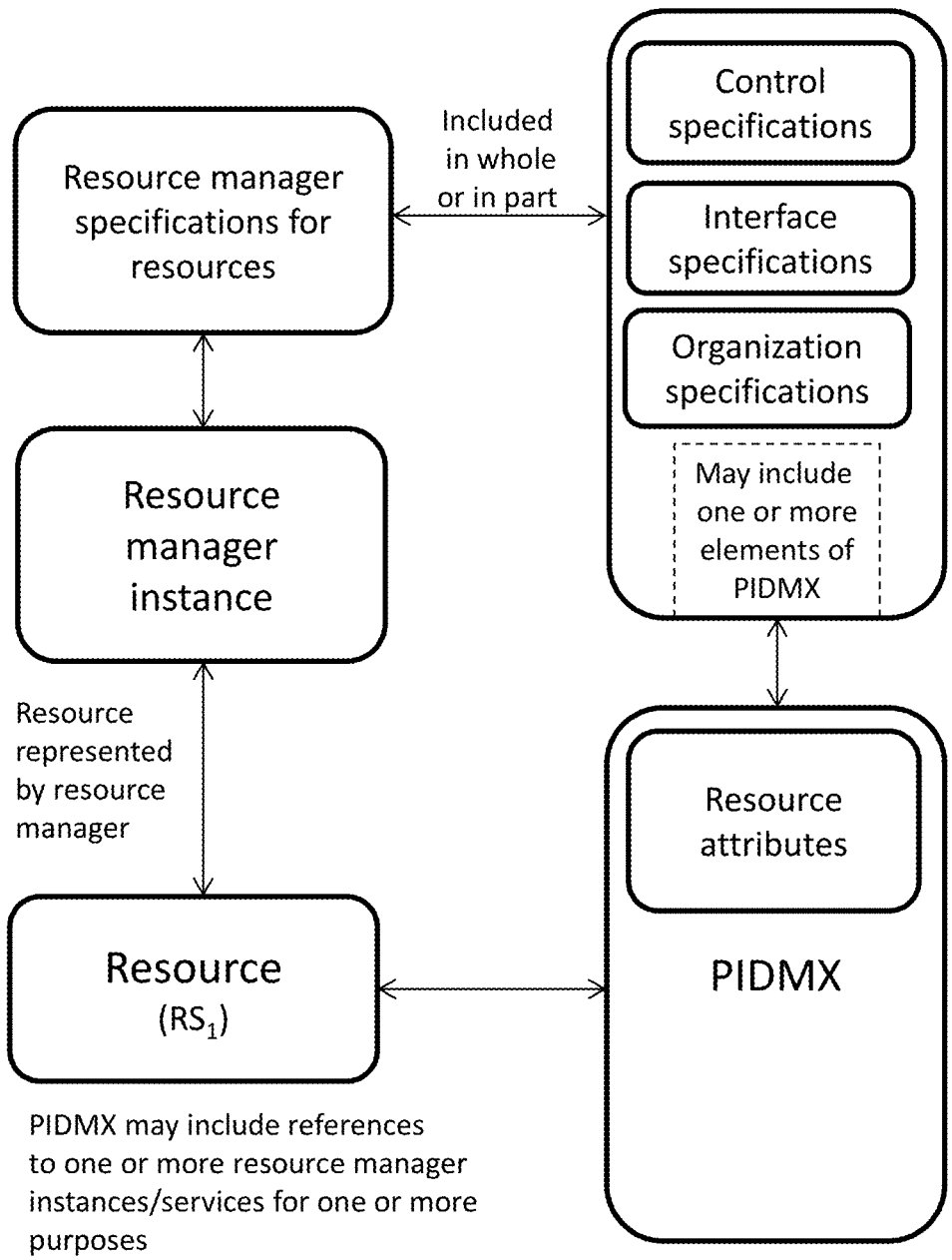
FIG. 28 is a non-limiting Illustrative example resource manager arrangement including PIDMX.

FIG. 28 is a non-limiting Illustrative example resource manager arrangement including PIDMX.

In some embodiments, PIDMX information sets may be extracted and/or processed by one or more processes to create identity information sets that are specific to one or more purposes, resource arrangements, constructs or other resource combinations. For example, these identity information sets may be i-Elements, designators, provenance identities, and/or the like, and may include existential biometric information sets, where appropriate.

Figure 29:
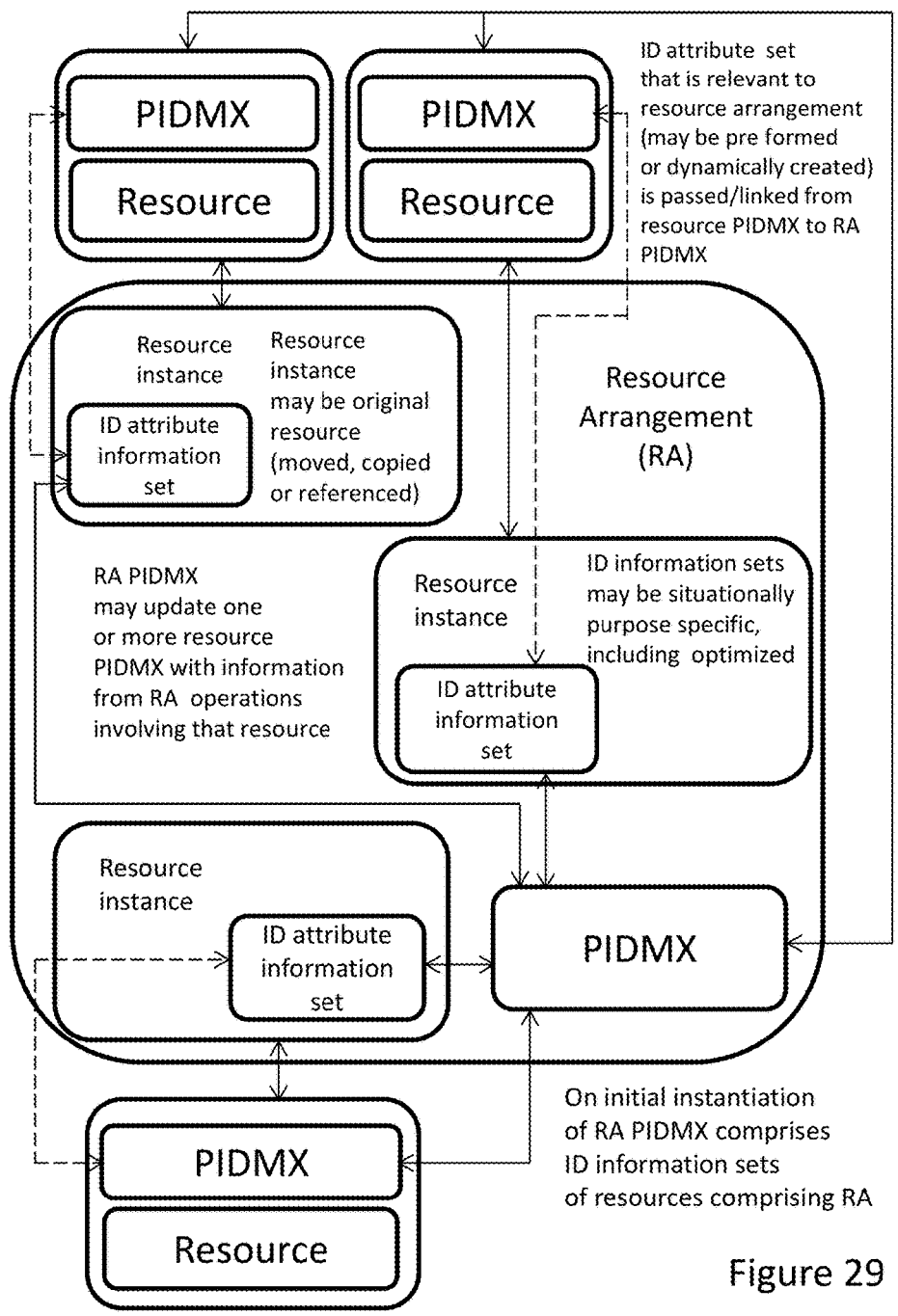
FIG. 29 is a non-limiting illustrative example of resource PIDMX and Resource Arrangement (RA) PIDMX.

FIG. 29 is a non-limiting illustrative example of resource PIDMX and Resource Arrangement (RA) PIDMX.

FIG. 29 is an illustrative example of a resource arrangement comprising three resources. Each of the contributing resources, in this example, is an instance of an originating resource and each resource instance has an associated identity information set, which may be, for example, situationally filtered and/or, if created dynamically, aggregated, and which are then aggregated in the resource arrangement PIDMX and where the PIDMX may have attribute and/or the like information that further reflects certain combinatorial characteristics of such formed resource arrangement. As the resource arrangement undertakes, or is involved in, one or more purpose operations, the resource arrangement PIDMX may be extended, for example, by, as germane and in accordance with purpose operating specifications, the information sets associated with those operations. In some embodiments, operating history information may then be, subject to the governing specifications, retained, in whole or in part, by the originating resources (and/or their instances, subject to the appropriate persistence conditions operating at the time) and/or by the resource arrangement, if such arrangement is persisted.

In some embodiments a resource set may be operatively associated with a plurality of resource interface arrangements, where each interface arrangement defines the set of capabilities and/or operations the resource set may provide for one or more specific contextual purpose specification set. For example, consider a purpose class application for learning physics. Such a purpose class application may have two interface arrangements, one interface arrangement for interacting with advanced graduate students, and another interface arrangement for interacting with undergraduate students. Such resource interface arrangements may have one or more control, organization, and/or interface specification sets that define how the resource set can be accessed, operate, and/or organized.

In some embodiments, a resource set associated with a plurality of resource interface arrangements may support a plurality of operating sessions, where operation sessions may have access to differing resource interface arrangement in accordance with the operating session's target contextual purpose specification set. Such resource interface arrangement may encapsulate one or more contextual purpose specific identity attribute sets. For example, this may include providing varying qualities of identity, for example, having lessor or higher quality security rigor requirements for a specified less or more secure session, thus, specifying differing resource characteristics and/or operations and/or providing, during a session, differing specification sets for such operations of the applicable resource set, through the resource interface set.

Figure 30:
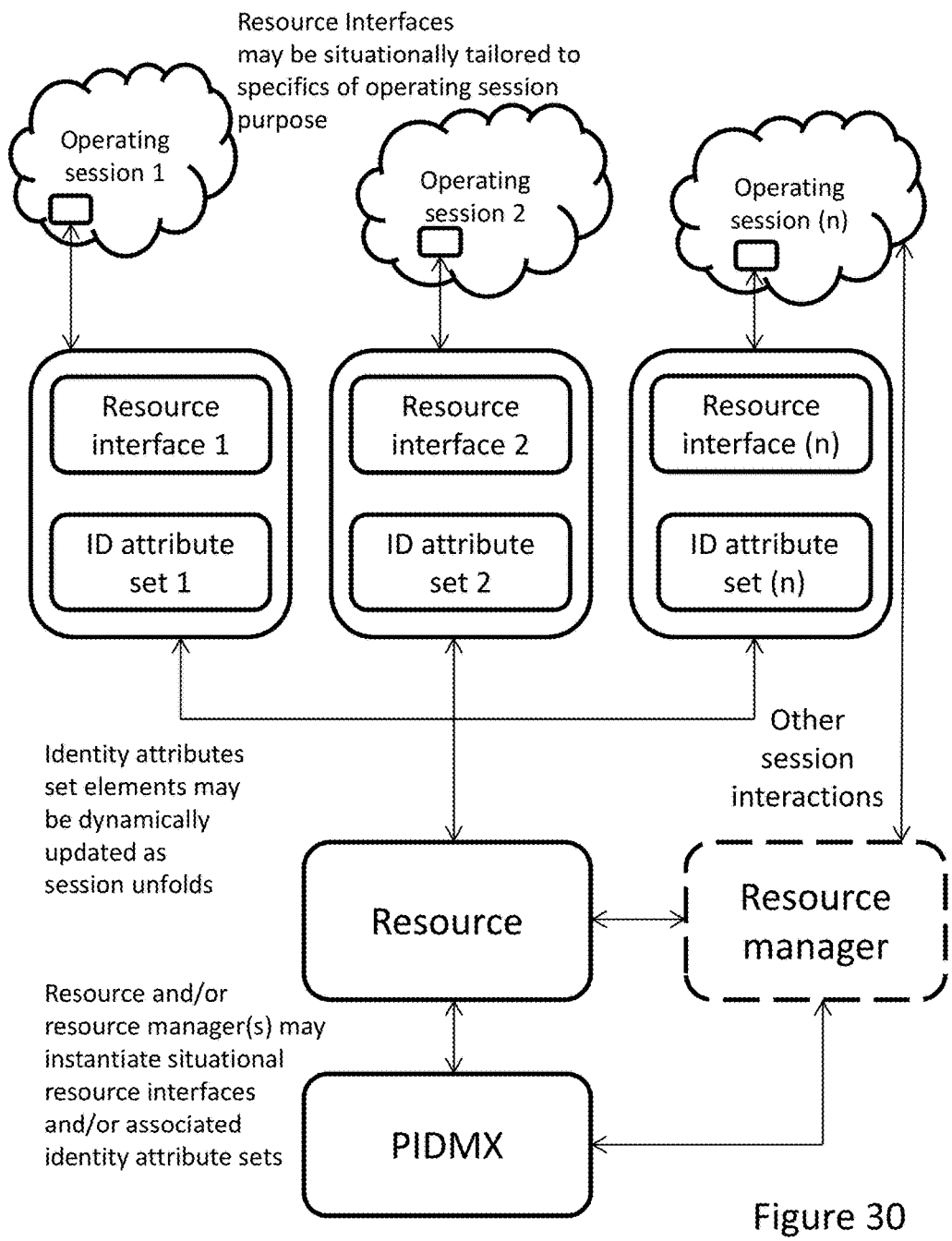
FIG. 30 is a non-limiting illustrative example of a single resource with multiple resource interfaces and associated identity attribute sets.

FIG. 30 is a non-limiting illustrative example of a single resource with multiple resource interfaces and associated identity attribute sets.

In the illustrative example shown in FIG. 30, where the resource has a single PIDMX from which appropriate identity information sets are distributed to the appropriate operating sessions. For example in one session this may comprise a designator, in another a set of existential biometric identity information, and/or the like.

Certain PERCos capabilities described herein substantially contribute to computing purposeful activity set consequences management. These capabilities include real-world improvements in the reliability of resource identification; the reliability, flexibility and situational applicability of resource information attributes and related evaluation processes; and the management of user (and/or Stakeholder) purpose related resource set deployment and operations, the foregoing in support of producing optimal user purpose responsive, computing arrangement usage results. Such capabilities can include:

1. Techniques for optimally assuring the reliability of persistent identities related to candidate computing resource sets.
2. Techniques for providing situationally appropriate aggregations of resource set specific, user purpose relevant, identity attributes in support of contextual purpose resource identification and evaluation operations, the foregoing supporting, for example, identifying, selecting and/or managing resource sets and/or portions thereof having best qualities—individually and/or in the aggregate—contributing towards purpose fulfillment (for example, in the balance of contextual considerations). Such purpose fulfillment processes may include, for example, situationally evaluating and/or managing resource sets in relation to other resource sets, their positive, as well as negative, Quality to Purpose characteristics, where the latter may contribute to unintended/undesirable consequences, such as malware results.
3. Techniques for specifying resource set deployments, and for managing resource related operations, in accordance with any such specifications during user set computing arrangement contextual purpose fulfillment activity sets such that resources deployed, and/or operations of any set of such resources, may be constrained and/or isolated in a manner to provide desirable and reliable degrees of resource set minimality and/or trustworthiness so as to optimize computing activity set efficiency and/or minimize unintended/undesirable consequences. Such resource constraining may be designed to isolate one or more purposeful session process sets (and/or, for example, related information sets) from other session and/or non-session processes and/or information in accordance, at least in part, with resource and/or resource portion identity related considerations.

4. Techniques for informing users and/or their computing arrangements regarding properties (e.g., attributes) of resources (including, when applicable, one or more portions of such resources), and/or concerning properties of resources and/or resource portions associated with other resources (such as one or more Stakeholders, in the form of Participants and/or the like who are associated with other PERCos published resources), wherein such qualities of given resource sets and/or resource portion sets and/or their associated resources (such as Stakeholders) may provide information regarding one or more Quality to Purpose relevant Effective Facts, Faith Facts, and/or Cred assertions, that may influence the identification of optimal user purpose fulfillment contributing resource set(s).

5. Techniques for managing PERCos identity information arrays in support of resource and resource portion set identification and/or evaluation, wherein such arrays include a binding (combining, direct associating, and/or algorithmic connecting) of resource identities (such as naming, explicitly locating, and/or the like) with resource attribute and/or portion sets, such that responsive to contextual purpose specifications, Purpose Statements, and/or the like, resource attribute sets, such as direct, asserted, and/or associated qualities of a given resource set, are selectively assembled and/or evaluated in response to such purpose specifications such that an identity/identity attribute(s) pairing set is based at least in part, on situationally germane to context, user purpose specifications (and/or associated actions).

6. Techniques for assuring the assiduous (for example, rigorous and situationally effective) identity reliability of humans, and associated groups, as resources, for example, as Stakeholders and Participants. and/or as users. Such parties may be involved in purposeful computing sessions, for example, directly as Participants, such as in the role of user expert resource sets and/or as other user purposeful computing participants, such as family members, business parties, friends, social networking contacts, and/or the like, and where such parties have registered published Participant identity information sets and/or the like identity resource instances that may be used to identify, reference, evaluate, authenticate, and/or the like any such parties, as they may be direct participants in purposeful computing sessions, and/or as they may be associated with such sessions as Stakeholder sets associated with computing arrangement resource sets. When serving as Stakeholder sets, such parties are attributes of resource sets, such as PERCos Formal resources, for example, as Stakeholder publishers, creators, distributors, editors, modifiers, retailers, and/or the like. Stakeholder identities associated with their corresponding resource sets, as situationally applicable when represented by human biometric information, means a Stakeholder party corresponding human Participant set and/or the like, or Participant set information for an authorized one or more human agents who may act on a corresponding Stakeholder party's behalf, in providing biometric human information representing a Stakeholder "signing" a Stakeholder published resource.

PERCos resource identity information arrangements and identity evaluation capabilities are, in some embodiments, based at least in part on highly reliable resource identifier sets produced, at least in part, for example, through the use of PERCos assiduous identity techniques. Such techniques may include assiduous biometric identity capabilities, whereby the identity of resources can be very reliably established, persisted, and subsequently authenticated. Such a Participant identity instance may be associated with one or more of a resource set's associated Stakeholder and/or Stakeholder agents' identity information, where, for example, such Stakeholder is identified, or such party's identity information is confirmed, through, for example, the use of liveness tested biometrics (e.g., iris, retina, vascular, eye tracking, 3D facial movement, and/or the like, which may be existentially reliable when for example combined with timing anomaly and/or biometric challenge and response and/or the like existential biometric analysis techniques), and where such biometric information may be augmented by environmental and/or historical behavior related pattern information, as well as by, for example, other assiduous biometric techniques such as human chemical molecular pattern set scent sniffing, protein profiling, DNA profiling, and/or other biometric assessments. Such one or more PERCos assiduous identity assessment techniques may be further augmented by, and/or PERCos may alternatively use, challenge response, multi-factor, and/or other assiduous, for example existential, biometric, and/or user computing arrangement environment techniques, sufficient to an assurance level of rigor situationally required and/or as specified by a PERCos embodiment. Such assiduous capabilities, in some embodiments, may involve further existential biometric liveness testing, including the use of, for example, situationally specific pseudo-random (may include any unpredictable) generated (and/or, as may be applicable, other effectively unpredictable sequences, bursts, patterns, and/or the like, of) electromagnetic radiation and/or sound wave emission "information" sets that may transparently "paint" humans and/or at least a portion set of their computing arrangement environments with electromagnetic radiation and/or sound in a form that creates information specific to such human and non-human environment portion sets. In some embodiments, one or more signals produced by one or more emitter sets may be, at least in part, reflected, refracted, diffracted, scattered, partially absorbed, re-emitted, and/or the like by such human and/or environment portion sets, and where one or more secure sensor sets (e.g., camera sets, microphone sets, and/or the like) may detect some portion of such redirected and/or modified signal sets (along with, for example, any co-present, i.e., background/ambient, radiation and/or sound) to obtain biometric and/or human computing environment information.

In some embodiments, such emitter signals may be comprised of one or more frequency range sets which may contain constant frequency (CF) and/or frequency modulated (FM) portions, and may, in some instances, be pulsed. Such embodiments may support a range of detection modalities, including, for example, those based on timing delays between sound wave emission events and corresponding sensing events (using, for example, principles of animal echolocation and/or other forms of sonar).

Such received information sets can then be used to extract human and/or environment identifying information, such as biometric pattern information through secure. (for example transparent to user), sensed user and/or environment information sets, including information resulting from such emitter challenge and response means. Such information may, in some embodiments, be, at least optionally, accumulated across time interval sets, and may be subjected to timing anomaly analysis as an aspect of biometric liveness testing. Such biometric and/or user computing arrangement environment information extraction techniques can, in some embodiments, involve hardened hardware and/or software components for securing emitting, sensing, processing, information storage, and/or communication functions, which components may be securely packaged to support the operation of an Identity Firewall, for example, bus compliant arrangement, other component arrangement such as an Awareness Manager. and/or a cooperative arrangement of plural such instances. Identity Firewall assiduous identity support embodiments, in combination with appropriate PERCos embodiment network based identity administrative and/or cloud authority one or more services and PERCos assiduous biometric identification and evaluation techniques, enable substantially identity-based architectures for secure user purposeful operations. Such embodiments, when further combined with PERCos CPFF capabilities, can support considerable improvements in the reliability and trustworthiness of open computing environments.

7. Techniques for assuring the assiduous reliability and identity of non-human tangible and intangible user computing arrangement resource sets and environments. PERCos Participant information sets may reliably identify user sets who have previously registered their Participant and/or the like identity information instance with, for example, a cloud identity or broader identity and resource service. Employing assiduously reliable Participant human identity information coupled with unique attribute information descriptive of non-human tangible and/or intangible resource sets may substantially contribute to assuring reliability of non-human computing arrangement tangible and intangible resources. This can be achieved by securely storing human, for example, authenticable existential biometric information with uniquely describing key attribute information of resource sets, where such resource attribute information corresponds to unique aspects of any given resource set, such as an identifiable one or more portions of its information content (e.g., a software application, document, video, database, portions thereof, and/or the like) and/or its interface information (hard drive, memory, human Participant, cloud service, and/or the like). Both such human information and such resource attribute information can be, for example, represented by one or more cryptographic functions, including, for example, hashes. Both such information types, in some embodiments, can be bound directly and securely together using, for example, cryptographic hash functions of such information sets that are representative of at least portions of the corresponding assiduous human identity information of such resource set's one or more Stakeholders and such attribute information (which may include interface information) of such non-human resource set. Such non-human resource set attribute information shall, in some embodiments, be sufficient to at least uniquely identify such resource set, and in some embodiments may, for example, further be sufficient to access such resource set. Such bindings of such human assiduous, for example, liveness tested and further authenticable Stakeholder biometric information, with such non-human resource information may involve combining into unified hashes of such resource information and such Stakeholder biometric information, employing plural corresponding securely linked hashes, securely referencing corresponding hashes, and/or the like cryptographic techniques.

The bindings of Stakeholder and resource securely represented metrics, and the availability of such metrics for identification and/or authentication of the "realness" that any given resource is at least in part based upon the authentic assertion (such as certification) of one or more resource Stakeholders (individually human, or organization and its human agent set), can enable very highly reliable to effectively foolproof means to assure a resource is the resource it "claims" to be, unmodified and as made available and/or otherwise validated by a valid Stakeholder set. Such Stakeholder sets may, for example, have been previously existentially biometrically and/or otherwise assiduously authenticated, for example, as one or more PERCos embodiment Participants, and, for example, later authenticated during a PERCos embodiment publishing process as a Stakeholder set of a given resource set that corresponds to a stored, registered and published Participant resource one or more instance. Such authentication of such Stakeholder set may involve validating such human instance, such as, for example, establishing an existential biometric information set, or authenticating such a set against a stored Participant and/or the like existential biometric information, when publishing a resource set. Further, PERCos related authentication processes can be performed at a later date, for example, when Participant experts are being authenticated as being the valid respective parties they claim to be and/or when a published, for example Formal PERCos resource Stakeholder information is being validated. In such instances, Participant information, as germane, can be tested to assure it is the same unique information set as claimed, for example, for a Stakeholder expert or a Stakeholder expert resource information set as, for example, stored Participant information held by one or more cloud service arrangements. Such authentication of Participant and/or the like information set corresponding to Stakeholder resource information may be performed when a resource set is being used or contemplated for use, for example, by a user set or as relevant, a Stakeholder set. Such authentication processes may occur when, for example, publishing a resource set such as a Participant resource, a non-Participant resource containing Stakeholder information, and/or during later evaluation and/or use of such set.

Such identity information arrangements and identity evaluation capabilities may involve storing Participant and/or the like biometric, environmental, behavioral, and/or other human resource Participant and/or the like Stakeholder certifying party information, including, for example, pattern information of the foregoing, in local user computing arrangement nodes (e.g., smartphone, tablet, notebook computer, game station, and/or other user device arrangements) and/or at network locations such as corporate administrative and/or cloud service one or more locations. Such stored Participant information, for example, in the form of assiduously acquired existentially assured, liveness tested, biometric and environment information (including, for example, timing anomaly and pseudo-random emitter challenge and response tested information), and/or one or more transformations thereof (e.g., cryptographic hash representations, whether limited to such biometric information and/or combined with one or more information components representative of such biometric information corresponding resource set), can be compared to an authentication information set securely associated with or embedded in any such resource set and/or such resource set interface and/or other resource set attribute information (including evaluation of a user set during live user computing arrangement contemplated or active participation), where the foregoing comparison validates, that is agrees, or invalidates, that is denies, that a given instance of a resource set authentically corresponds to the stored resource set certified by such Stakeholder set and/or human agents thereof and securely bound with other such resource set attribute (which may include, for example, interface) information.

8. Techniques that—at least in part, through use of secure hardware, which may be "hardened", and/or software components of user set computing arrangement environments—contribute to ensuring the correspondence to purpose, reliability, and security of resource provisioning, as well as the establishment of identity authenticity. Such arrangements may include device arrangements, including, for example, arrangements employing security hardened identity appliances and/or hardware chips and/or chipsets (and/or portion set) and/or secure software and/or data management capabilities supporting, in various embodiments, various degrees of hardened, secured assiduous biometric and/or other contextual and/or the like identity establishment, delineation, authentication, and/or other evaluation. Such hardened environment capabilities may include in some embodiments securing user and/or user computing environment related identity and/or computing arrangement environment/usage attribute information, such as pattern information (e.g., behavioral and multi-user interaction patterns, location, gait/motion, and/or the like). Such hardened environments may, for example, with Awareness Managers, protect operations that include the testing of human identity, for example, at least in part, through use of such emitter and/or sensor capabilities. Further, such hardened environments may protect identity related user computing arrangement environment configuration, activity, and/or constituent element sets. Such testing may involve pattern matching against human user set specific stored pattern information and/or human "normative" (e.g., normal liveness dynamics) biometric pattern and/or related information. Such testing and/or related identity evaluation capabilities may, in some embodiments, include the use of secure hardware component included clock functions (real-time and/or relative time, including duration information), whereby, for example, anomalies revealed by secure timing analysis of the sequence (unfolding) of sensor received biometric data—for example, employing secure time stamped information—are identified and/or otherwise event indicated (e.g., suggesting and/or requiring further evaluation and/or event response) as abnormal and/or inconsistent with anticipated timing of biometric (such as pattern) information, and/or where normal unfolding of sensor biometric input data, such as human 3D facial movement dynamics, do not properly correspond to real-time "normal" information sequencing (e.g., biometric information fluidity dynamics). Such over-time anomalies can indicate or demonstrate attempts, for example, by hackers to spoof the human identity biometric information flowing from, and/or appearing to flow from, sensor and/or sensor and emitter operations, since attempts to build and transmit on-the-fly spoofing misinformation for complex biometric signals, such as 3D facial movements in space over time, will, under many, if not all circumstances, have one or more discontinuities relative to normal, real-time signals. Some embodiments may further include the use of remotely instructed to a user computing arrangement, session specific, real time, and/or the like, and/or pseudo-randomly generated (that is, without knowing certain secret information, unpredictable), for example, ultrasound, and/or radio waves, and/or the like pattern and/or other set of "information," whose reflection is acquired by corresponding sensor one or more types. Such "lighting up" of users and/or at least a portion of their environment arrangements with unpredictable information sets that cause reflection information can support highly trusted biometric assessment arrangements for assuring the acquisition of live human and/or such environment information. In some embodiments, all of the above capabilities may be supported in Identity Firewall embodiments, for example, secure Identity Firewall appliances and/or bus resident Identity Firewall one or more components, including Awareness Manager ("AM") implementations incorporating such Identity Firewall arrangements. Such arrangements, in support of pseudo-random emitter emission generation may employ, for example, PRNG (PseudoRandom Number Generator) principles, where a generated value set is applied to an emitter emission producing algorithm set for generating a specific result set based on a PRNG seed set, which seed set may be different, as a unique secret, for each IF and/or AM arrangement, and may be shared as a shared secret set with a cloud service and/or administrative arrangement. Such emitter emission producing algorithm set may be at least in some manner unique in each IF or AM instance or instance grouping having a pseudo-random generator set. Such pseudo-random emissions may be, at least in part, reflected, refracted, diffracted, scattered, partially absorbed, re-emitted, and/or the like, and such response to emissions may at least in part be sensed by its respective, corresponding IF associated and/or AM included sensor sets.

Such PERCos hardened capability sets, such as Identity Firewall embodiments, include secure communications capabilities used to transmit information between user set computing arrangement Identity Firewall plural instances, and between such computing locations and cloud and/or network cloud service(s) and/or administrative nodes. Such hardened environment capabilities may further include control and/or evaluation capabilities for such arrangements, e.g., identity process awareness and control management, including, for example, management of pseudo-random emitter signal emissions, and/or combination PERCos CPFF/awareness management capabilities sets, and/or the like, which such arrangements may be internal to one component, component set, plural component arrangement, connectable appliance arrangement, and/or the like where the foregoing may support internal and/or shared and/or redundant capability/operations sets, including any secure inter and/or intra such computing arrangement encryption and communication capabilities. The foregoing awareness management capabilities may be employed for assessing and/or managing such hardened arrangement processes, related process instruction information, and related process results information (for example, including arrangement environment awareness of ephemeral and/or persistently retained (e.g., audit log) input (e.g., from emitter distributing, biometric sensing, location sensing, and/or the like) where such assessing and/or managing may include analysis of one or more qualities related to hardened arrangement information and/or process set authenticity, security, efficiency, reliability, and/or the like, for example, by evaluating biometric input using biometric signal timing anomaly and/or other liveness techniques, evaluation of security integrity of one or more such device nodes internal information and/or processes, evaluating correspondence relationships between, for example, emitter emissions (such as challenge and response) and acquired biometric signal information, and/or evaluating security integrity of communication activities between any set of such nodes, for example, by evaluation of PKI and/or related certificate types, existential biometric certificates, and/or the like.

2 Secure and Reliable Purpose Provisioning and Identity Assurance

Currently, sophisticated cyber criminals, hackers, and/or other disruptive humans, have little difficulty, under most circumstances, in spying on and/or breaking into computing arrangements of organizations—however large or small—and individual users to steal and/or otherwise gain inappropriate access to, and potentially observe, copy, modify, and/or misdirect, sensitive information and/or process sets, as well as spoof identities and create fraudulent communications. Such theft, access, and/or other miscreant activities may be directed towards, for example, corporate financial-related information sets, sensitive corporate and/or other organization information sets (such as intellectual property, research and development information sets, financial records, and/or the like), individual user credit card numbers, transaction histories, and/or other personally sensitive information sets (including, for example, personal correspondences, photos, and/or the like), employment associated personal information sets (such as, for example, Social Security Numbers, employment histories, and/or other highly personal information sets), personal health information (involving, for example, diagnosis, conditions, medications, and/or the like), and/or the like by breaching security perimeters of computing arrangements of organizations and/or users.

Various reasons contribute to the vulnerability of computing based systems, and in particular, to network connected systems. Generally speaking, malware and other security incursions are the result of resources having one or more attributes that support and/or otherwise enable, normally in a hidden manner, a malevolent external (to one's trusted circle) parties' purpose set (and where a resource is anything that may be processed, including anything that has computing interface information supporting interaction with a tangible instance set, such as storage media or human participants). Since most computing systems and/or applications provide rich feature sets whose implementations are highly complex and whose attributes are often in flux as such products and components evolve, even the most sophisticated users, including those within security support divisions of large organizations, have great difficulty in thoroughly analyzing and/or otherwise comprehending the full scope of both intended, and potential, and often hidden and unknown, unintended to user set consequences resulting from resource use instances, and resource sets having multiple resources as constituent components.

Reliable, persistent identity and identity awareness/knowledge, and the capability to manage resources based on such identity information and understanding, are underlying root factors for establishing and/or maintaining effective secure user computing arrangements, and in particular, arrangements that are connected to the internet and rely on one or more resource types and instances sourced from remote, independently managed locations. Resource identity involves two types of domains: the computing domain, comprised of resources employed in the computing sessions, and the cross edge human side, which may include the cross edge's external environment local to the user computing arrangement. Such cross edge environment is comprised of human user sets and tangible environment other elements.

PERCos security innovations provide two sets of hardened technology environments, one to address each of these two root constituent domains, with, in some embodiments. CPFFs providing important trustworthy computing capabilities for managing the computing environment resource composition and its appropriateness to user contextual purpose sets, and Identity Firewalls and/or Awareness Managers helping establish, and support the use of, human identity descriptive related information to ensure the integrity and reliable persistent identity of user and/or Stakeholder set identification representations.

In some embodiments, Identity Firewalls (IFs) and/or Awareness Managers (AMs) can provide important capabilities that can, to a very high level of confidence and reliability, assess and contribute biometric for humans, as well as environment elements depicting user and/or Stakeholder set (and/or in some circumstances user environment and/or computing arrangement) attribute information from the environment that can serve as key, root identifying information sets associated with a user set and/or the like persistent, unique identifier information, such as may be incorporated in a registered, published PERCos Participant resource information set, and/or may be employed to assure the integrity of non-human resource information by employing liveness tested and/or other assiduous biometrically derived information to be securely bound to their respective, published resource set descriptive information sets in a manner ensuring very highly reliable resource integrity and identity persistence. By employing both of these capability sets, and in particular when combined with PERCos and/or the like standardized and interoperable contextual purpose specification capabilities and related features, along with Repute Cred, EF, and FF, and/or the like capability sets, user sets can control, or have automatically and transparently controlled by expert, for example Frameworks, resource set provisioning and operations management through use of CPFF arrangements, where CPFF specifications regarding eligible resource sets (at least in part satisfying, for example, purpose related specification information) can rely on the highly reliable resource identity and related authentication capabilities enabled and/or otherwise supported by IFs and AMs. IFs, AMs, and CPFFs, in some embodiments, can operate in any logical distributed arrangement connected by any sufficiently reliable communications means.

To manage the economies of power usage, cost to manufacture, size, and/or other considerations, capabilities of any of such PERCos hardened environments may be shared, and/or combined. For example, one IF or AM may operate as an in part "master" instance, having, for example, a time clock, time stamping, capability set, pseudo-random emitter pattern or other distributed signal control logic, memory storage, and/or any centralized, shared processing and communications capabilities that it is logical, for their application, to share in one or more "master" instances. This same sharing of capabilities principally applies, in some embodiments, to CPFF plural instances, and further to any sharing, mixed IF, AM, and/or CPFF arrangements. In some embodiments, certain one or more IF, AM, and/or CPFF capabilities may be operated on a server and one or more of the respective IF, AM, and/or CPFF instances may function as a thin, to thicker, client, which other functions operating, or redundantly operating, on one or more server arrangements, whether an administrator arrangement on a network and/or a independent cloud service serving a plurality of separate business clients.

Figure 31:
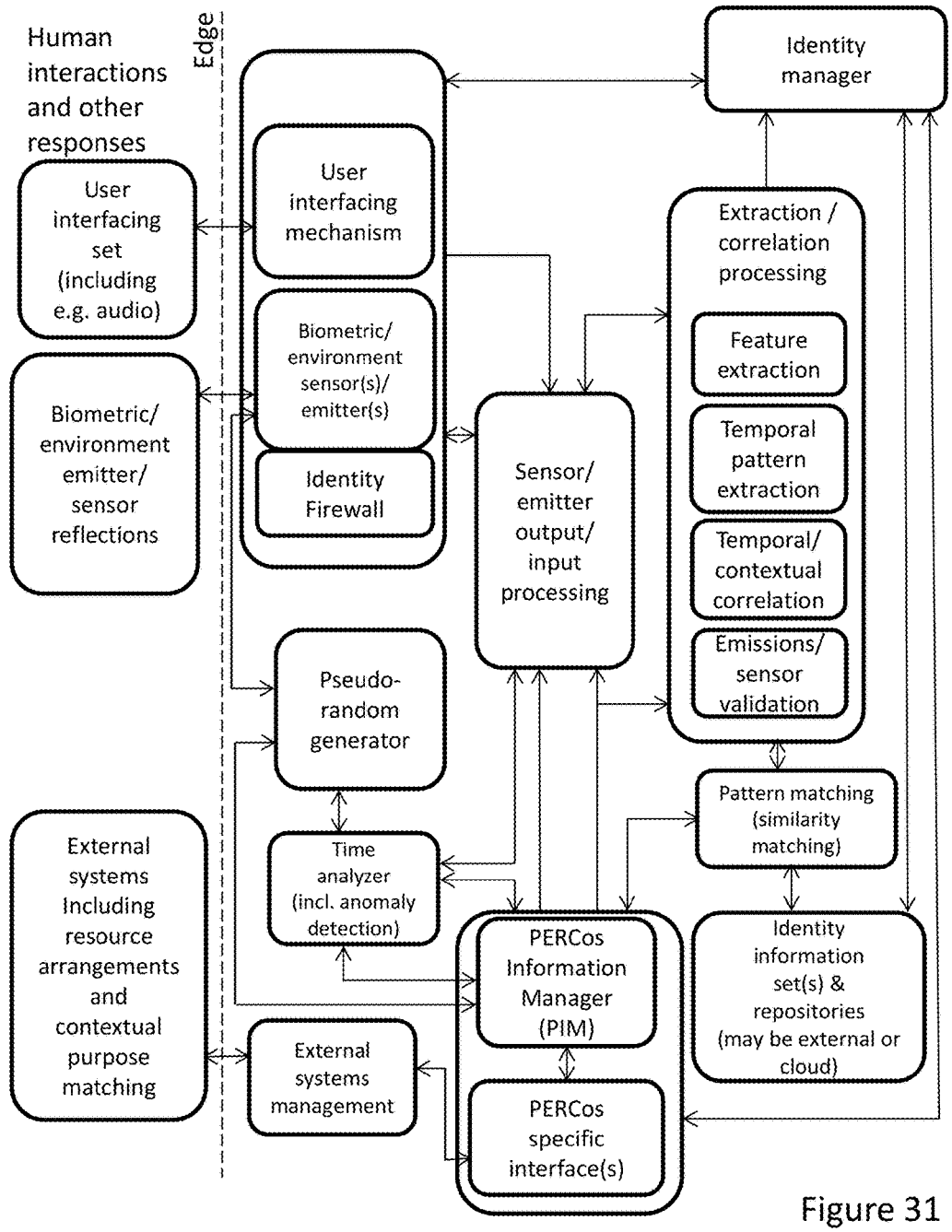
FIG. 31 is a non-limiting illustrative example of components of a secure arrangement for purposeful computing using a reliable identity-based resource system.

FIG. 31 is a non-limiting illustrative example of components of a secure arrangement for purposeful computing using a reliable identity-based resource system.

CPFF sessions may, in some embodiments be spawned as dedicated contextual purpose sessions (CPSs) in VMs with the general purpose operating environment for a user computing arrangement moving into non-CPFF VM while any one or more CPS sessions are open. When all open CPSs are closed, the general OS VM is closed and the OS is moved back into its traditional operating mode without VM overhead. In some embodiments, various IF. AM, and/or CPFF hardware implementations may employ specialized accelerator components, for example, a VM, other sandbox, and/or other contextual purpose provisioning and resource managing accelerator arrangement, that is adapted in some arrangements to the capabilities related to opening, closing, process managing, storing, retrieving and/or auditing VM, other sandbox, other contextual purpose, and/or the like processes.

The assurance of identity reliability and the provisioning of persistent, reliably identified, authorized resources for contextual purpose sessions, is, in various embodiments, an important consideration set. As a result, IFs, AMs, and CPFFs will, in such embodiments, be secured user computing arrangement techniques designed to prevent exposing sensitive information and/or processes to outside inspection, copying, modification, repurposing. In some embodiments, some portion or all IF, AM, and/or CPFF capabilities may be provided in hardened hardware enclosures such as chips, chipsets, computing arrangement attached devices/appliances, directly internet connected appliances, and/or the like. Such arrangements may employ integrated circuit reverse engineering countermeasure techniques. These may include methods to manage or prevent decapsulations, optimal imaging, microprobing. EMA, fault injection, and/or the like, such as employing diffusion programmable device techniques, anti-power analysis countermeasures capabilities (for power, differential power, and/or the like) and/or the like. Such arrangements may be enscapsulated using epoxy and/or other decapsulation and/or inspection materials, and such packaging may further include tripwire arrangements and/or other deactivating and/or event monitoring capabilities. Such hardware instances may include secure component communication chip set arrangements for secure communications among IF, AM, CPFF, and/or administrative and/or cloud related services.

Currently, most end users who use their computing arrangements for a wide variety of tasks have difficulty dynamically configuring their resource sets for specific tasks in a manner that balances differing situation-specific considerations concerning resource use risks and consequences. These risks and other considerations may include trustworthiness, reliability, cost, privacy, authenticity, efficiency, resource combinatorial processing consequences, Stakeholder interests, and/or the like.

Today's computing environments often have a number of executing processes that are not directly, or even to a large extent, indirectly, related to many of user target purpose computing objectives. In some circumstances, resource elements may contribute to an aspect of user purpose that differs from the central purpose focus, such as having the reduction of the cost to use certain associated resources or, as is argued by certain large computer cloud service companies, help services inform users concerning available options. Many computing resources, whether operating or available to operate on a given user computing arrangement, are, from a user standpoint, unknown, unauthorized, and/or potentially unreliable and/or untrustworthy.

Computing resource sets frequently operate as background process sets that may directly serve the commercial, or at times the malevolent, interests of other parties. As a result, today's computing arrangement user sets need practical means to control the resources operating on their computing arrangements, particularly when such arrangements are performing sensitive operations and/or involve confidential information. Currently, computing arrangement user sets have no broad means to ensure that security, privacy, efficiency, and/or other usage consequences flowing from the provisioning of various resources, will be reasonably consistent with user and/or other party considerations, including their respective concerns, requirements, and/or the like.

Generally speaking, today's user sets are ill-prepared to evaluate what resources should operate in their computing environments at any given time and, for example, during any given contextual purpose fulfillment activity. This challenge set has become profoundly more formidable as the computer connected world has evolved. This connected universe offers user sets nearly boundless arrays of resource opportunities made available by a vast, distributed assortment of resource providers who, in many instances, along with their corresponding resource sets, are poorly understood. Such resources, and their associated Stakeholders, range from unknown or unfamiliar to user sets, to relatively known but poorly understood by, and/or to unreliably provided and/or described to, users sets. Such unknown, to poorly understood, to unreliably provided and/or described resources, range from emails and their attachments, to software programs, document sets, web pages, cloud services, devices and other hardware, human actors, entertainment instances such as games, movies, and music, and/or the like. All the foregoing types, at least from time to time, present a host of potential liabilities to user sets, particularly when such user sets use typical and relatively open, versus, for example, fixed appliance, computing arrangements.

Given the high level of incidence of malware compromising todays computing systems, and given the widespread concern regarding the consequences of compromising user set information privacy, providing computing arrangement solutions for managing the provisioning of computing arrangement resources so as to avoid unintended computing arrangement usage consequences is a major technology challenge confronting today's computing infrastructure. Such concerns are of particular significance when user sets are performing sensitive computing activity sets such as those involving confidential information. Such confidential information may comprise many different forms and compromising these various forms may have quite different implications, but may be comparably serious for the one or more parties involved. Such information sets and/or process related types, for example, and without limitation, may include (and some of which may overlap):

Banking, investment banking, and other related financial information, for example involving account numbers, passwords, account balances, transfer information, and/or the like, Credit card numbers and associated passwords and user identifying information, such as Social Security Numbers and/or the like, employed and/or otherwise displayed during application processes, such as for employment, insurance, accounts, and/or the like and/or employed, for example during online transactions such as when performing purchasing activities and/or as provided in the form of transaction information historical details available during cloud service/user interactions, Sensitive corporate and other organization information, such as, financial, intellectual property, research and development, planning, project, product, and/or marketing information, such as, for example, corporate product planning documents, technology research project information, investment and related investment planning information, confidential military technology designs, product compositions, designs, and/or release information, and/or the like, as well as, for example, information related to societal services such as tax authority, police, defense, and/or diplomatic service activities.

Sensitive personal information regarding interests, priorities, involvements, discovery activities, and/or the like, for example, the activities of individuals and small groups involving internet surfing, searching, and/or discovery, as well as personal interaction and research activities, performing community and/or fulfilling other responsibilities, and/or the like.

Information storage and processing activities including personal (local and/or local network and/or otherwise distributed) and/or cloud service (Dropbox. Box, OneDrive, Google Drive, and/or the like) documentation and/or records such as emails stores, financial records, personal pictures, videos, and/or the like, as well as health information, interpersonal private communications (e.g., video telecommunicating, messaging, and/or the like), and/or other stored information, for example, information associated with personal interaction with others, personal records, personal beliefs and/or events, and/or the like, Manufacturing and/or other sensitive and/or valuable process management activities, such as commercial manufacturing process control, nuclear power plant operations management, power electrical grid power management and systems maintenance, water related infrastructure such as storage, pumping, and transmission control systems, air traffic control systems operations, and/or the like, Health-related information sets, contributed to and accessed by multiple-parties, for example medical history, medications, and/or the like.

With some embodiments, user relationships to such user activity and information sets can be associated with at least in part standardized and interoperable contextual purpose expressions and/or the like. By using such purpose specifications, users can identify and select, and/or have automatically provisioned, resource sets specifically appropriate to any given purpose fulfillment set. By associating contextual purpose and/or the like specifications with specific candidate and/or selected resource sets, PERCos provides an ability to limit—when user computing activities involve sensitive processes and/or information—provisioned resource sets, and/or their performance and operational characteristics, to sets explicitly appropriate to user set contextual purposes.

In some embodiments, PERCos contextual purpose expression and other standardized and interoperable contextual purpose capability sets, along with other PERCos, such as CPFF, capability sets, support a set of platform capabilities that can, under many circumstances, substantially to entirely control inappropriate interactions between, and/or inappropriate consequences resulting from, the interaction of computing resources and sensitive user set information and corresponding processes. Such provisioning of safe and appropriate to user (and/or Stakeholder) contextual purposes resource sets may, in some embodiments and/or under certain circumstances, operate automatically, dynamically provisioning such resource sets in response to users employing, at least in part, standardized and interoperable purpose expression instructions.

By contrast, current contextual internet related computing technologies do not support simple and well managed computing session selective, contextual purpose related, resource provisioning. As a result, best resource sets are often not applied towards computing-related purpose fulfillment and importantly, most users are often oblivious to the consequences, such as inefficiencies and/or malicious behavior, resulting from operation of certain one or more resource instance sets. For example, normally only sophisticated computing arrangement user sets would attempt to initiate a target activity specific computing operations that would potentially undermine and/or otherwise detract from computing session outcomes. Further, even a sophisticated user would need a high level of specific and reliable understanding of the performance attributes and potential consequences of adoption of each and every resource set contemplated for use. Given these two demanding considerations, user set computer session lack of design sophistication, and the frequent absence of user set informed understanding of resource usage consequences, new techniques are required in order to ensure under many circumstances sufficient reliability, security, and efficiency of target purpose fulfillment resource utilization.

For example, a computer sophisticated user set that understands the qualities and usage consequences of each and every contemplated for use resource set, decides, for example, to employ a hypervisor supporting one or more VMs for provisioning and managing appropriate to circumstance set, target purpose session resource usage and associated process isolation. Such user set further employs well understood by user set firewalls, access controls, encryption and communication means, and purpose related reference information sets and applications, and one or more cloud services. Given proper implementation of such VM and supporting environments, including setting associated controls and reliably identifying and thoroughly understanding usage implications (such as no malware impact) of applicable software applications and other resources, a sophisticated computing user set may experience, adequate to their task set, isolation, minimizing, and efficiency benefits. Unfortunately, even an expert may fail to thoroughly understand all relevant considerations related to resources and virtual machine organization and protection, and in any event, establishing such a target activity specific VM environment using current technology may, under many circumstances, require substantial user set effort, and is not suitable for most user set types (e.g., ordinary consumers, experts in non-computing fields, and/or the like) and/or for use with a wide variety of different contextual purpose fulfillment activity sets corresponding to the requirements of a spectrum of different user target contextual purpose sets.

PERCos capabilities that, in some embodiments, may be employed to support instantiating secure and reliable computer operating environment sessions provisioned with contextual purpose appropriate resource sets, include:
 Assiduous, including for example, existential, biometric identity capabilities,
 Purpose class and other purpose neighborhood resource organization arrangements,
 Formal and Informal and/or the like resource registration and publishing, including employing assiduous, persistent Stakeholder biometric identification information, bound to such Stakeholder respective resource sets,
 Identity situational attribute management,
 Identity Firewall and related Awareness Manager capabilities,
 Resource situational management standardized and interoperable capability sets supporting, for example, PERCos Framework and Foundation Construct resource specification sets,
 Repute and/or the like Cred, EF, and FF resource evaluation capabilities,
 CPFF framework instance contextual purpose resource set management including target contextual purpose resource provisioning management and session environment virtual machine and/or sandboxing (e.g., with multiple different sessions), the foregoing in accordance with CPFF specification set resource, process, and/or information isolation and/or other protection information, as may be applicable.

Figure 32:
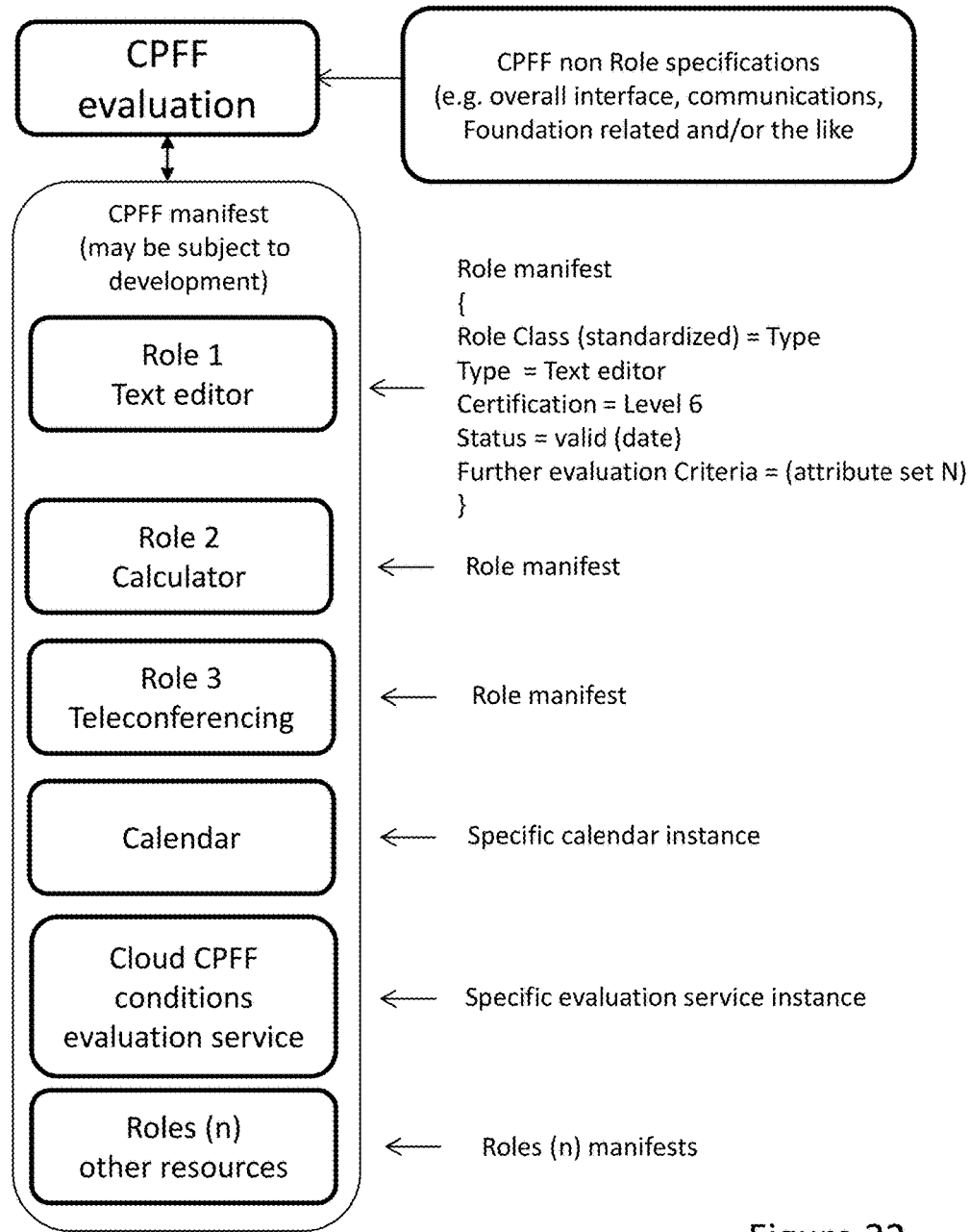
FIG. 32 is a non-limiting illustrative example of CPFF role manifest and instance(s).

FIG. 32 is a non-limiting illustrative example of CPFF role manifest and instance(s).

A Contextual Purpose Firewall Framework ("CPFF") is a form of PERCos Framework specification set that specifies operating variables for user contextual purpose fulfillment computing sessions, such that such sessions may be provisioned with resource sets that comply with specification requirements of such a Framework, such as resource sets that correspond to those one or more resource sets enumerated on a specified target contextual purpose Framework resource set manifest and/or where resource one or more sets attributes are compliant with specified resource minimalism, isolation, impact on session process set efficiency, and/or other CPFF specification set (which may include resource combinatorial and/or Role) specifications. The general purpose of a CPFF is to support the provisioning of user target purpose computing arrangement sessions such that it minimizes or eliminates unintended consequences, for example, those resulting from the use of resource sets that provision or enable malware, and/or those that impact operational efficiency for the specified purpose of one or more portions of such sessions.

In some embodiments, PERCos CPFF capabilities enable the explicit delineation and/or other relevant identification of what resource compositions may be applied towards, fulfilling given purposeful activities involving sensitive information and/or process sets. Such target purpose specification may be employed by one or more PERCos services—as such information may be complemented by certain situational purpose input information such as historical behavioral, profile, preference, applicable Foundation, and/or the like information—to, at least in part, identify, evaluate, select, prioritize, provision, manage, and/or the like, one or more resource sets. For example, such CPFF capabilities can enable user set specification of a purpose class appropriate computing arrangement resource set as a result of such user set specifying a target purpose objective set that is used by a PERCos service set to identify a corresponding CPFF set, for example, as associated with a highly recommended aggregate CRED set from experts. Such CPFF user contextual purpose fulfillment resource sets may be automatically selected and/or otherwise identified and evaluated, when their contextual purpose related specification information sufficiently corresponds to such user set contextual purpose related information. Such resource one or more sets may be identified by their membership in a purpose class and/or other resource purpose neighborhood having a corresponding contextual purpose specification set to a user target contextual purpose specification set, and/or by a resource set, such as a resource Framework, having a directly corresponding contextual purpose specification set as an attribute set (and/or in some other resource characterizing information form). Further, constituent resource sets of any such Framework, as identified by their specification in such a Framework, can be provisioned in satisfaction of such user target contextual purpose due to such Framework relationship to such user contextual purpose specification set, but such provisioning may be subject to associated Framework, such as resource set specific, and/or other user set purpose related specifications, as may be relevant to such resource set and such situation.

PERCos Frameworks provide specifications identifying resource set arrangements to be employed in satisfying associated, specified target contextual purposes, and CPFFs provide Framework instances with a further capability set enabling, at least in part, the control of an operating environment, and which, in some embodiments, may also, at least in part, control the operating performance of such specifically enumerated purpose specification satisfying target purpose resource sets. As a result, CPFFs can, in some embodiments, through their specification information and instantiation mechanisms, constrain a contextual purpose computing session to only employ resource sets authorized by, and as specified by, any such contextual purpose specification sufficiently corresponding, Framework. Such constraining of the operating resources authorized for a given contextual purpose fulfillment session, can substantially constrain the presence of, and/or unintended consequences resulting from, malware and/or the like. In combination with other PERCos, including other CPFF, capabilities such specification driven contextual purpose sessions can be substantially more secure and reliable when compared to today's typical user computing arrangement sessions.

CPFF constraining capabilities are, in some embodiments, achieved in part through the use of virtual machine capabilities wherein target contextual purpose computing environments can operate in virtual machine sets that, for example, at least substantially (as set by specification) isolate approved resource sets and related processes and information stores from a computing environments user primary, for example open, operating system platform. Such open computing system platform may be operated as, for example, an underlying platform, or alternatively in a separate virtual machine. Such virtual target purpose operating sessions, such as in the form of contextual purpose fulfillment virtual machine environments, can employ Type 1 or Type 2 hypervisor implementations, and/or the like.

Figure 33:
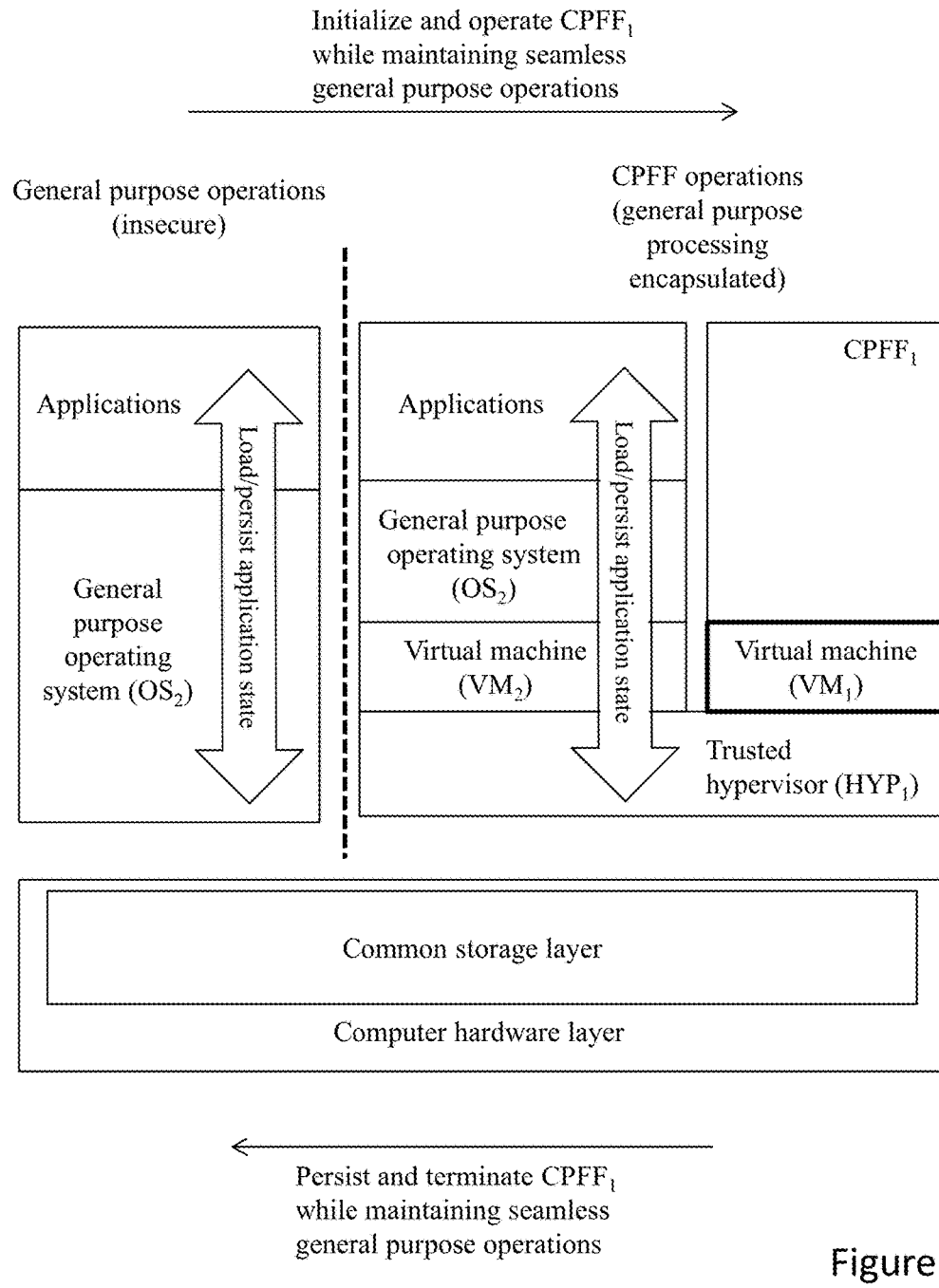
FIG. 33 is a non-limiting illustrative example of seamless general purpose operations while operating CPFF sets.

FIG. 33 is a non-limiting illustrative example of seamless general purpose operations while operating CPFF sets.

In other embodiments, (or for other sessions for the same computing arrangement user) such target purpose computing environments may operate employing, for example in some cases, less isolating sandboxing capability sets that are not virtual machines, for example, as provided by an operating system such as Windows. In some embodiments PERCos CPFF implementations that combine such isolation techniques with PERCos Framework authorized resource set and/or resource specification operating conditions/functions management, can enable the dynamic provisioning of secure user target contextual purpose sessions where setup of such virtual machine or sandboxed operating environments can be performed transparently to respective user sets and may be dynamically spawned according to, and accommodating any one or more, active user target contextual purpose sets. With CPFF instances, such provisioning of Framework associated resource sets within secure session environments (e.g., virtual machines) can be substantially augmented by various other PERCos capabilities available in some PERCos embodiments.

A CPFF user target purpose resource set may be derived, at least in part, from one or more process sets involving a user target contextual purpose expression set, and/or the like, being sufficiently (by specification and/or evaluation) related to, for example, by being members of, a corresponding to such purpose specification set Purpose Class. A user target purpose resource set may also be derived through identifying a CPFF Framework instance that has sufficiently matching contextual purpose specification attribute information. Such CPFF Framework sets provide specification sets that may provide at least a portion of a user set target purpose fulfilling computing environment specification framework. Such Framework may involve an arrangement of one or more resource sets, and/or target purpose fulfilling specification set scaffolding for computing arrangement session information, that, for example, may identify one or more resource set Roles, which such Roles may be respectively filled by Role specification satisfying resource sets that can be employed in performing such specified one or more Roles and such resource sets may be provided by one or more independent parties. When, for example, a ready to operate Framework corresponding to a target purpose approximation specification such as a Purpose Class and/or other purpose neighborhood specification, is operated in conjunction with a user computing arrangement Foundation, a user computing arrangement target purpose fulfillment capability set may be instantiated so as to provide a user computing arrangement provisioned to be employed in user contextual purpose fulfillment.

In some embodiments, for example, PERCos computing Frameworks are employed as specification sets, in combination with user computing arrangement Foundations, or otherwise in anticipation of being employed with a sufficiently compatible such Foundation. As a form of Framework, CPFF instances, also may be used in combination with a user computing arrangement Foundation, and may provide specifications regarding managing potential combinations with Foundations. A CPFF, as with other Frameworks, may include specifications regarding which resource sets and/or resource classes may be employed, for example, as specified by resource Role class sets, and/or by other resource neighborhoods. For example, such resource sets satisfying a Framework respective Role instance(s) specification requirement set may be provisioned, if other necessary cooperative and/or complementary other specified necessary resources are provisionable and/or provisioned, and as may be otherwise required by specifications and/or resource attribute combinatorial functional evaluation.

In some embodiments, for example, Frameworks published as PERCos Formal resources, such as Formal resource CPFFs, may be either in the form of ready to operate Purpose Class Applications, or ready to be completed Purpose Class Application Frameworks (e.g., scaffolding) employing, for example, Role specifications for identifying corresponding, specification satisfying resource sets, which may be in the form, for example, of PERCos Formal and/or Informal resources and/or the like.

Some PERCos embodiments may employ PERID and/or the like resource set information arrangements that may, at least in part, store any applicable set of Framework information, for example, CPFF framework instance information, such as Framework associated contextual purpose one or more expressions, purpose class or other Purpose Neighborhood Framework (for example, as a published PERCos resource) membership(s), associated Purpose Statement(s), and/or any other applicable purpose expression related specification information such as relevant, for example, situational attribute set information. A PERID arrangement may also store for a Framework published resource, a Framework's composition of resources attribute, interface, and/or other information, Framework and/or such component resource association(s) with other resource sets and/or with attribute sets, and/or the like information. Such information may include, for example, applicable Framework interface information, constituent Framework resource sets along with, for example. Resource set one or more Resource Class Roles (e.g., which classify Role satisfying members as a Role type, such as a text editor, word processor, and/or the like, with any other applicable, specified Role related attribute information, such as Role desired and/or required characteristic information). Role types, in some embodiments, are, or may be, standardized and interoperable, such as representing Role Classes with applicable resource sets as members (e.g., Role Class type "word processor" might include specification satisfying, appropriately certified, resource sets: e.g., MS Word, Apple Pages, WordPerfect, Google Docs, and/or the like, if so certified), such that a, for example, word processor published as a PERCos Formal resource having such a Role Class as an attribute with, for example, adequate resource accompanying certification and/or Repute Quality to Purpose Values (certified and/or otherwise asserted, for example, by either direct or indirect Stakeholders, such as publishers. Cred asserters, and/or the like), could be provisioned to fulfill a Framework's Role for word processor—given that its attribute set and/or any applicable test set also satisfies any other applicable Framework specifications. Such CPFF and/or other Framework resource information arrangements may further contain assiduous Stakeholder identifying information, such as liveness tested, timing anomaly evaluated, emitter challenge and response assessed, assertion corresponding Stakeholder related existential biometric information conveying human set assertion set information regarding the integrity and authentic, unaltered composition of associated resource sets.

In some embodiments, certain key aspects underlying a contemplated computing session can be securely, reliably, and dynamically instantiated using CPFF instances, for example, employing hypervisors and session dedicated virtual machines to manage in accordance with user (and/or Stakeholder) sets' target contextual purpose specification arrangements, and employing capabilities that can include:

Supporting an organization, other affinity group, and/or global standardized and interoperable purpose expression implementation set, along with associated purpose class and/or the like resource organization infrastructure, which may include purpose neighborhood generation means (e.g., based on contextual purpose related specification set resolution), and further supporting interoperable user contextual purpose and/or the like specification instruction sets for formulating target purpose specific, computing session virtual machines, other isolation strategies and technologies such as process isolation, forms of sandboxes, and/or the like, provisioned with target purpose appropriate, user expressly acceptable and/or other authorized resource sets.

Supporting fundamentally reliable, assiduously produced, persistent resource identity information (identifier set) reliably bound to descriptive resource representation information and/or otherwise reliably referencing for provisioning its corresponding resource set instance set. Such identity information may include assiduous biometric Stakeholder information representing the declaration of publishing responsibility by one or more human individuals and further including means to bind such assiduous biometric Stakeholder information to highly reliable and purpose effective representation and/or location information of its associated resource set, enabling reliable authentication of such resource and its integrity based, at least in part, on a trusted Stakeholder set biometric certification assertion set regarding such resource and resource representation information.

Supporting a, at least in part, for example, user contextual purpose standardized expression capability set for use in generating specification sets corresponding to CPFF specific Frameworks and/or the like specification arrangements, supporting specifications describing user computing arrangement contextual purpose environment specification instructions, which can be employed to define contextual purpose fulfillment session set authorized resource one or more sets and/or minimalism, isolation, and/or efficiency criteria for such session set in support of optimization of an associated user specified and/or other related purpose specification set, such as a contextual purpose expression, Purpose Statement, and/or other, at least in part, standardized and interoperable, contextual purpose related specification set.

Supporting a resource knowledge cosmos arrangement constituting, for example, a self-organizing and/or expert-facilitated Quality to Purpose information sets as asserted by direct and/or indirect resource set Stakeholders, such as provided by Repute Cred, EF, FF, and/or the like embodiments, whereby resource set instances may be evaluated by user sets and/or their computing arrangements regarding their satisfaction of Quality to Purpose considerations specified by user sets and/or their computing arrangements regarding one or more Foundation and/or Framework constituent, and/or one or more other, relevant resource sets. Such satisfaction may involve, for example, meeting required, specified criteria and/or calibrating relative value of one resource set or resource set class in relationship to other candidate resource sets, or classes and/or other resource neighborhoods.

Supporting contextual purpose, such as Framework based, resource provisioning and management input for virtual machine contextual purpose session operation, whereby, for example, a PERCos compliant hypervisor arrangement may instantiate virtual machine computing arrangement environments based, at least in part, on such CPFF Framework and/or the like specifications identifying specific one or more authorized resource sets and/or providing minimizing, isolation, and/or efficiency contextual purpose related operating session criteria.

Supporting organization, other affinity group, and/or global standardized and interoperable resource Role classification infrastructure, e.g., Role classes and resource members, which may be employed as specified constituent component resource sets of Frameworks, including, for example, CPFF Frameworks, where sufficiently trusted and/or other criteria satisfying resource sets having a given Role type identification may be employed in a Role component position within a Framework, such as a CPFF Framework, given such resource set's satisfaction of any specified, other evaluation criteria and/or consequent selection by a user set, Framework Stakeholder set, and/or one or more of their respective computing arrangements.

Supporting hardware and/or hardened software capability sets for protecting CPFF resource management, communications, and information process and storage functions, including variably in some embodiments, direct integration within and/or secure communication and cooperative processing with, one or more Identity Firewall and/or Awareness Manager implementations.

Such PERCos embodiment capability sets can effectively categorize resource sets in a purpose related manner, supporting user sets and/or their computing arrangements organizing of resource sets into user criteria satisfying, resource contextual purpose fulfilling, arrangements employing user directly authorized resource sets and/or employing minimizing and/or isolating resource provisioning and/or otherwise managing capabilities. Such capabilities can enable users to reduce or eliminate unintended consequences arising from computing resource usage, which such provisioned resource set, unknown, to their respective users, have questionable to seriously undesirable usage consequences. Such questionable to seriously undesirable consequences may occur generally with such resource set usage, or more specifically occur under certain situational computing sets of conditions. Such usage consequences may include unintended results that are seriously damaging to the interests of users of computing arrangements and/or parties with whom they relate. Use of such questionable resource sets may include the altering, in one or more ways, of forward going aspects of a given computing environment's functioning and/or information sets.

Unfortunately, today's computing tools for managing user computing arrangement unintended resource related consequences are generally proving to be inadequate, with a large percentage of computing arrangements being populated by malware, and with, as a result, sensitive user information being frequently stolen and sensitive processes being interfered with in often seriously harmful manners. Today's tools for preventing computing arrangement unintentional processes and unintended consequences typically involve some set of capabilities including one or more of firewalls, malware identification and removal capability arrangements, internet surfing web page reputation evaluators, sandboxing and virtual machine isolation techniques, encryption and related secure communication capabilities, and/or the like. Such tools sets are reliant on the behavior, addresses, and/or composition signatures of software, processes, and/or computing web page addresses, and/or on relatively time consuming configuration in manners consistent with user activities and explicitly descriptive of one or more sets of user computing environment capabilities. As a result of this signature, behavior, and address analysis approach generally employed by firewall technology and malware management tools, resources with unknown, uncatalogued, and/or unperceived problems often avoid detection and control, and constraining environments that provide resource isolation services, such as virtual machines, for example, those implemented through the use of hypervisors, are frequently subject to malware incidents.

Such VM and the like constraining environments are not adaptive to the shifting composition and related nuances of different user contextual purpose sessions that have their purpose specific associated security, efficiency, and the like user priorities and resulting balances of security rigor, risk, efficiency of operation, flexibility, transparency to user, and/or the like considerations. Such VM and the like capability sets, particularly when employed on end user computing arrangements, tend to be used as "open" computing environments, for example supporting a further "open" general operating system environment, at times subject to some of the same malware incidents as traditional general operating system environments. Today's general computing and/or "open" secondary (e.g., VM) computing environments are not efficiently adaptive to, and do not support transparent to, or low computing skill level, easy to implement, adaptable to the highly varied spectrum of consumer, general business, and specialized user computing activities that may require, or preferably operate with, reliable security and/or efficiency performance. By contrast. CPFF can provide specialized to contextual purpose computing environments that can dynamically tailor their configuration optimally, and under some embodiments and circumstances transparently to user, provision their resource sets so as to provide a user set target contextual purpose fulfillment environment that operates optimally to user purpose, including providing outcomes, including maintaining private information private, and computing resources applied to sensitive operations, unmodified by malware.

Ideally, securing (and optimizing the efficiency of) computing arrangement environments would operate, in part, based upon:

Establishing dependably valid, persistent identities of resource sets employed in computing activities, including the authenticity of their unmodified composition, Before resource set deployment, having user sets, their computing arrangements, and/or relevant, trusted cloud one or more services, evaluate resource identities, and related resource set attribute metrics (including for example performance), to ensure that contemplated to be used resource set usage is consistent with user set contextual purpose set purpose fulfillment optimization (including efficiency, risk factor, and/or cost) considerations. This evaluation would include sufficient understanding of usage consequences of, and/or the assurance of the absence of unintended consequences resulting from, use of any given resource set, and, at least when involving user computing arrangement user proprietary information and related sensitive processes for any given session, variably employing only those resource sets that are consistent with differing user set session specific contextual purpose considerations, so as to support user approved, appropriate balances between the "openness" of a given computing arrangement during a given purposeful computing session, and management of situationally reasonable efficiency, malware, and/or other risk factors, and Otherwise securing user computing arrangement operating environments so as to prevent exposing sensitive information sets and/or processes to outside inspection, copying, modification, and/or repurposing, by assuring user purpose appropriate mixes of secure environment and constituent component hardening techniques for hardware, software, communication networks, associated service (for example, cloud services) and/or the like.

For example, consider a computing arrangement user set who uses his/her computing arrangement for participating in social networks, paying bills, investing, banking online, travel planning, occupation related work at home, communication with colleagues, shopping online, and/or the like. As situationally relevant, such user may select and/or otherwise arrange the provisioning of a resource arrangement that such user set believes is applicable for user set target intended activity.

Traditionally, for such computing purposes, a user set may use computing environment protection mechanisms, such as one or more of access control arrangements, secure communication arrangements such as secure TSL/SSL browser communication capabilities, encryption capabilities, firewalls, security program capabilities such as non-firewall malware scanning and inspection and web suite reputation monitoring and blocking, and/or the like, and more sophisticated users may decide, for example, to use a hypervisor and one or more virtual machines. Currently, some mix of these tools serve as primary means for protecting user set resource sets from unauthorized tampering and/or disclosure. Normally though, in pursuit of user set purpose sets, user sets finds customizing such protection mechanisms as too technically difficult, time consuming, inefficient, and/or inflexible. Moreover, such tools lack basic capabilities that may be necessary to adequately ensure their efficient adaptability to various different computing arrangement users and circumstances. For example, a user set may find itself unable to, or finds it too laborious and/or other complicated to, configure and/or reconfigure user set computing arrangement protection mechanisms to enable such user set to secure user video conferencing tools in different manners with differing groups of friends and colleagues, depending upon, for example, associated contextual purposes of respective conferencing sessions and participating user set composition, so as to achieve correspondingly appropriate, secure, reliable, and/or efficient session properties. Moreover, such tools are more based on identifying known, unreliable resources and/or behaviors, and far less on an authentication and/or evaluation of the inherent identity and authenticity of the resources themselves.

In some embodiments, PERCos CPFF related capabilities provide methods for substantially enhancing and ensuring contextual purpose computing session security, reliability, and efficiency through processes that can automate the provisioning and management of at least portions of purpose related computing target environments. Such provisioning and management may employ, for example, resource minimalism, operating session resource isolation, and/or other resource administration/control policies that are established in response to user set and/or cohered user and Stakeholder sets contextual purpose related specifications. Such CPFF related specifications, as provided in some PERCos embodiments, can enable, in some embodiments, dynamically configured resource sets establishing user target contextual purpose fulfillment corresponding resource set environments, where such provision of resources and instantiating of, for example, a target contextual purpose environment may be entirely, or primarily, transparent to user operation sets responsive, at least in part, to user, contextual purpose expressions. Such configured purpose fulfillment corresponding environments may use CPFF instances that employ session corresponding user computing arrangement Foundation information and corresponding resource sets. Such Framework instances may employ Foundation constituent resource sets to satisfy Framework specifications, including, for example, Role resource instances, if they satisfy corresponding resource one or more set necessary conditions, for example, as specified by such Framework and/or Foundation specifications. CPFF specifications may be automatically selected, for example, from one or more Purpose Classes and/or other purpose neighborhoods having contextual purpose expression set sufficiently corresponding to a user set contextual purpose expression set or Purpose Statement or the like, and wherein such CPFF sets (having, for example, superior Repute Cred resource and/or resource Stakeholder aggregate Cred Quality to Purpose and/or the like standardized and interoperable values relative to other neighborhood Framework instances and where such Framework set is selected, for example, as result of resolving a balancing of situational contextual purpose considerations, where such determination process set, for example, is operated on such user set computing arrangement, and/or by a cloud service Framework selection and provisioning automation service arrangement, and where such automatically selected set (one or more instances as specified and/or qualified) may be subject to final user selection and/or other approval action sets or may be automatically provisioned for ease of acquiring a purpose fulfillment environment for such user set.

CPFF arrangements may, at least in part, incorporate, and/or provide input for, the production of one or more particularity management situational target contextual purpose specification sets that CPFF arrangement can employ in managing relevant aspects of resource provisioning and/or usage. Such management of resource sets may employ explicitly specified resource sets. A CPFF capability set may also or alternatively, based on contextual purpose related specification information, determine and/or manage resource sets based, for example, on situationally important attribute one or more sets identified in contextual purpose related specification sets (e.g., CPFF specification instances. CPEs. Purpose Statements, resonance specifications, profile information, preference information, crowd behavior historical information (e.g., as related to use contextual purpose expressions), and/or the like, for example, CPFF arrangements may examine at least a portion of the known behavioral attributes of relevant candidate resource and/or resource portion sets to ensure that one or more such resource instances will only engage in those behaviors that will contribute to, not interfere with, and/or not otherwise have undesirable consequences related to, fulfilling situation-specific target purpose sets.

CPFF particularity management arrangements, in some embodiments may use computer security, including information and/or process protection capabilities, such as access control, hypervisor instantiated VMs, process isolation, firewalls, encryption, PERCos assiduous identity technologies and methods. Repute Cred, EF. FF, and/or the like arrangements and information instances, secure communication channels (e.g., to cloud service arrangements), and/or the like. Such capabilities, in some embodiment, can, for example, encapsulate provisioned resource and/or resource portion sets, isolating them from potential interference caused by other PERCos (and/or, as applicable, non-PERCos (e.g., external to PERCos embodiments)) session process sets and/or resource sets.

In some embodiments, particularity management services may use protection mechanisms (such as, access control, process isolation, hypervisor. VMs, firewalls, encryption, and/or the like) to encapsulate and/or otherwise isolate CPFF arrangement provisioned resource and/or resource element sets to protect particularity management related one or more process sets, resource sets, and/or other information sets from potential interference from other PERCos session and/or non-PERCos session (e.g., external to PERCos) process sets, resource sets, and/or other information sets. For example, particularity management may use, for example, firewalls and secured, hardened (employing secure hardware and software protection techniques) CPFF silicon chips, chipset, and/or appliance arrangements to protect operating CPFF instances from one or more aspects of its external, including other PERCos, environment.

In some embodiments, particularity management services may have one or more processing elements, such as, for example, CPFF (e.g., situational) monitoring, environment management, resource arrangement set (including CPFF set) provisioning, encapsulation and/or isolation of resource sets, and/or the like. For example, particularity monitoring may monitor the operating situation (environment and their resource arrangements, including state information, event information, and/or the like) of provisioned CPFF (i.e., operating CPFF) instances and take responsive (for example, corrective) actions, as appropriate, such as, for example, through CPFF Service arrangements, Coherence Services and/or other PERCos Platform Services, to adapt to changing situations to, in some embodiments, for example:

Optimize interim results and/or Outcomes.

Minimize unintended consequences as specified by target contextual purpose specification sets (and/or as at least in part derived therefrom), generating optimal results and/or Outcomes, and, for example, as identified by operating session consequence management event information sets, Provide isolation instructions, separating CPFF operations (including operating information), resources, and/or stored information from non-CPFF target purpose session operations, resources, and/or stored information, so as to protect the integrity of CPFF session related sensitive information (including, for example, resource sets) and/or processes and/or the like.

Invoke one or more further operations in response to variations in monitored situational conditions, for example an increase in levels of rigor, specifications from one or more senior resources (for example those with higher privilege) for increased rigor, and/or the like.

For example, suppose an acknowledged Domain expert published a situationally relevant contextual purpose specification that expressed the following:

when the sensitivity of user set information is low, users can use, for example, less costly, more flexible sets of, and/or easier-to-use tools to pursue their target purpose set, for example, and where the sensitivity of information sets (such as private information) may be automatically identified by one or more user sets, user and/or organization preference sets, published resource sets through attribute information instances, and/or other information characterizing information, for example, as may be provided, for example, associated with resource class Role and where such descriptive information may be associated with lower levels of standardized and interoperable threat sensitivity information (such as threat levels 1-10), degrees of rigor associated with purpose types and/or document classification. For example, a user preparing the user's tax return may specify a high degree of rigor.

when the sensitivity of user set information is higher, as for example, as might be determined using the above information threat descriptive information described with low sensitivity, the target operating session can be provisioned with higher levels of constraining of resource sets and resource choice array, and where such minimization of resource sets may variably reflect one or more of such specified threat response standardized and interoperable security levels for, for example, provisioning resources in a PERCos related hypervisor related virtual machine.

In some embodiments, a situationally relevant operating specification set may provide operating CPFF instances with a degree of flexibility in configuring their constituent resource arrangement sets by providing seniority values. For example, consider the following contextual relevance specification:

---

(security (seniority = 5)
   (if required-rigor-level ≥ 4 then security (resources) ≥ 9
   elseif 2 ≤ required-rigor-level ≤ 3 then (security ( resources)) ≥ 7 > 8
   elseif required-rigor-level = 1 then security (resources) ≥ 5)
and
(performance: (seniority = 4)
   (if required-rigor-level = 1 and demand = normal then
     (Quality to Purpose (performance, resources)) ≥ 8)

---

By specifying that security contextual variables have a higher seniority value set than performance, this contextual relevance specification provides operating CPFF embodiment instances with freedom to relax performance when required rigor-level is greater than 1 by reconfiguring and/or populating their resource arrangement sets with resource sets that provide a higher degree of security rigor.

In some embodiments, to ensure operating CPFF embodiment instances comply with their respective situationally relevant operating specification sets, particularity management services may employ particularity monitoring that monitors current threat levels. When, for example, a threat level goes over a certain threshold, particularity monitoring may generate an exception causing the operating session to gracefully shutdown services that are no longer viewed as necessary (e.g., essential and/or sufficiently secure) and further modifies isolation mechanisms such as network gateways to ensure that the CPFF arrangement session is properly isolated from the external to CPFF computing arrangement, such as external processes and/or information sets.

In some embodiments, operating sessions in pursuit of a situation-specific purpose set may comprise multiple operating sub-sessions. In such a case, instantiated operating CPFF embodiments may allocate and distribute session processes (including management) into different operating sub-sessions and specify appropriate management relationship, such as, for example, supervisor-subordinate, peer-to-peer, and/or the like.

In some embodiments, particularity management instances may operate as part of PERCos Platform Cohering Services to support PERCos operations during PERCos Purpose Cycles, such as, for example:

During purpose formulation, framing contextual variables that balance situationally relevant conditions, such as, for example, complexity, privacy, integrity, functionality, and/or the like in pursuit of target purpose sets. For example, suppose a user, pursuing online shopping, is more interested in privacy than cost. Particularity management services to formulate a situationally relevant operating specification that can be used to provision a CPFF that increases the user's privacy, possibly at the expense of cost.

Provisioning CPFF instances with minimal, cohered, reliable, efficient, isolated, and/or encapsulated resource arrangement sets in fulfillment of situation specific target contextual purpose related specification sets.

Supporting in part operating CPFF instances to fulfill their respective situationally relevant operating specifications by limiting standard operating capabilities of at least one or more portions of such user set underlying operating system arrangement (e.g., Unix, Windows, or the like).

Monitoring internal CPFF resource sets and/or external environments to ensure their adherence to respective situation specific contextual purpose related specification sets and taking corrective actions as appropriate.

In some embodiments, particularity management services may provide a core set of processing elements that can be instantiated as a core particularity management services layer that operating CPFF instances may use to dynamically manage their resource sets. Such a core particularity management services layer may provide a unified, standardized and interoperable interface that may hide the implementation details of the particulars of user computing arrangement combinations that may include, in addition to a vast variety of hardware implementations and hardware platforms (such as, different motherboards, devices, security apparatus and/or the like), many distinct software stacks including different operating systems, such as, for example, Windows, OS/X, iOS, Android, other Unix variants and/or the like.

For example, suppose an operating CPFF instance is to comply with a situationally relevant operating specification set that controls access to networks. When running on an iOS or OS/X platform, such a situationally relevant operating specification set may be implemented using an iOS or OS/X compatible sandbox. When running on a Windows platform, the same specification set may be implemented through configuration of the Windows firewall. The core particularity management layer may provide a common interface to both implementations, thereby freeing the operating CPFF instance from the need to determine how to optimally implement its situationally relevant operating specification set on different platforms.

In some embodiments, a core particularity management service layer may accept control specifications, perhaps represented as parameterizations that are at least in part derived from a contextual user purpose. In some embodiments such control specifications may be adaptive based on the values of contextual variables (e.g., threat level, cost parameters, efficiency, reliability, trustworthiness) that are monitored by particularity management monitoring. For example, consider the following contextual relevance specification:

```
contextual relevance specification
    (if threat situation <= 3 then
        (performance >= 8 and ease-of-use >= 6 and security > 4)
    else
        (security > 7)))
```

In some embodiments, such a contextual relevance specification may translate into a control specification for the core particularity management service layer, which may respond to such a specification by starting a particularity monitoring and situationally adapted configuration for an operating session based on the information set provided by the monitoring.

In some embodiments, a core particularity management service layer may employ, for example and without limitation. PERCos Platform Services such as, Resource Management Services, Identity Management Services, Coherence Services, Governance Services, Monitoring and Exception Handling Services, and/or the like, to provide, for example, core services required or otherwise used for CPFF functionality including particularity management services (e.g., based on hypervisor services, operating system policy and sandboxing capabilities, and/or the like), and identity management capabilities and/or the like. Such standardized core particularity management layers may be customized and/or extended for a situation specific target contextual purpose set, such as a, for example. Coherence resolved Purpose Statement with its own contextual relevance specifications.

In some embodiments, CPFFs, as with other Frameworks, may be specified as having varying degrees of completeness. Particularity management services (for example, in the form of Coherence Services specification resolving), may be integrated into and/or separately managed from CPFF purpose formulation processing and may support sufficient completion of CPFFs for provisioning by enabling users to frame one or more contextual variable sets (such as, for example, trust variables, consequence management variables, and/or the like) to meet their situationally relevant contexts (such as, for example, anticipated external threat conditions, performance demands, cost considerations, Quality to Purpose metrics, and/or the like).

In some embodiments, completion of CPFFs may depend on the computing platform arrangements (i.e., as specified by Foundations) on which they are to operate. For example, suppose a user, $U_1$, is interested in using a CPFF, $CPFF_1$, published by an acknowledged Domain expert, $ADE_1$, for performing online banking that has a set of contextually relevant variables (such as, security, reliability, integrity) and associated recommended values (such as, 8, 9, 8 respectively). Particularity management services may support $U_1$ to complete $CPFF_1$ by invoking a resource inspector instance to examine $U_1$'s computing arrangements and dynamically generate a Foundation that would provide most optimal environment for operating a $CPFF_1$. Based on the generated Foundation, particularity management services may inform $U_1$ that $CPFF_1$ can provide the following levels of performance, security, integrity, ease of use, and reliability:

```
(contextual relevance specification
    (performance >= 5)
    (security >= 8)
    (integrity >= 8)
    (ease-of-use >= 3)
    (reliability = 9))
```

If $U_1$ decides that the level of service $CPFF_1$ provides is acceptable, particularity management services may generate a situationally relevant operating specification set, $sros_1$, that expresses the specification elements, such as, for example:

Virtualization—such as for example, using a virtual machine that operates on the hypervisor that can run resource arrangement sets supporting online banking.

Policy formulation—such as, for example, policies that express:
  Encapsulation and isolation of sensitive resource sets and processes from potential interference.
  Access control to protection of resource sets from unauthorized disclosure, tampering and/or the like.
  Adherence of resource sets to their operating agreements to minimize unintended consequences.
  And/or the like.

Policy enforcement—such as, for example, using protection mechanisms to enforce compliance with formulated policies, including situational operating specifications.

Adaptation—such as, for example, adapting to changes in operational situations, both internal and external.

Performing CPFF session monitoring and exception handling—such as, for example, monitoring operating session resource sets and their situationally relevant operating specification set and/or performing corrective actions, including for example, reconfiguring, replacing, and/or otherwise managing operating session resource sets in accordance with target purpose set particularity specification information that may specify constraints and/or performance parameters.

And/or the like.

Figure 34:
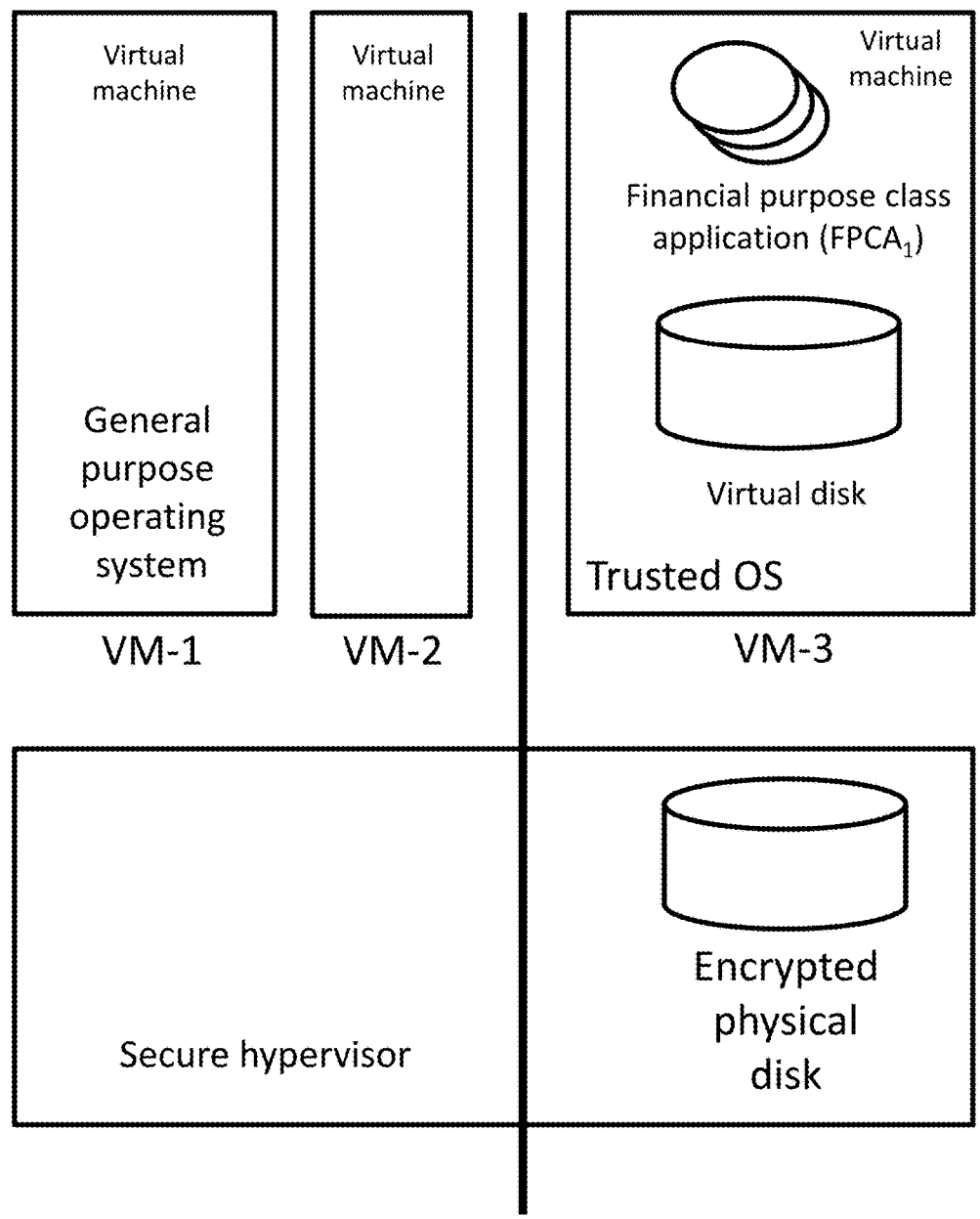
FIG. 34 is a non-limiting illustrative example of isolation provided by a hypervisor.

FIG. 34 is a non-limiting illustrative example of isolation provided by a hypervisor.

FIG. 34 illustrates provisioning of a situationally relevant operating specification set, in which security of a CPFF Framework instance is at least in part ensured by the presence of a secure hypervisor in a user's computing arrangement.

Alternatively, in another example, $U_1$'s computing arrangement does not have a hypervisor. In such a case, $CPFF_1$ may not be able to provide as high level of performance or ease of use since particularity management services may interact with $U_1$ to consider using another CPFF instance that may provide for the desired level of security by a employing resource set having lower ratings regarding ease of use and/or performance. For example, consider, a user, $U_2$, with a computing arrangement that does not include a hypervisor, such as, a computing arrangement comprising Windows 8 and Secure Boot capability. Such a user may specify the following contextual purpose specification:

```
(contextual relevant specification
    (purpose: perform financial transaction)
```

-continued

```
(performance >= 3)
(ease of use >= 2)
(security >= 8))
```

Based on $U_2$'s Foundation and $U_2$'s contextual relevant specification set, particularity management services may identify a CPFF, $CPFF_2$, which can provide a high degree of security assurance at some cost in ease-of-use:

```
(contextual relevant specification
(performance >= 7)
(ease of use = 2)
(security = 8))
```

Figure 35:
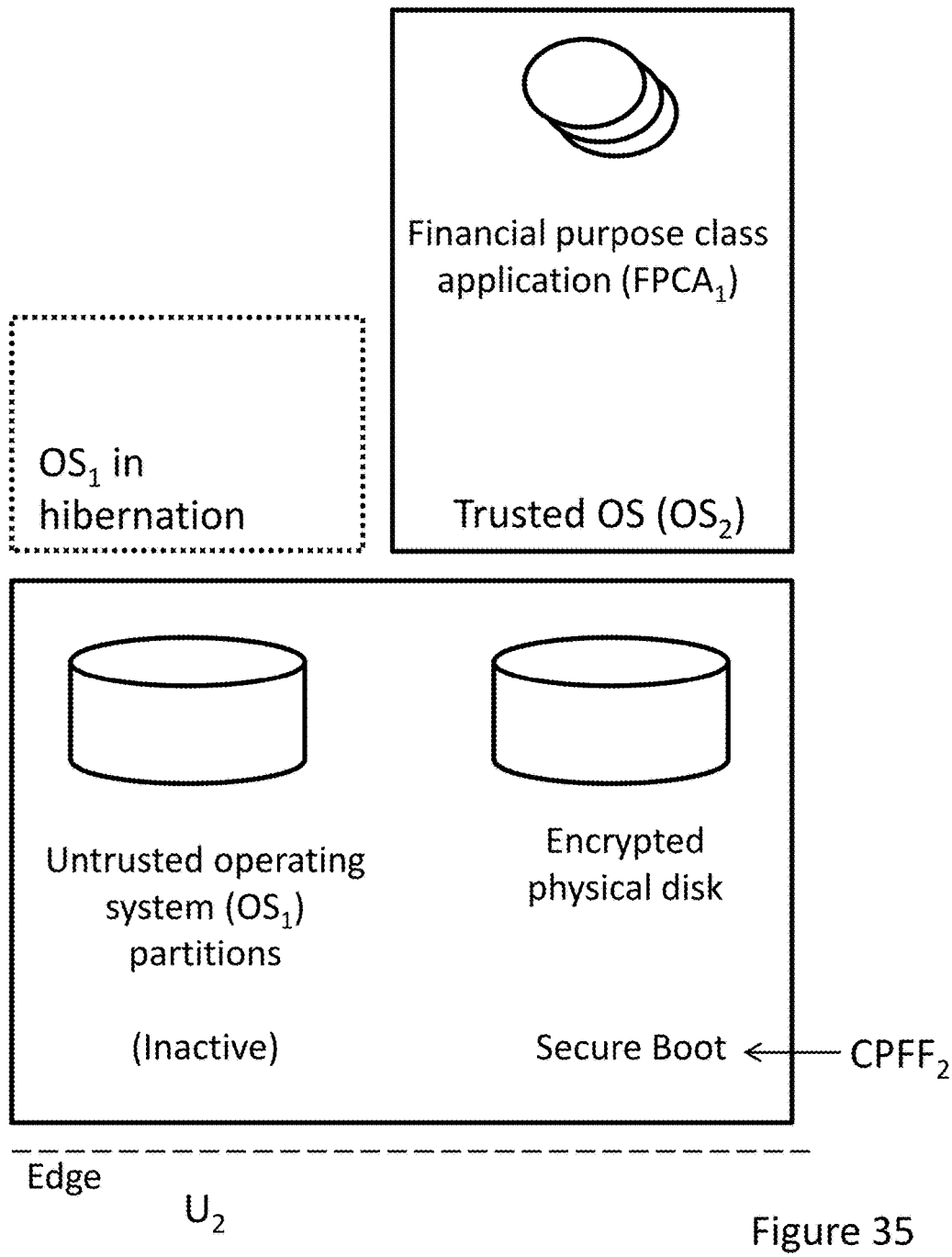
FIG. 35 is a non-limiting high level illustrative example of trustworthy configuration of operating session.

FIG. 35 is a non-limiting high level illustrative example of trustworthy configuration of operating session.

As shown in FIG. 35, $CPFF_2$ operates by installing a Secure Boot financial purpose dedicated operating system. $OS_2$, with full disk encryption and applications, $FPCA_1$, on $U_2$'s computer. It also requires that $U_2$ shut down or hibernate the user's existing operating system, $OS_1$, before starting $OS_2$. $CPFF_2$ utilizes the Secure Boot capability of $U_2$'s Foundation to provide $U_2$ with a specified level of assurance of its tamper-resistance. Although $CPFF_2$ may have a very good Repute in security, it may not have as high ease-of-use Repute because of its requirement of a dual boot and constraints on the applications that can be run while $CPFF_2$ is operating.

In some embodiments, particularity management instances may include instances of PERCos Coherence Services and, like other PERCos management instances, may be provided with one or more control, interface and/or organizational specifications that define their respective particularity management operations. Particularity management instances may use one or more PERCos Platform Services, such as, for example, Resource Management Services, Evaluation and Arbitration Services, Identity Services, Repute Services. and/or the like) to support formulation of situationally relevant CPE sets that can be further processed to generate situationally relevant operating specifications for providing optimal interim results and/or Outcome sets in pursuit of a situational target purpose set.

In some embodiments, one or more direct or indirect (e.g., Repute Cred publishers) Stakeholders of a resource arrangement set may perform particularity management on their resource arrangement set, $RAS_1$, to ensure their minimality in achieving optimal interim results and/or Outcomes in pursuit of a target purpose set $TPS_1$ by performing, for example, the following actions. First. Stakeholders may formulate a descriptive contextual purpose expression, $CPE_1$, for $RAS_1$, describing contextually related actions $RAS_1$ may or may not perform in pursuit of $TPS_1$. They. and/or their computing arrangements, may then analyze consequences, including evaluating combinatorial complexity consequences, of removing and/or constraining each resource set and/or its constituent parts (and/or evaluate substitutions and/or at least in part alternative arrangements) in $RAS_1$'s adherence to $CPE_1$. For example, they may determine the type of behaviors of each resource and/or its constituent parts and how such behaviors may be restricted and the consequences of constraining them may affect $RAS_1$'s ability to comply with $CPE_1$, which in turn ultimately affect $RAS_1$'s ability to achieve optimal interim results and Outcomes in pursuit of its target purpose set, $TPS_1$. Such an evaluation set may be performed against various CPE sets, where such sets may comprise differing applications of such $RAS_1$.

For example, suppose a resource arrangement set, $RAS_2$, whose purpose is to provide a secure proprietary product development environment, has a descriptive specification set, $CPE_2$ that specifies a set of actions that $RAS_2$ may or may not perform. A Stakeholder may check if behaviors of each resource set and/or one or more of resource set constituent parts in $RAS_2$ are compatible with actions specified by $CPE_2$. For example, suppose $RAS_2$ contains a possibly insecure, or not known to be secure, web browser plugin (such as, for example. Adobe Flash) that allows users to explore the internet. Stakeholders may analyze the browser's behavior to determine if it would cause unintended consequences, such as, importing certain malware into the product development environment and if so, remove it from $RAS_2$ specifications and replace it with a more appropriate constituent resource.

In some embodiments, creators and/or other Stakeholders of a resource arrangement set may use a wide variety of assurance techniques to determinate the behaviors of one or more of its resource sets and/or their constituent parts, such as, for example:

Design analysis and review.
Code development methodologies, such as, for example, the use of type-safe coding language which may guarantee that a resource may not "crash."
Code walkthroughs, including automated code analysis.
Testing methodologies, including white box testing, black box testing, unit testing, penetration testing, and/or the like
Formal verification methodologies.
And/or the like.

Stakeholders of a resource arrangement set may publish one or more situational target contextual purpose particularity management specification sets to be associated with their resource arrangement set, expressing their assertion of the resource arrangement set's minimality, documentation of minimality assurance, which may include one or more methods that can be used to evaluate assertions of minimality of resource arrangements and/or parts thereof.

In some embodiments, acknowledged Domain experts and/or other Stakeholders may authenticate and validate such particularity management specifications of a resource arrangement set, $RAS_3$, and publish one or more Reputes (such as, for example, Cred assertions, Effective Facts, Faith Facts) which may then be associated with $RAS_3$ in the form of one or more identity attributes. For example, an acknowledged Domain expert, $ADE_1$, may authenticate and/or validate the adherence of the standardized security protocol specification, such as, TSL/SSL, to its descriptive situationally relevant CPE set and publish one or more Reputes asserting $ADE_1$'s certification, which may then be associated with one or more identity attributes of the TSL/SSL specification. Such certification of a resource arrangement set's adherence to its particularity management specification may be published as a PERCos, for example. Formal resource, which may be published as a Repute Cred or Effective Fact and/or the like with the $ADE_1$ as the Cred or EF creator and publisher, and further may depend on validating and/or authenticating, for example, as specified in an associated particularity management specification:

Provenance identities of the resource set, including situationally related, that is attribute relevant, identities of one or more of its direct Stakeholders (such as, its publisher, creator, distributor, and/or the like).

One or more test harness suites and/or any other validity/authenticating testing specifications and/or embodiments that may be used to validate the resource arrangement set's particularity management specification sets.

And/or the like.

In some embodiments, the assessment of a resource set's adherence to its particularity management specification set associated with a resource arrangement, $RAS_4$, may depend on measurability of $RAS_4$'s intended and unintended consequences. For example suppose a resource arrangement set, $RAS_1$, has a specification set that specifies that any information $RAS_1$ may receive (for example from a storage system) will be encrypted and only be available to authorized parties (such as authorized users, Stakeholders, process sets, and/or resource sets) that, for example, hold/control encryption keys. In such a case, the positive aspect of the consequences can be tested in binary yes/no manner, where consequences are: i) information set arrived encrypted; ii) the key held by an authorized party provides access to the information set and corresponds to an identity instance on a list of all identities of parties having authorized access rights (for example, in the form of PERCos Participants expressed as PERCos Formal resources); and iii) the information set is identical to that provided by the resource set's one or more Stakeholders.

In some embodiments, measurability of unintended consequences of resource arrangement sets is subjective and based on the opinions of their evaluators, and, for example, such opinions may be expressed in the form of Repute Creds and/or the like. For example, demonstrating that a resource arrangement set does not or may not to a certain standard of rigor, generate unexpected consequences may be equivalent to relying on assurance methodologies as, for example, code walk-throughs, design analysis and/or formal verification and/or one or more operating monitors, such as for example network monitors (e.g., packet inspection), process monitoring and the like, to confirm that resource arrangement set adheres to a specification set stating that certain behaviors do not occur.

In some embodiments, metrics of expected and unexpected consequences of a resource arrangement set may be expressed in terms of trust variables, where the values of a trust variable may comprise one of the following standardized and interoperable values and may in some embodiments be expressed in the form of Repute Facets of Quality to Purpose, for example:
(reliability: 8 on a scale of 1 to 10),
(security: 7 on a scale of 1 to 10),
(trustworthiness: 9 on a scale of 1 to 10),
(authenticity: 0 on a scale of 1 to 10 to where 0 is unknown and 10 is the highest level of authenticity),
And/or the like In some embodiments, CPFFs may employ particularity management services to construct a cohered minimal resource arrangement set in pursuit of, that is, employed in the fulfillment of, target contextual purpose sets. Particularity management services for a CPFF fulfilling a target contextual purpose set, $PS_1$, may identify a set of candidate resource arrangement sets and then analyze their suitability based on a combined weighted degree of, for example,
Degree of similarity matching of a resource arrangement's set's one or more descriptive CPE sets with $PS_1$;
Degree of reliability of identities, identity attributes, any other relevant data, and/or relevant Reputes Creds and/or EFs and/or the like published by their indirect Stakeholders;
Degree of minimality of candidate resource arrangements in fulfilling $PS_1$, where the degree of minimality is the resource arrangement obtained from applying particularity management services;
and/or the like.

Figure 36:
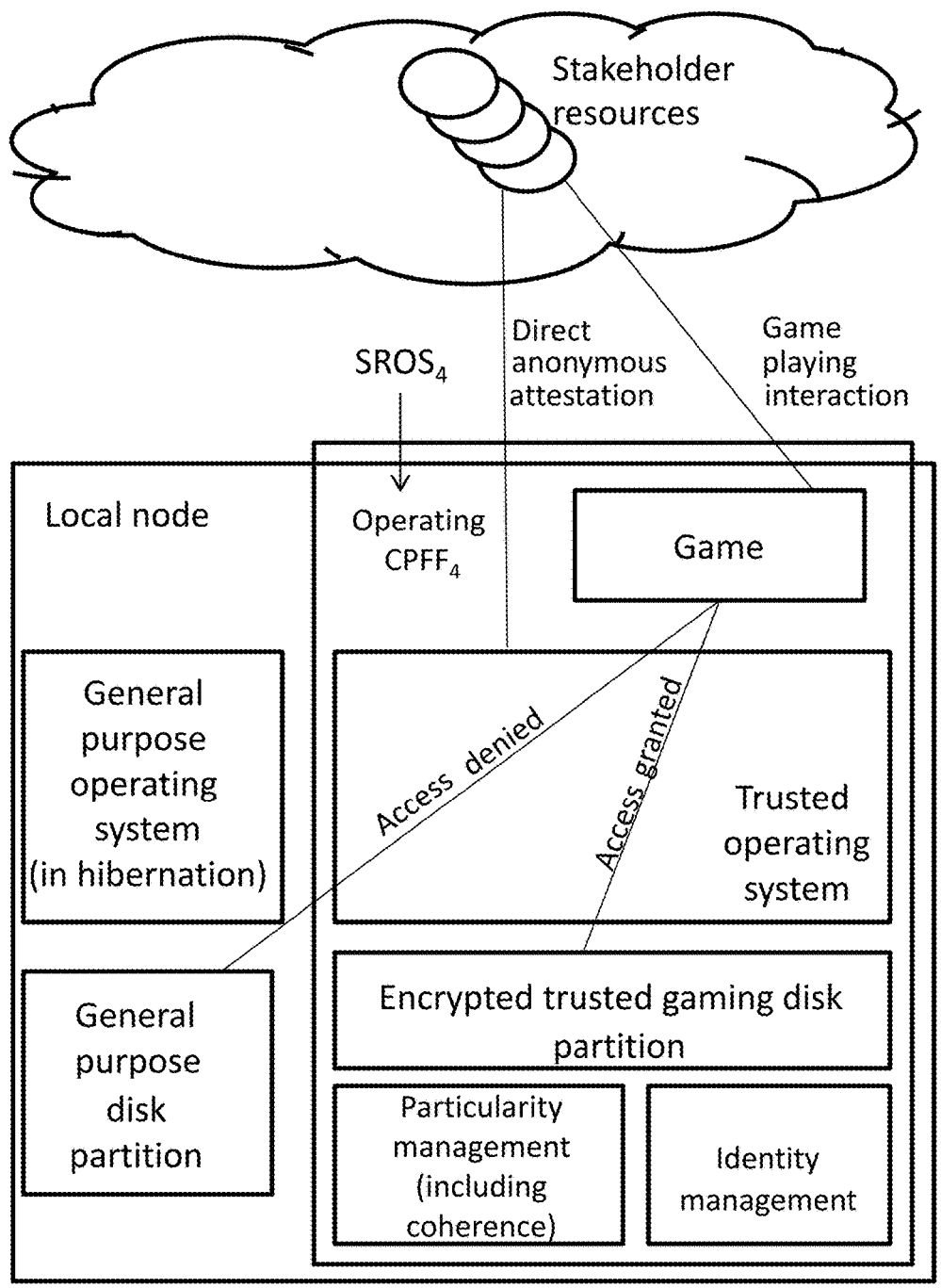
FIG. 36 is a non-limiting illustrative example of isolation managed by particularity management employing hibernation.

FIG. 36 is a non-limiting illustrative example of isolation managed by particularity management employing hibernation.

The weighting may be used for combination may be in accordance with situation-specific specification set. For example, FIG. 36 illustrates a coherence particularity manager instance fulfilling a situationally relevant operating specification set that enables users to securely explore new types of games. For example, a coherence particularity manager instance may protect confidential resource sets, sensitive related processes, and proprietary Stakeholder resource sets from unauthorized disclosure and/or modifications. In some embodiments, such a particularity manager instance may examine each candidate resource arrangement set to assess the consequences of removing and/or constraining a resource and/or resource element set.

For example, suppose a candidate resource arrangement, $RAS_1$, for provisioning a CPFF includes an advanced highly configurable network gateway, $NG_1$. If such a network gateway has an excessive number of features to satisfy a situationally relevant operating specification, $SROS_1$, particularity management services may examine $RAS_1$'s particularity management specification set to assess the consequences of replacing $NG_1$ with a simpler (e.g., perhaps IP level) network gateway or constraining the functionality of $NG_1$ to the minimal set required to fulfill $SROS_1$. Based on the assessment, particularity management services either replace $NG_1$ or constrain its behavior.

In some operating CPFF instances, a situation-specific CPE set may specify balancing of one or more contextual variables on the basis of current and/or anticipated future environmental situations. For example, consider an operating CPFF instance, $OCPFF_3$, particularity management services may govern operations of $OCPFF_3$'s operating resource sets and environment to assess its situational conditions and perform corrective actions as needed. For example, particularity management services may reconfigure $OCPFF_3$'s operating resource sets to adapt to varying operating environmental situations, such as, for example, varying threat levels.

In some embodiments, particularity management services of an operating CPFF instance. $OCPFF_4$, may be parameterized to detect changes in $OCPFF_4$'s operating environment and if appropriate, take corrective action(s). For example, suppose a user set has a purpose of exploring a new type of game, and formulates a contextual relevance specification set that requires the game to preserve the integrity of critical user files and protect confidential user data from unauthorized access. In some embodiments, the user set may frame his/her/their input in a manner that balances security and performance to generate a situationally relevant operating specification set, $SROS_4$, for a CPFF, $CPFF_4$, or such user set optionally acquires SROS, for example, in response to a CPE resource identification activity, where such SROS has been published by an expert well regarded by the user set and/or a user set computing arrangement processes strong Repute Quality to Purpose aggregate Creds for user set game evaluation contextual purpose set. $SROS_4$, may include in part, for example, a specification set of, or otherwise expressing:

When the threat level ≤6 (on a scale from 1 to 10), then an operating $CPFF_5$ instance should provision itself so that its integrity ≥7, privacy ≥7, and the performance level ≥8.

When the threat level ≥6, then an operating $CPFF_5$ instance should provision itself so that it integrity strength ≥9 and privacy ≥7 (which, for example, may have an impact on performance).

FIG. 36 illustrates one possible operating embodiment of $CPFF_4$. $SROS_4$ specifies that operating $CPFF_4$ instance is initialized by putting the general purpose operating system into hibernation and then running on a trusted (gaming) operating environment, which may spawn one or more operating sessions. Such operating sessions may satisfy $SROS_4$ by, for example and without limitation:

- Meeting the user contextual purpose specification sets of privacy and integrity by suspending the general purpose operating system and running a trusted operating environment configured to protect privacy and integrity of the user resource sets.
- Meeting the Stakeholder contextual purpose specifications of non-disclosure of proprietary gaming data and algorithms, by running an operating environment which is configured in a way that is satisfactory to both the Stakeholder and the user and which may be authenticated by the Stakeholder through, for example a remote attestation protocol.
- Meeting performance specifications of the user and the Stakeholders by ensuring that the only resources executing in the operating session are those that are essential to the gaming purpose.

Monitoring the operating $CPFF_4$ instance's threat environment (both internal and external) and performing needed actions, as appropriate, including taking corrective actions, such as, reconfiguring the resource arrangement set of the operating $CPFF_5$ instance, notifying appropriate coherence and/or the like process sets, which may in turn, take corrective actions, such as, for example, notifying the user, Stakeholders. and/or the like.

In some embodiments, particularity management services may utilize one or more PERCos Platform Services (such as, for example, Coherence Services, Governance Services, Evaluation and Arbitration Services, and/or the like) to encapsulate an operating session, such as, an operating CPFF embodiment instance, so as to protect it from undesirable consequences, as defined by the user purpose.

For example, consider a user who wishes to perform sensitive financial transactions. Such a user may formulate, select and/or otherwise identify a situation specific CPE set that may include a specification set that requires protection of financial information from disclosure and further ensuring protection of, including ensuring no unauthorized modifications to, financial instructions communicated to a financial institution such as a bank, investment fund, and/or the like. In some embodiments, Coherence Services may translate this situation specific CPE set into a situationally relevant operating specification set that includes policies for controlling access to user related sensitive information sets and policies for user interface, user instruction processing, user instruction communication security, and/or the like. In some embodiments, an operating CPFF embodiment instance may comply with such access control and user financial instruction policies by using Governance Services to, as applicable, mediate and enforce access to user sensitive resource sets, and manage resource configuration and/or processing related to user financial instructions.

In some embodiments, operating CPFF instances may dynamically adapt to changing operating situational conditions to produce contextual purpose optimized interim results and/or Outcomes through, in part, the use of particularity management, and/or the like, services. For example, suppose an operating CPFF instance, $OCPFF_1$, is fulfilling a target CPE set that includes a requirement to balance contextual variables, such as, for example, security, cost/budget, performance, and ease-of-use. In some embodiments, particularity management services may support $OCPFF_1$ to adapt to changing environments by monitoring $OCPFF_1$ operating behaviors (such as intended and unintended consequences) and conditions (such as demands for its services, security threats, and/or the like) and if appropriate, taking actions (such as, for example, reconfiguring $OCPFF_1$'s operating resource sets, including replacing one or more resource and/or resource element sets).

For example, suppose an operating CPFF instance. $OCPFF_2$, is developed to fulfill a situation-specific target CPE set that balances security, performance and ease-or-use based on desired rigor level, such as, for example:

---

(contextual relevance specification
  (if threat level ≤ 3 then
    (performance ≥ 8 and ease-of-use ≥ 6 and rigor level (security)1 ≥ 4 and rigor level (reliability) ≥ 5)
  else
    (rigor level ( security) ≥ 7 and rigor level (reliability) ≥ 8)))

---

This contextual relevance specification states that if the threat environment of operating session is relatively benign, then rigor levels of security and reliability can be relaxed, whereas, if threat level increases, the operating session has to maintain high rigor levels for security and reliability.

In some embodiments, $OCPFF_2$ may satisfy such a situation-specific target CPE set by employing particularity management services that monitor $OCPFF_2$'s operating threat level and trigger a response when the threat level rises above 3 or descends below 3. For example, suppose the threat level rises from below 3 to higher than 3. Particularity management service may reconfigure $OCPFF_2$'s operating resource sets, such as, for example, reconfigure $OCPFF_2$'s network gateways to minimize network access, turn off those services that are less secure but contribute towards providing higher performance, and/or the like.

In some embodiments, the responses to changes in situational conditions may be pre-calculated for efficiency prior to launching an operating CPFF instance. In such a case, backup resource sets may be provisioned and made ready (or otherwise be at least in part readied) but inactive so that when required they can be easily and efficiently activated to replace existing operating resource one or more sets that no longer meet the requirements of a situation's changed conditions. Alternatively, some embodiments may, at least in part, dynamically calculate an appropriate response to changing situations as they occur, for example, particularly in cases where changes occur rarely or slowly over a period of time or the impact of changing is acceptable given the CPFF specification set, for example, such change set is consistent with user target purpose objectives. These two strategies may be combined in any combination. In some embodiments such strategies may be implemented by Coherence services.

In some embodiments, a user set, or, in this example, a Stakeholder set, $STK_1$, may use a divide-and-conquer software development approach to develop a CPFF in pursuit of a target contextual purpose specification, $CPS_1$ by performing a series of actions. First, $STK_1$ may generate a cohered and resolved specification set, $CPS_2$, comprising, for example:

Refinement specification sets that are refinements of $CPS_1$ to facilitate discovery of applicable resource arrangement sets.

Functional specification sets that may express enabling and/or contributing capabilities for generating functional results. For example, functional specification sets may express capabilities needed to provide Stakeholders with support for publishing resource sets for users to support securely performing social networking interactions involving sensitive information, performing online banking, developing sensitive intellectual property, and/or the like.

Situational relevance specification sets for provisioning operating sessions with resource sets that balance contextual variables (such as, reliability, ease-of-use, performance, trustworthiness, and/or the like). For example, situational relevance specification sets may describe conditions that resource sets may need to satisfy, such as having specified encryption, firewalls, hypervisors, and/or the like to provide required CPFF instance characteristics.

Monitoring specification sets to monitor resource set behaviors and/or operating environments and notify relevant processes, such as, for example, particularity management services, which may, in some embodiments, operate as part of and/or in conjunction with Coherence Services.

And/or the like

In some embodiments, $STK_1$ may next decompose $PS_2$ into an ordered set of component specification sets. $PS_{2,1}$, $PS_{2,2}$, ... $PS_{2,n}$, that is strictly hierarchical by eliminating circular dependencies, hierarchical dependencies, and/or overlapping dependencies by employing services and/or techniques, such as, for example, particularity management service and/or other software development techniques to minimize the resulting resource set.

$STK_1$ may then identify and selects resource arrangement sets, $RA_{2,1}$, $RA_{2,1}$, ..., $RA_{2,n}$, that satisfy ordered set $PS_{2,1}$, $PS_{2,2}$, ..., $PS_{2,n}$.

$STK_1$ may then recursively composes component resource sets. $RA_{2,1}$, $RA_{2,1}$, ..., $RA_{2,n}$ to form a composite resource arrangement set, $RA_2$.

$STK_1$ may then perform both unit testing of component resource arrangements (i.e., $RA_{2,1}$, $RA_{2,1}$, ..., $RA_{2,n}$) and integrated testing of $RA_2$, which can then be used to generate test harness such that other Stakeholders (such as experts) may validate (or have validated) the testing harness and publish their results or users can evaluate it in pursuit of their purpose set.

Finally, $STK_1$ may generate one or more, for example, results corresponding identity attributes associated with $CFPP_1$.

In some embodiments, Stakeholders may use published CPFFs, such as, for example, $CFPP_1$, to publish more capable CPFFs. For example, suppose a tax expert published a CPFF, $CPFF_2$, for preparing tax returns. Other Stakeholders can use $CPFF_2$ as a framework to construct a new, for example modified, $CPFF_3$, providing it with additional features, such as, the ability to trade-off between differing contextual variables, such as, for example, balance between costs, security, performance, functionality, reliability, and/or the like. The security expert may then publish $CPFF_3$.

Some PERCos embodiments may involve coordinating the generation of, and resolving to, situationally relevant one or more operating specifications that, given available specification and associated information sets, are resolved in a manner that produces a balanced, optimally responsive to user contextual purpose, computing arrangement operating set. For example. Purpose Statement and/or other contextual purpose specifications sets may be similarity matched to one or more Frameworks, such as CPFFs, published, for example, by acknowledged Domain experts and/or other experts who may have sufficient expertise to merit highly valuing Repute Creds, where such Frameworks that can provide scaffolding for generating one or more situationally relevant specification sets, and/or for provisioning operating contextual purpose sessions, that may, depending on specification specifics including for example:

Balance operating variables, such as, purpose specific results, complexity, trustworthiness, cost, performance, time duration, and/or other variables, certain of which may be reflected in Quality to Purpose Creds and/or other contextual purpose specification input;

Support provisioning/initiating operating sessions in support of satisfying situationally relevant purpose-related specification information through the use of at least in part, corresponding cohered, reliable, efficient, encapsulated and/or otherwise isolated, one or more functionally cohesive resource arrangement sets comprising situationally and/or combinatorially reliable, tested and/or otherwise assumed to operable, resource sets that operate at least in part in one or more secure hardened computing environment sets in accordance with one or more situationally relevant specification sets; and At least in part be used to manage and/or monitor contextual purpose computing session consequences by managing not only purpose fulfillment contributing identified resource sets but also effectively managing one or more aspects of the underlying operating environment (e.g., Unix. Windows, iOS, and/or the like) by limiting standard operating capabilities of at least one or more portions of such user set underlying operating system arrangement.

In some embodiments, key aspects leading to provisioning and/or initiating a CPFF Framework instance are the identification and selection of optimal (or estimated best) resource sets by evaluating and/or validating the qualities of persistent situationally related identity attributes of relevant candidate resource sets to ensure that their deployment is in accordance with user set contextual purpose specification and/or other relevant contextual input information, including specification sets that may express balancing of operating variables. In some instances, validating such qualities of a resource set may include evaluating and/or validating one or more Stakeholder and/or related provenance information sets to assess the authenticity and/or other attribute one or more qualities of a resource set, and, in some embodiments, may further include assessing the means used to assiduously bind the resource set with its one or more Stakeholder set information, such as existential biometric information, to assure sufficiency of binding characteristics to any associated contextual purpose user set binding characteristics requirement information.

In some embodiments. Stakeholder information be bound to a resource set information set and may reference and/or include one or more chain of Stakeholder authorities identity information sets that include biometric information for one or more human Stakeholders, such as resource set one or more resource Stakeholder publishers. Such Stakeholder publishers may have registered their human "root," for example, liveness tested, existential biometric and/or other sufficient to specification Stakeholder identity information sets with one or more trusted identity (and/or resource) managers (such as cloud service and/or network administrator) where at least a portion of such resource set published Stakeholder identity information may be similarity matched against any such registered, for example, biometric, identity information, such as provided in the form of a PERCos Participant published identity resource instance. For example consider a resource set, $RS_1$, published by a Stakeholder. $STK_1$. $STK_1$ may reference and/or contain a chain of Stakeholder authorities that include, for example, a human manager, $MGR_1$, that has the rights/authorization to publish $RS_1$ as well as the delegation authority to authorize $STK_1$ to act as $MGR_1$'s delegate.

Some PERCos embodiments may enable users and/or Stakeholders to maintain their biometric and/or contextual information sets in a varied set of computing arrangements. Users and/or Stakeholders may store such information sets in their local computing arrangements, register them with one or more trusted third party identity and/or the like management services, provide (and/or establish again, as may be current and/or authenticated by a given, for example, such information receiving party) at least a portion of such information sets to one or more organizations (such as, banks, employers, publishing services, and/or the like), and/or any combination thereof.

Regardless of where such biometric and/or contextual information sets are to be stored, some PERCos embodiments may provide one or more Identity Firewall (IF) and/or Awareness Manager (AM) sets that may be used in supporting sufficient to contextual purpose related specification, rigorous registration- and/or authentication-related operations regarding tangible identities, such as, for example, human participants in a PERCos Cosmos embodiment, in pursuit of one or more situationally relevant target purpose sets, establishing a new Participant and/or the like biometric identity information set associated with the installation environments of such IFs and/or AMs, and/or for environment, sensed, at least in part biometric auditing of at least a portion of human activity in such associated environments.

Some embodiments of IF and AM sets, such as hardware protected embodiments thereof, may provide a minimal set of capabilities comprising time-related operations and secure communication capabilities to securely transmit and/or receive, correlated including, for example, time stamped, biometric and/or other user computing arrangement sensor and/or related emitter information sets (e.g., regarding when such emitting and/or sensing occurred as well as at least specification satisfying (such as contextual purpose set and/or general setting satisfying) descriptive information regarding and/or any, at least in part, transforming of, any such emitted and/or received applicable emitter and/or sensor information). In some embodiments and some circumstances other IF and AM sets may provide a richer set of capabilities, in addition to, for example, supporting identity acquisition, time stamping, and secure communication service, where such further capabilities may include at least in part analyzing such acquired identity information, such as performing timing anomaly analysis and/or performing authentication services involving matching acquired identity information with stored identity information to determine validity of identity assertions, or to otherwise recognize the "name" and/or other identity information corresponding to such acquired identity information. Such hardened IF and AM sets may further provide control arrangements for providing instruction sets to their respective emitter sets regarding initiating, including otherwise describing, situationally specific emitter activity sets, where such instructions may be, for example, at least in part produced by an emitter instruction generator arrangement, such as a pseudo-random emitter patter generation set, and where such pseudo-random arrangement may employ pseudo-random generation techniques at least in part comparable to techniques employed by pseudo-random number generators. Such arrangements, such as, for example, hardware packaged embodiments, may further support CPFF operations, such as, for example, supporting PPE and associated capabilities for initiating CPFF contextual purpose sessions through support of, for example, particularity management, PIMS, other identity management related services, and/or the like.

In some embodiments, AM sets. $AM_1$, may be an arrangement set ranging from a thin AM client to core AM set (comprising one or more trusted clocks, one or more sensor sets, and a secure communications services) to a full AM set (comprising, for example, correlation systems, anomaly detection systems, one or more pseudo random emitter generator sets, one or more emitter sets, one or more authentication and/or reliability integrity processing and/or management sets), where $AM_1$ elements, such as, for example, trusted clocks, pseudo random generators, and/or managers for controlling authentication and/or reliability integrity processing, may be installed in different locations as long as they are locally or otherwise dependably available and connected through a sufficiently reliable and secure communications pathway, such as, for example, a wireless connection employing, for example, encrypted sufficiently reliable Bluetooth communications. For example, a plurality of AM and/or IF sets may use the same trusted clock for example, embedded in a "master" AM or IF, a router, access point, firewall and/or the like. AM and/or IF sets may have one or more pseudo random generator sets that may be also available for shared use (pseudo-random emitter instruction sets may, for example in some embodiments, be received from a remote location, such as non-local (for example, local vicinity) network administrative and/or cloud service arrangement). An AM or IF may serve as a "master" AM or IF providing pseudo random emitter generation and time services to other securely connected "thinner" AMs or Ifs, and in some embodiments, a plurality of "master" such arrangements may operate, at least at times, and at least for some one or more functions, redundant and/or cross-evaluation manner.

Figure 37:
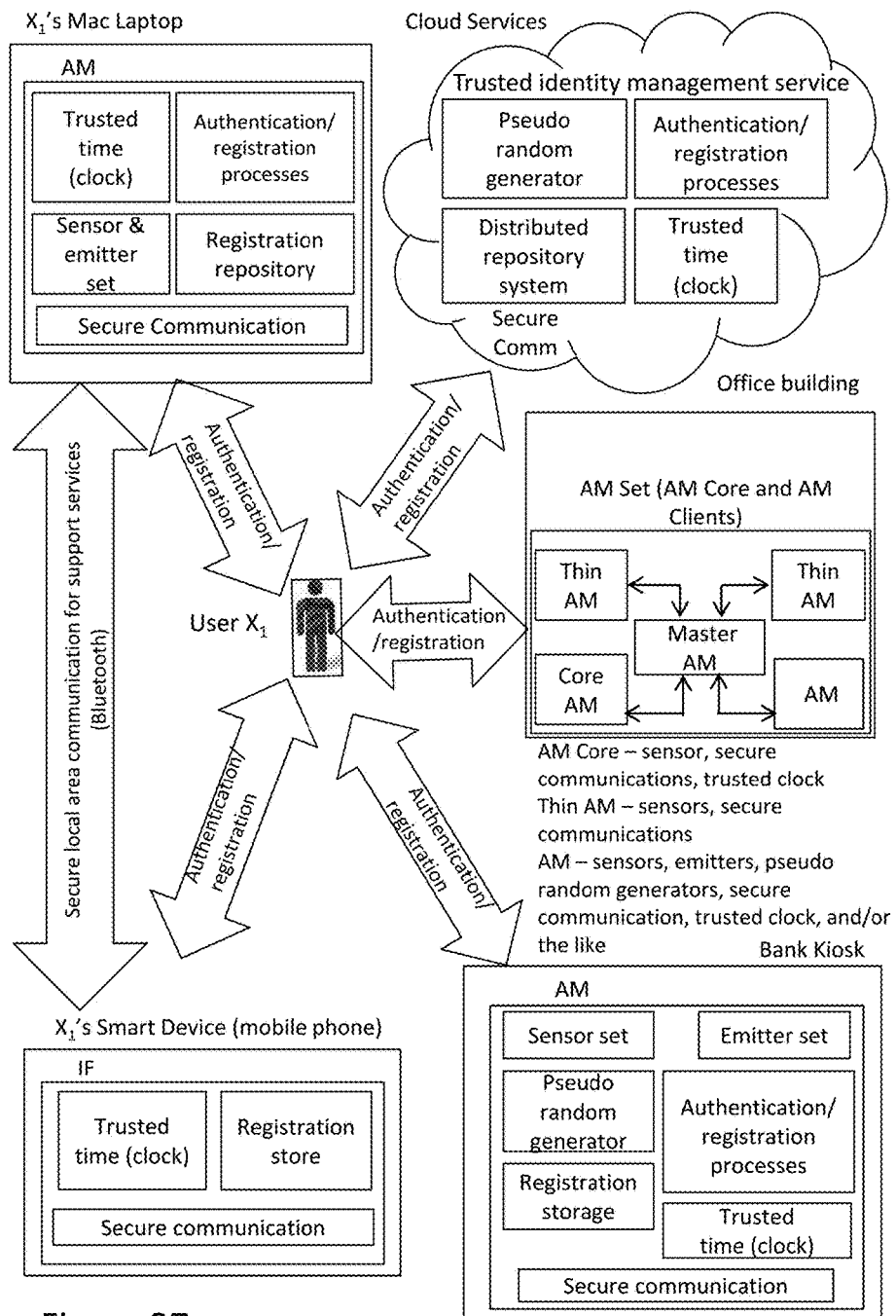
FIG. 37 is a non-limiting illustration of users registering their biometric and/or contextual information set in multiple locations.

FIG. 37 is a non-limiting illustration of users registering their biometric and/or contextual information set in multiple locations.

For example, FIG. 37 illustrates a user. $X_1$ registering $X_1$'s biometric and/or contextual information set in four locations: $X_1$'s Mac Laptop. $X_1$'s mobile phone. $X_1$'s bank kiosk, and a trusted third party service that $X_1$ uses to authenticate himself or herself so that the service can generate cryptographic tokens that $X_1$ may use as needed.

In this example, $X_1$ may be an employee of a company, where the company's multistory building may have a distributed AM set to manage situational awareness of the entire building. Such a distributed AM set may comprise a master AM set, $AM_X$, may coordinate a plurality of AM, core AM, thin AM-client, and/or IF sets in any combination thereof. $AM_X$ may comprise one or more sensor sets, pseudo random generators, tamper-resistant repository system(s)—that may have one or more backups in the cloud-. PIMS for managing information stored in the tamper-resistant repository system, secure communication services that the master AM set (and/or any combination of instances) may use to interact with an identity management system in the cloud (and/or for example, at a network location in the company's headquarter building located elsewhere), authentication and/or reality integrity analyzer arrangement, trusted clock service that can perform a range of time-related operations (such as timing anomaly analysis, time-stamping sensor information and/or emitter instruction sets, time-related correlation analysis, and/or the like), one or more load module sets, $LM_X$, that may at least in part coordinate and/or otherwise manage $AM_X$'s subordinate AM, thin-client, core AM and/or IF sets. In particular, $LM_X$ on behalf of $AM_X$ may, in some circumstances, coordinate the following:

Entrance AM sets, where each entrance of the building has an AM set comprising, unless the specific capability instance is available from portion of the building AM set arrangement, one or more pseudo random generator sets, emitter sets, sensor sets, and/or timing anomaly sets that communicates their information sets using the building's wireless connection to authenticate users coming into the building or leaving the building. For example, suppose $X_1$ wishes to enter the building at entrance $E_1$, $AM_1$, which is $E_1$'s AM set, may capture $X_1$'s biometric/or contextual information set (for example, existential liveness tested) and transmits it to $AM_X$. $AM_X$, after processing the transmitted information set, a decision is made, by $AM_X$ and/or by an associated operator and/or computing arrangement, to obtain further authentication by initiating a challenge, such as a controlled ultra-sound emission, using $AM_1$'s pseudo random generator to "paint" the user using $AM_1$'s emitter set. If the response, which may be transparent to the user, similarity matches the stored response information set corresponding with the challenge and/or otherwise contains information indicative of appropriate characteristic set for $X_1$, then the door will open so that the user can enter the building.

Stairwell thin AM sets, where entrances to each stairwell has a thin AM set comprising one or more sensor sets and secure communication sets (may also have one or more secure clocks).

One or more core AM and/or IF sets at public areas, such as, lobby, conference rooms, and/or the like. For example, the lobby has an IF that uses the sensor and emitter set located in the main entrance, whereas a large conference room may have a plurality of core AM sets provided through multiple sensor sets deployed throughout the rooms enabling a full, effectively unobstructed view of the room using one or more of the sensor and emitter capability sets.

Figure 38:
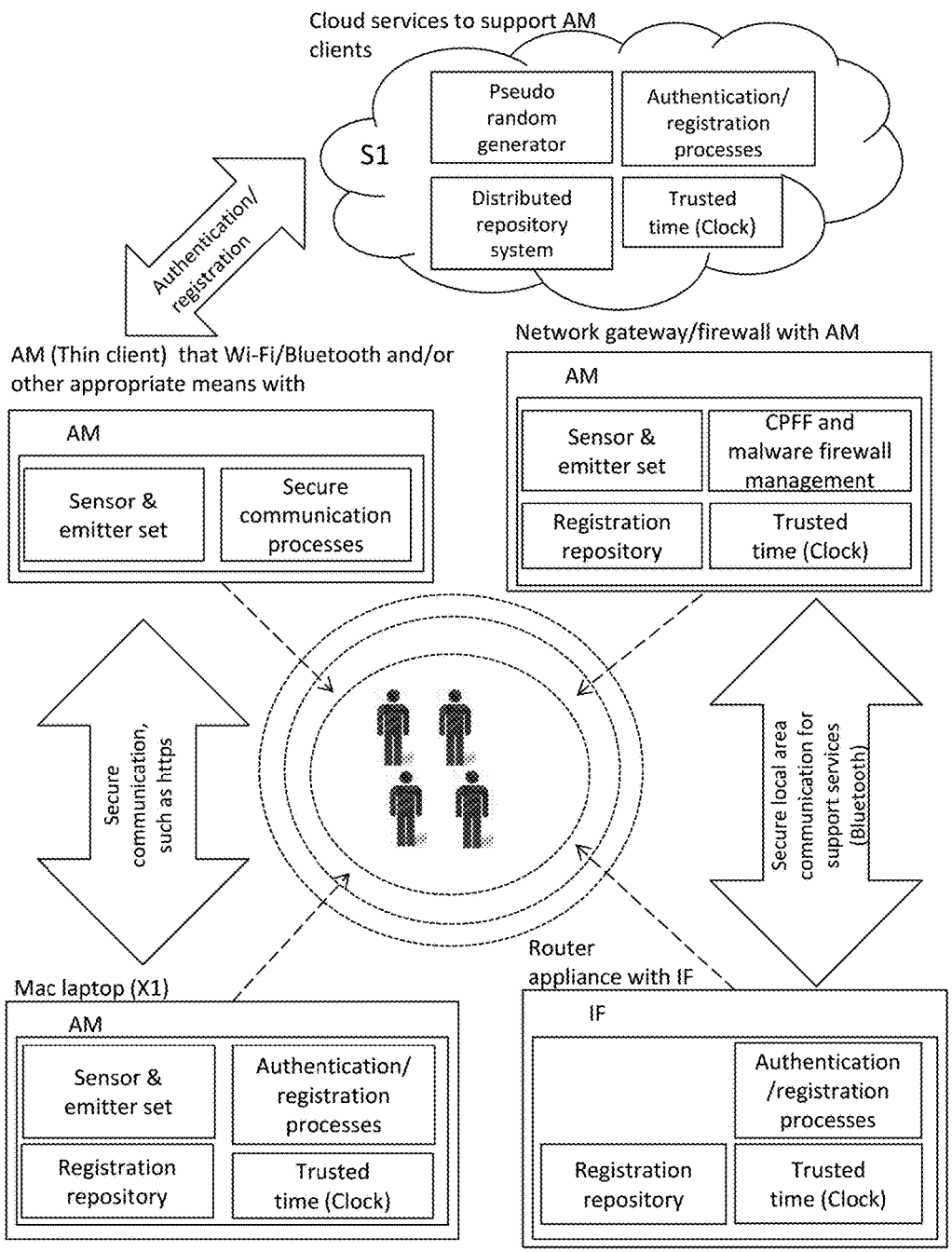
FIG. 38 is a non-limiting illustrative example of AMs and IFs communicating with each other to monitor user set.

FIG. 38 is a non-limiting illustrative example of AMs and IFs communicating with each other to monitor user set.

FIG. 38 illustrates how differing AM and/or IF sets may use locally available communication media to communicate their information sets to assiduously authenticate users. For example, suppose a user, $X_1$, using $X_1$'s Mac Laptop to communicate (via https) with an on-line store, $S_1$. $S_1$ has only a thin AM client that does not have sufficient capability to assiduously authenticate $X_1$. Instead, $S_1$ uses a cloud service to authenticate $X_1$'s existential biometric and/or contextual information set.

In some embodiments, resource sets selected to provision a CPFF Framework instance may be compartmentalized into one or more functionally cohesive resource arrangement groups and allocated to operate in one or more secure hardened computing (including, for example, appliance) environments, such as hardware protected processing environment (PPE) sets, virtual machine (VM) and/or isolation technology (e.g., sandbox) sets running on top a trusted virtual machine monitor (such as, a hypervisor) and/or a trusted operating system.

For example, FIG. 37 illustrates a user, $X_1$ registering $X_1$'s biometric and/or contextual information set in four locations: $X_1$'s Mac Laptop. $X_1$'s mobile phone. $X_1$'s bank kiosk, and with a trusted third party service that $X_1$ uses to authenticate himself or herself so that the service can generate cryptographic tokens that $X_1$ may use as needed, which such tokens may be associated with or otherwise represent and/or include at least a portion of $X_1$ Participant identity information, such as $X_1$s existential biometric information used for authentication information matching.

Figure 39:
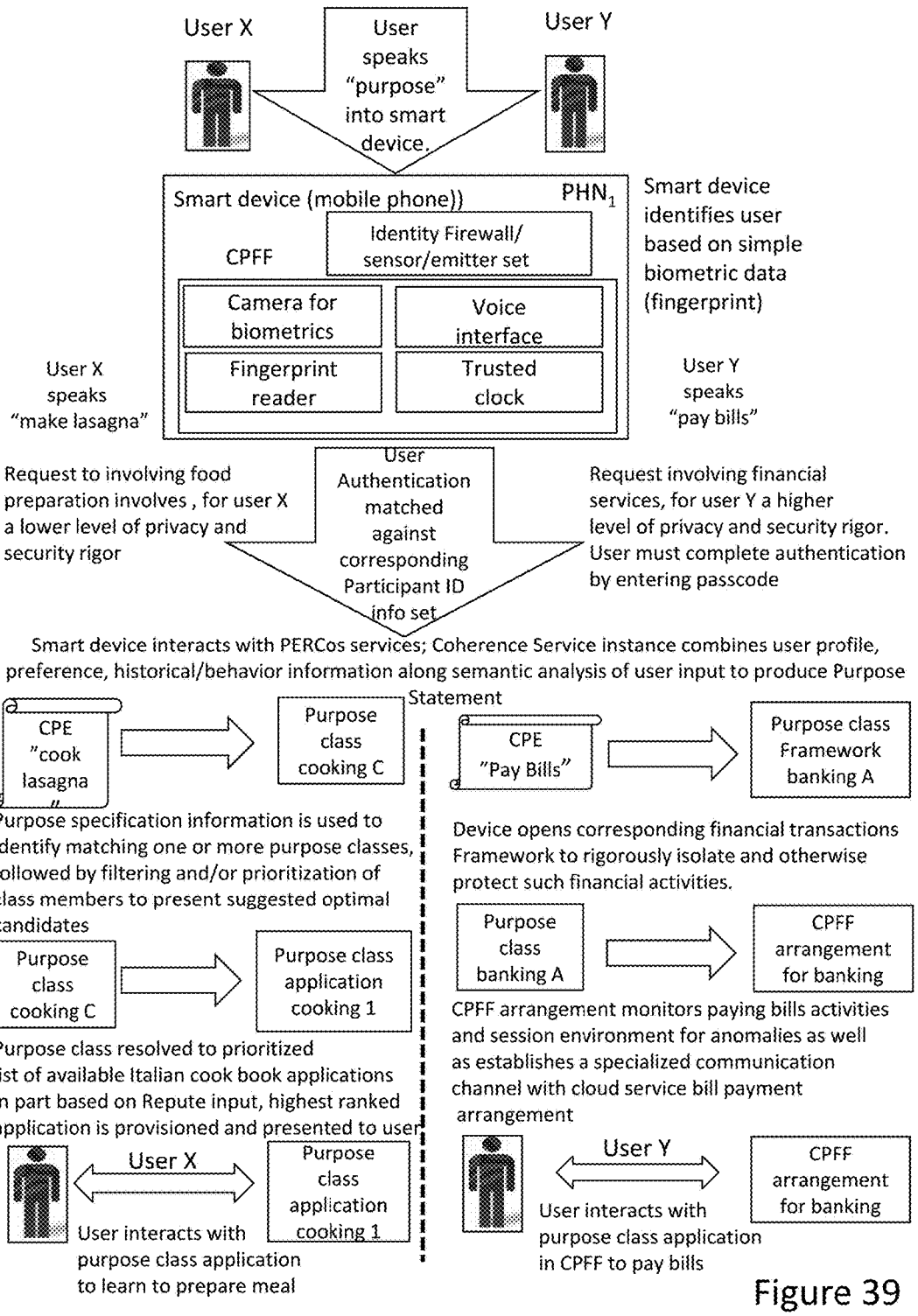
FIG. 39 is a non-limiting illustrative example of multiple Contextual purpose resolutions on a single device.

FIG. 39 is a non-limiting illustrative example of multiple Contextual purpose resolutions on a single device.

FIG. 39 shows two users, X and Y, interacting with the same brand mobile device, $PHN_1$, which comprises an Identity Firewall and sensor/emitter set with two distinct situational purposes. In order to initiate an interaction with the mobile device, both X and Y must submit to an initial simple biometric test involving, in this example, a measurement of a fingerprint. At this point, the behaviors of X and Y diverge based on their situational purpose.

X is pursuing a purpose of cooking the evening meal and therefore speaks the phrase "make lasagna." In response to this request, $PHN_1$ interacts with PERCos services to refine the target user purpose (in FIG. 39 a purpose class, Cooking C, is identified as a close approximation to the user purpose) and help the user select appropriate resources (in FIG. 39, the user selects a purpose class application, Cooking 1). X then provisions and operations the Cooking 1 purpose to find the right recipes to use $PHN_1$ to help cook a lasagna.

The processing of Y's purpose proceeds in a similar manner, except that Y's purpose involves contextual relevance specifications requiring a trusted to purpose operating session. Y speaks the phrase "pay bills". In this example, there exists a policy that requires an additional layer of user authentication to occur when financial purpose related resources are involved, at this point Y must enter a passcode as part of the additional layer of required authentication. As Y's purpose unfolds, PERCos coherence services determine that this purpose requires a trusted to purpose operating session utilizing CPFF support. In this example, Y selects a CPFF arrangement for banking which provides some support to avoid unintended consequences such as, for example, requiring assiduous existential authentication of Y and/or monitoring the session environment for anomalies.

In some embodiments, such identified and selected reliable resource sets may be compartmentalized into one or more functionally cohesive resource arrangement groups and allocated to operate in one or more secure hardened computing environments, such as hardware protected processing environment (PPE) sets, virtual machine (VM)

and/or isolation technology (e.g., sandbox) sets and/or the like, for example, as may be employed in a CPFF supporting hardened component and/or other device arrangement.

In some embodiments, such secure hardened computing environment sets may provide tamper-resistant environments, (for example, tamper-resistant, hardware packaged environments, and wherein components, circuitry, and software therein may be respectively hardened individually and collectively) that protect and/or isolate their operating resource sets from corruption, misdirection, subversion, observation, and/or other forms of interference and/or interference of rights, using external resource sets. Such secure hardened arrangements may adapt to changing situational conditions by reconfiguring, updating, and/or replacing their associated load module sets in accordance with one or more situational conditions, as specified by, for example, CPFF specification sets.

For example, suppose a user employs a local computing environment that has a single CPFF hardware PPE arrangement, $PPE_1$. Depending on the user's current target purpose set, $PPE_1$ may load and operate one or more different load module (LM) sets that enable the user to securely and optimally engage in different activities, such as online banking, secure online purchasing, PERCos resource publishing (as a Stakeholder), and/or the like. As a user purpose session unfolds. $PPE_1$ may, in some embodiments, update, replace, and/or reconfigure its load module sets and/or resource sets depending on its environmental conditions, such as a threat detection event that may change the degree of encapsulation and/or isolation needed to perform purpose operations with sufficient rigor, security, and/or the like, to avoid subversion by malware, potentially disruptive humans, and/or the like. For example, suppose a hardware $PPE_1$ is installed in a user's mobile phone. When the user is using the phone in a crowded area, $PPE_1$ may load a load module set that restricts the set of sensitive operations that the user may perform in order to prevent the disclosure of sensitive information. However, when the user is in a safe area (such as, his office), $PPE_1$ uses a different load module that allows the user to perform sensitive operations with less rigorous restrictions.

In some embodiments, particularity management services may be multiply instantiated, so that some instances can be integrated into CPFF evaluation processing, whereas others may be managed separately. Such particularity management service instances may enable users to accept, add, modify, refine, resolve, cohere, and/or otherwise manipulate—single instance or iteratively—their prescriptive Purpose Statements (and/or like, purpose specification) sets that can be similarity matched to identify and select a Framework, such as, a CPFF, that can be used as a scaffolding and/or other environment to produce a situationally relevant operating specification set. Such similarity matching may include cohering CPFFs and/or other Frameworks with user Foundation resource sets to ensure that provisioning of CPFF Framework instance would be compatible with user Foundation resource sets. Particularity management services may provision and/or otherwise instantiate an identified CPFF Framework instance with an optimal resource set whose operation set would satisfy produced, situationally relevant, operating specification set.

Figure 40:
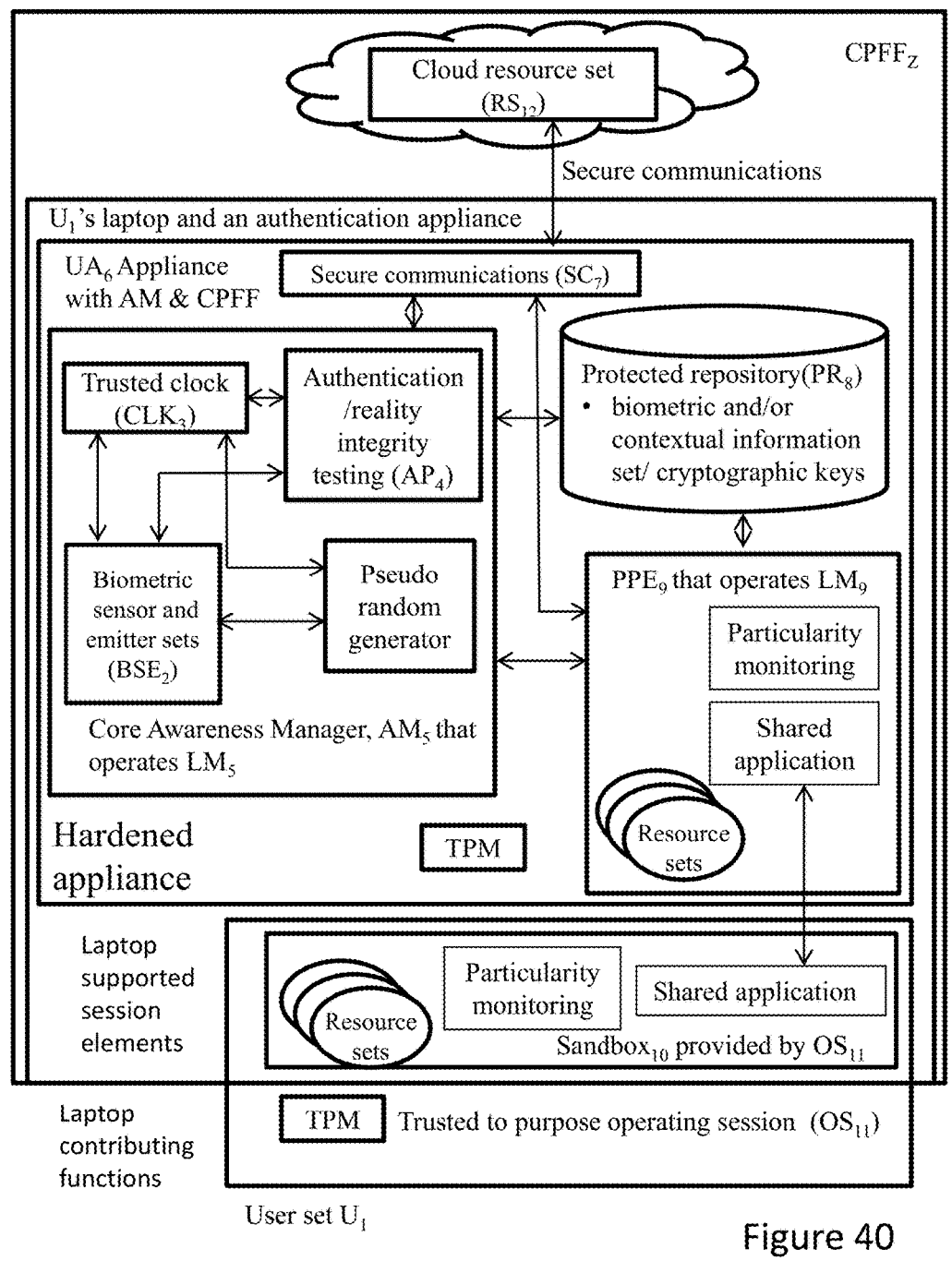
FIG. 40 is a non-limiting illustrative example of an operating CPFF that employs a unified hardware appliance to monitor to exploration of development tools.

FIG. 40 is a non-limiting illustrative example of an operating CPFF that employs a unified hardware appliance to monitor to exploration of development tools.

In this example, an operating CPFF. $CPFF_z$, which, as illustrated in FIG. 40, is a CPFF Framework instance is used with a user Foundation resource set that enables users in a user set, $U_1$, to securely and reliably use development tools to develop a software system. Software development tools (such as compilers for converting source files into executable modules, build tools, revision control systems that manage versioning and/or resource sets in a manner that is convenient for software developers, and/or the like) are, in general, large, complex, and dynamically evolving. In current practice, such tool sets are commonly run in untrusted computing environments that are at risk to malware and other (for example, human) security threats that can taint the end result of software development processes. This example illustrates how $CPFF_z$ provides users in $U_1$ with secure processing environments by using operating session resource sets distributed across a plurality of computing environments, with operations in computing environments secured, at least in part, by secure hardened hardware appliance such as, for example, a unified appliance, $UA_6$, with AM and, at least in part, CPFF functionality.

$CPFF_z$ operating arrangement may employ, and where applicable, operate, the following secure hardened processing environments:

$UA_6$, a tamper-resistant hardware appliance that operates a LM set, $LM_9$, to manage an application that Sandbox$_{10}$ and $UA_6$ share. In the current example, $UA_6$'s capabilities include:
Assiduous biometric-based procedures for existential authenticating $U_1$.
Secure communications with cloud resource sets.
A trusted path for reliable communications from $U_1$ to $UA_6$ via $AM_5$'s sensor/emitter set.

Sandbox$_{10}$, a sandbox provided by the trusted to purpose operating session, $OS_{11}$. By operating on top of $OS_{11}$, Sandbox$_{10}$ provides a reliable environment to support software development and collaboration, via source control, chat, e-mail, screen sharing, and/or the like, with other developers.

A computing environment in the cloud, such as, for example, a software PPE (SPE), for evaluating cloud resource sets. For example, developers can explore the internet to find new tools they may be interested in using. After evaluating cloud resource sets, a developer may, in some instances, choose to install one or more tools into Sandbox$_{10}$.

In some embodiments, $LM_9$ operating in $PPE_9$ may also provide monitoring of $OS_{11}$ and applications that run in Sandbox$_{10}$. When the laptop boots $OS_{11}$, its TPM device may be able to measure the boot code and attest to the status of $OS_{11}$ when $OS_{11}$ has initialized. The TPM may then attest to the state of the laptop to $LM_8$ by sending it the measurement, which $LM_9$ verifies with its stored code. $LM_9$ in turn instructs an LED display in $BSE_2$ to display a message indicating its verification of the state of $OS_{11}$ boot, thereby providing U with a reliable means of knowing the health of $OS_{11}$ when it boots. Similar measurements, attestation and display may be applied to the initialization of Sandbox$_9$.

By compartmentalizing user resource sets into two environments. $UA_6$ and Sandbox$_{10}$, $CPFF_z$ satisfies least privilege principle that may limit the consequences of any disruptive software development tools developers may install into their development environment. By cooperating together $UA_6$ and Sandbox$_{10}$ may obtain capabilities that cannot be provided by either environment alone. For example, resource sets operating in Sandbox$_9$ may integrate screen sharing with a rich development environment and $UA_6$ may add assurance that the screen may only be shared with authorized developers. Sandbox$_{10}$ may provide source code control and $UA_6$ may ensure that assiduous (for example liveness tested biometric) authentication, which is described in more detail in the example illustrated by FIG. 42 that uses the same appliance $UA_6$ as this example, meets the requirements of the source code control server. Sandbox$_{10}$ may provide a secure environment for development work and $UA_6$ may monitor that environment and provide $U_1$ with status updates on an LED display.

In this example, in order to access some resource sets, such as, for example, $RS_{12}$, their Stakeholders may require that $U_1$ assiduously be bound to $U_1$'s existential identity to demonstrate $U_1$'s authorization to access $RS_{12}$. In such a case, $U_1$ may use of authentication appliance, $UA_6$, to provide the sufficient to purpose degree of authentication.

In some embodiments, for reasons of architectural optimization, convenience, cost, and/or other situational conditions, CPFF Framework instances may employ differing arrangements of secure hardened computing environments. Some embodiments may use an arrangement comprising one or more hardware PPE sets operating in a CPU set, whereas others may use an arrangement comprising one or more hardened software environment, such as sandboxes that operate as part of an operating system set, a VM operating on top of an operating system, and/or the like. Such differing arrangements may provide differing degrees of rigor, reliability, security, and/or, for example, other Quality to Purpose Facet considerations. Some example illustrations of such differing configurations are as follows.

Figure 41:
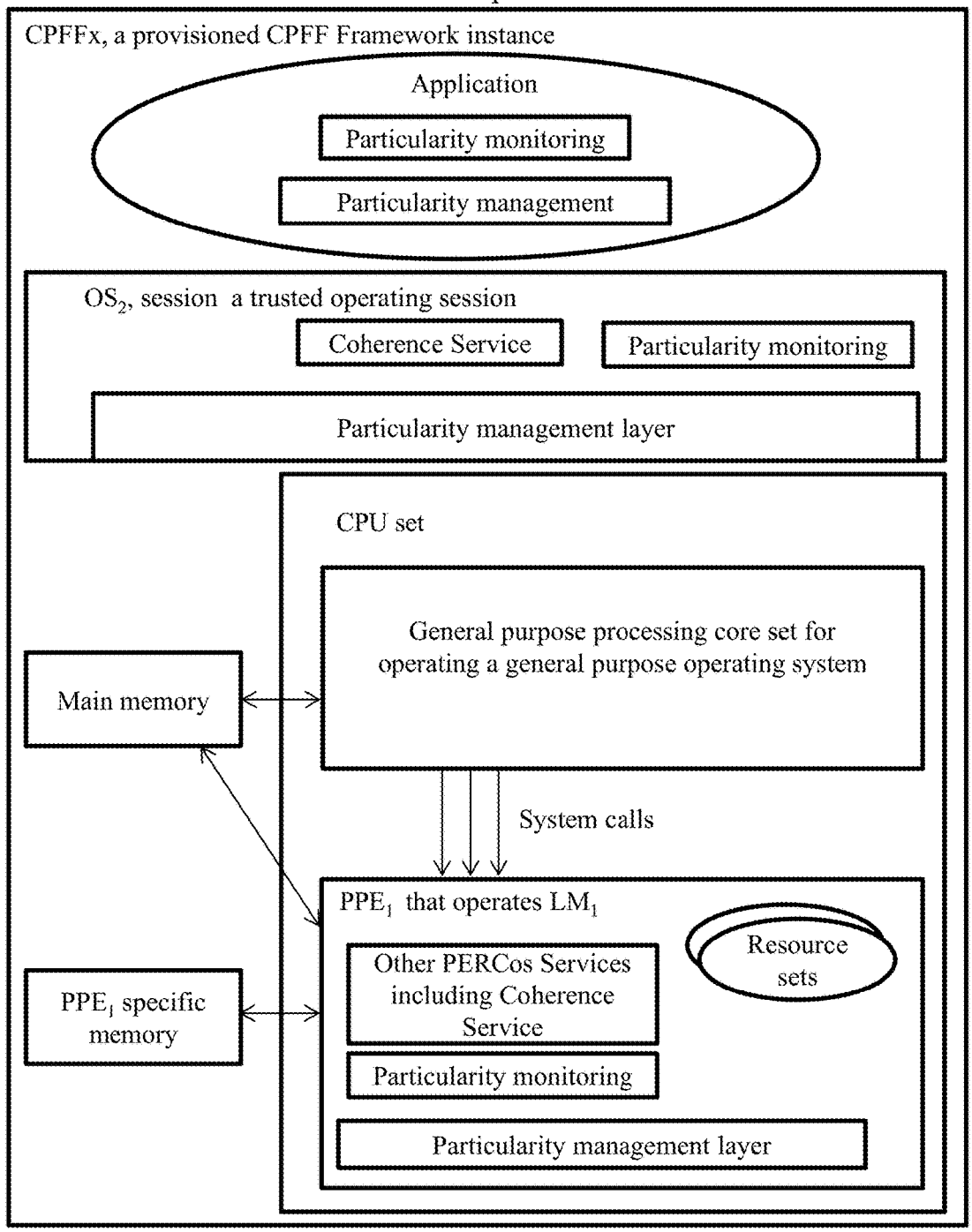
FIG. 41 is a non-limiting illustrative example of a CPFF operating session that uses a hardware PPE set in a CPU set to manage intended and/or unintended consequences.

FIG. 41 is a non-limiting illustrative example of a CPFF operating session that uses a hardware PPE set in a CPU set to manage intended and/or unintended consequences.

FIG. 41 illustrates a non-limiting example of an operating CPFF. CPFF$_x$, that operates a functionally cohesive resource arrangement comprising one or more highly rigorous and reliable processing sets in a hardware PPE set. PPE$_1$, in a CPU set to manage intended and/or unintended consequences. PPE$_1$'s associated load module, LM$_1$, has its own dedicated memory, which LM$_1$ uses to implement a set of PPE$_1$'s system calls, such as, system calls that implement, whole or in part, particularity management services including, for example, particularity monitoring services, and/or other coherence services, and/or other PERCos services. LM$_1$ may utilize a variety of resources sets to perform its operations, such as, for example, informational resources, such as, for example, resources specifying and/or supporting the management of operating systems and/or applications that execute in the general purpose CPU operating environment. LM$_1$ may also have access to main memory so that LM$_1$ can monitor and, if needed, modify operations of the general purpose operating system. In some embodiments, PPE$_1$ may be implemented through a combination of, hypervisor technologies such as VMM root mode, to provide a memory space that is isolated from tampering by the general purpose operating system together with a mechanism by which PPE$_1$ may authenticate its load modules.

In some embodiments. LM$_1$ may cooperate with and/or support CPFF$_x$'s other operating resource sets, such as particularity management services and/or other PERCos services that operate on top of OS$_2$. In some such embodiments, such cooperation may allow CPFF processing to continue to operate correctly even when an operating system running on top of the CPU set is compromised. For example, in cases where OS$_2$ and/or the applications supported by OS$_2$ are infected with malware and/or otherwise become unreliable, particularity monitoring service operating in PPE$_1$ in the CPU set may detect, or suspect, such failures and take corrective actions, such as, for example, restart the operating system and/or replace faulting resource sets with alternate resource sets.

In some circumstances, user sets (for example, corporations for their employees) may not want their banks and/or certain one or more other parties to have direct access to their biometric and/or contextual information sets and, further, may not want to store such confidential one or more information sets in their mobile phone and/or other portable devices where it might be lost, stolen, and/or penetrated by malware and/or humans acting in a manner inconsistent with banking agreement specifications. Such user sets, and/or computing arrangements acting on their behalf, may negotiate or otherwise agree with a banking resource set representing their banks to use a third party (for example, a banking transaction authentication utility performing acting on behalf of many banks) that they both trust to act as an intermediary to securely and reliably authenticate all parties involved in a banking transaction, and as may be applicable, provide appropriate further information. In some cases, such negotiation or other agreement process may be elevated to a higher order authority, such as, an operations manager, MGR$_1$, at the bank who may explicitly authorize such use of a third party. In some instances, however, such as for high value transactions, MGR$_1$ may insist that users register their existential biometric identity information set (including performing processes to acquire their relevant biometric information) with the bank's identity management system and assiduously authenticate themselves using biometric sensor/emitter devices authenticated and evaluated by MGR$_1$ as sufficient to perform banking transactions.

Figure 42:
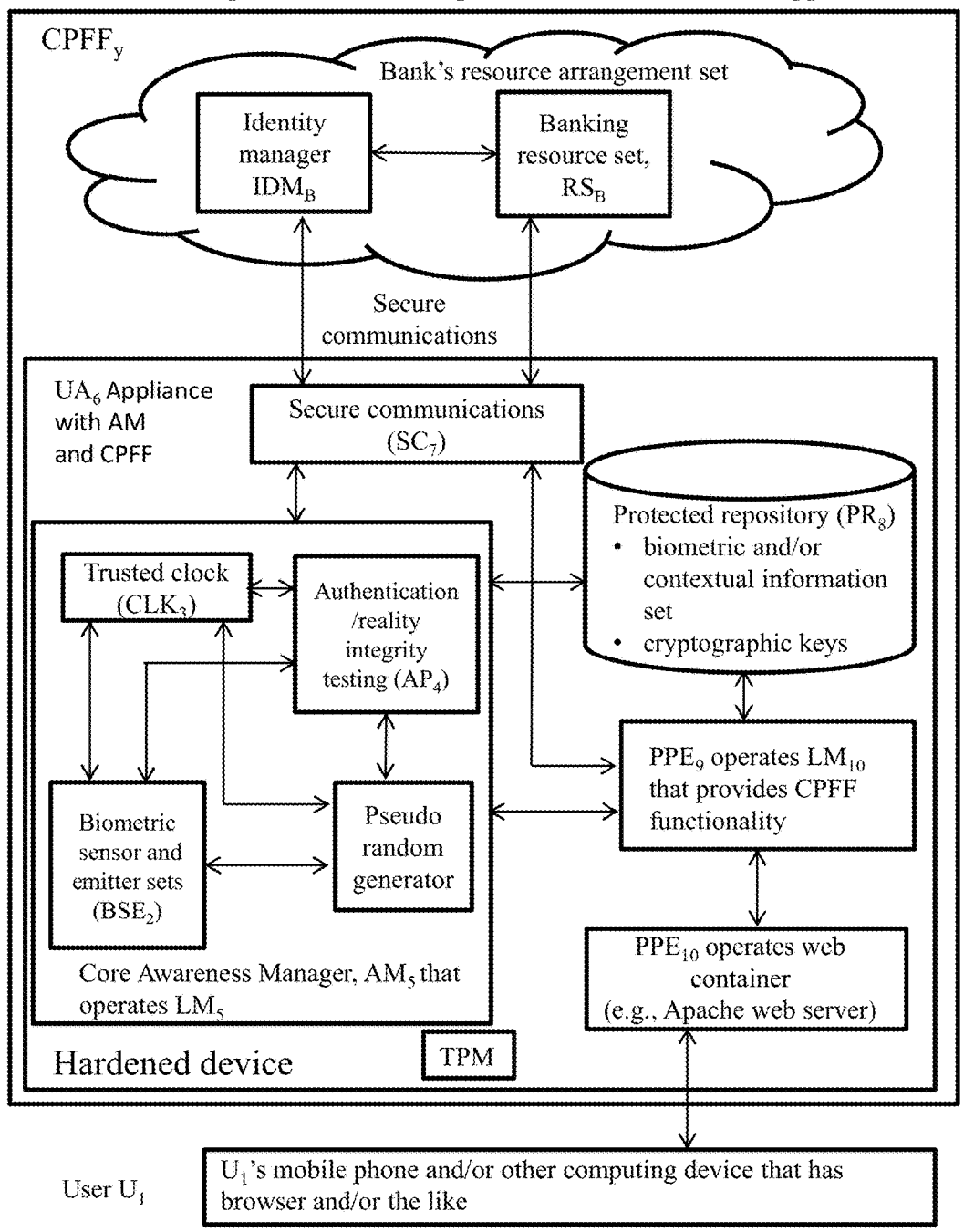
FIG. 42 is a non-limiting illustrative example of a hardware unified appliance.

FIG. 42 is a non-limiting illustrative example of a hardware unified appliance.

FIG. 42 illustrates a non-limiting example embodiment of a trusted third party that services users who have a hardware appliance plugged into and/or otherwise in sufficient close proximity to securely interact with their respective local computing environment (e.g., mobile phone) to securely bank on-line using their potentially untrusted mobile phone and/or other portable devices.

In this example, the appliance used by the trusted third party is comprised of an Awareness Manager, $UA_6$, which includes CPFF management capabilities and securely supports a distributed CPFF operating session, CPFF$_y$. CPFF$_y$ enables users to bank online via secure communications to remote banking resource. $RS_B$. Although $UA_6$ supports (or otherwise includes) CPFF$_y$ to manage intended and unintended consequences by enforcing least privilege principle, in which it uses a hardened hardware arrangement comprised of a plurality of hardware PPE sets, other Awareness Manager instances may use a single secure hardened computing arrangement to provide its services.

In this example, each PPE set is provisioned with a minimal resource set it needs to perform its operations. For example, CPFF$_y$ minimizes untended consequences by using a PPE, PPE$_8$ (and a corresponding load module. LM$_8$), to manage its elements and a separate PPE, PPE$_9$, to operate a load module (a web container) for interacting with $U_1$'s mobile phone. In this example, $UA_6$, which is the same as $UA_6$ illustrated in FIG. 40, is comprised of the following elements:

A core Awareness Manager, AM$_5$, that manages the following components:

Biometric sensor and emitter set (BSE$_2$), where BSE$_2$ emitters include a small LED display and a speaker and BSE$_2$'s sensors are sufficient to perform assiduous authentication of $U_1$'s one or more identities and/or other reality-integrity validation.

Trusted clock set, $CLK_3$, that performs/supports time-related operations, such as, for example, time-stamping relevant events, interacting with $BSE_2$ and $AP_4$ to perform timing anomaly analysis, correlating sensor and/or emitter information sets, and/or the like.

In some embodiments, accuracy of said trusted clock set may be calibrated, tested, and/or adjusted using a variety of methods, such as, for example, through interaction with an authenticated clock set, for example, hosted by a remote cloud service arrangement. Such calibration, adjustments and/or testing may take, for example, the following forms:

Calibration, adjustments and/or testing of absolute time, establishing that the absolute time provided by clocks is accurate to within a desired (or at a minimum known) tolerance, which may support, for example, appending absolute time-stamps to data; and/or Calibration, adjustments and/or testing that time intervals (i.e., relative times) calculated by clocks are accurate to within a desired (or at a minimum known) tolerance, which may support, for example, temporal anomaly detection even in the case where absolute times are not (and/or are not known to be) accurate.

Authentication and/or reality-integrity testing process set ($AP_4$) providing validation of a user set's liveness, using voice commands and/or other existentially measurable actions to confirm banking transactions, and/or the like.

A secure communications component ($SC_7$) which is a PPE, that operates a load module set that signs and/or encrypts all communications between $UA_6$ and external Stakeholder resources (such as resources that provide banking services to their clients). Such communication using a well-known protocol, such as TLS, includes providing evidence of the security and/or reliability of situational identities of $UA_6$ (e.g., that may in some instances vary, for example, according to load module updates) where such evidence may be established by demonstrating that $UA_6$ holds the private key for a cryptographic certificate issued by its manufacturer. $CPFF_y$'s operating specification, in this example, instructs that communications processing resource sets operate in a separate hardware PPE from other hardware PPEs (such as, for example, $AM_5$, $PPE_9$, and $PPE_{10}$) to exercise least privilege principle that ensures that load module sets operating in other PPEs do not to know $SC_7$'s private key.

Protected tamper-resistant repository set. $PR_8$, that persists some portion of information sets between service invocations and may include access controls wherein information sets are only released to authenticated and authorized load modules operating in, for example, $PPE_9$ and $PPE_{10}$. $PR_8$ may contain various information sets, such as:

Identities of one or more user sets authorized to use the appliance,

Load module programs for loading PPEs (e.g., $AM_5$. $SC_7$. $PPE_9$ and $PPE_{10}$).

Bank account information sets of users,

Billing information sets,

And/or the like.

In some embodiments, user biometric information sets may not be stored locally.

Instead, such information set may be stored in a tamper resistant repository system maintained by a third party cloud service and downloaded as needed.

A TPM or other such technology with similar capabilities that manages private keys for PPEs to attest their authenticity and releases a private key after properly authenticating the associated LM set. In some embodiments, such a TPM may be a component of PPEs.

$PPE_9$, in this example, operates $LM_{10}$ in accordance with $CPFF_y$'s situational operating specification. In particular, $LM_{10}$ manages $UA_6$'s components by providing each component with authorization/rights it needs to perform its service sets. When a user. $U_1$, invokes $UA_6$'s services with a request, $LM_9$ may coordinate actions performed by a range of $UA_6$'s elements. Such coordination may include, for example, at appropriate times, instructing:

$PR_8$ to retrieve relevant information sets, such as, $U_1$'s banking information sets.

$AM_5$ to initiate authentication of $U_1$ if the authentication is to be performed locally, otherwise, $LM_9$ requests $AM_5$ to capture U1's biometric information set and forwards it to $SC_7$ so that it can be sent to the trusted third party server.

$SC_7$ to initiate communication with $U_1$'s banking resource set $PPE_{10}$ to load a web container (e.g., Apache web server), for interacting with $U_1$'s mobile phone.

$PPE_{10}$ that operates a load module set, such as a web container, for interacting with users.

This example assumes that the bank agrees to allow $U_1$ to locally authenticate $U_1$'s identity. In such a case, user. $U_1$, who uses the trusted third party services, selects a CPFF, to provision and instantiate an operating CPFF, $CPFF_x$, using $U_1$'s Foundation resource sets, such as $U_1$'s mobile phone and browser and/or other computing device that has browser and/or the like, and may employ a component CPFF. $U_1$ may then associate an icon so that whenever $U_1$ wishes to bank on line with the banking institution represented by $RS_B$, $U_1$ can use the icon to initiate a CPFF, operating session.

Such initiation may comprise the following steps:

Step 1: $AM_5$ assiduously authenticates $U_1$ using $BSE_2$ to capture $U_1$'s biometric and/or environmental information sets and comparing the captured information set with one or more reference information sets stored in $PR_8$.

Since the web container does not trust $U_1$'s mobile phone, it requests $AM_5$ to initiate reality-integrity (for example, including existential biometric) testing to validate $U_1$'s physical presence.

$AM_5$ directs its pseudo random emission generator (which comprises its pseudo random generator together with one or more emitter sets in $BSE_2$) to paint $U_1$ and, in some instances, $U_1$'s physical environment, and directs its sensors to capture the response so that $AP_4$ can analyze for $U_1$'s tangible presence (i.e., liveness)

Step 2: $UA_6$ initiates a validation of $RS_B$'s certificates by issuing a request through $SC_7$ to $RS_B$.

Step 3: $RS_B$ assiduously authenticates $UA_6$, where such authentication process may vary depending on rigor level situationally warranted, and may, for example, include $UA_6$ demonstrating its possession of relevant private keys (for example, private keys held by $PPE_8$ and/or $SC_7$) such as a cryptographic certificate of the identity of $UA_6$ signed by its manufacturer (Stakeholder). This step includes $UA_6$'s TPM measuring $LM_8$ and then securely sending such measurement information to $RS_B$. $RS_B$ then validates the sent measurement with its identity manager, $IDM_B$. In addition, $RS_B$ determines that the signature on the secure communications from $SC_7$ to $RS_B$ is consistent with the identity of $UA_6$.

Step 4: $RS_B$ assiduously assesses $UA_6$'s situational identity, which may include validating and/or having one or more of its attributes validated previously, that one or more of the following:

$UA_6$'s situational identity is sufficient to purpose for the bank (e.g., Stakeholder) interests as represented by $RS_B$'s situational control specification set. In some circumstances, assessment of $UA_6$'s identity may include validating attributes describing $UA_6$'s provenance information, such as identity information sets associated with its one or more Stakeholders (such as its manufacturer, installer, distributor, and/or the like), attributes describing $UA_6$'s internal configuration, such as the fact that $UA_6$ is configured to provide least privilege by using separate PPEs to operate awareness management, administrative management, communications, and interaction with users' mobile environments, and/or the like.

$LM_5$'s identity is suitable to banking Stakeholder purpose as represented by $RS_B$'s control specification set, where such identity may describe the degree of rigor with which $LM_5$ (through $AM_5$'s services) binds users to their corresponding Participant identities.

After performing these steps, $UA_6$ may be initialized and ready to interact with $U_1$'s mobile phone, which, in this particular embodiment and context, is not trusted.

Step 5: $U_1$'s mobile phone communicates user's financial transaction request to the web container (e.g., Apache web server) that operates in $PPE_9$.

Step 6: $PPE_9$ communicates the transaction request to $RS_B$ using $SC_7$'s services. Based on request details, in some instances $RS_B$ may require different and/or additional user set authentication means, which it may communicate via $SC_7$ to $UA_6$, which in turn, may communicate to $U_1$ via $AM_5$'s speaker set.

Step 7: Prior to completing the transaction, the bank, through the services of $RS_B$, requests that $UA_6$ perform a protocol to obtain $U_1$'s confirmation of the transaction.

Step 8: $LM_5$ in $AM_5$ uses its LED device in $BSE_2$ to: i) display a brief summary of the transaction to be performed; and ii) use a speaker (in $BSE_2$) to request that $U_1$ confirm or deny the transaction in progress. $AP_4$ then analyzes the information sets generated by sensors (such as microphone) in $BSE_2$ to ensure that the response was, in fact, generated by $U_1$.

Step 9: The results of $AP_4$'s evaluation of $U_1$'s response (i.e., confirmation or denial) are sent to $RS_B$, which in turn, may notify any additional banking resources necessary to complete the transaction.

Figure 43:
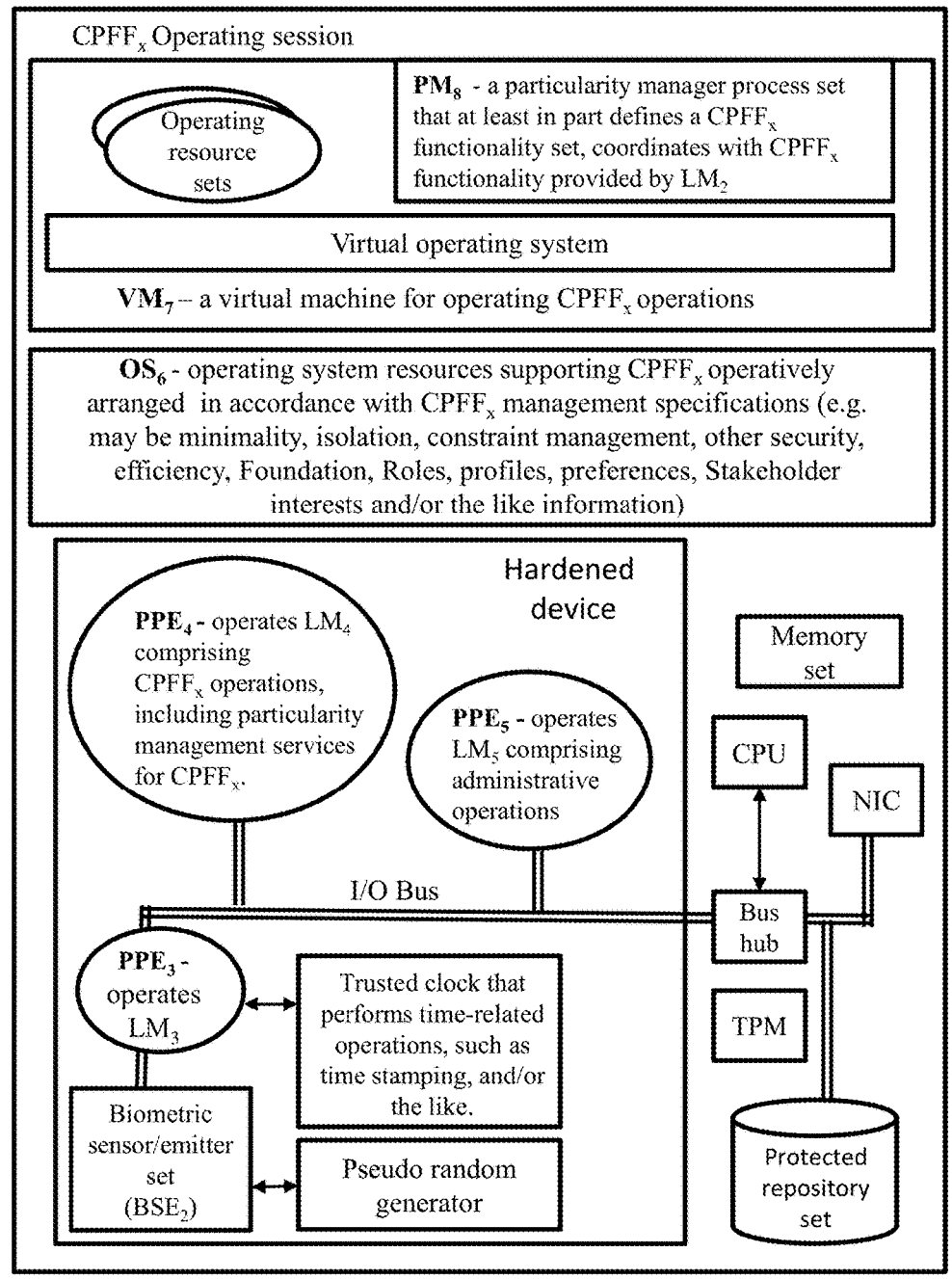
FIG. 43 is a non-limiting illustrative example of an operating CPFF that employs a hardened device and a secured software computing environment.

FIG. 43 is a non-limiting illustrative example of an operating CPFF that employs a hardened device and a secured software computing environment.

FIG. 43 illustrates an operating CPFF, $CPFF_x$, that compartmentalizes its resource sets into two secure hardened computing environments A hardened device in $U_1$'s hardware computing arrangement to operate resource sets that perform $CPFF_x$-related administrative operations, such as tangible identity acquisition and/or authentication-related operations, particularity monitoring operations, and/or the like, that support $CPFF_x$ to managing intended and unintended consequences/

$VM_7$ a virtual machine customized to support $CPFF_x$ operations to operate resource sets that perform purposeful operations that support $CPFF_x$ achieve optimal interim results and Outcomes.

In some embodiments, one or more secure hardened computing environments may be, arranged hierarchically, in a client/server manner, peer-to-peer and/or otherwise in a distributed fashion, and/or any combination thereof to coordinate their respective operations in pursuit of target user set purpose set. In such embodiments, secure hardened computing arrangements may have differing seniority (or privilege) levels in a chain of command, where one hardware PPE set may have management rights over one or more subordinate hardware PPE sets, where management rights include assigning their seniority levels and/or authorities.

For example, as illustrated in FIG. 43, suppose a hardware PPE set, $PPE_5$, has a seniority level. 3, and access rights (authorization) set including management rights over PPEs, $PPE_3$ and $PPE_4$. In such a case. $PPE_5$'s management rights may include rights (authorizations) to dynamically assign seniority levels to $PPE_3$ and $PPE_4$ as well as assigning $PPE_3$ and $PPE_4$ rights (authorizations), including rights (authorizations) to perform PERCos operations. For example, $PPE_5$ can assign the same seniority levels or differing seniority levels to $PPE_3$ and $PPE_4$, where these levels may change in accordance with situational specific context. $PPE_5$ can specify their relationships, such as, expressing that they operate as peer to peer or superior-subordinate (by granting the superior hardware PPE (e.g., $PPE_3$) management access rights over the other hardware PPE (e.g., $PPE_4$).

In some embodiments, hardware PPE sets can assign their associated LM sets access rights/authorization they may need to perform their operations, such as, for example:

Administrative rights over other load module sets.

System privileges such as control over I/O operations and control over various CPU sets.

And/or the like.

For example, in the example illustrated by FIG. 43, $PPE_3$, responsible for managing its biometric sensor/emitter set. $BES_2$, has authorization to add cryptographic protections to $BES_2$ information sets and instructions. In such a case, $PPE_3$ grants such authorization to its load module set, $LM_3$.

In some embodiments, $PPE_3$ and another PPE set, $PPE_4$, may have the same seniority. In such a case, $PPE_3$ and $PPE_4$ collectively (or collaboratively) may provide a set of capabilities that is a superset of capabilities of either $PPE_3$ or $PPE_4$.

In particular. FIG. 43 shows a hardened device, providing capabilities, such as, Awareness Manager capabilities (such as, biometric sensor/emitter set services), particularity management services, and/or other PERCos services and/or the like, is comprised of the following elements:

$BSE_2$ comprising biometric sensor/emitter set.

$PPE_3$, which is directly connected to a biometric sensor and emitter set, BSE2, is assigned seniority level 1. $PPE_3$ operates a LM, $LM_3$, which $IF_3$ may configure to monitor and/or modify communications coming from or going to $BSE_2$. In some embodiments, $LM_3$ may perform various functions such as, for example:

Securing communications to and from $BSE_2$.

Granting authorized external resource sets exclusive, for example, access to $BSE_2$.

Performing validity checks on commands made to $BSE_2$ (such as, for example, emission generation instructions) and/or data generated by sensor sets.

Managing cross-edge interactions between $BSE_2$ and computing arrangement user. $U_1$, in support of, for example, existential registration, authentication, and/or reality integrity testing.

And/or the like.

$PPE_4$, comprising a hardware PPE set that operates a load module set, $LM_4$, that provides a set of $CPFF_X$ operations (such as, for example, particularity management services for $CPFF_x$, and/or the like) that requires highest level of security, reliability, and/or Quality to Purpose, is assigned seniority level 1. $PPE_4$ may configure $LM_4$ so that $LM_4$ can interact with the device sets on the bus to, for example, examine logs being stored on a storage device, and/or interact with the CPU and main memory. $LM_4$ may perform CPFF support operations, such as, for example:

Particularity management services accessible from the main CPU. The set of particularity management services provided by $LM_4$ may coordinate, at least in part, with the set of particularity management services provided by particularity manager process set, $PM_8$, to $CPFF_x$ functionality operating in the virtual machine, $VM_7$.

Authentication of one or more resource sets running on the main CPU through interactions with, for example, a TPM.

Responding to particularity management events, where a response may include, for example, resetting and reprogramming the main CPU.

$PPE_5$ operates a load module set, $LM_5$, for providing administrative services, such as, for example, coherence, monitoring and response operations, and/or the like. $PPE_5$ is assigned seniority level 3 and managing access rights (authorizations) over $IF_3$ (and hence over $LM_3$) and $PPE_4$ (and hence over $LM_4$). For example, a coherence manager instance in $LM_5$ may perform operations such as, for example, cohering, installing, replacing, monitoring, reconfiguring, resetting, and/or otherwise managing LM sets in $IF_3$ and $PPE_4$. For example, $LM_5$ may direct $LM_3$ how to configure $BSE_2$ to enable assiduous authentication processes, interact with the trust clock to express the set of time related operations, such as, for example, time stamping sensor generated information set and/or emitter instruction set, performing correlations and/or timing anomalies analysis, and/or the like.

Pseudo random generator that may generate instruction for emitters, communicate with authorized process sets (such as authentication process sets) for correlating emitter instructions with tangible response sets detected by $BSE_1$'s sensor set, and/or the like.

A trusted clock for performing time-related operations.

In this example, $CPFF_x$ is configured also to include a software layer operating on top of the $U_1$'s hardware arrangement comprising, for example:

$OS_6$, a trusted to purpose operating session that is operatively arranged in accordance with $CPFF_x$ management specifications (e.g., minimality, isolation, constraint management, other security, efficiency, Foundation, Roles, profiles, preferences, Stakeholder interests and/or the like information). It enforces control specifications restricting how applications and virtual machine operating on top of $OS_6$ may interfere with or be interfered with by resource and/or process sets including those resource and/or process sets provided by $OS_6$.

A virtual machine, $VM_7$, operating a virtual operating system which may provide a rich virtual environment for the operation of virtual operating resource sets. In particular $VM_7$ may operate a particularity manager process set. $PM_8$, which operates on $VM_7$, coordinates its operations with particularity management services provided by $LM_4$.

Figure 44:
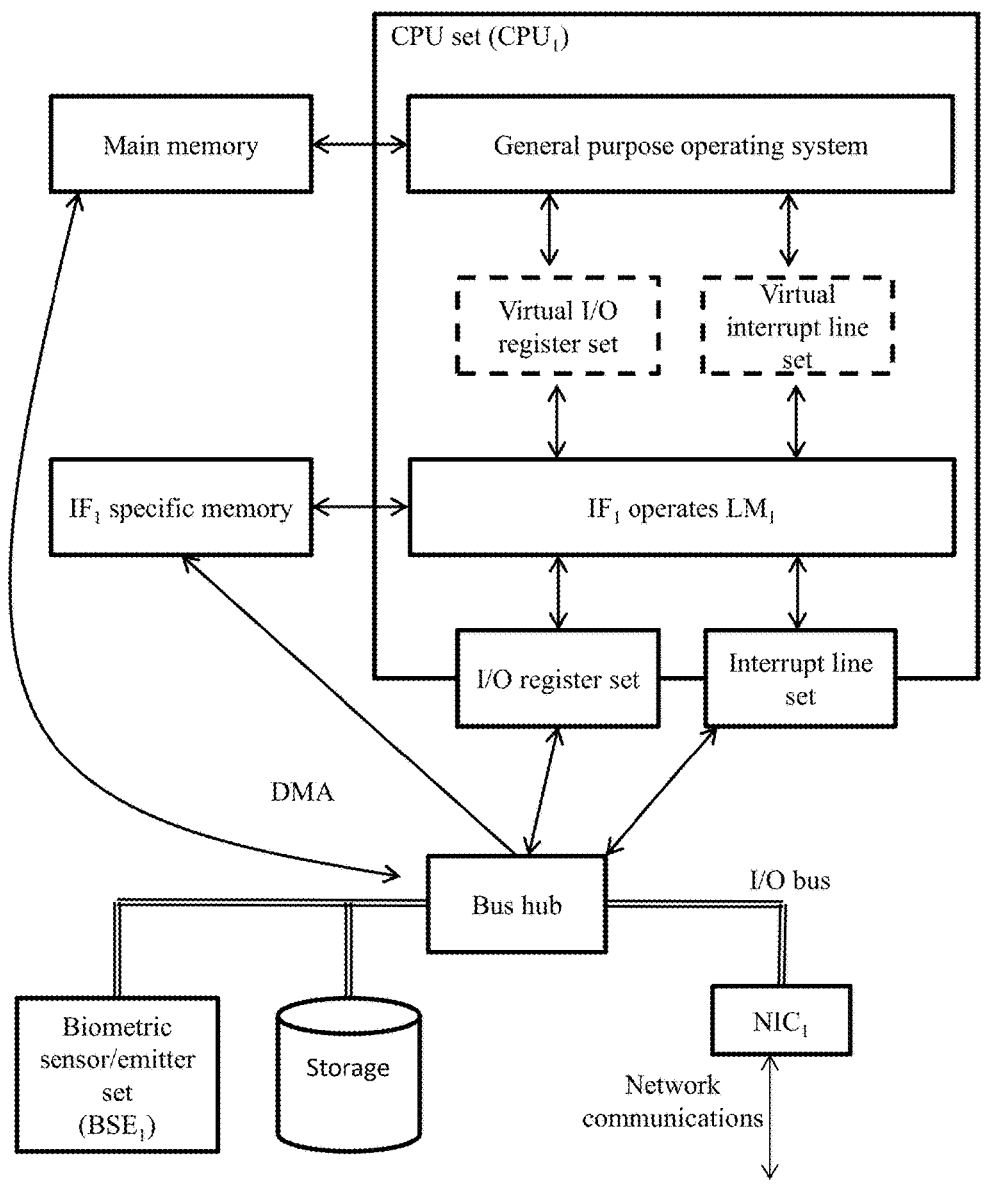
FIG. 44 is a non-limiting illustrative example of an IF in a CPU set.

FIG. 44 is a non-limiting illustrative example of an IF in a CPU set.

FIG. 44 illustrates a CPU set, $CPU_1$, that supports an on-board Identity Firewall, $IF_1$. In this example, $IF_1$, comprising one or more hardware PPE sets, encapsulates its associated load module, $LM_1$, to isolate it from interference from other resource sets, such as a general purpose operating system running on the general purpose processing cores of the CPU set. In this example, $LM_1$ has direct access to I/O registers and I/O interrupts, and through the manipulation of these registers, $LM_1$ orchestrates the activities of a device set. $DV_1$, on an I/O bus set directly connected $CPU_1$ which may include, for example, sensor/emitter sets ($BSE_1$) including traditional HMI devices such as touch devices, keyboards and display adapters, storage devices, network devices ($NIC_1$), bus controllers and/or bridges and/or the like. Manipulation of such device sets may include, for example, Management of secure communications between $BSE_1$ and external authorized resources accessed through a network card, $NIC_1$. $LM_1$ may ensure that all such communications are cryptographically protected when they reach $NIC_1$ and may ensure that information from external resource sets must be properly signed before it may be delivered to the $BSE_1$. $LM_1$ may ensure that such communications may or may not be seen by the general purpose processing units in $CPU_1$. In some embodiments, $LM_1$ may perform validation of instructions sent from an external process to $BSE_1$ Management of direct memory access between devices in $DV_1$ and/or memory. In some embodiments, $LM_1$ may redirect direct memory access from a device to $IF_1$ controlled memory where $LM_1$ may process such transferred memory without interference.

Based on its ability to interact with sensors and/or emitters. $LM_1$ may: i) perform registration, authentication and/or reality integrity testing; ii) mediate general purpose operating system's access to I/O activities on $CPU_1$ managed bus set. For example, in some cases, $LM_1$ may prevent general purpose processing on a CPU set from having any access to a biometric sensor while the sensor is being used for authentication. Such mediation may prevent general purpose operations from interfering with and/or detecting registration, authentication and/or reality integrity processing.

In some embodiments, users and/or Stakeholders and/or computing arrangements operating on their respective behalves in pursuit of target situational contextual purpose sets may assess the reliability of, in this example, a device arrangement, $DEV_1$, by authenticating the identity of $DEV_1$ (is the device actually what it claims to be), and evaluating other aspects $DEV_1$'s identity (is the identified device suitable to purpose). For example, suppose $DEV_1$ is an Awareness Manager being used, for example, to existentially authenticate a user set for a cloud service, CSI, that provides, for example, banking services. $CS_1$ may evaluate $DEV_1$'s identity to assess its sufficiency regarding a target contextual purpose related assiduous authentication specification set, where such evaluation may include evaluation of $DEV_1$'s provenance information set, including, for example, Identities of one or more direct Stakeholder sets, $STK_1$, including, for example, its manufacturers, distributors, retailers, installers and/or the like. The identity of $STK_1$ may further contain a variety of general and/or situational attribute (and/or for example metadata) information such as $STK_1$ own provenance related information set, including, for example, Effective Facts and/or aggregate Creds asserted by, for example, Acknowledged Domain expert sets, Cred asserters regarding $STK_1$ direct Stakeholders, and/or the like.

Creds asserted by indirect Stakeholders who have used the $DEV_1$ device. As with any PERCos and/or the like resource, such Creds may have their own provenance information, including, for example, aggregate Creds. Creds on Creds (or aggregate Creds), Creds on the Cred Stakeholder sets (e.g., Cred creator, publisher, distributor, retailer, user, and/or the like and any which Cred instance may be in framed in reference to specific one or more contextual purpose specifications, including the resource).

Creds asserted by acknowledged Domain experts regarding, for example, the design of $DEV_1$, and/or any other constituent resource set component, service, and/or combination thereof.

And/or the like.

For example, FIG. 42, illustrates a banking resource arrangement set, operating on behalf of a bank, that may assess the reliability of a hardware unified appliance. $UA_6$, to support authentication of a user and CPFF functions. In some embodiments, the assurance of $UA_6$ may depend on hardware device components, such as, for example, a core Awareness Manager, $AM_5$, and other components, and related processes, where the foregoing may be assiduously bound to one or more PERCos Formal resource sets, as relates to their identities and the following:

Establishment of the provenance of a hardware device set. In some embodiments, identity attributes relating to a hardware device set's provenance may be provided by its Stakeholders, including its manufacturers, installers, consumers and/or the like, and/or by one or more Stakeholder sets of one or more computing arrangements containing the hardware device set.

Authentication, which in some embodiments may be provided by, for example, attestation protocols in an interface set of a hardware device set to produce a binding between the hardware device set and its corresponding PERCos resource set.

Evaluation of Quality to Purpose of the hardware device set, which may involve various, differing, or different contextual purposes, as associated with differing Quality to Purpose values for different purposes. Such evaluation may assess one or more attributes of the hardware device set independent of environment and/or within current and/or potential (computing and/or tangible world) operating environment sets that may, for example, complement, extend, and/or otherwise modify one or more hardware device set attributes, and may include specifications and/or other performance metrics within the context of, for example, local hardware and/or software arrangements, external (such as cloud based) resource sets, known or potential user usage patterns, tangible world environmental attribute sets, and/or the like. Such Quality to Purpose evaluation may, for example, assess attributes such as device tamper-resistance, reliability of services provided by the device (e.g., existential authentication, CPFF support) within differing tangible world environments (e.g., under various background lighting and/or auditory conditions), and/or the like.

Dynamic establishment of situational identities whose attributes may reflect the device's current load modules and firmware updates.

Figure 45:
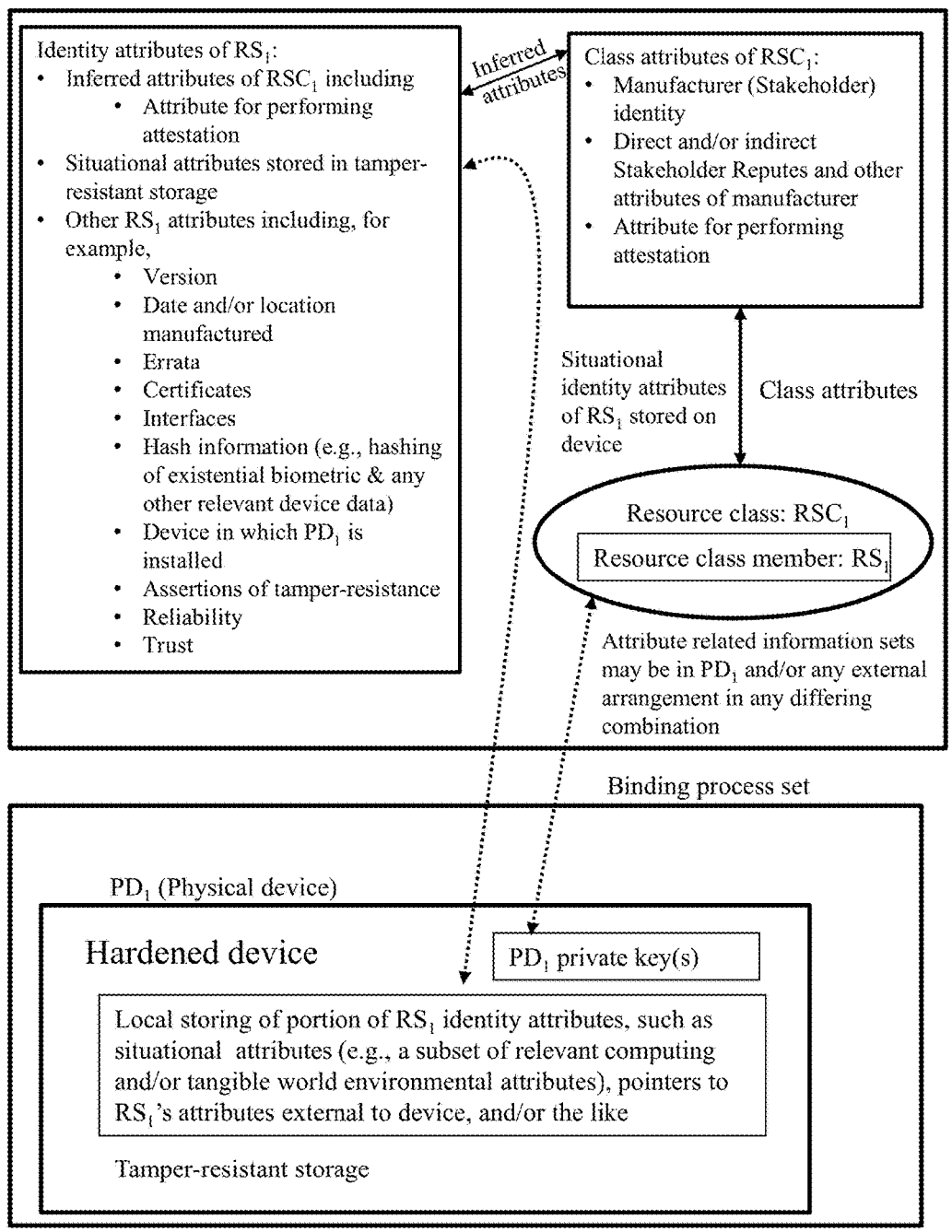
FIG. 45 is a non-limiting illustrative example of hardware resource set and associated identities and attributes.

FIG. 45 is a non-limiting illustrative example of hardware resource set and associated identities and attributes.

FIG. 45 illustrates an example in which a resource. $RS_1$ (a resource that is a representation of a physical device. $PD_1$) is a member of a resource class. $RSC_1$ (e.g., a resource class that represents biometric sensors of a particular model provided by a particular manufacturer). $RSC_1$ may have one or more class attribute sets that specify one or more attestation protocols for assiduously binding devices to $RSC_1$'s member resources. $PD_1$ may use such an attestation protocol to bind itself to $RS_1$, which may specify that $PD_1$ prove its possession of the private key of a certificate signed by its manufacturer.

Once $RS_1$ is bound to $PD_1$, in some embodiments. $RS_1$'s identity may be evaluated and/or validated, where $RS_1$'s identity may have attributes and/or other identity-related information sets (such as metadata) comprising, for example:

$RS_1$'s provenance information.

One or more Reputes for $RS_1$ that may assert $RS_1$'s Quality to Purpose for a particular set of purposes.

Situational information sets describing environmental conditions of $PD_1$'s internal components, such as temperature of a processing unit and/or the like.

Attributes describing $PD_1$'s computing environment, which may be situational, such as relationships $PD_1$ may have with other devices.

Other relationships, such as indirect Stakeholders. $PD_1$ Roles.

In some embodiments. $RS_1$'s identity attributes may be:

Retrieved from one or more identity manager sets for $RS_1$.

Inferred from attributes associated with a resource class, $RSC_1$, that contains $RS_1$ as a member. For example, suppose $RS_1$ is a device type, $DT_1$. $RS_1$'s manufacture may have created $RSC_1$, representing all devices of $DT_1$. The manufacturer may have described $RSC_1$ in terms of a set of attributes that are common to $DT_1$ such as, for example, attributes characterizing $DT_1$ devices, such as their interface sets, recommended uses and/or the like.

Retrieved from tamper-resistant repository sets on-board $PD_1$. In some instances, cloud based identity managers that have $RS_1$'s identity information sets may not accessible, sufficiently reliable and/or sufficiently efficient. In such instances, ability to retrieve identity attributes from such tamper-resistant repository sets may enable other resource sets to reliably assess $RS_1$'s identity attributes.

Calculated and/or measured on-board $PD_1$, such as, for example, temperature measurements or logged data of $PD_1$'s uptime, usage, health checks, and/or the like.

Retrieved from local storage and/or generated by process sets in $U_1$'s computing arrangement.

Figure 46:
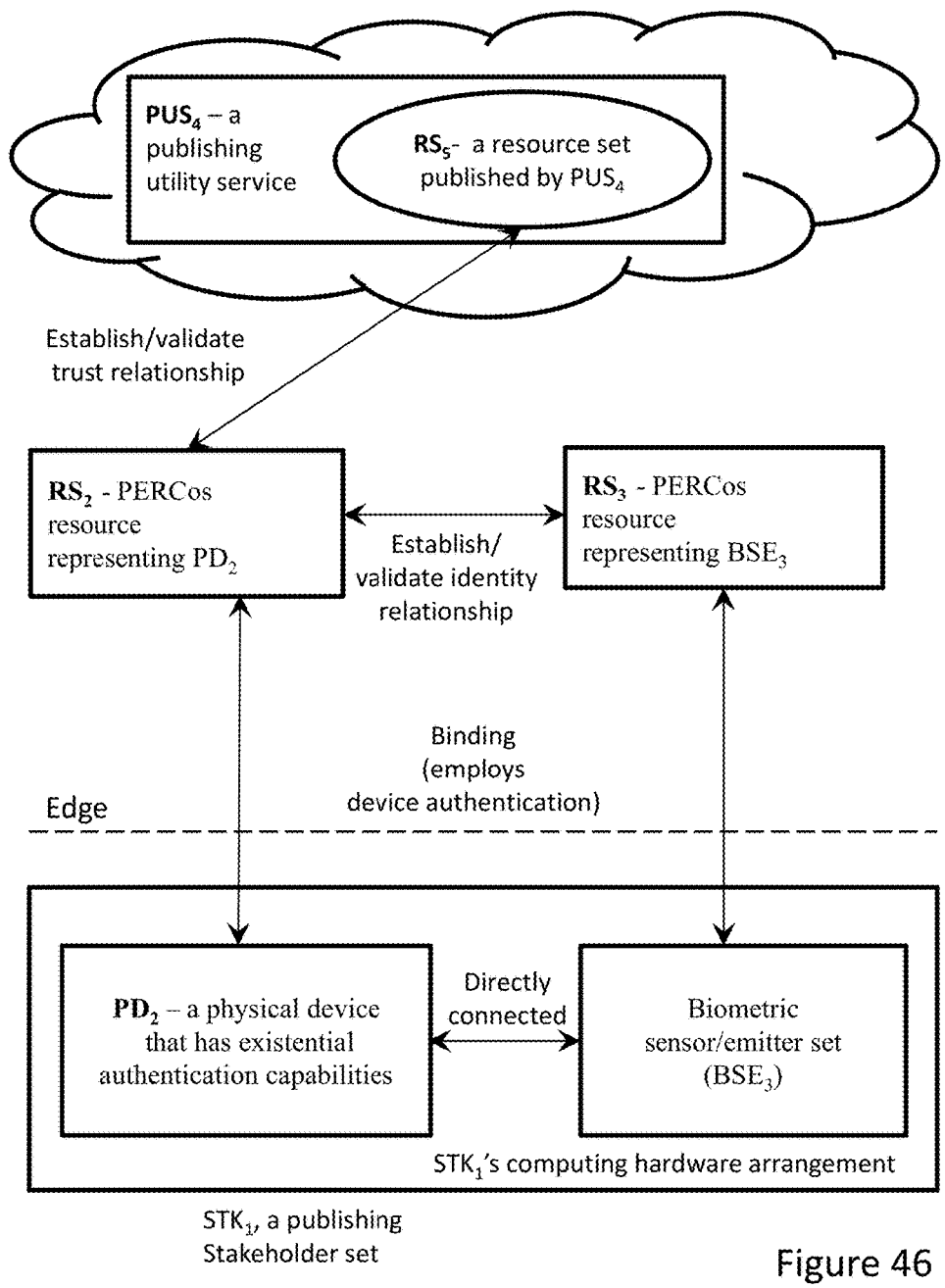
FIG. 46 is a non-limiting illustrative example of authenticated and evaluated device in operation.

FIG. 46 is a non-limiting illustrative example of authenticated and evaluated device in operation.

In some embodiments, evaluation of the suitability of a physical device set. $PD_2$, for a given purpose set may involve the evaluation of identity attribute sets. For example, FIG. 46 shows a third party publication service, $PUS_4$, assessing the reliability of the device, $PD_2$, that a Stakeholder, $STK_1$, may use to bind to $STK_1$'s existential biometric identity, where assessment includes the relationship between $PD_2$ and the sensor/emitter set, $BSE_3$, that $STK_1$ may use to provide $STK_1$'s biometric information sets.

$STK_1$ may establish and/or validate a trust relationship—sufficient for $PUS_4$ purpose—between $PUS_4$ resources and $PD_2$ and $BSE_3$ on $STK_1$'s hardware arrangement by:

Authenticating $STK_1$'s computing arrangements (e.g., $STK_1$'s laptop), resulting in a binding components in the laptop, such as, for example binding of:

$PD_2$ to a resource set, $RS_2$, which is $PD_2$'s PERCos representation, through cryptographic attestation protocol using private encryption keys installed as part of $PD_2$'s manufacturing.

$BSE_3$ to a resource set, $RS_3$, which is $PD_2$'s PERCos representation

Evaluating Quality to Purpose of resource sets bound to $STK_1$'s computing arrangements, such as, $PD_2$ and $BSE_3$. Evaluation may include assiduous evaluation of identity attributes associated with $RS_2$: i) at the time of $PD_2$ manufacturing including Reputes asserting the list of sensor/emitter sets that $PD_2$ can use to provide assiduous authentication; ii) at the time of installation of $PD_2$ into laptop, including a direct tamper-resistance connection between $PD_2$ to $BSE_3$. In some instances, manufacturers of $BSE_3$ may also publish Reputes asserting $BSE_3$'s capabilities to support PD2 to perform assiduous authentication. Coherence managers may establish and/or validate additional attributes for $RS_2$ from its relationship with $RS_3$, that reflects the direct relationship between $PD_2$ and $BSE_3$ and one or Reputes associated with $RS_2$ by Stakeholders of $PD_2$ and/or $BSE_3$.

In some embodiments, evaluation of identity attributes may assess qualities of $PD_2$ independent of details regarding its operation within a situationally specific instance of an encompassing computing arrangement. For example, manufacturers of $PD_2$ may associate a set of identity attributes at the time of manufacturing. For example, manufacturers may associate identity attributes specifying how well $PD_2$ may perform when it is installed one or more sets of hardware models, software sets, and/or other resources.

In some embodiments. $RS_2$'s identity attribute set may be derived and/or inferred, at least in part, from details of $PD_2$'s installation process and interactive effects resulting from use of $PD_2$ with one or more relevant other components within $PD_2$'s computing arrangement (e.g., sensor and emitter sets with which $PD_2$ interacts and/or the like) and/or with one or more external resource sets. Such interactive effects may, for example, depend on intrinsic attributes of said other components and/or external resource sets, and/or system attributes that may result from a combinatorial set of interactions between two or more computing arrangement components and/or external resource sets.

In some embodiments, a computing arrangement, such as a laptop, may be subject to control specification sets that restrict the availability of some portion of $PD_2$ information (such as identity attributes that describe details of manufacturing) to some user sets. In such instances, an evaluator of a computing arrangement may, for example:

Evaluate one or more Reputes, such as Creds and/or EFs that, for example, describe one or more capability and/or quality sets of a computing arrangement as a composite resource without having access to information regarding any one or more internal hardware related information sets of the computing arrangement.

Employ services of trusted third party utilities who are allowed, at least in part, access to information about the internals of the computing arrangement for evaluation purposes. Such at least in part trusted third party utilities, after evaluating and/or validating one or more aspects of the computing arrangement, may publish one or more Repute sets regarding their assessments expressed for example as Quality to Purpose with value ratings (e.g., 1-10) that users may subsequently use.

Enable a Stakeholder to selectively control evaluation aspects of their respective resource set by establishing specifications, such as CPFF specification set, that provides instructions for enabling operation of their respective resource set, including, for example, the selective provisioning of resource set capabilities and/or associated information, such as descriptive information, so that such Stakeholder may allow their resource set to be evaluated in a practical manner without exposing information and/or capabilities in a manner such Stakeholder wishes to prevent or avoid.

And/or any combination thereof.

Figure 47:
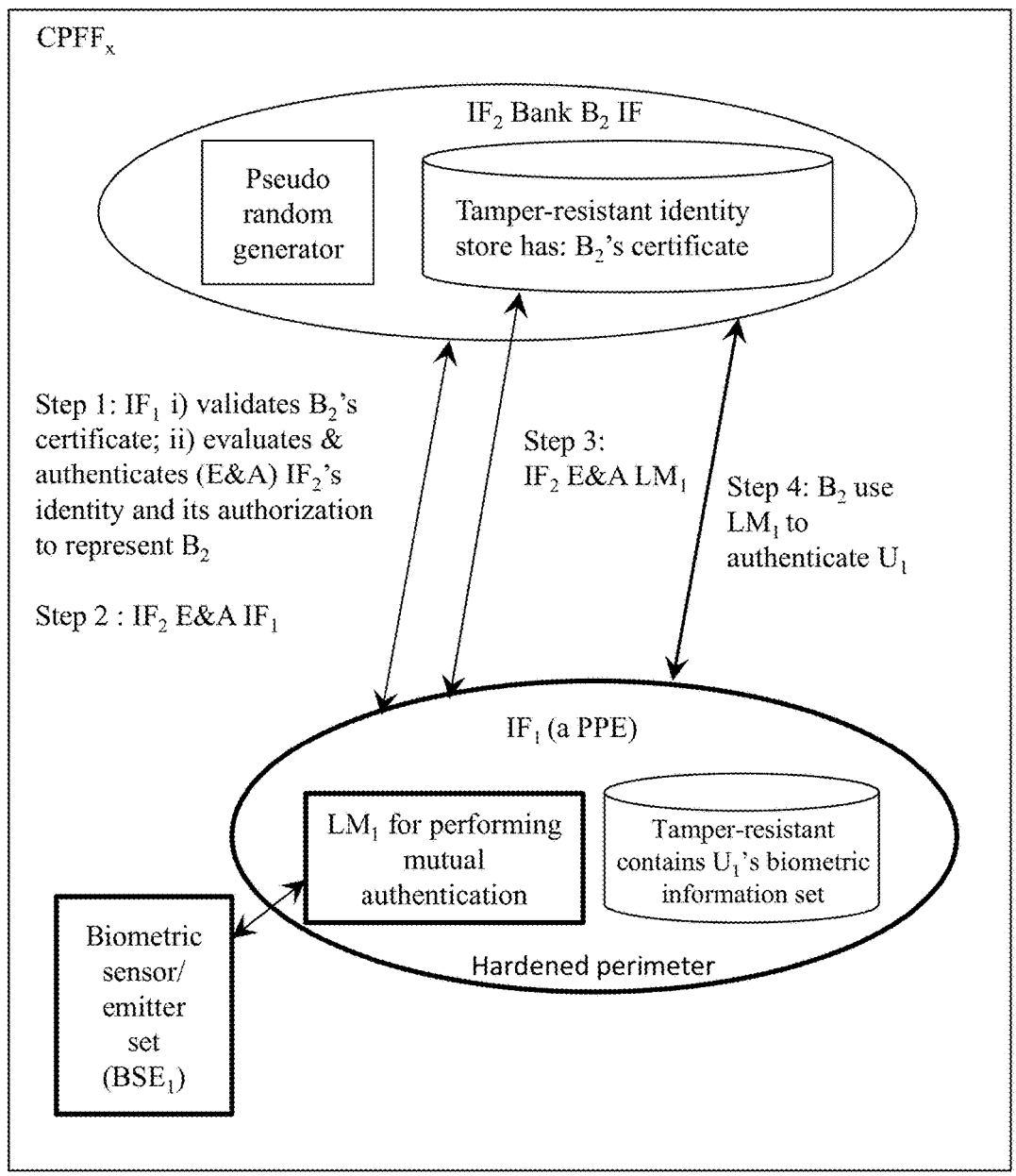
FIG. 47 is a non-limiting illustrative example of evaluation and authentication of one or more load module sets.

FIG. 47 is a non-limiting illustrative example of evaluation and authentication of one or more load module sets.

FIG. 47 illustrates an example of a computing arrangement and procedure that a user, $U_1$, may employ to perform online banking in a secure fashion. In this example, a CPFF, $CPFF_x$, may enable a user, $U_1$, to securely bank on-line with $U_1$'s bank by interacting with $B_2$, a resource set used by $U_1$'s bank for servicing its clients.

In this example, $CPFF_x$ may perform the following steps:

Step 1: an $U_1$'s Identity Firewall, $IF_1$, which is a hardware PPE in $U_1$'s computing arrangement: i) authenticates and evaluates an $B_2$'s Identity Firewall, $IF_2$; and ii) validates $B_2$'s certificates, which may be stored in a tamper-resistance identity store in $IF_2$'s computing arrangement. $IF_1$ evaluates $IF_2$'s identity to ensure that $IF_2$ and, in particular, $IF_2$'s associated identity store, is indeed tamper resistant (thereby ensuring the integrity of $B_2$'s certificate).

Steps 2 and 3: $IF_2$, on behalf of $U_1$'s bank, validates sufficiency of $U_1$'s $IF_1$ for authenticating $U_1$ by performing:

Step 2: assiduous authentication and evaluation of $IF_1$'s identities, which may include assiduously evaluating $IF_1$'s provenance, Stakeholder identities, and/or the like.

Step 3a: identification and selection of one or more $IF_1$'s identity attributes that refers to or contains one or more methods for authenticating $IF_1$'s load modules (e.g., $LM_1$ in this instance).

Step 3b: assiduous authentication of $LM_1$'s identity using one of the methods selected in step 3a.

Step 3c: assiduous evaluation of $LM_1$'s identity for its suitability in $U_1$'s bank's interest.

Step 4: Having assiduously evaluated and authenticated $IF_1$ and $LM_1$, $IF_2$ uses $LM_1$ to authenticate $U_1$ on behalf of $B_2$. In this example, $LM_1$ uses $U_1$'s biometric information set stored in a tamper-resistant store, however, in some embodiments, $LM_1$ may interact with a remote identity manager set to obtain $U_1$'s biometric information set.

In this example, $B_2$ may invoke a challenge response protocol using a pseudo random generator instruction set and communicate it to $U_1$'s $BSE_1$. In some embodiments, such emission instruction sets may be stored so that they can be used at a later time.

The capacity to perform trusted resource identity, authenticity, evaluation, and related resource provisioning and computing session environment management operations are key to optimal consequence management of PERCos contextual purpose fulfillment computing sessions. Individuals seeking to publish PERCos compliant resource sets, as well as those performing computing arrangement operations involving sensitive information and/or processes, may be faced with the twin tasks of reliably establishing their identities, for example, at potentially differing, standardized and interoperable levels of rigor, and/or performing resource related processing dependent on accurate identification of resources and the performing of resource related operations consistent with user purposes and free from unintended, and in particular, malicious and/or inefficient, operations.

Mechanisms by which an individual, or a non-human resource set, establishes identity may vary substantially, and in some instances, may be determined by specifications regarding the interests of plural independent parties. Such processes may involve PERCos coherence services that consider requirements and/or preferences specified by any combination of a user set, other parties engaged in, or otherwise supporting, computing sessions where associated contextual purpose related specifications may be associated not only with user sets (and which may differ among users), but with non-human resource sets, for example, as expressed by resource Stakeholder sets and/or the like.

When interacting with diverse PERCos and/or non-PERCos resource sets, an assiduous understanding of user and/or resource identity, including associated identity and identity attribute reliability, quality and/or trustworthiness, may depend on a computing arrangements capacity to reliably assess such identities—that is, the set of attributes, which may be target contextual purpose specific as to a subset of identity attributes or may be a general and consistent set. For example, target contextual purpose provisioning, and an operating sessions capabilities and/or potential risks, may at least in part arise from, that is be influenced by, the operating computing environment as regards both target situationally relevant PERCos contextual purpose sets and/or non-PERCos resources, processes, information, and/or the like. In some instances, it may be necessary to evaluate trade-offs between potential functionality on the one hand, and concerns relating to security risks and/or other forms of unintended consequences on the other, to achieve a desired balance that satisfies minimality, isolation, and/or efficiency considerations.

In some embodiments, Identity Firewall (IF) sets may support evaluation of identities by providing capabilities that support tangible environment element identity related operations, by providing a range of capabilities. Such capabilities may, for example:

Provide secure communications (e.g., trusted paths) between: i) Local computing environments and humans through, in part, management of biometric and/or other sensor and emitter sets. Some instances of IFs may support hardening and/or otherwise securely enhancing biometric and/or other sensor and/or emitter sets operations; ii) Local identity-related resource sets (such as local biometric sensors and/or emitter sets) and external resource sets (such as, for example, cloud registration and/or authentication services, PIMs, administration and/or other utility services, and/or the like).

Perform time-related operations, such as: i) time stamping information sets sent to and/or received by sensor sets, instruction sets sent to emitter sets, acknowledgements from emitter sets, duration periods, correspondences between emitter and sensor activities, and/or the like; ii) performing timing anomaly analysis, such as, for example, ensuring that responses to existential challenges unfold in accordance with "normal" temporal realities, such as normal unfolding of corresponding biometric event sequences; iii) and/or the like.

Generate pseudo random pattern and/or other formulation sets instructing exposure of human user set and/or non-human tangible environment set to one or more emitter sets emitting, for example, electro-magnetic radiation, and/or ultrasound and/or other sonic emissions and/or the like.

Extend capabilities of sensor and emitter sets, such as, for example: i) encrypting, compressing, extracting, transforming, signing data, and/or the like data related functions, between sensors and/or emitter sets and resource sets, such as employing sensor processing sets, registration processing sets, authentication processing sets, external systems, and/or the like; ii) correlating multimodal and/or multi-sourced sensor data, such as, for example, correlating facial expressions with speech, environmental sound and/or lighting and/or other sensing environment input; and/or iii) correlating sensor data with emitter instruction sets and/or otherwise interpreting emitter emission information through analysis of sensor sensed information. For example, an IF may use a pseudo random emitter generator to produce an instruction to an emitter set to transparently "paint" a subject and/or physical environment with ultrasonic emission set. The use of such secure, external to system unpredictable, pseudo random generation techniques may make it very difficult, if not impossible, for disrupters to generate fake response sets within a timeframe necessary to effectively spoof identity operations, such as, for example, as related to registration, authentication, reality integrity testing, and/or the like. Such issued instructions, together with the information sets provided by sensors, may then be time-stamped, correlated, and/or assiduously analyzed for temporal anomalies, consistency human (and/or individual person) physiological response unfolding sequences and/or otherwise with the nature of human physiology and/or the laws of physics and/or the like.

Some PERCos embodiments may provide commonly packaged Awareness Manager sets that include one or more IF and at least one or more sensor sets, and/or alternatively, one or more IFs and associated sensor sets, to reliably sense at least one or more portions of a tangible environment in support of existential identity authentication, registration, evaluation, validation, reality integrity analysis, and/or the like.

Figure 48:
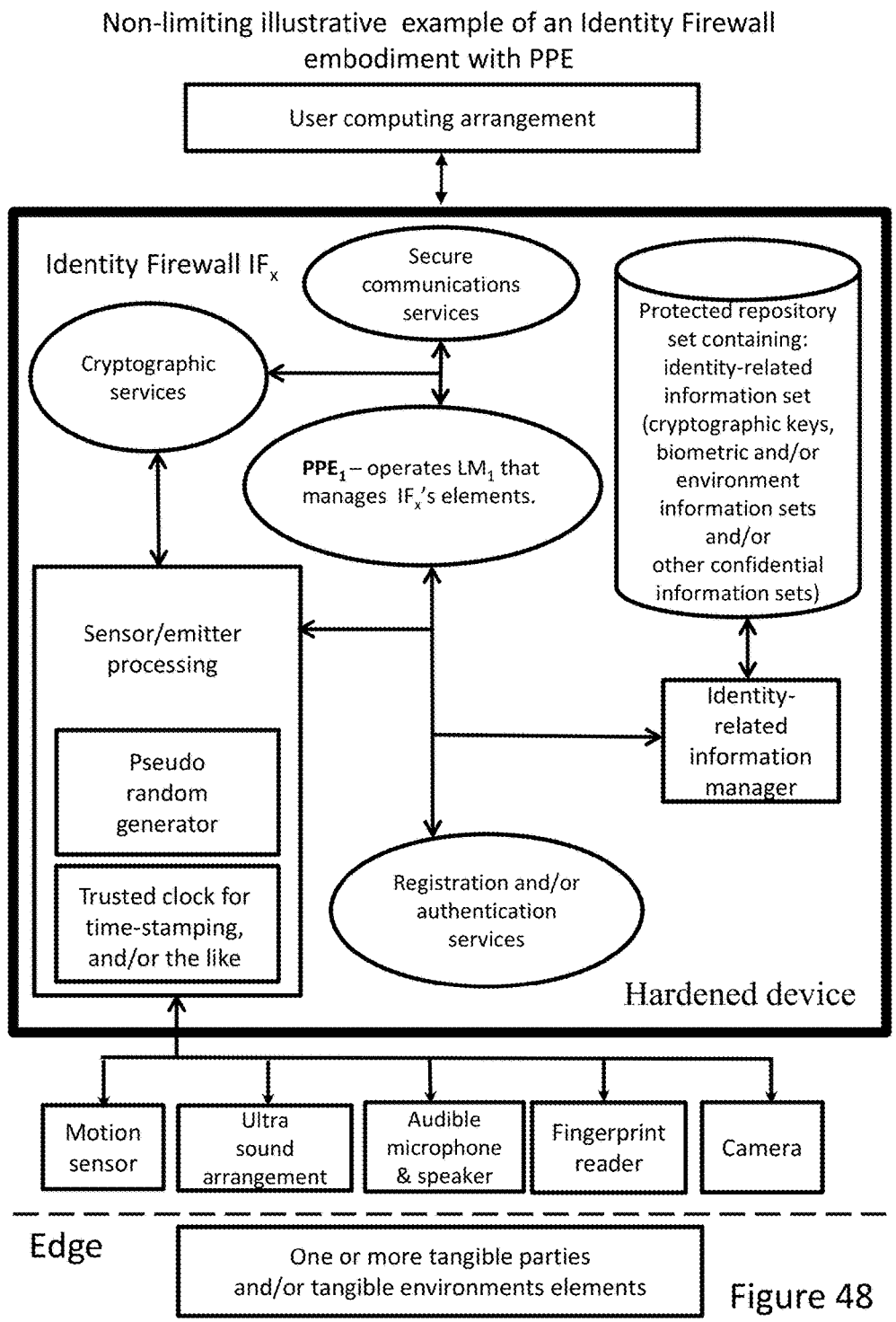
FIG. 48 is a non-limiting illustrative example of an Identity Firewall embodiment with PPE.

FIG. 48 is a non-limiting illustrative example of an Identity Firewall embodiment with PPE.

In some embodiments, an Identity Firewall embodiment, as illustrated in FIG. 48, may support establishment of a root of trust biometric and/or user computing arrangement environment information set for identity operations by employing one or more load module sets that operate in one or more hardware protected PPE sets (for example, hardened enclosure and/or chip arrangement). Such an IF embodiment may support assiduous, tangible identity acquisition and/or authentication-related operations, such as, reliable sensor and/or emitter processing, existential biometric authentication and/or registration of users and Stakeholders, other reality-integrity testing, and/or the like in support of one or more CPFF framework instances. In this example, an IF embodiment is comprised, for example, some or all of the following elements:

Tamper resistant IF enclosure packaging,
Cryptographic services,
Sensor and/or emitter processing for $IF_x$'s sensors and emitters, comprising, for example, pseudo random generator, a trusted clock that perform time-related operations (such as time stamp relevant events and information sets, perform timing anomaly analysis, and/or the like), and any other applicable processing capabilities.
Registration and/or authentication services
A hardware-based PPE (HPE), $PPE_1$, secure tamper resistant component that has administrative control over $IF_x$'s elements, such as sensors/emitter sets, trusted clock, and identity related information manager.
Protected repository set (e.g., includes secure memory arrangement) for storing confidential information sets, such as, for example, biometric and/or contextual information sets, environmental information sets, cryptographic keys, and/or other identity-related information sets, and/or the like.
Identity related information manager arrangement that interacts with $IF_x$'s protected repository sets to store, retrieve, update, organize, and/or otherwise manage, as applicable, information sets in support of $IF_x$'s operations.

In this example, $IF_x$ may, provide one or more of the following capabilities:

Attestation using one or more method sets that enable $PPE_5$ to assiduously attest the identity of $IF_x$.
Cooperation among $IF_x$'s services. For example, a trusted clock may communicate with registration, authentication, provisioning services, and/or the like, related to timing anomaly analysis.
Time-related processing, such as, for example, time stamping sensor generated biometric and/or contextual information sets, timing anomaly analysis, and/or the like.
Validation of liveness of tangible parties (and/or non-living environment item sets) by, for example, painting them using pseudo randomly generated emission signal set and observing (e.g., sensing information regarding) at least one or more portions of their reflections, refractions, diffractions, re-emissions, partial absorptions, and/or the like responses.
And/or the like.

In some embodiments, AM sets may enhance the capabilities of Identity Firewalls by providing sensor, and may further provider emitter, capabilities to be assiduously aware of one or more tangible parties and/or tangible environment elements, thereby enabling Participant and/or the like registered users (in some embodiments may include non-register users) and/or Stakeholders to provide sufficiently reliable and/or rigorous evidence of their respective existential identities to satisfy situationally specific conditions. For example, consider John Doe, who wishes to publish a resource set, through a trusted on-line publishing service, $PS_1$, using his laptop. $PS_1$ may inspect the laptop to determine that it has a hardware-based Awareness Manager. $AM_1$, comprising one or more IF sets. $PS_1$ may obtain sufficient to purpose assurance level it requires of the reliability of $AM_1$'s assiduous authentication of Mr. Doe's existential identity (including his liveness) by authenticating and evaluating $AM_1$'s identity, where $PS_1$ authenticates $AM_1$'s identity by having $AM_1$ demonstrate its possession of its private key signed by its manufacturer using an attestation protocol and $PS_1$ assiduously evaluates $AM_1$'s identity by evaluating $AM_1$'s provenance information sets, identity information sets of $AM_1$'s one or more Stakeholder sets, $AM_1$'s Reputes, and/or the like, In some embodiments, tangible parties may deploy one or more Awareness Manager sets, where some Awareness Manager sets may comprise pluralities of sensor sets to obtain reliable awareness of tangible parties and/or environmental element sets. For example, an Awareness Manager may manage situational awareness of a conference room by strategically placing one or more sensor sets to achieve comprehensive coverage of such conference room.

Figure 49:
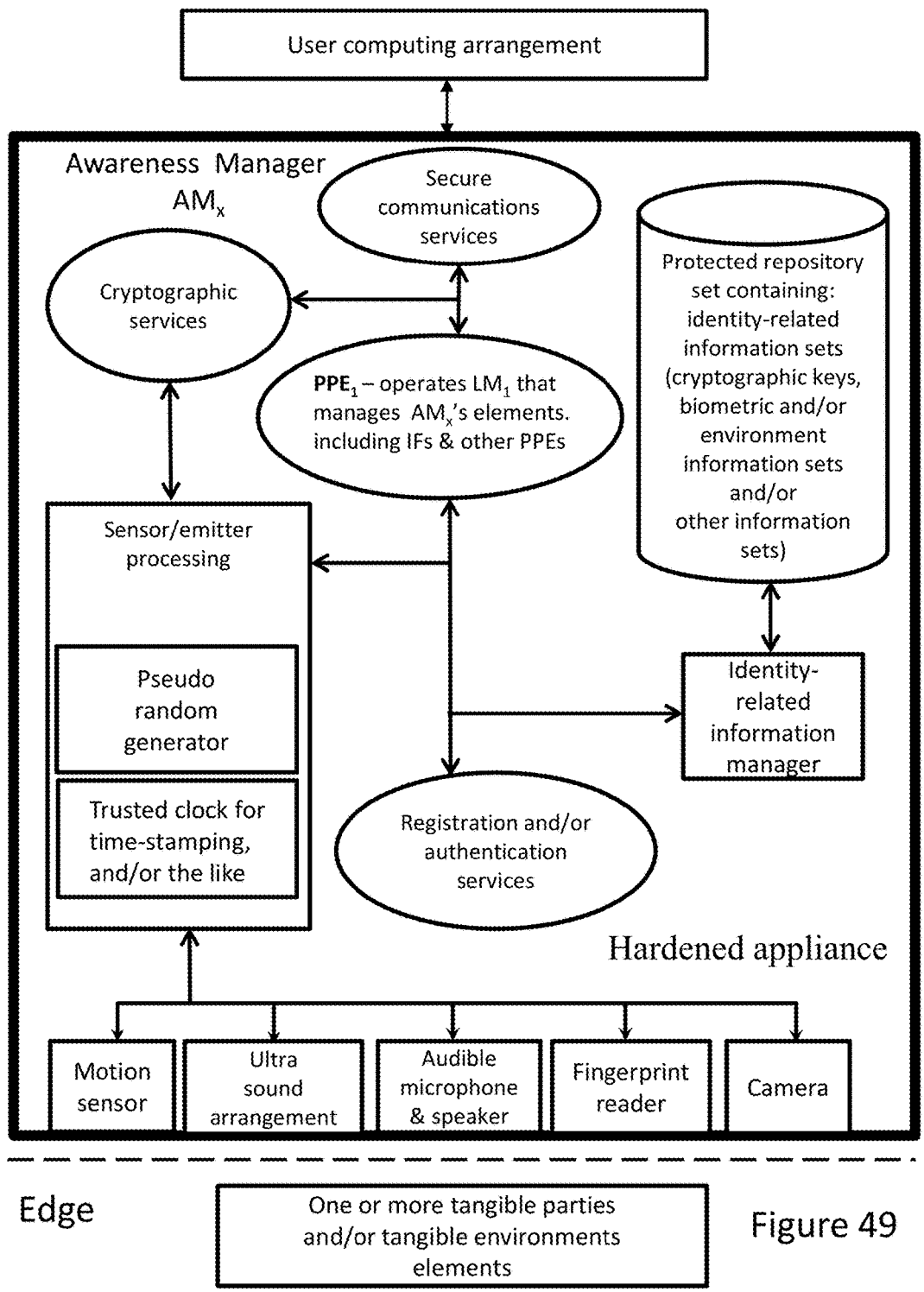
FIG. 49 is a non-limiting illustrative example of an Awareness Manager embodiment.

FIG. 49 is a non-limiting illustrative example of an Awareness Manager embodiment.

FIG. 49 illustrates a non-limiting embodiment of an Awareness Manager, $AM_x$, that in addition to including the capabilities of Identity Firewall embodiment, $IF_x$, that is illustrated in FIG. 48, includes sensor/emitter sets (motion sensor, ultra sound arrangement, audible microphone and speaker, finger print scanner, and camera) that may enable $AM_x$ to be aware of one or more tangible parties and/or tangible environments elements by deploying one or more sensor sets. For example, $AM_x$ may use one or more sensor sets to monitor tangible events that may potential disrupt user fulfillment, and take corrective actions, such as block, re-route, encrypt, decrypt, initiate, and/or the like traffic in accordance with situation-specific or default specification sets.

Figure 50:
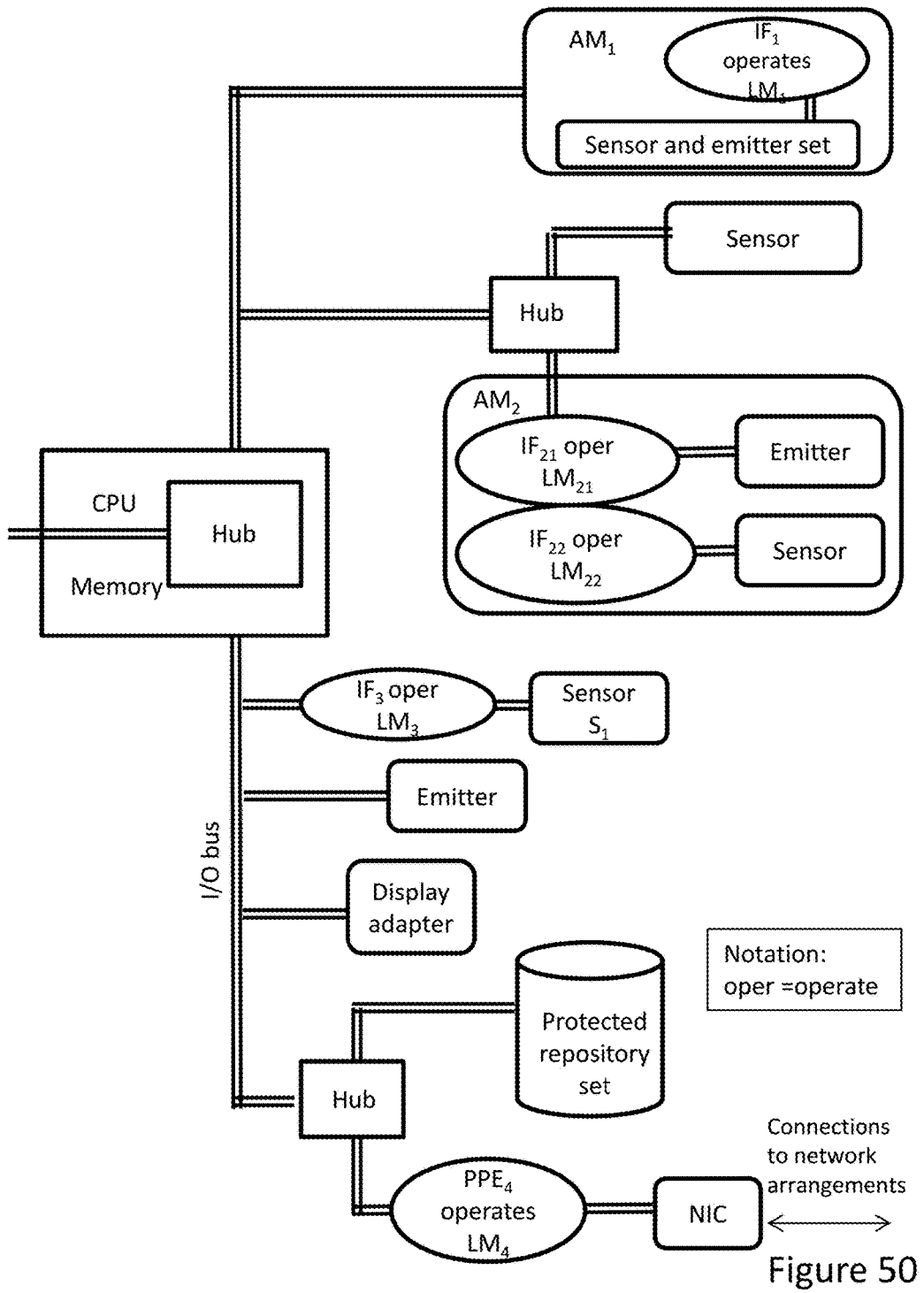
FIG. 50 is a non-limiting illustrative embodiment of an I/O bus with AMs (Awareness Managers), IFs (Identity Firewalls) and PPEs.

FIG. 50 is a non-limiting illustrative embodiment of an I/O bus with AMs (Awareness Managers), IFs (Identity Firewalls) and PPEs.

In some embodiments, as shown in FIG. 50 hardware embodiments may contain one or more AM and/or IF sets at differing points in the I/O bus topology, such as, for example, directly connecting to sensor and emitter device sets, to NIC sets, and/or the like.

This hardware embodiment example has the following IFs, AMs and PPEs on an I/O bus:

$AM_1$, comprising a IF. $IF_1$, that operates a load module, $LM_1$, that manages $AM_1$'s sensor and emitter set
$AM_2$, comprising two IFs, $IF_{21}$ and $IF_{22}$, where $IF_{21}$ operates $LM_{21}$ that manages $AM_2$'s emitter and $IF_{22}$ operates $LM_{22}$ that manages $AM_2$'s sensor.
$IF_3$, that operates $LM_3$ that secures communications to and/or from sensor $S_1$.
$PPE_4$ that operates $LM_4$ to secure communications to and external resource sets through (NIC).

In some embodiments, placement of IFs. AMs, and/or hardware PPE sets at different points in an I/O bus topology may provide differing capabilities in support of CPFF operations (and/or any other identity related operation set, as may be applicable in an embodiment). A summary of several example variants of hardware IF, AM, and/or hardware PPE placement and corresponding capabilities are provided below, followed by a more detailed explanation of each example.

Figure 51:
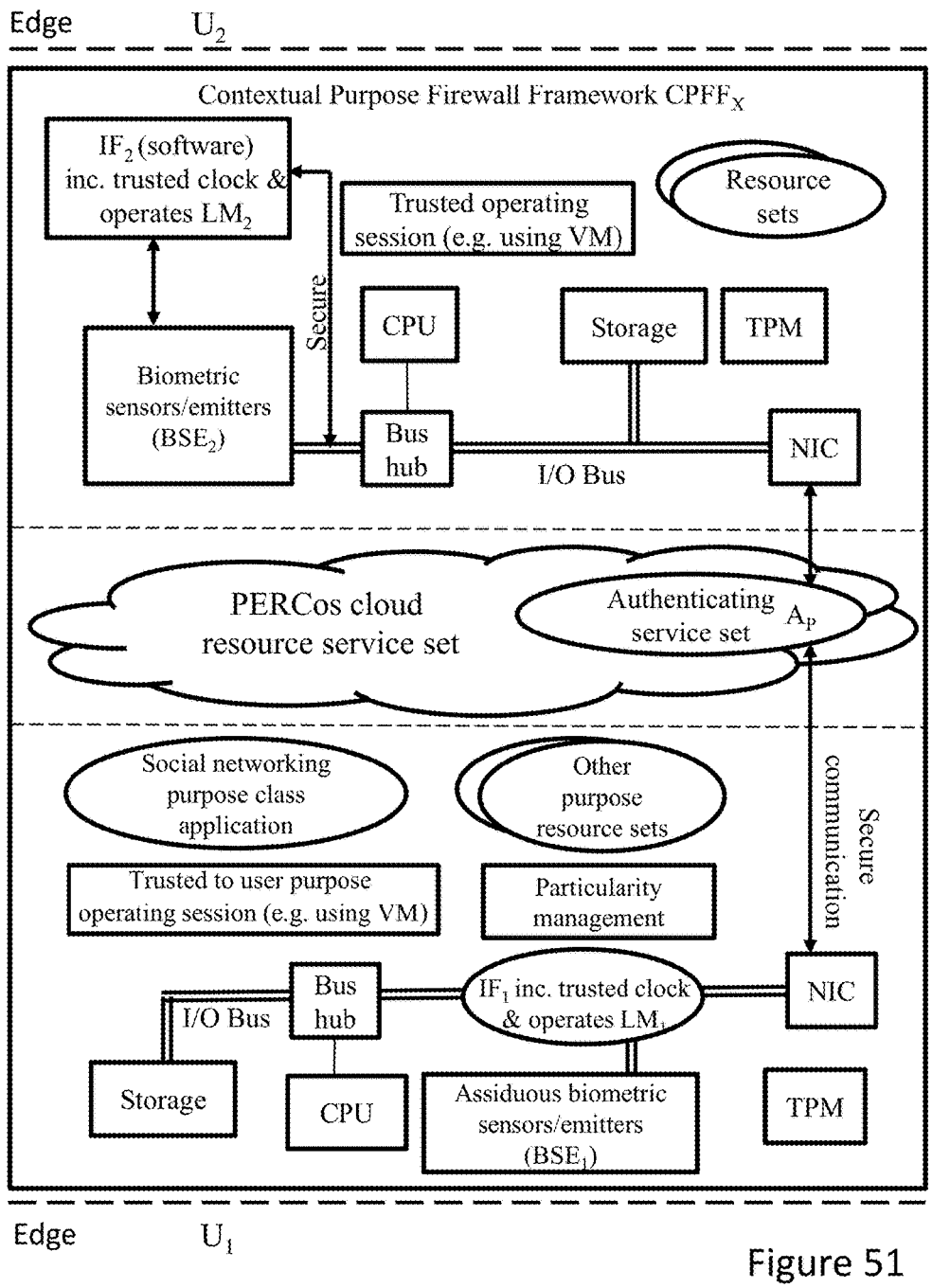
FIG. 51 is a non-limiting illustrative example of an Identity Firewall running on top of a trusted operating session.

Secure communications: FIG. 51 illustrates secure communications paths from devices, such as sensors and/or emitters, to external resources, such as services for registration, authentication, reality integrity testing, existential evaluation and/or validation, and/or the like. This figure also illustrates an authentication process having exclusive access to a sensor and/or emitter device set, in accordance with one or more situational specification sets provided by a higher authorized process set, such as, for example, a coherence manager.

Figure 53:
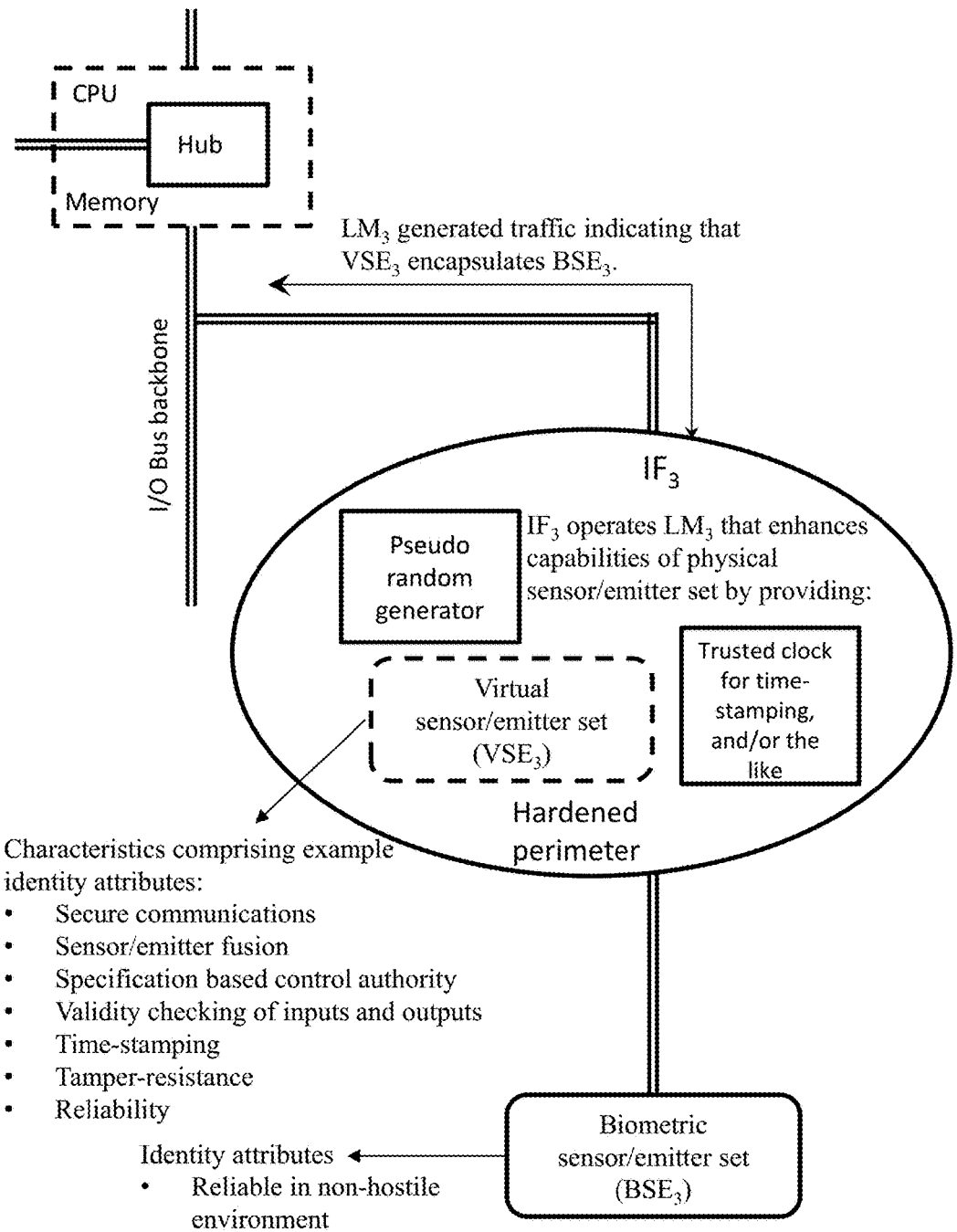
FIG. 53 is a non-limiting illustrative example of an IF enhancing capabilities of a physical sensor/emitter set.

Device virtualization: FIG. 53 illustrates virtualization of physical device sets to enhance their capabilities to support biometric registration, authentication, and/or reality-integrity testing.

Figure 54:
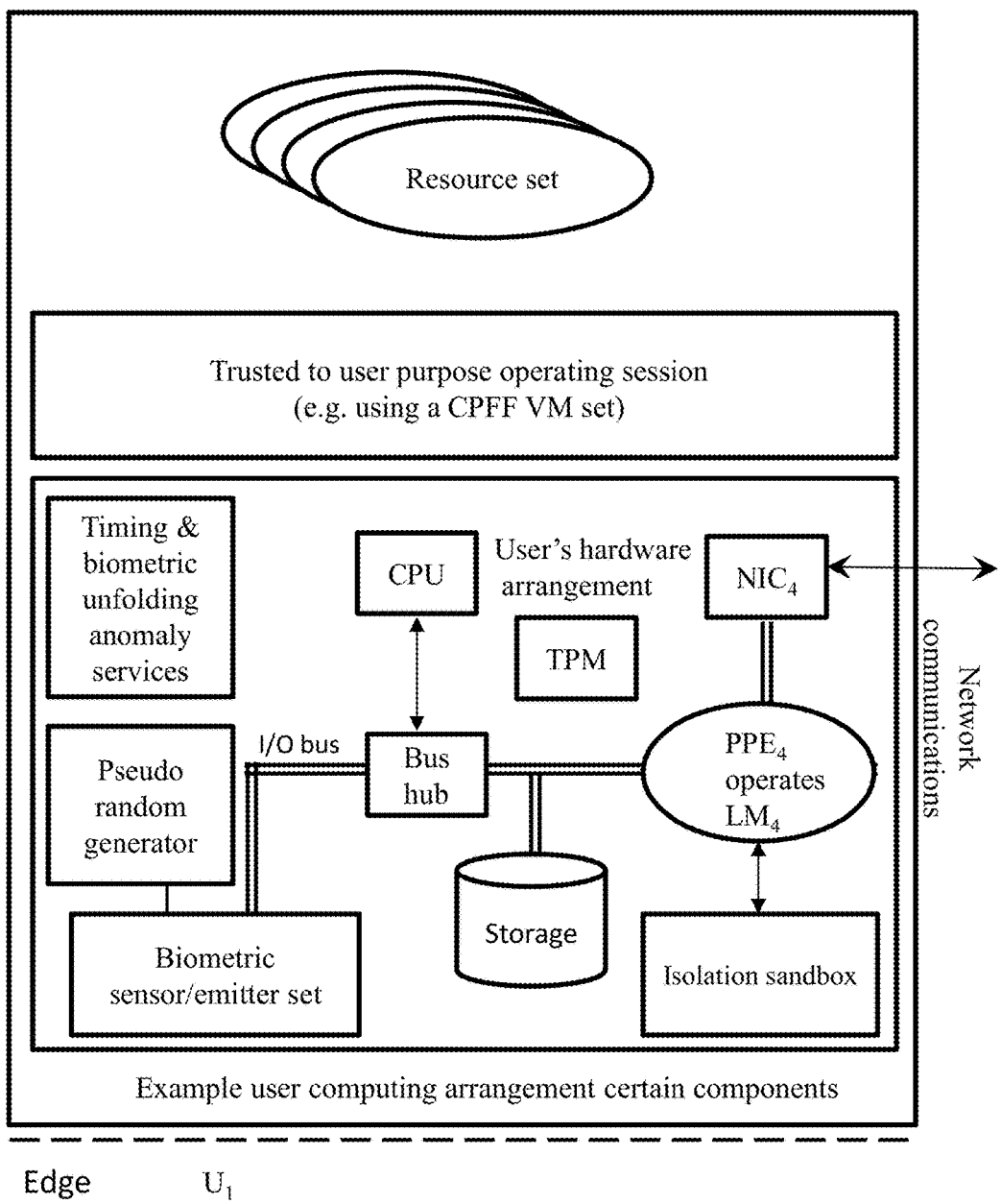
FIG. 54 is a non-limiting illustrative example of PPE providing firewall support.

Network firewall services: FIG. 54 illustrates an embodiment of a hardware PPE set can validate, filter, block, redirect and/or the like network traffic to and from a NIC. Validation may include for example, validating the consistency of sensor information against the challenges instructed by pseudo random generator.

FIG. 51 is a non-limiting illustrative example of an Identity Firewall running on top of a trusted operating session.

FIG. 51 illustrates a non-limiting example in which a CPFF that enables users, $U_1$ and $U_2$, interested in pursuit of social networking experience, to assiduously authenticate each other using a third party authentication service using their respective Identity Firewalls. In this example neither $U_1$ nor $U_2$ wishes to provide the other party with his or her biometric identity information sets. Instead they agree to register their biometric identities with a trusted third party, $A_p$, to perform authentication on their behalf.

PERCos embodiment helps $U_1$ and $U_2$ to select a CPFF, $CPFF_x$ that can be provisioned with resource set comprising resources from $U_1$'s and $U_2$'s respective computing arrangements and a set of PERCos cloud resource services including an authentication service set, $A_p$, that cooperate together to provide mutual authentication and/or other services suitable to common user ($U_1$ and $U_2$) purpose. Such resource sets may include $U_1$'s and $U_2$'s IFs, $IF_1$ and $IF_2$, that are provisioned to enhance assurance of existential authentication by providing a secure communications path between a sensor and/or emitter device set and an $A_p$. $IF_1$ is provided by tamper-resistant hardware that includes a trusted clock and operates a load module, $LM_1$. $IF_2$ is implemented as an application and/or system process executing on a trusted to purpose operating session and/or hardware. $IF_2$ may operate a software plugin and/or other component, $LM_2$, to provide $U_2$'s tangible identity acquisition.

In this example, $CPFF_x$ may enable two users, $U_1$ and $U_2$, to reliably interact socially by performing through the following actions:

Action 1: $U_1$ and $U_2$ mutually agree that a trusted third party process. $A_p$ can authenticate all relevant Participants, including $U_1$ and $U_2$, for their common purpose. For example, $A_p$ may have one or more Repute attributes that assert $A_p$'s reliability and/or Quality to Purpose in authenticating users. $U_1$ and $U_2$ may assiduously evaluate and/or validate $A_p$'s Reputes to assess $A_p$'s reliability. In some variations of this example, an $A_p$ instance may be running in either (or both) users' computing arrangements and/or $A_p$ may operate externally of $CPFF_x$.

Action 2: $A_p$ evaluates and authenticates biometric sensor and emitter sets. $BSE_1$ and $BSE_2$ and their associated IF's, $IF_1$ and $IF_2$, respectively, where $BSE_1$ is directly connected to $IF_1$ and $BSE_2$ is directly connected to $IF_2$. In this example, $IF_2$ is a software arrangement environment, whereas $IF_1$ is a tamper-resistant hardware component. This difference between these IF's may mean that $A_p$'s authentication of $IF_1$ and $IF_2$ may proceed in a somewhat different manner.

To authenticate $IF_1$, $A_p$ may verify that $IF_1$ is the holder of the private key for a cryptographic certificate of authenticity signed and sealed in $IF_1$ by $IF_1$'s manufacturer. Since $IF_1$ is a tamper-resistant device, this may be a sufficient proof of $IF_1$'s identity for the target user purpose.

To authenticate $IF_2$, $A_p$ may first need to authenticate $U_2$'s trusted to user purpose operating session on which $IF_2$ operates. Without such authentication, $IF_2$ may not perform in a reliable fashion because malware and/or other unreliable software in $U_2$'s trusted to user purpose operating session may corrupt the performance of $IF_2$. In some embodiments, such authentication of $IF_2$ may, in whole or in part, be provided by the services of a $U_2$'s TPM. Such a TPM may measure the boor of $U_2$'s trusted to purpose operating session and follow such measurements by measurements of the initialization of $IF_2$. After performing both measurements, $U_2$'s TPM may be able to attest to the measurements of $U_2$'s operating session and of $IF_2$ where such measurements may be strongly associated with the identities of $U_2$'s operating session and $IF_2$.

Action 3: $A_p$ evaluates and authenticates LMs. $LM_1$ and $LM_2$, that operate in $IF_1$ and $IF_2$, respectively, including validating that they are configured in accordance with control specifications associated with the authenticating process, $A_p$. For example, $LM_i$ may provide:

A secure, cryptographically protected communications path between $BSE_i$ and $A_p$ that ensures integrity and/or confidentiality of communications. $IF_2$ may rely on the services of $U_2$'s trusted to purpose operating session to provide appropriate control over the sensor devices and provide $IF_2$ with secure access to cryptographic materials needed to encrypt and sign the connection.

Correlation of one or more sensor information sets with one or more emitter instruction sets and/or other sensor information sets.

And/or the like.

In some embodiments. $CPFF_x$ may include other resources and/or processes supporting user purpose including, for example, $U_1$'s and/or $U_2$'s trusted to purpose operating session sets, which may, due to their reliability, provide a foundation for other process sets in $U_1$'s and $U_2$'s software environment including, for example, particularity management processing and/or social networking purpose class applications.

Situational particularity management operating on $U_1$'s and/or $U_2$'s trusted to purpose operating session sets which may monitor $U_1$ and/or $U_2$'s situation and generate responses to exceptional conditions. For example, if $U_1$'s situational particularity management processing is informed by cloud services that the threat level has increased, perhaps because of a class of attacks against reliable authentication, $CPFF_x$ may regard as no longer being sufficiently secure to purpose and cause $U_2$'s resource sets to be removed from the $CPFF_x$ embodiments until $U_2$ may support a more reliable arrangement.

Social networking class applications operating on behalf of $U_1$ and $U_2$ may provide services specific to social networking such as, for example, video chat, access to social networking resource repositories and/or the like.

PERCos cloud resource service sets which may provide PERCos and/or other services such as identity management, particularity management, and/or the like in support of a target (social networking) user purpose.

In some embodiments, $LM_1$ may grant $A_p$ exclusive access to $BSE_1$ by establishing an exclusive cryptographically protected communications path between $BSE_1$ and $A_p$. In particular, $LM_1$ may monitor all communications traffic to and/or from $BSE_1$ to ensure that they are from and/or to $A_p$. This may prevent external resource sets interfering with $BSE_1$'s configuration and/or protect biometric information sets from unauthorized disclosure.

Figure 52:
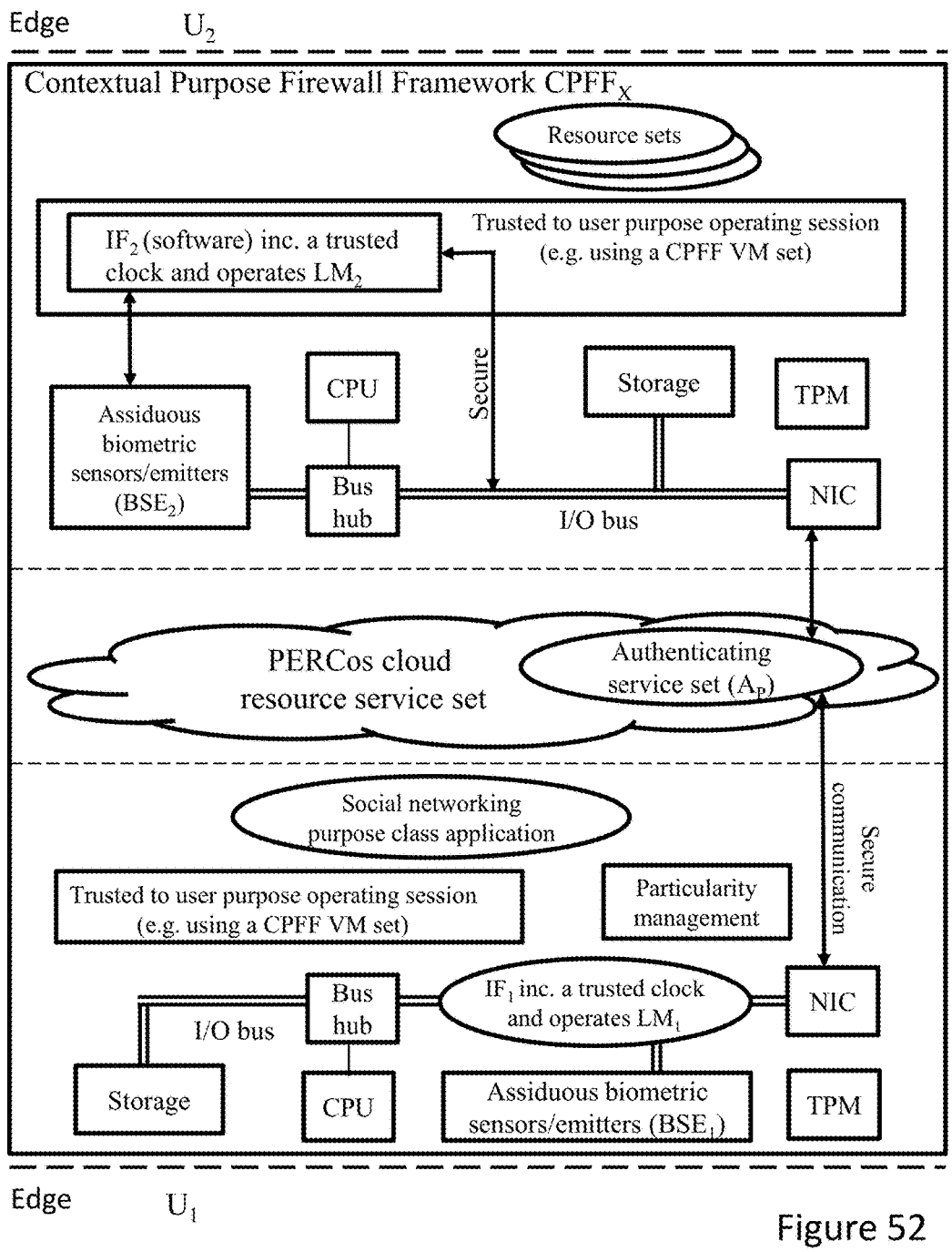
FIG. 52 is a non-limiting illustrative example of an Identity Firewall operating as part of a trusted to user purpose operating session.

FIG. 52 is a non-limiting illustrative example of an Identity Firewall operating as part of a trusted to user purpose operating session.

FIG. 52 illustrates a non-limiting example in which a social networking CPFF enables participants in a social network to mutually assiduously authenticate each other using a third party authentication service using their respective Identity Firewalls. FIG. 52 is a variation of a similar operating CPFF instance shown in FIG. 51 except that $U_2$'s IF, $IF_2$, operates inside $U_2$'s trusted to purpose operating session set instead of operating as a service on top of $U_2$'s trusted to purpose operating session set. In some embodiments, operating $IF_2$ inside $U_2$'s trusted to purpose operating session set may allow $IF_2$ to perform better—by reducing context switches—and may be provide $IF_2$ more efficient (direct) access to hardware such as, for example, to assiduous biometric sensor and emitter sets.

FIG. 53 is a non-limiting illustrative example of an IF enhancing capabilities of a physical sensor/emitter set.

FIG. 53 illustrates how an Identity Firewall, $IF_3$, that is a hardware PPE on an I/O bus may use a load module, $LM_3$, to enhance the capabilities of a physical sensor/emitter set. $BSE_3$, such as providing secure communications, correlation of different sensor data (e.g., voice and facial biometrics), and sanity validation (i.e., checking for data corruption) in support of assiduous registration and/or authentication and/or reality integrity processing. For example, $LM_3$ may:

Convert instructions sent to $VSE_3$ into instructions to be forwarded to $BSE_3$.

Transform $BSE_3$ generated information sets to $VSE_3$ generated information sets.

In some embodiments, $VSE_3$ may have, for example, the following characteristics that differentiate it from $BSE_3$:

$VSE_3$ may be able to attest to its identity, which may in turn have identity attributes that assert its reliability and trust characteristics.

$VSE_3$ may provide security and/or other features not provided by $BSE_3$ such as, for example, providing signed and/or encrypted information sets FIG. 54 is a non-limiting illustrative example of PPE providing firewall support.

FIG. 54 illustrates how hardware PPE sets on an I/O bus may control incoming and outgoing network traffic in accordance with a situational specification set, $SSS_1$, provided by an authorized process set, such as, for example, a coherence manager set that coheres one or more specification sets representing interests of one or more involved parties, such as, for example, $U_1$ and resource set Stakeholders.

For example, consider a LM, $LM_4$, running in a PPE. $PPE_4$, which intercepts all internal user computing arrangement communications to and from a network interface controller, $NIC_4$. $LM_4$ may act as a network gateway by, for example, Blocking all messages to and from $NIC_4$ that do not comply with $SSS_1$.

Performing application level testing of the contents of messages to and from $NIC_4$. For example, such testing may identify any network traffic that may potentially contain malware and forward traffic to one or more authorized processing sets (e.g., honey pot in FIG. 54) that may perform protective and/or corrective actions, such as, sanitizing, deleting, sending to a honey pot set, and/or the like traffic Forcing use of certain protocols by, for example, adding encryption or forcing the use of a Tor network.

And/or the like.

In addition, $LM_4$ may interact with biometric sensor/emitter sets to enhance sensor/emitter information sets being sent to an external registration, authentication and/or reality-integrity testing service ($A_P$) by, for example, Utilizing timing and biometric unfolding anomaly detection services to pre-process received sensor and/or related emitter information sets and raise an exception if inconsistencies are observed. For example, timing and biometric unfolding anomaly detection services may detect discontinuities and/or excessive elapsed time periods suggesting that video frames from different sources are being spliced together, suggesting an attack in progress. In such a case, $LM_4$ may raise an exception to be handled by $A_P$.

Utilizing cryptographically secure pseudo random emitter generator services (or other one or more forms, if available and applicable, for example, of external to system unpredictable and/or the like emitter signal generator services) to add liveness detection information to sensor information sets. For example, $LM_4$ may use the pseudo random generator arrangement to generate patterns and/or other formulations for emitters and analyze the reflections and/or other responses to such emissions to see if they are consistent, for example, with identifying one or more individuals and/or reality testing, such as existential, analysis. If an inconsistency is detected, $LM_4$ may raise an exception to be handled by $A_P$.

In this example, $LM_4$ may function on a device such as, for example, a mobile phone or a laptop, and may, for example, be insulated through hardware PPE based hardware protection, from interference from, for example, the operating system, even in the case that the operating system has been corrupted by malware. For example, in some embodiments, $PPE_4$ may only accept load module instances that are loaded directly into the hardware, e.g., through BIOS mechanisms before the system is booted, and such load module instances may be inaccessible to an executing operating system.

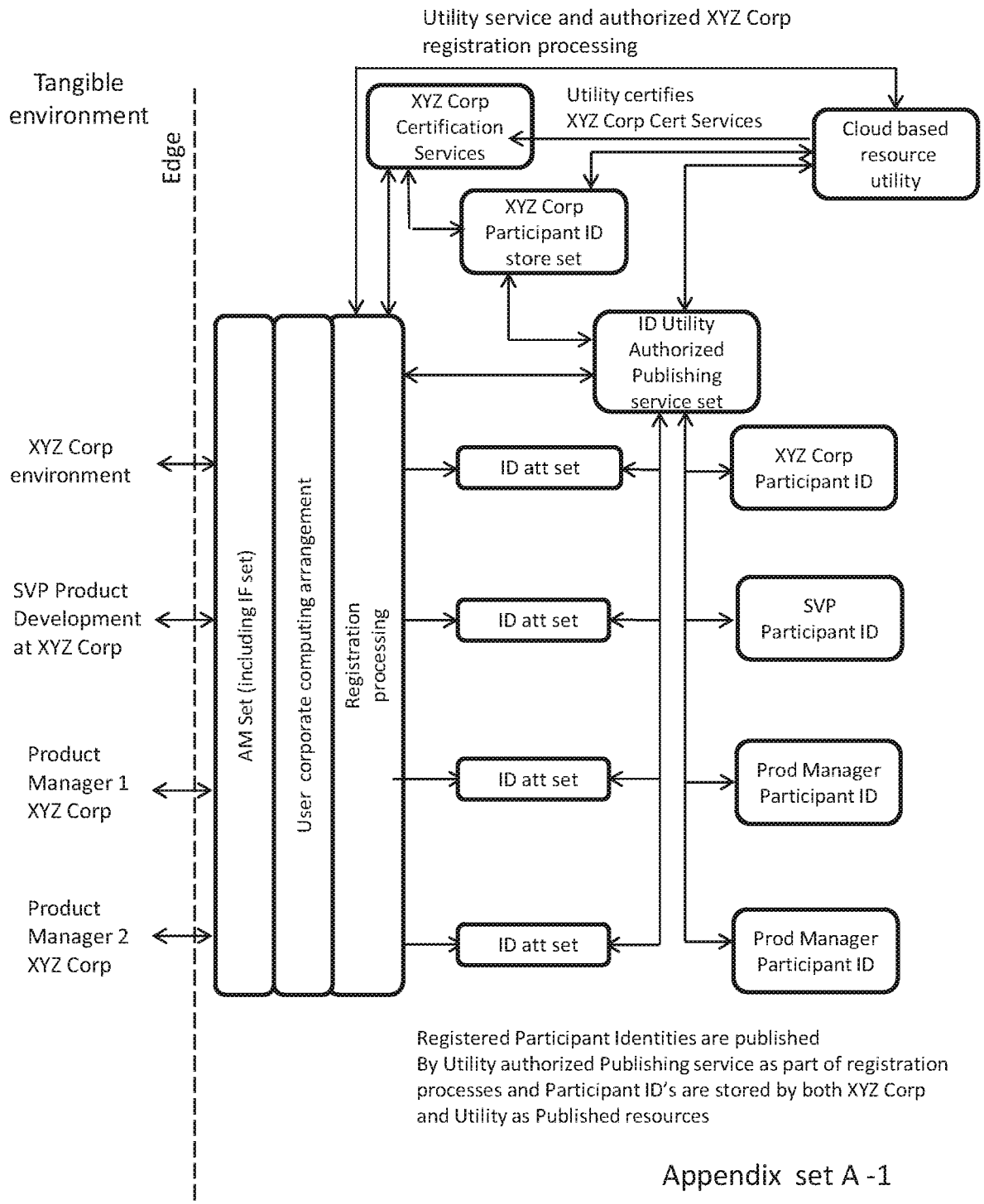

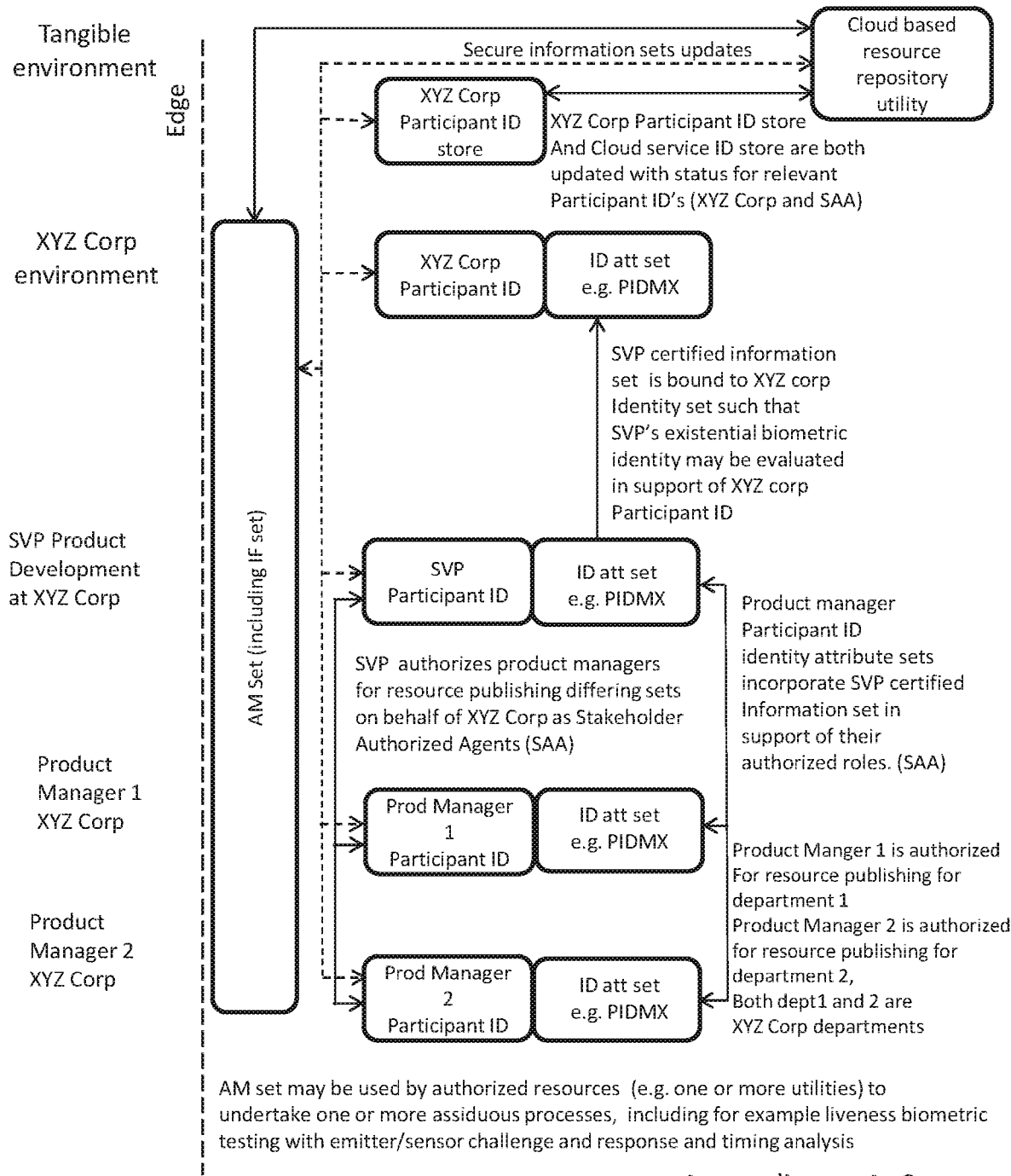
Non limiting Illustrative example of establishing relationships between XYZ Corp and employee set identity attribute sets
Appendix set A -2

Non limiting Illustrative example of XYZ Corporation deployed services and employee set undertaking resource publishing with binding of Stakeholder identity attributes in conjunction with cloud utility service Utility undertakes validation of information set provided by XYZ Corp Participant stores and authenticates one or more resources (Participant identities of SAA, SVP and XYZ Corp) which may include employing AM for liveness (including emission) biometric testing with emitter/sensor challenge and response and timing analysis. XYZ Corp Participant ID store and/or Certification services may be part of cloud, XYZ Corp networks and/or both.

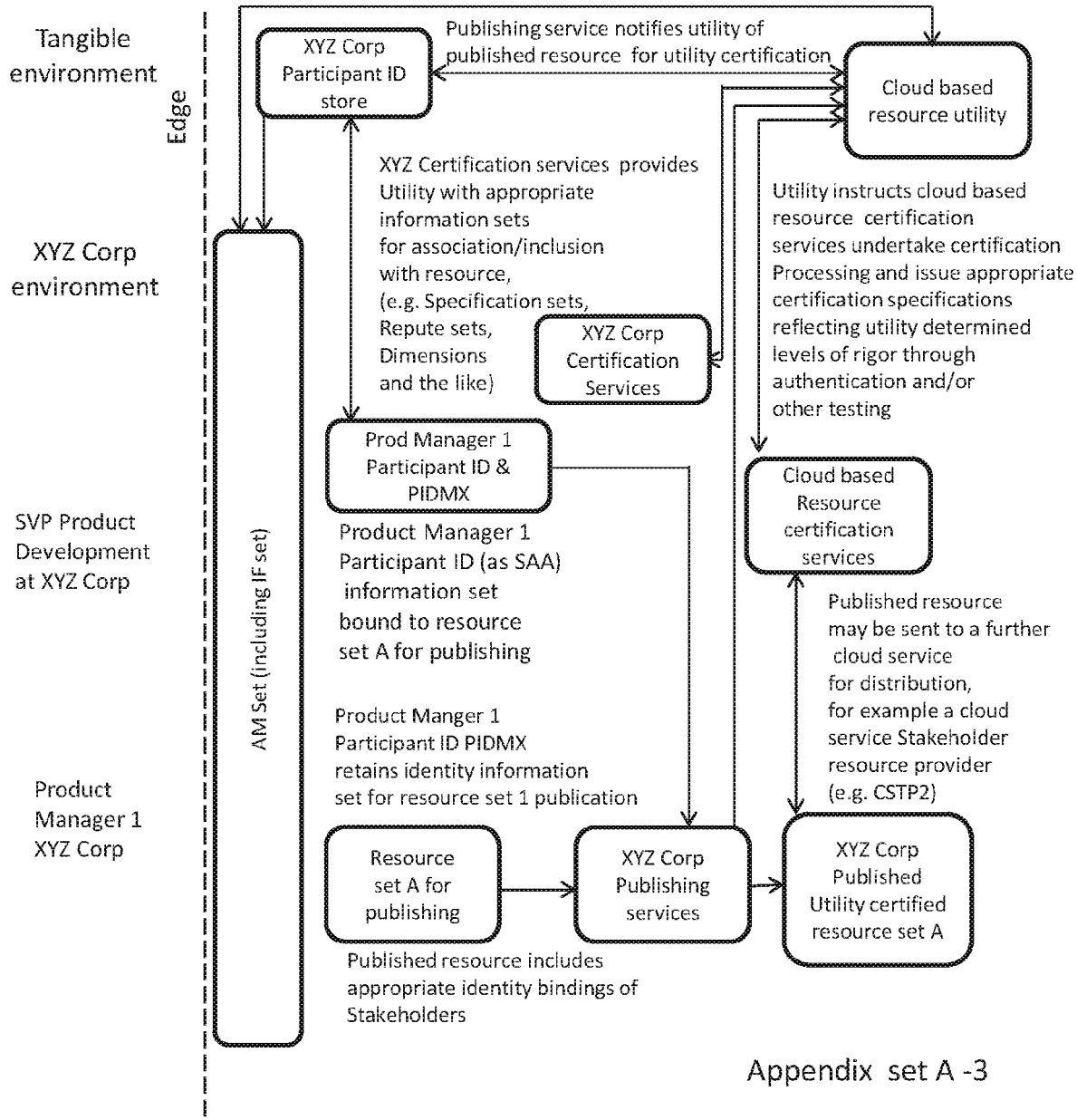

Appendix set A -3

Non limiting Illustrative example of XYZ Corp employee set publishing resources and binding Stakeholder identity attributes using cloud based services
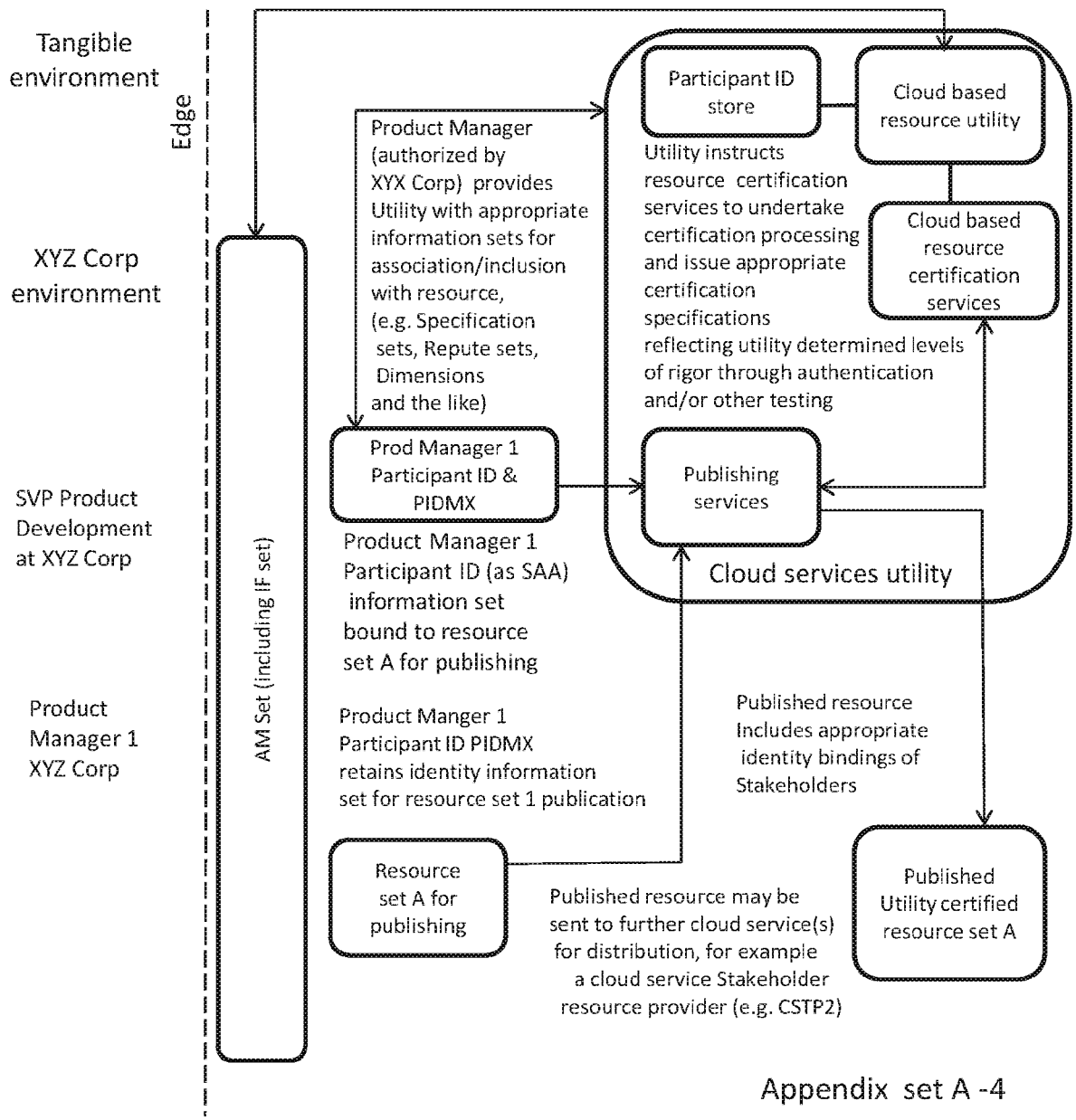
Appendix set A -4

Non limiting example of user discovering a resource set and evaluating resource stakeholders
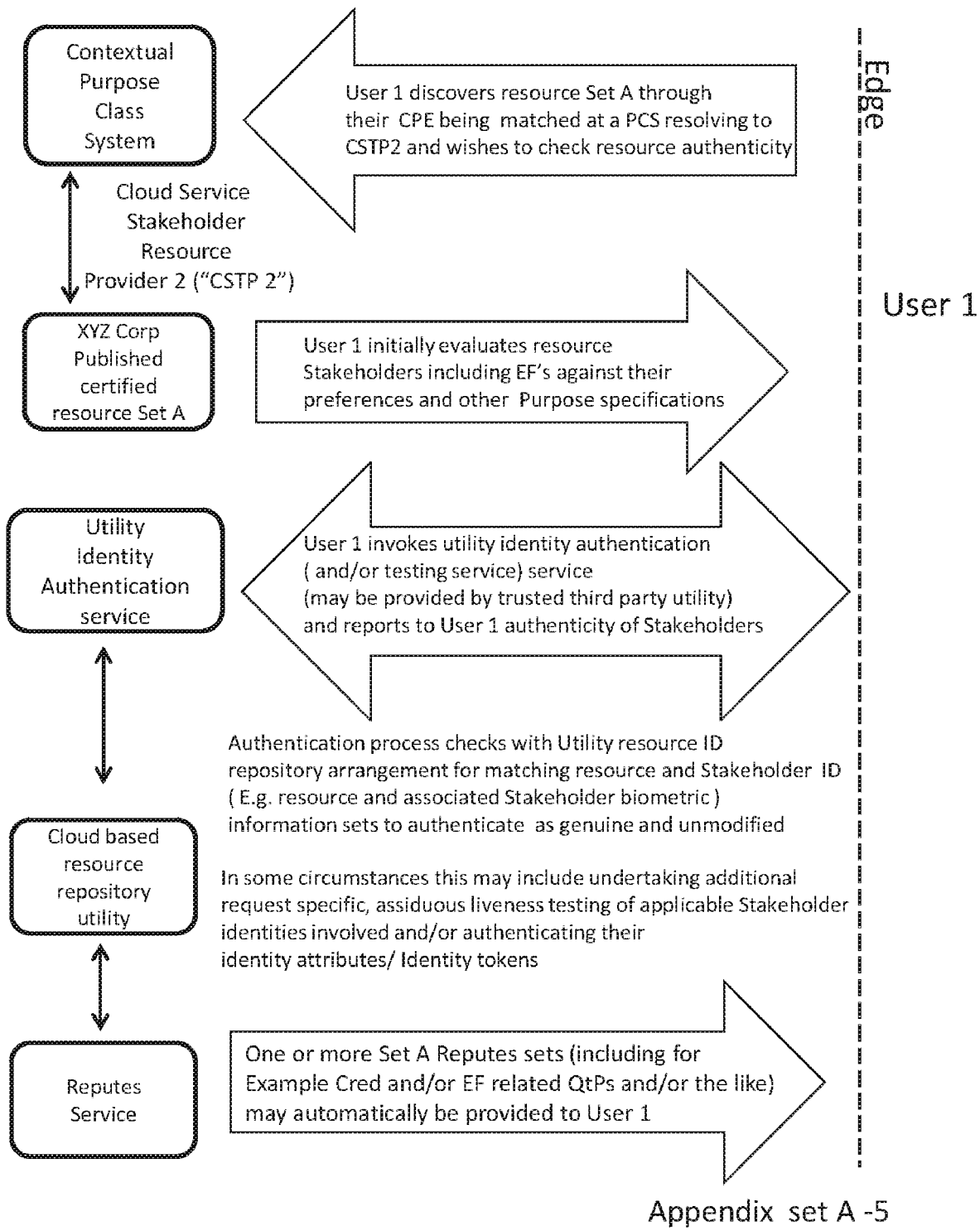
Appendix set A -5

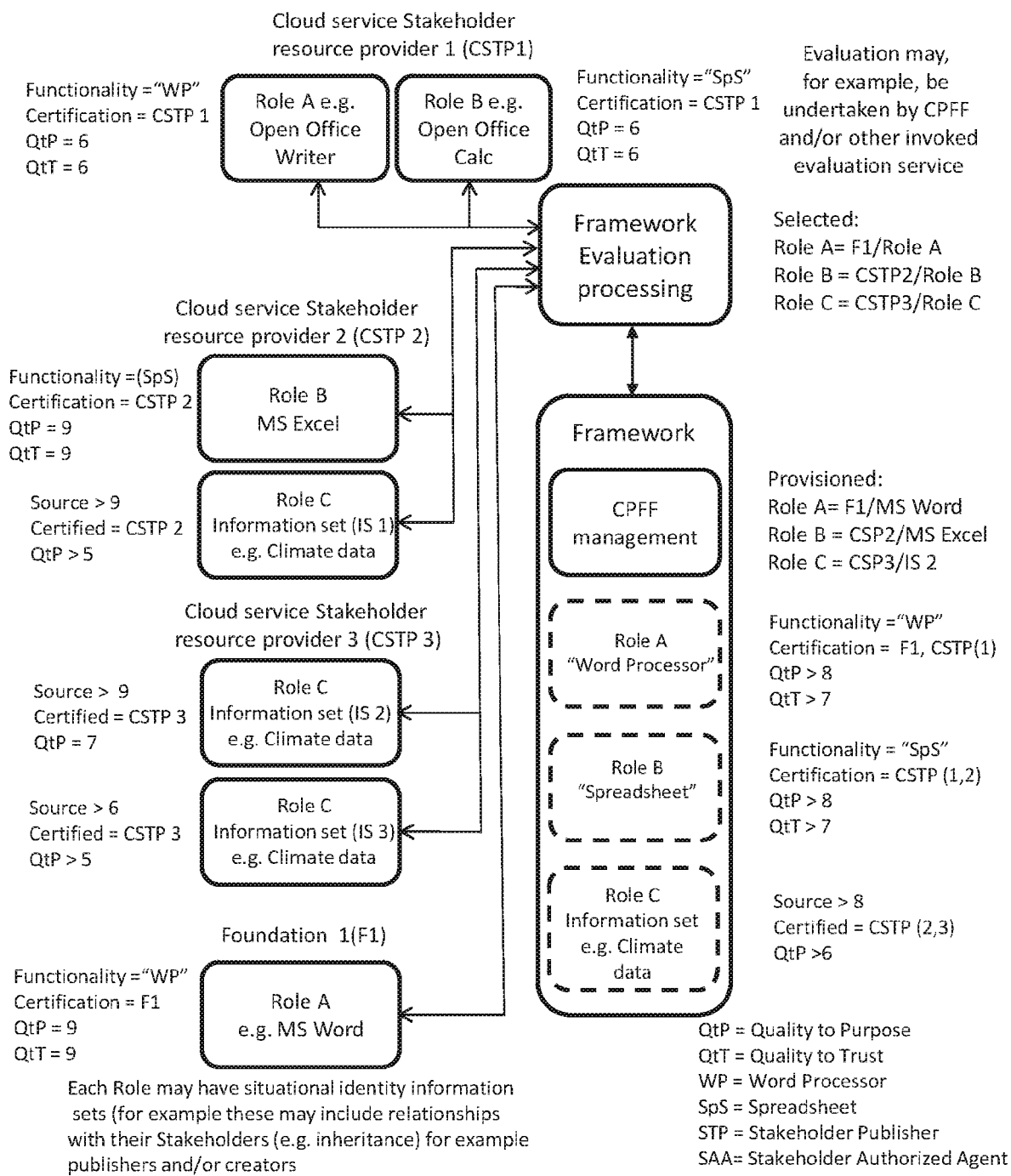
Non Limiting example of CPFF( applies to other Frameworks) comprising multiple candidate resource Roles from multiple sources to match CPFF specifications
Appendix set A -6

Simplified overview of certain identity functions for contextual purpose management systems
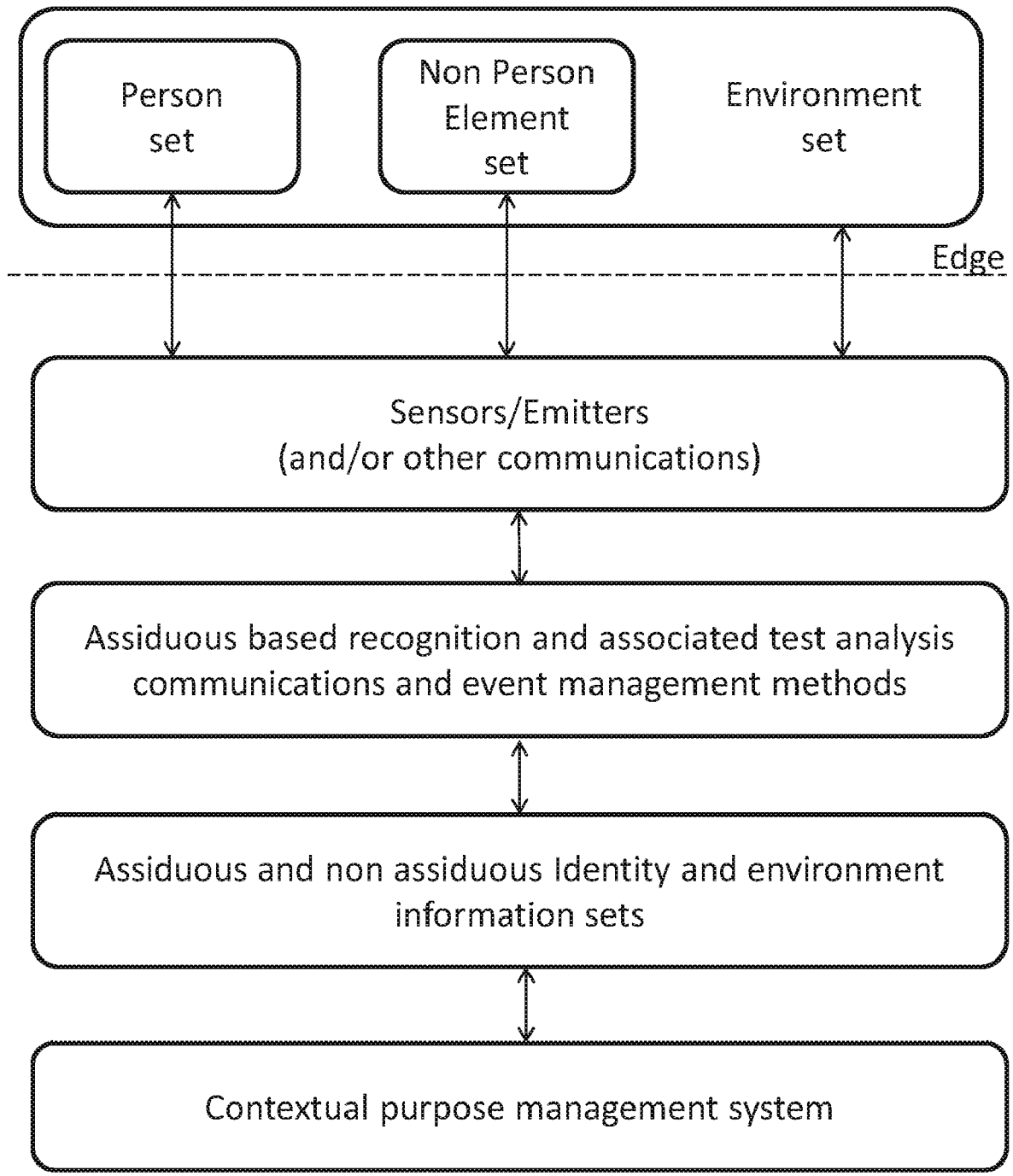
Appendix set A-7

Non Limiting illustrative example of some embodiments of PERCos cross edge elements
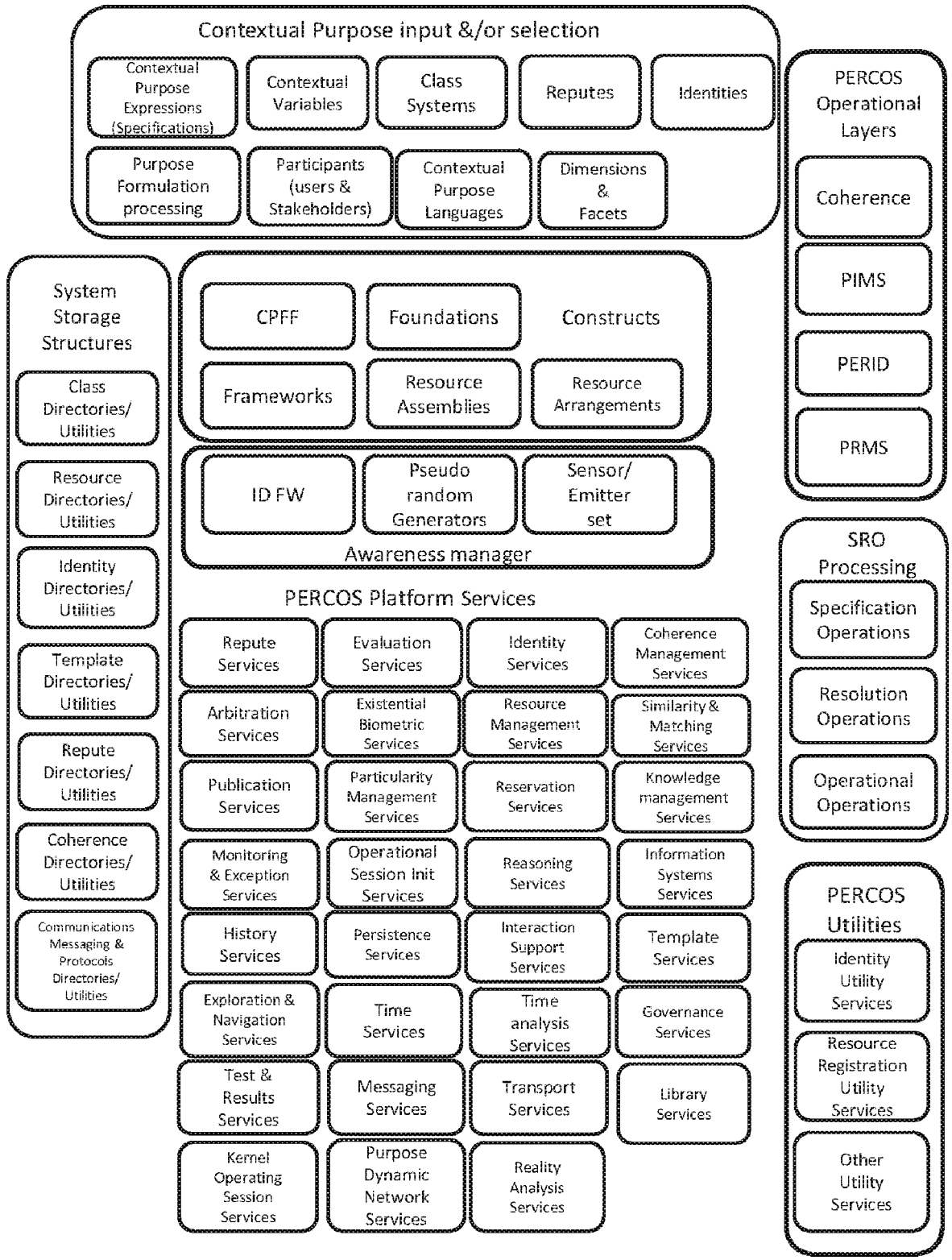
Appendix set A-8

Non limiting illustrative example of resource publication with existential biometric identification
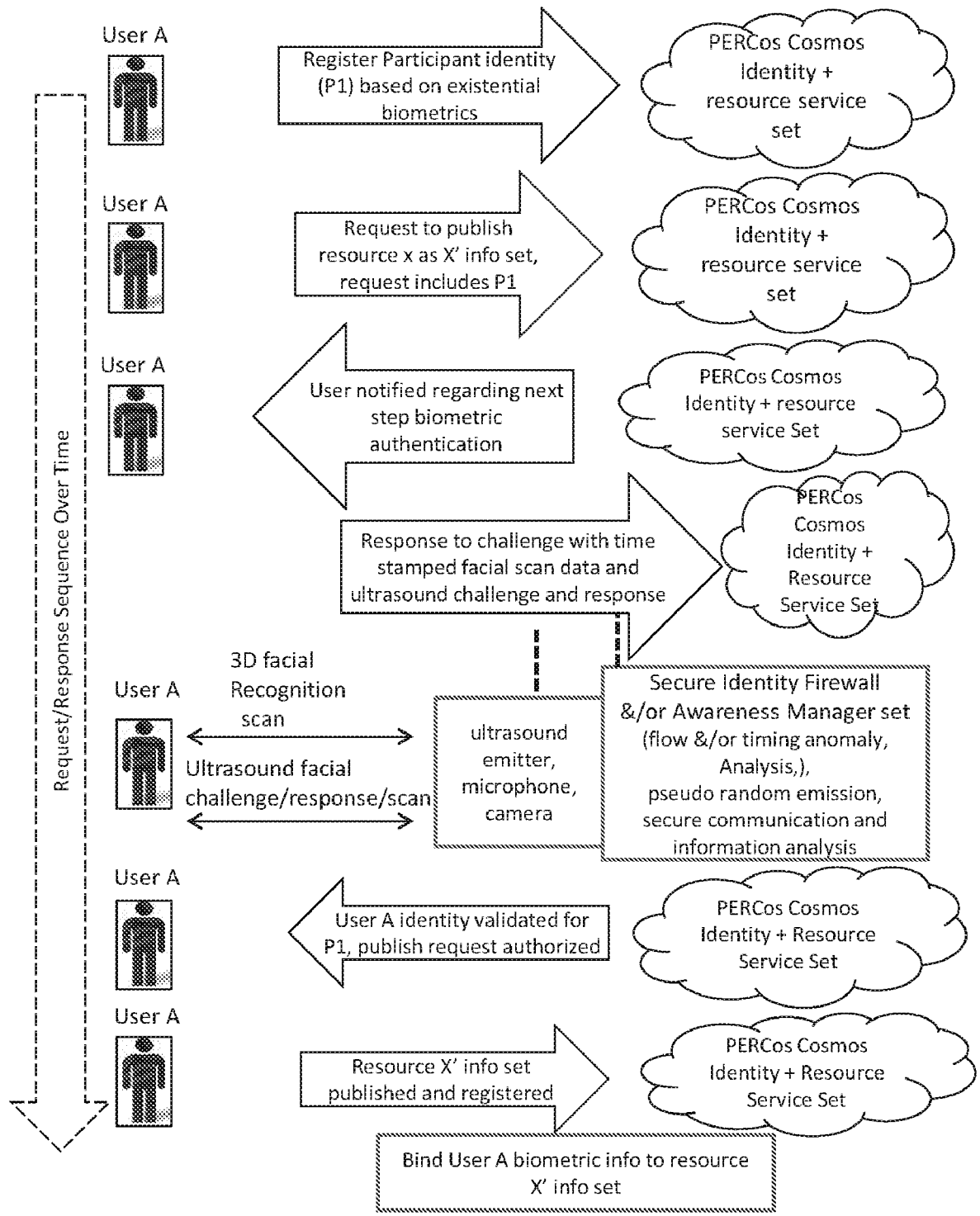
Appendix set A-9

Non limiting illustrative example of Purpose Class System (PCS) portions (and/or other neighborhood portions) and user generated information sets
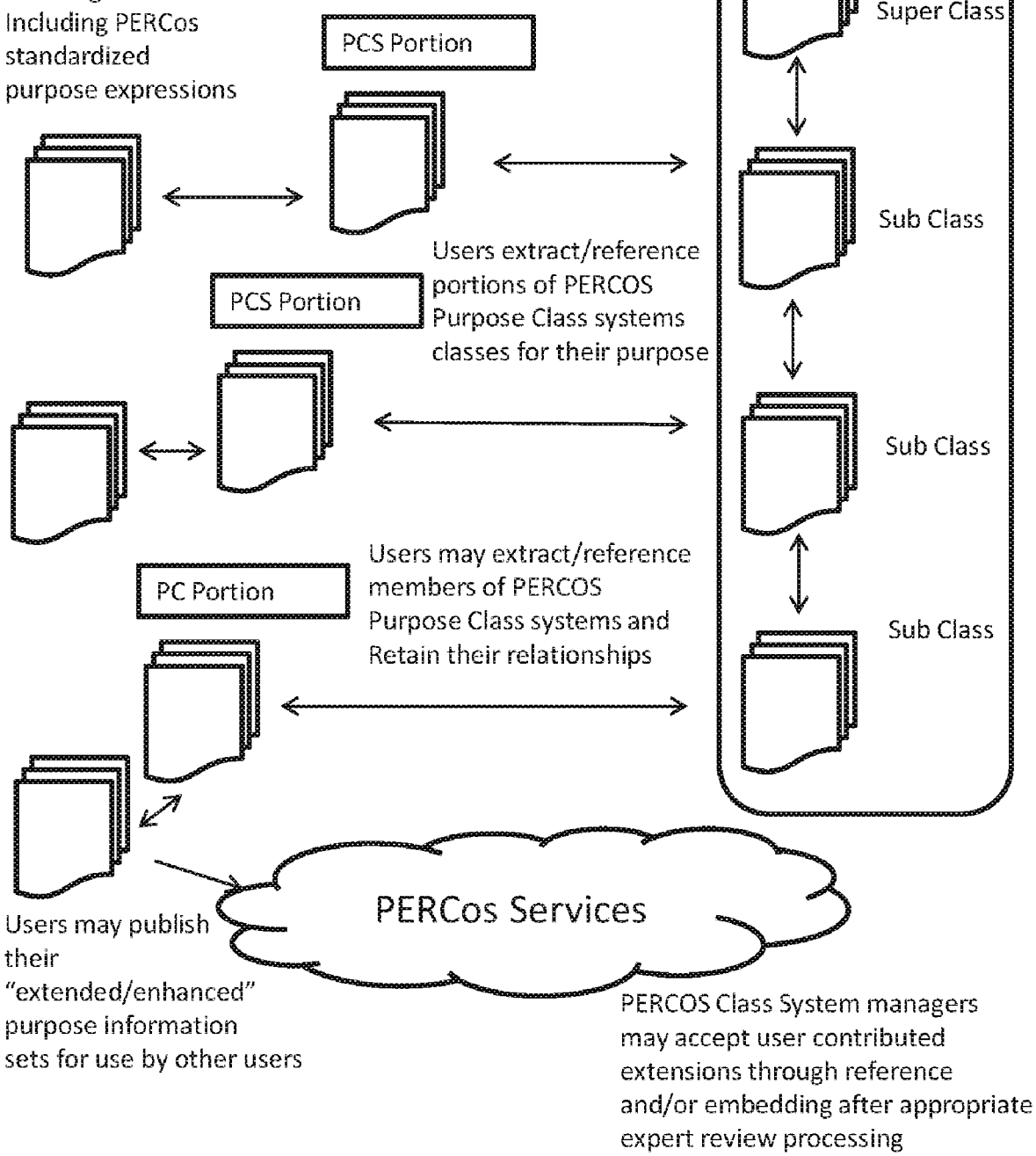
Appendix set A-10

Non limiting illustrative example resource selection
for CPFF based on user specifications

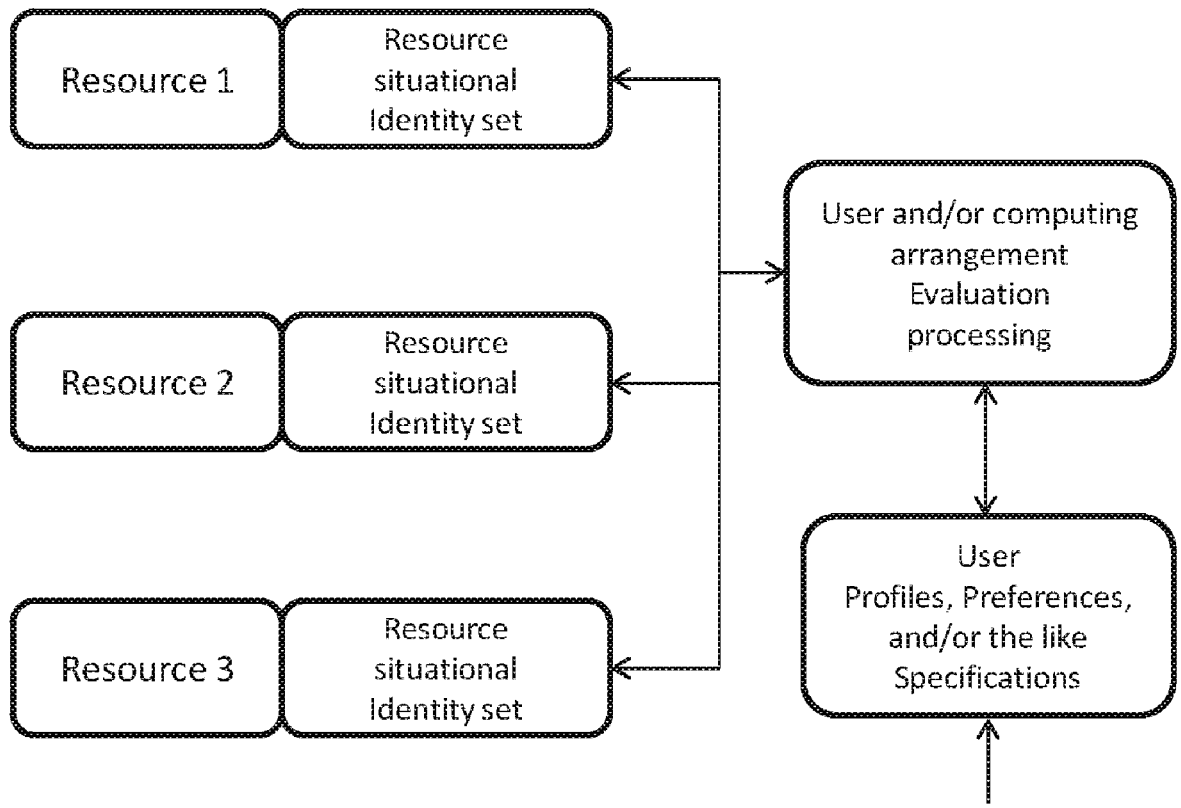

Illustrative example of user specifications

Creator = Domain expert where ID reliability >7
Publisher= verified independent experts where reputes > 8
Purpose = CPE {Learn: Medical technologies investment opportunities}
Quality to Purpose > 8
Framework = Type CPFF
Foundation &/or Foundation Role type(s) = Type 67 and/or 42
(e.g. user has type 67 Ms Word text editor)
Resources = not published by "Wells Fargo"

Appendix set A-11

Non limiting example of multiple Awareness Managers (AM), embodied as hardened appliances with single PIM in an environment
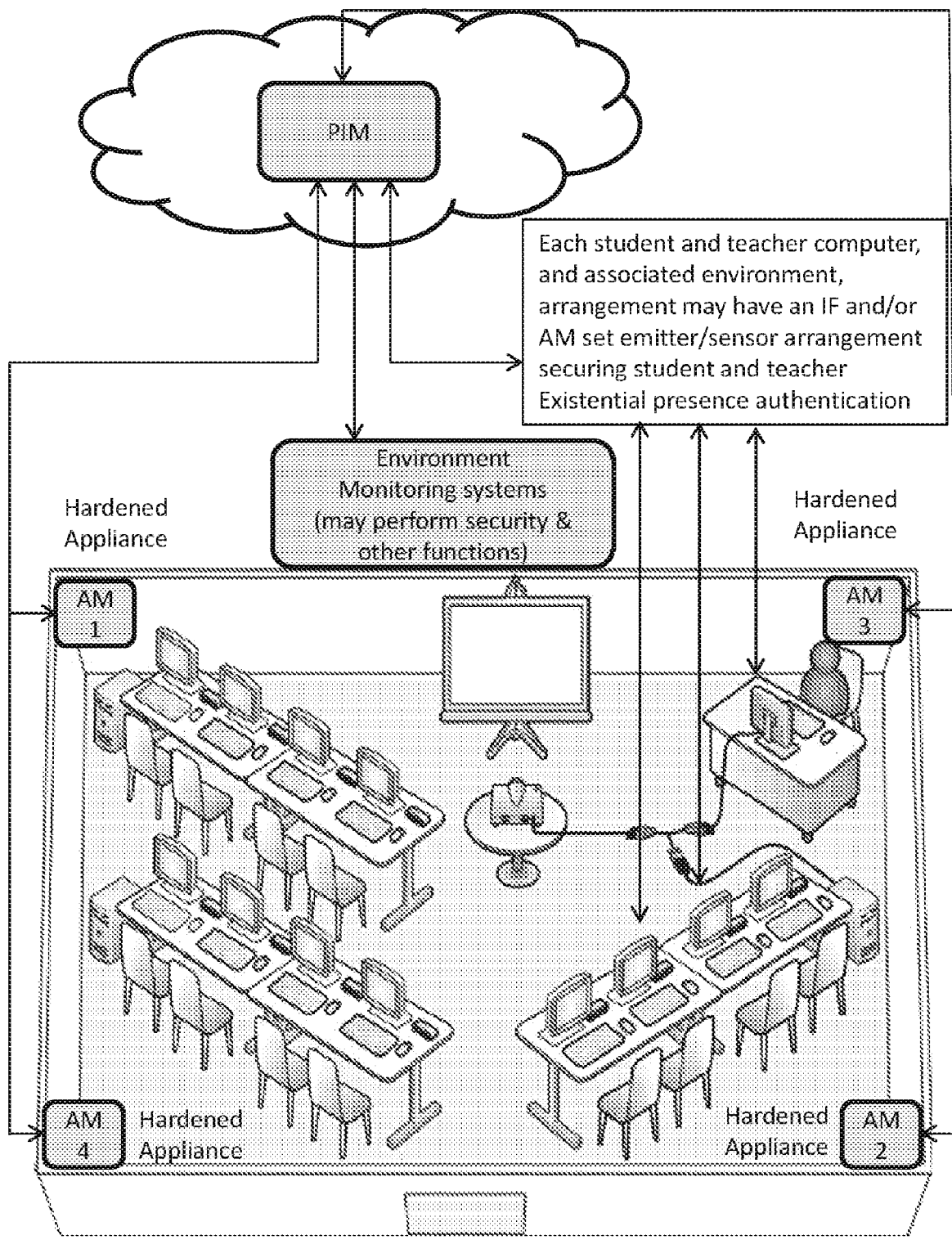
Appendix set A-12

Non-limiting example of Framework, Foundation, Operating Session matching and resolution
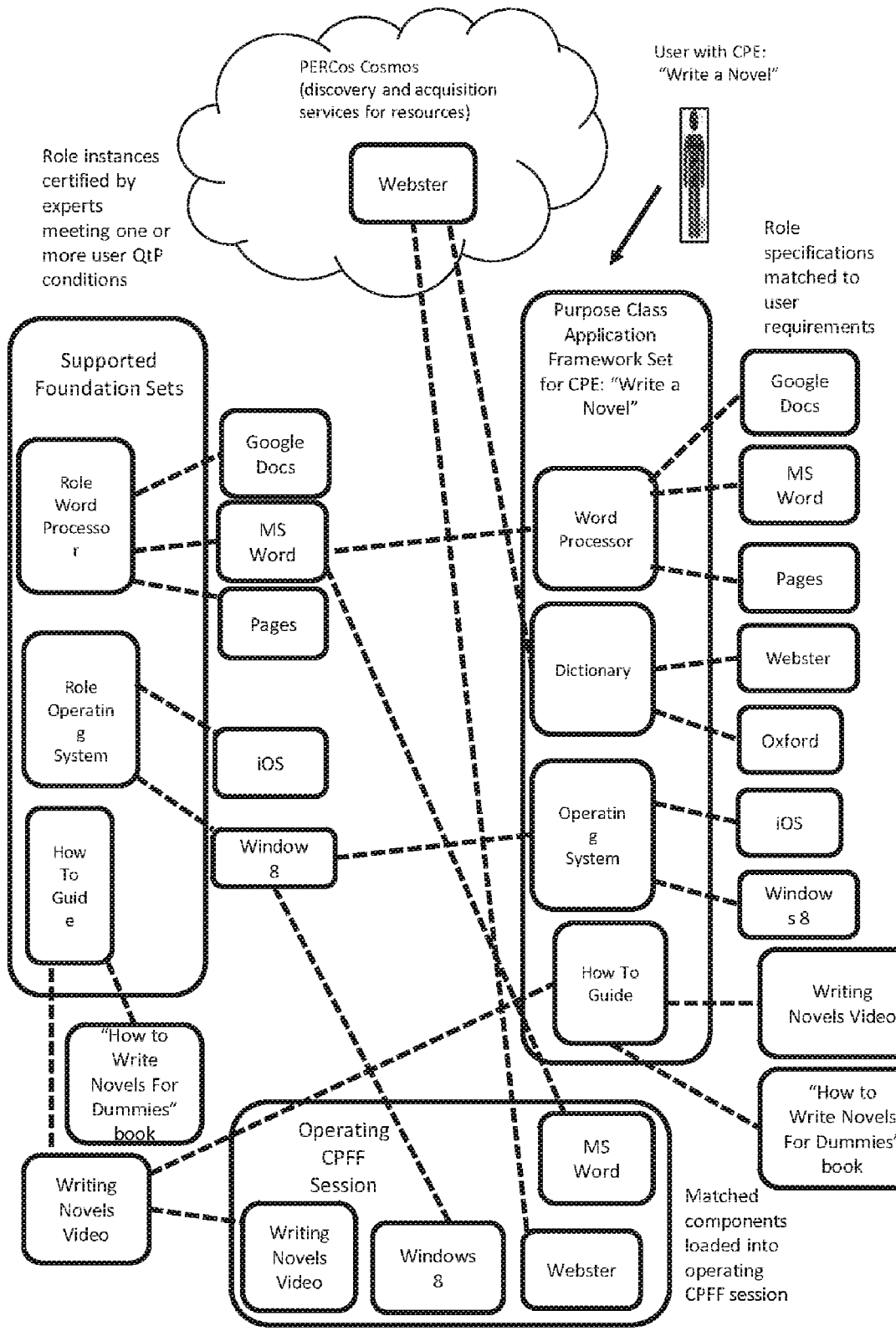
Appendix set A-13

Non limiting example of an identity firewall embodiment
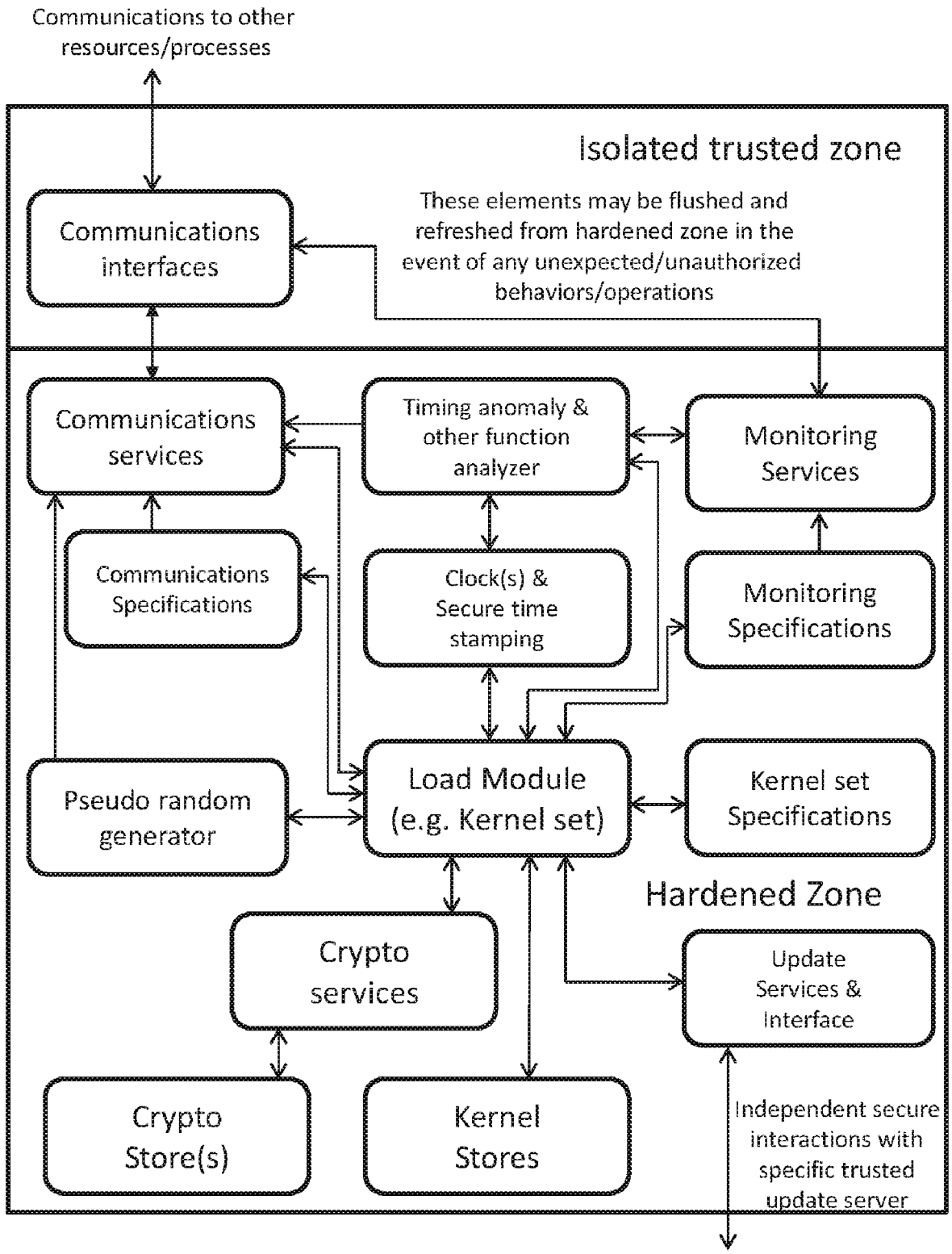
Appendix set A-14

Non limiting illustrative example embodiment of Identity Firewall and Awareness Manager embodiment including pseudo random emitter generator and timing anomaly detection
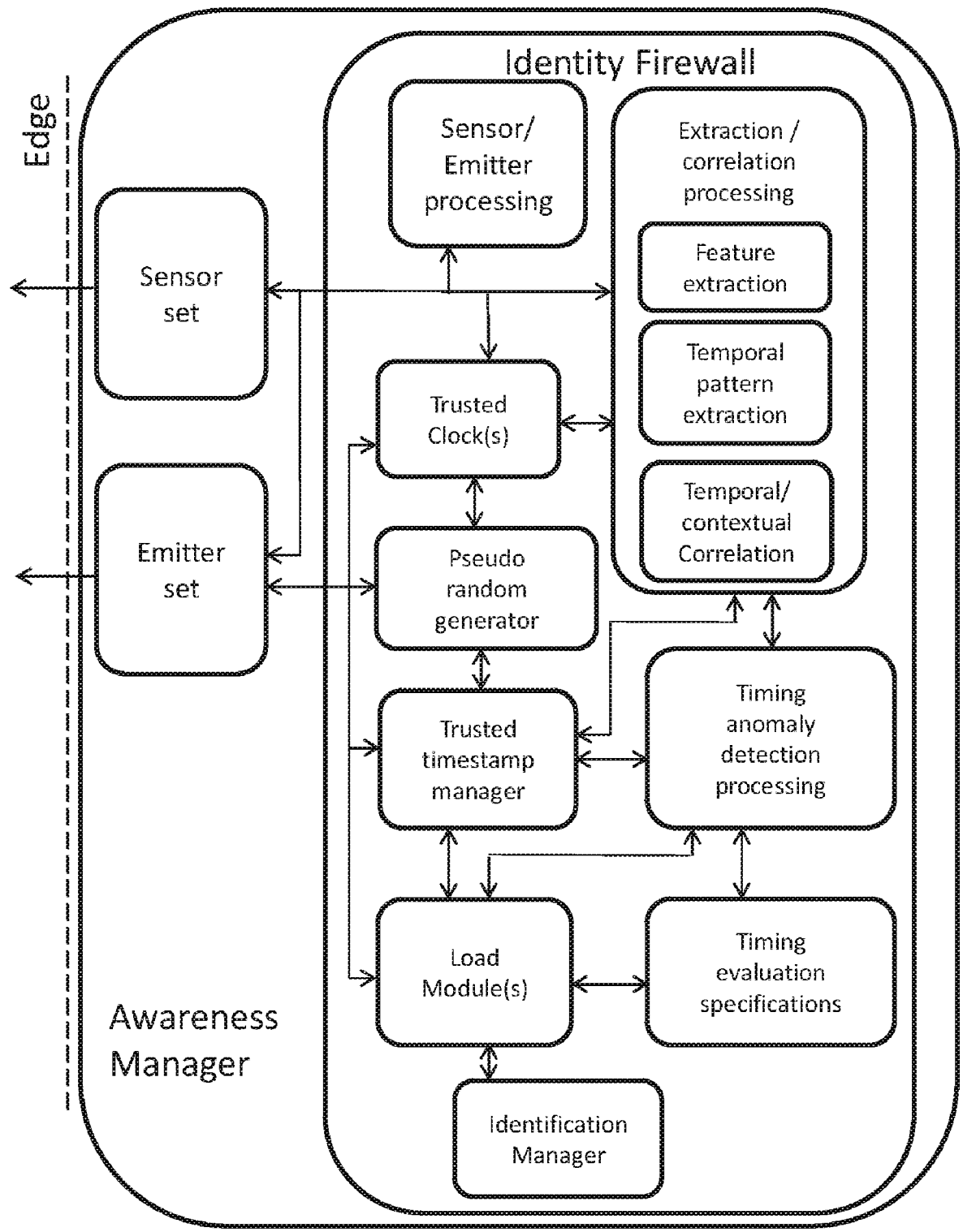
Appendix set A-15

Non Limiting illustrative example of multiple identity firewalls
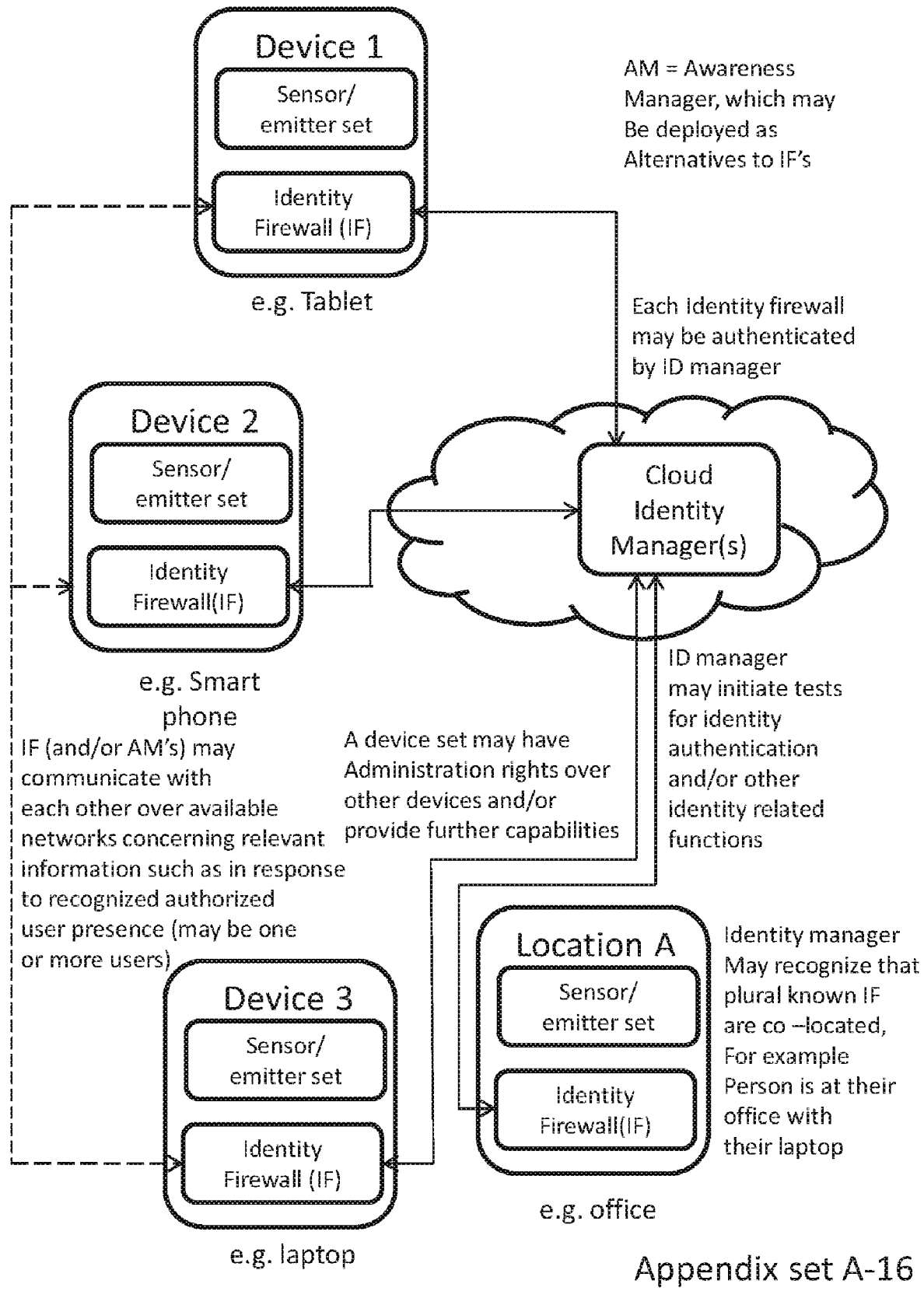
Appendix set A-16

Non Limiting illustrative example of cloud based challenge/response process set using pseudo random emission generators
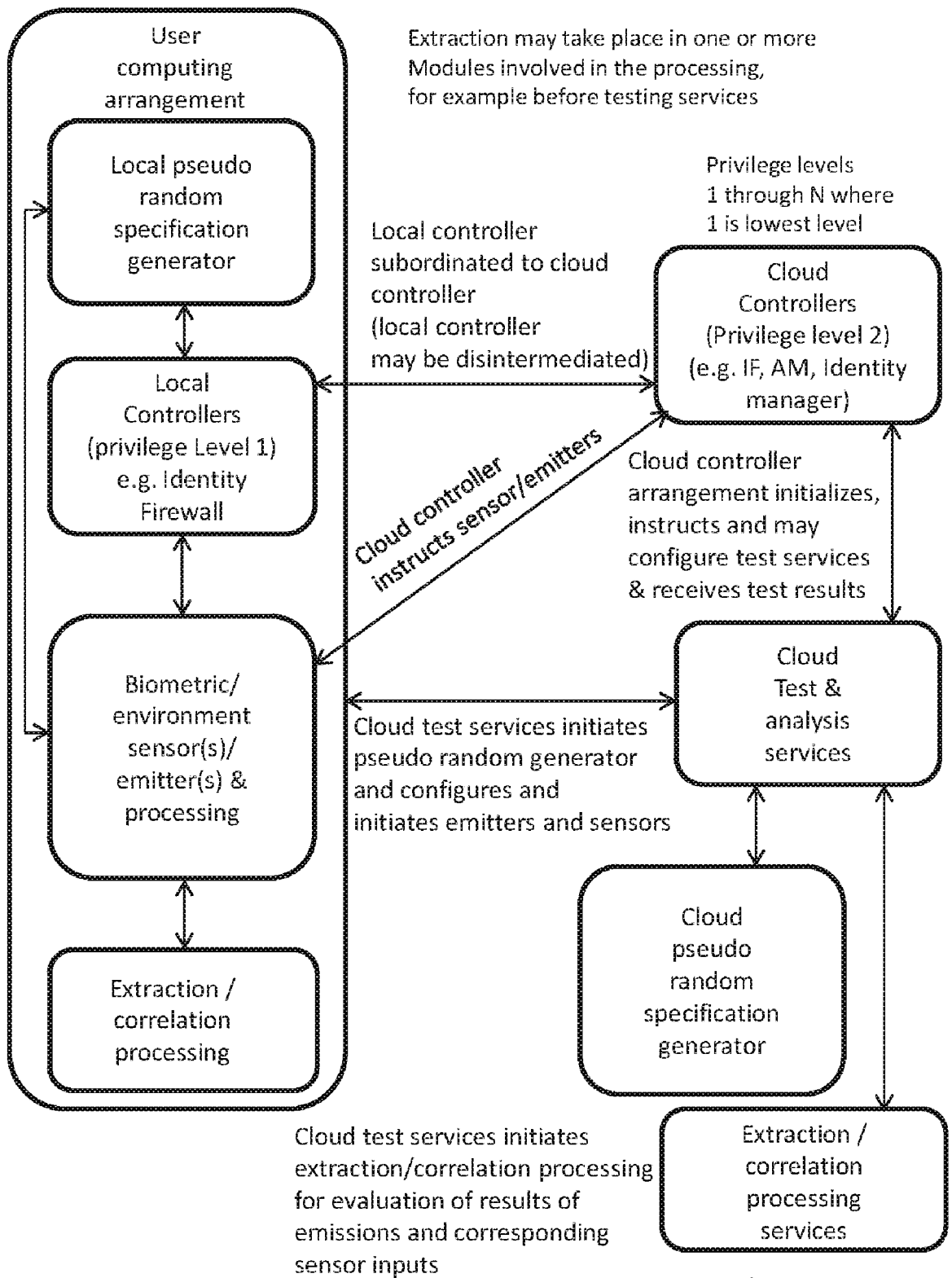
Appendix set A-17

Non Limiting example of Identity Firewall providing instructions to secure sensor /emitters with supporting services
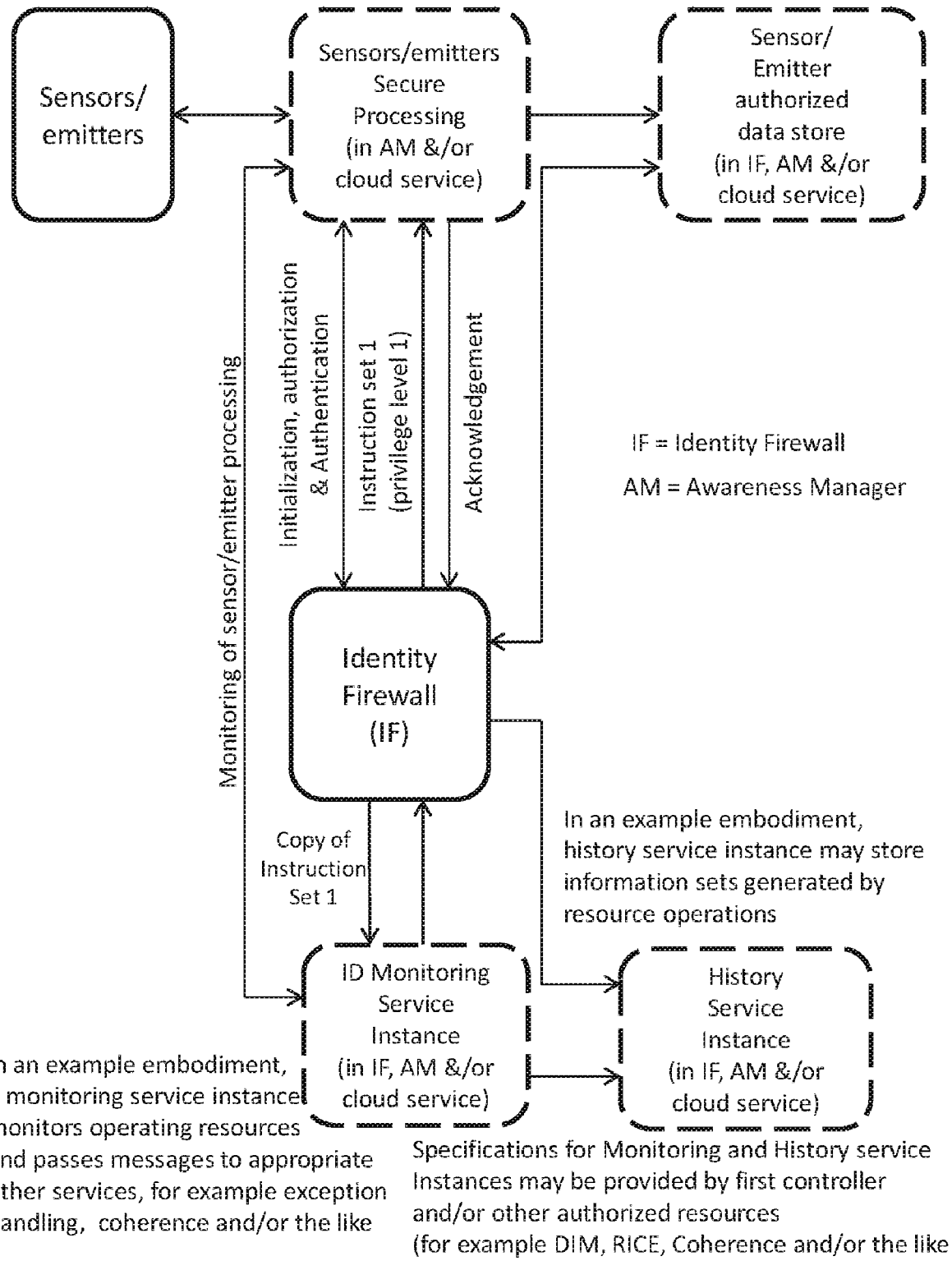
Appendix set A-18

Non Limiting example of Identity Firewall with higher privilege level issuing more senior instructions to secure sensor /emitters with supporting services
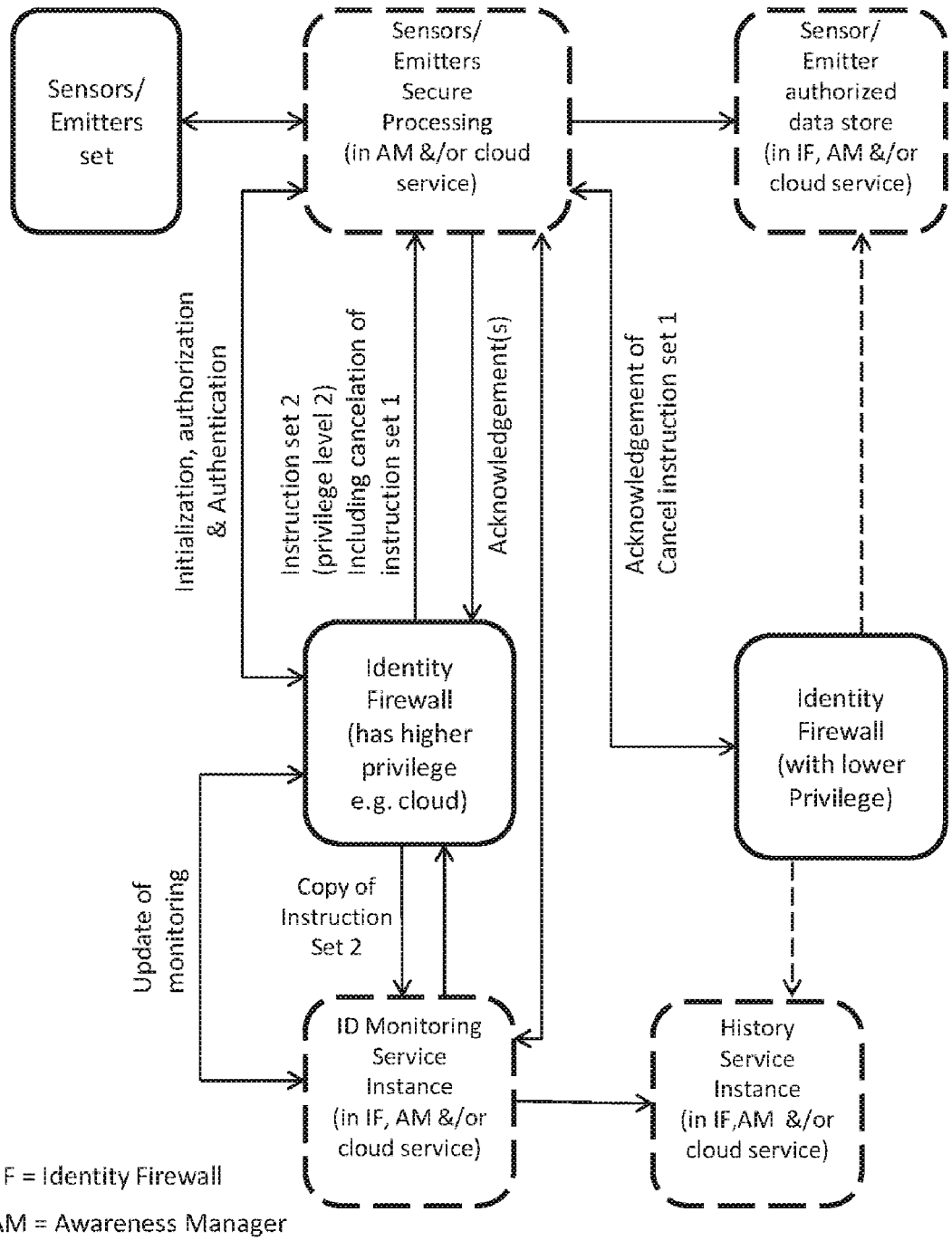
Appendix set A-19

Non limiting illustrative example of a
PERCos Information Manager(PIM) embodiment
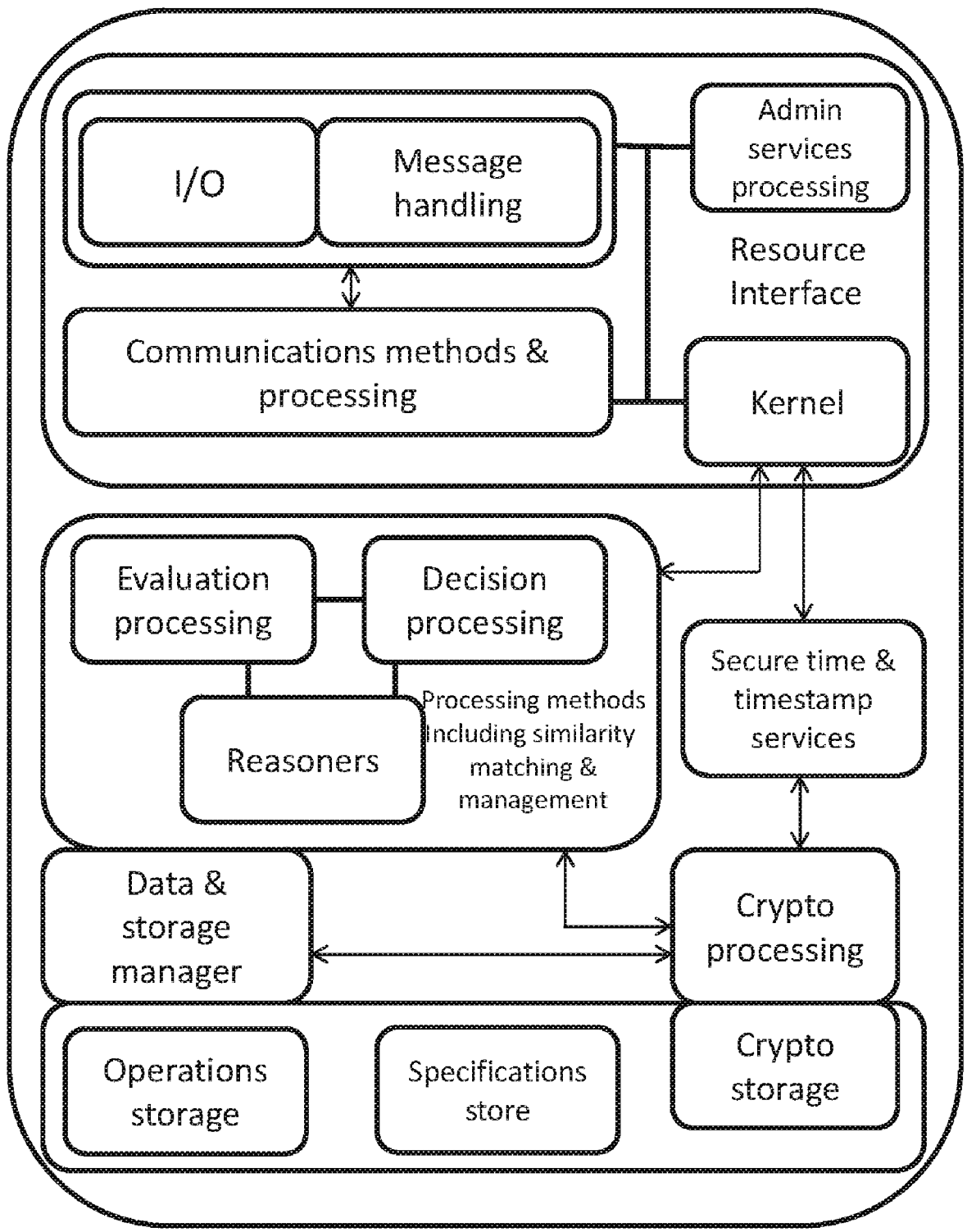
Appendix set A-20

Non limiting illustrative example of Framework and Foundation specifications resolving to resources
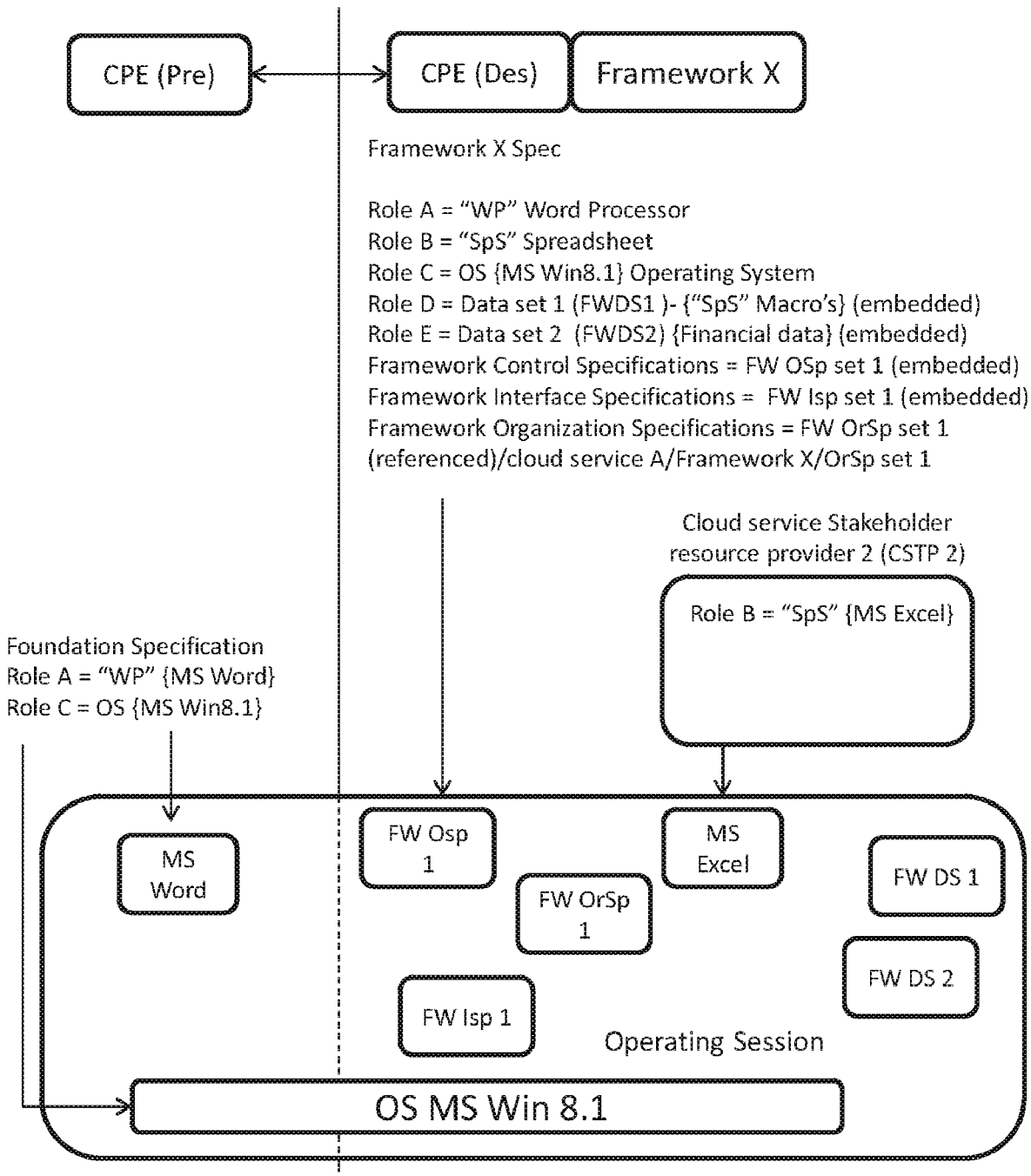
Appendix set A-21

Non limiting example of CPFF selection
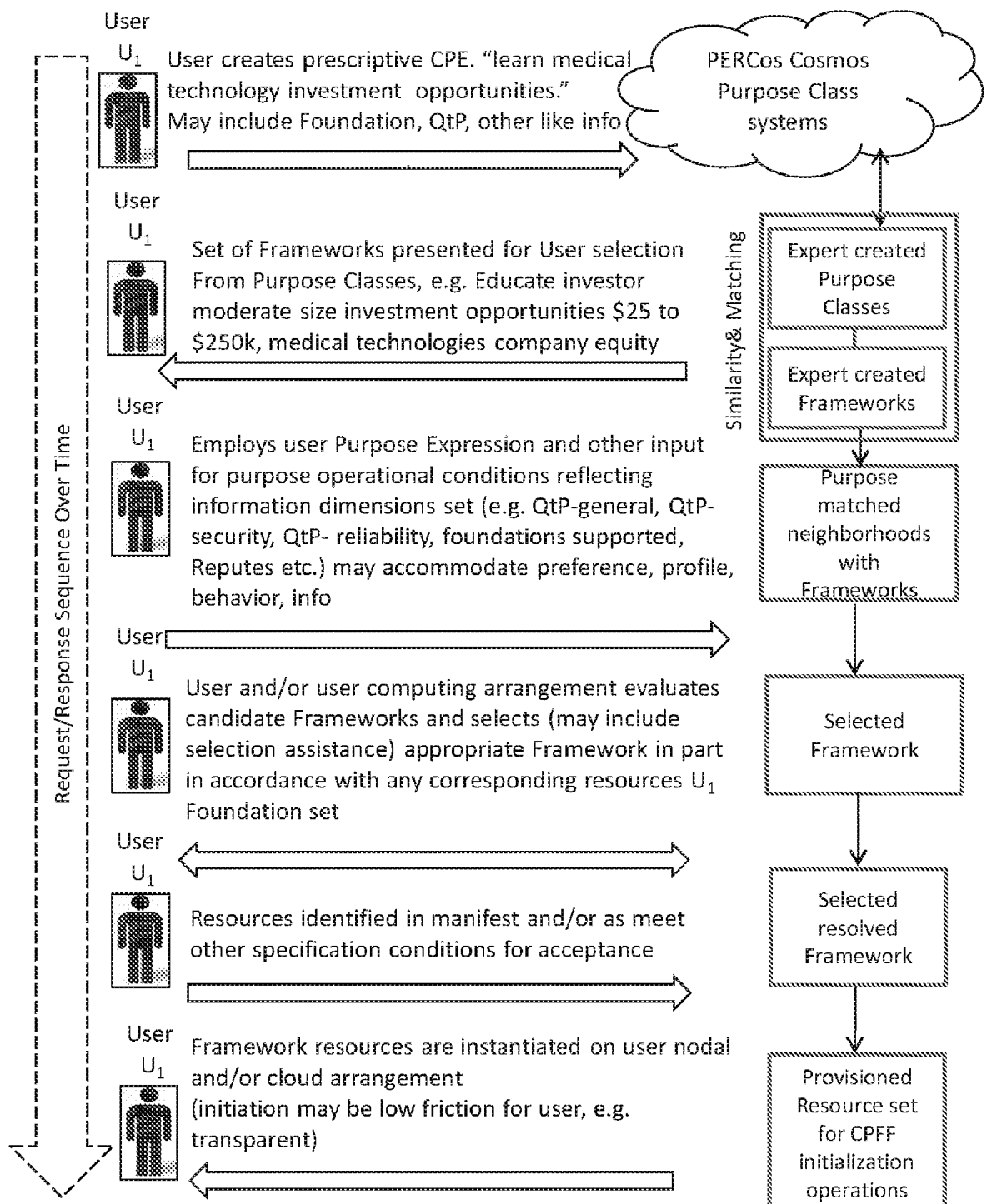
Appendix set A-22

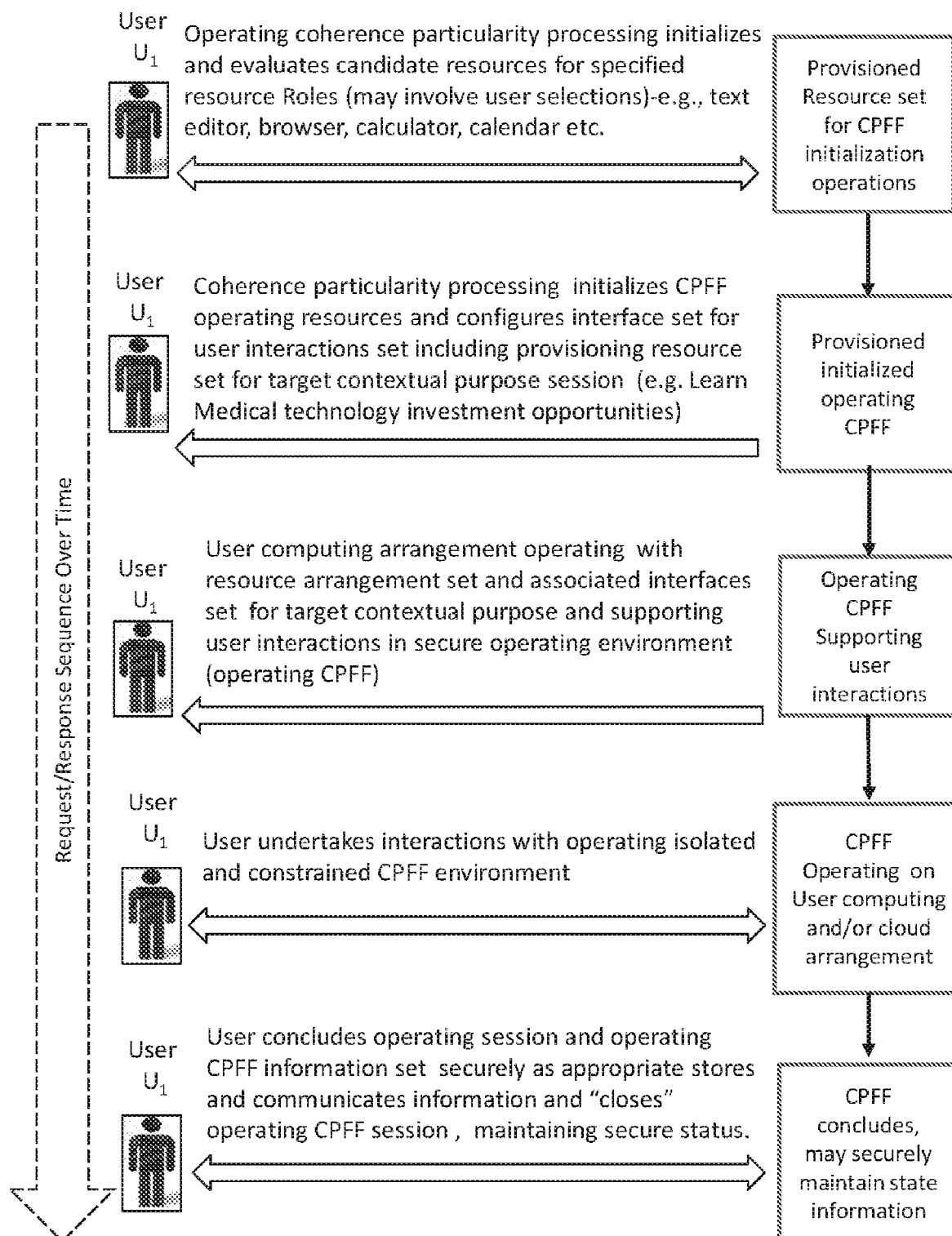
Appendix set A-23

Non-limiting illustrative example resource situational identity set for evaluating CPFFs

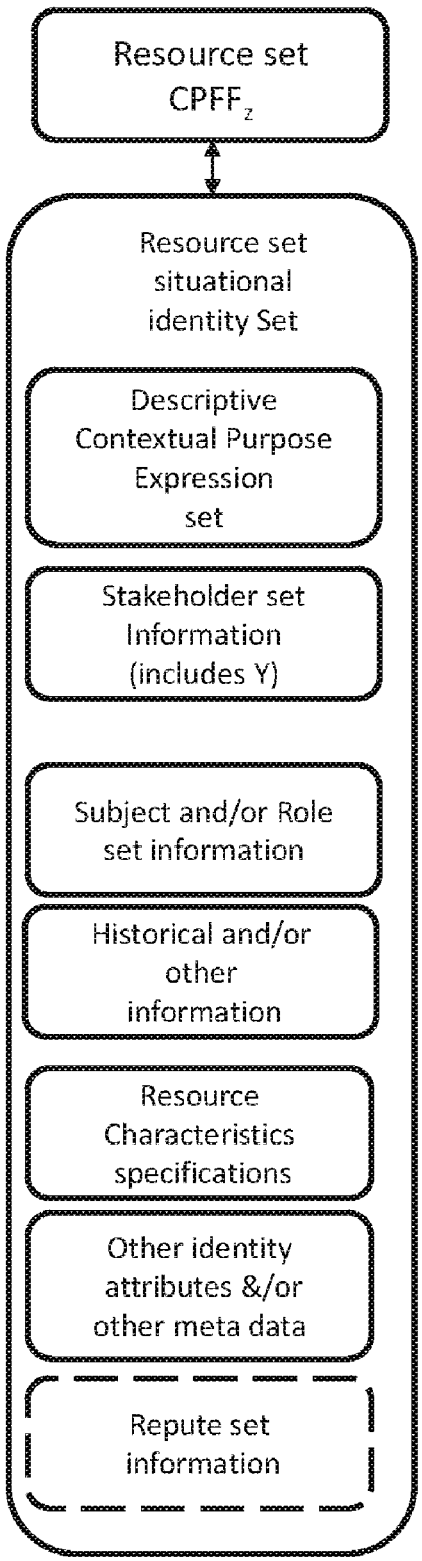

Illustrative example

Descriptive CPE
{ learn: Medical technology
investment opportunities}

Stakeholder type= Publisher
{ Stakeholder STK$_2$ Existential ID
        Registrar = /utility 1/id1010
        Time= "time/date of registration"
        Testing = date set for resource info set
        Tokens= set( a1134) }

CPFF general QtP rigor 8/10

Historic and crowd general or filter based,
environment based
e.g. nodal, provenance , general preference,
information and/or the like RCS
    {purpose: support users interact with
                   investment firms}
    {cost: $10 --cost role 1, $5, cost role 2, $6}
    {<Dependencies>}

For example other PIDMX sets

Repute Set
{ (Subject: Resource CPFF$_z$
    CPE: learn: Medical technology
           investment opportunities
    Stakeholder type = publisher
    Stakeholder STK$_2$ existential identifier "ID$_2$"
    Quality to Purpose (8/10))}

Appendix set A-24

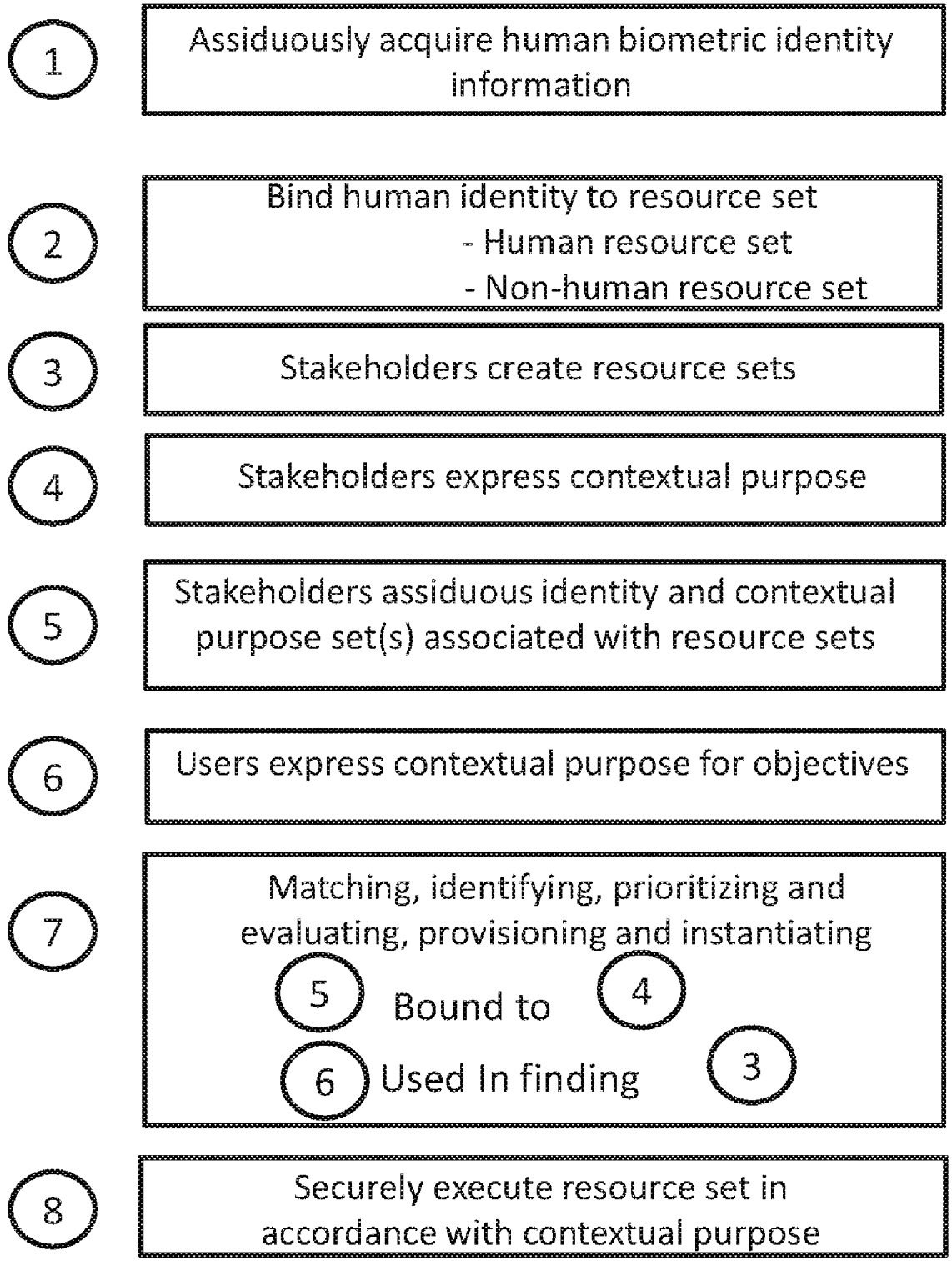
Appendix set A-25

What is claimed is:

1. A secure, tamper resistant identity system for device and device corresponding stakeholder assiduous identification and authentication, such system comprising:
one or more computing arrangements, including at least one processor, for use in providing one or more standardized at least one of resources and specifications, that at least in part enable forming and validating device stakeholder biometric, and device, bound identifying attribute information sets,
wherein such one or more computing arrangements are employed to provide such one or more standardized at least one of resources and specifications, that at least in part, enable using a secure identity information processing and memory arrangement, producing device unique one or more identifier attribute information sets, wherein such identifier attribute information sets include one or more device identifier attributes that are securely at least one of embedded in, otherwise incorporated in, and otherwise securely bound to, their respective device resource corresponding information sets, such at least one of embedded in, otherwise incorporated in, and otherwise securely bound to, attribute information sets including respective devices' at least one of one or more private keys for respective digital certificates, and symmetric keys,
wherein such digital certificates are signed by, and/or symmetric keys are enabled by, their devices' respective manufacturers, and
wherein each device identifier attribute information set includes commercial value chain device corresponding stakeholder at least one of creator, manufacturer, distributor, retailer, and installer, identity information,
wherein such one or more computing arrangements are employed to provide such one or more standardized at least one of resources and specifications, that at least in part, enable using a human biometric identification arrangement comprising, at least in part, at least one of secure electromagnetic and ultrasound, sensor set for biometric identification of device stakeholder identity information sets,
wherein device stakeholders comprise at least one of one or more manufacturers, providers, distributors, retailers, installers, and at least one of users and owners, wherein at least one of stakeholder biometric attribute information sets and information sets respectively derived therefrom, are at least one of securely included in, and securely associated with, respective, corresponding device information sets to form device stakeholder biometric, and device, bound identifying attribute information sets, and
wherein such one or more computing arrangements are employed to provide such one or more standardized at least one of resources and specifications, that at least in part, enable device validation, employing an at least in part hardware tamper resistant processing and memory arrangement, in support of validating such stakeholder biometric, and device, bound identifying attribute information sets, and wherein a determination as to whether to use one or more devices is based, at least in part, on validating the authenticity of device respective at least one of such stakeholder biometric attribute information sets, and such bound identifying attribute information sets.

2. A system as in claim 1, wherein providing such one or more standardized at least one of resources and specifications, enables at least in part, with a computing arrangement including at least one processor, securely registering, respective devices' such bound identifying attribute information sets as device and stakeholder resource identifying information sets with at least one of a cloud service and network service, arrangement.

3. A system as in claim 2, wherein providing such one or more standardized at least one of resources and specifications, enables at least in part, with a computing arrangement including at least one processor, securely storing for each such respective device, at least a portion of such resource identifying information set, within such device and at an at least one of cloud service and network service, arrangement, as at least a portion of a device identity information set.

4. A system as in any one of claims 1, 2, and 3, wherein providing such one or more standardized at least one of resources and specifications, enables at least in part, with a computing arrangement including at least one processor, use of devices based, at least in part, by respectively validating at least one of such stakeholder biometric, and device, bound identifying attribute information sets and stakeholder identifying biometric attribute information sets, through secure communication with such at least one of a cloud service and a network service, arrangement.

5. A system as in any one of claims 1, 2, and 3, wherein providing such one or more standardized at least one of resources and specifications, enables at least in part, with a computing arrangement including at least one processor, such biometric identification arrangement to employ an at least in part hardware tamper resistant pseudo random generator arrangement to produce unpredictable biometric identification arrangement emitter emissions.

6. A system as in any one of claims 1, 2, and 3, wherein providing such one or more standardized at least one of resources and specifications, enables at least in part, with a computing arrangement including at least one processor, a secret set to be shared by
each at least one of Identity Firewall and Awareness Manager, arrangement, such at least one arrangement including at least one of a sensor set and an emitter and sensor set, and
at least one of a cloud service and an administrative, arrangement.

7. A system as in claim 1, wherein providing such one or more standardized at least one of resources and specifications, enables at least in part, with a computing arrangement, including at least one processor and at least one emitter, each biometric identification emitter and sensor arrangement to employ a shared secret, wherein such secret is protected by a hardened environment, wherein such secret is employed, at least in part, in securely communicating at least one of emitter instructions and emitter updates.

8. A system as in any one of claims 1, 2, 3, and 7, wherein providing such one or more standardized at least one of resources and specifications, enables at least in part, with a computing arrangement including at least one processor, such secure, tamper resistant identity system to include at least one of an Identity Firewall and Awareness Manager, arrangement, wherein each such at least one of an Identity Firewall and Awareness Manager, arrangement has a uniquely identifying secret set.

9. A system as in claim 8, wherein providing such one or more standardized at least one of resources and specifications, enables at least in part, with a computing arrangement including at least one processor and at least one emitter, each such at least one of an Identity Firewall and Awareness Manager, arrangement to have an at least in part algorithmic processing arrangement for producing respective emitter and sensor set human biometric identification arrangements' emitter pseudo random emissions.

10. A system as in claim 9, wherein providing such one or more standardized at least one of resources and specifications, enables at least in part, with a computing arrangement including at least one processor, at least a portion of processes for each such at least one of an Identity Firewall and Awareness Manager, arrangement to employ: information encryption capabilities, and misdirection and/or obfuscation capabilities.

11. A system as in claim 8, wherein providing such one or more standardized at least one of resources and specifications, enables at least in part, with a computing arrangement including at least one processor, at least a portion of processes for each such at least one of an Identity Firewall and Awareness Manager, arrangement to employ: information encryption capabilities, and misdirection and/or obfuscation capabilities.

12. A method for establishing a secure, tamper resistant identity system for device and device corresponding stakeholder assiduous identification and authentication, such method comprising:

providing, through use of one or more computing arrangements, including at least one processor, one or more standardized at least one of resources and specifications, that at least in part enable forming and validating device stakeholder biometric, and device, bound identifying attribute information sets, wherein such providing one or more standardized at least one of resources and specifications, at least in part, enables using a secure identity information processing and memory arrangement, producing device unique one or more identifier attribute information sets, wherein such identifier attribute information sets include one or more device identifier attributes that are securely at least one of embedded in, otherwise incorporated in, and otherwise securely bound to, their respective device resource corresponding information sets, such at least one of embedded in, otherwise incorporated in, and otherwise securely bound to, attribute information sets including respective devices' at least one of one or more private keys for respective digital certificates, and symmetric keys, wherein such digital certificates are signed by, and/or symmetric keys are enabled by, their devices' respective manufacturers, and wherein each device identifier attribute information set includes commercial value chain device corresponding stakeholder at least one of creator, manufacturer, distributor, retailer, and installer, identity information, wherein such providing one or more standardized at least one of resources and specifications, at least in part, enables using a human biometric identification arrangement comprising, at least in part, at least one of secure electromagnetic and ultrasound, sensor set for biometric identification of device stakeholder identity information sets, wherein device stakeholders comprise at least one of one or more manufacturers, providers, distributors, retailers, installers, and at least one of users and owners, wherein at least one of stakeholder biometric attribute information sets and information sets respectively derived therefrom, are at least one of securely included in, and securely associated with, respective, corresponding device information sets to form device stakeholder biometric, and device, bound identifying attribute information sets, and wherein such providing one or more standardized at least one of resources and specifications, at least in part, enables device validation, employing an at least in part hardware tamper resistant processing and memory arrangement, in support of validating such stakeholder biometric, and device, bound identifying attribute information sets, and wherein a determination as to whether to use one or more devices is based, at least in part, on validating the authenticity of device respective at least one of such stakeholder biometric attribute information sets, and such bound identifying attribute information sets.

13. A method as in claim 12, wherein such providing one or more standardized at least one of resources and specifications, enables at least in part, with a computing arrangement including at least one processor, securely registering, respective devices' such bound identifying attribute information sets as device and stakeholder resource identifying information sets with at least one of a cloud service and network service, arrangement.

14. A method as in claim 13, wherein such providing one or more standardized at least one of resources and specifications, enables at least in part, with a computing arrangement including at least one processor, securely storing for each such respective device, at least a portion of such resource identifying information set, within such device and at an at least one of cloud service and network service, arrangement, as at least a portion of a device identity information set.

15. A method as in any one of claims 12, 13, and 14, wherein such providing one or more standardized at least one of resources and specifications, enables at least in part, with a computing arrangement including at least one processor, use of devices based, at least in part, by respectively validating at least one of such stakeholder biometric, and device, bound identifying attribute information sets and stakeholder identifying biometric attribute information sets, through secure communication with such at least one of a cloud service and a network service, arrangement.

16. A method as in any one of claims 12, 13, and 14, wherein such providing one or more standardized at least one of resources and specifications, enables at least in part, with a computing arrangement including at least one processor, such biometric identification arrangement to employ an at least in part hardware tamper resistant pseudo random generator arrangement to produce unpredictable biometric identification arrangement emitter emissions.

17. A method as in any one of claims 12, 13, and 14, wherein such providing one or more standardized at least one of resources and specifications, enables at least in part, with a computing arrangement including at least one processor, a secret set to be shared by each at least one of Identity Firewall and Awareness Manager, arrangement, such at least one arrangement including at least one of a sensor set and an emitter and sensor set, and at least one of a cloud service and an administrative, arrangement.

18. A method as in claim 12, wherein such providing one or more standardized at least one of resources and specifications, enables at least in part, with a computing arrangement including at least one processor and at least one emitter, each biometric identification emitter and sensor arrangement to employ a shared secret, wherein such secret is protected by a hardened environment, wherein such secret is employed, at least in part, in securely communicating at least one of emitter instructions and emitter updates.

19. A method as in any one of claims 12, 13, 14, and 18, wherein such providing one or more standardized at least one of resources and specifications, enables at least in part, with a computing arrangement including at least one processor, such secure, tamper resistant identity system to include at least one of an Identity Firewall and Awareness Manager, arrangement, wherein each such at least one of an Identity Firewall and Awareness Manager, arrangement has a uniquely identifying secret set.

20. A method as in claim 19, wherein such providing one or more standardized at least one of resources and specifications, enables at least in part, with a computing arrangement including at least one processor and at least one emitter, each such at least one of an Identity Firewall and Awareness Manager, arrangement to have an at least in part algorithmic processing arrangement for producing respective emitter and sensor set human biometric identification arrangements' emitter pseudo random emissions.

21. A method as in claim 20, wherein such providing one or more standardized at least one of resources and specifications, enables at least in part, with a computing arrangement including at least one processor, at least a portion of processes for each such at least one of an Identity Firewall and Awareness Manager, arrangement to employ: information encryption capabilities, and misdirection and/or obfuscation capabilities.

22. A method as in claim 19, wherein such providing one or more standardized at least one of resources and specifications, enables at least in part, with a computing arrangement including at least one processor, at least a portion of processes for each such at least one of an Identity Firewall and Awareness Manager, arrangement to employ: information encryption capabilities, and misdirection and/or obfuscation capabilities.

* * * * *